US011523243B2

(12) United States Patent
Satongar et al.

(10) Patent No.: US 11,523,243 B2
(45) Date of Patent: Dec. 6, 2022

(54) SYSTEMS, METHODS, AND GRAPHICAL USER INTERFACES FOR USING SPATIALIZED AUDIO DURING COMMUNICATION SESSIONS

(71) Applicant: Apple Inc., Cupertino, CA (US)

(72) Inventors: Darius A. Satongar, Santa Clara, CA (US); Per Håkan Linus Persson, San Francisco, CA (US); Sean B. Kelly, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/483,741

(22) Filed: Sep. 23, 2021

(65) Prior Publication Data
US 2022/0103963 A1 Mar. 31, 2022

Related U.S. Application Data

(60) Provisional application No. 63/197,483, filed on Jun. 6, 2021, provisional application No. 63/152,796, filed on (Continued)

(51) Int. Cl.
H04S 7/00 (2006.01)
G06F 3/0486 (2013.01)
(Continued)

(52) U.S. Cl.
CPC ............ H04S 7/303 (2013.01); G06F 3/0486 (2013.01); G06F 3/165 (2013.01); H04N 7/152 (2013.01);
(Continued)

(58) Field of Classification Search
None
See application file for complete search history.

(56) References Cited

U.S. PATENT DOCUMENTS 8,126,399 B1  2/2012 Lee
8,290,537 B2  10/2012 Lee et al.
(Continued)

FOREIGN PATENT DOCUMENTS

CN   102439972 A   5/2012
CN   104054323 A   9/2014
(Continued)

OTHER PUBLICATIONS

3GPP, "3rd Generation Partnership project; Technical Specification Group Services and System Aspects; Release 16", ftp://ftp.3gpp.org/specs/archive/26_series/26.928/26928-110.zip 26928-110-rm.doc, Oct. 29, 2019, 4 pages.

(Continued)

Primary Examiner — Duc Nguyen
Assistant Examiner — Assad Mohammed
(74) Attorney, Agent, or Firm — Morgan, Lewis & Bockius LLP

(57) ABSTRACT

An electronic device communicates with a display, an input device, and a wearable audio output device. The device displays a user interface with dynamic visual representations of participants in a communication session. Outputting, via the wearable audio output device, audio from the plurality of participants in the communication session. The audio is adjusted to maintain simulated spatial locations of participants relative to a frame of reference of the communication session, independently of a position of the wearable audio output device relative to the frame of reference. The simulated spatial locations correspond to the locations of the dynamic visual representations. Receiving an input selecting one of the dynamic visual representations. In response, displaying the dynamic visual representations at locations different from their initial locations, and outputting audio from the participants to position their audio at a different (Continued)

simulated spatial locations, relative to the frame of reference.

81 Claims, 83 Drawing Sheets

Related U.S. Application Data on Feb. 23, 2021, provisional application No. 63/083,807, filed on Sep. 25, 2020.

(51) Int. Cl.
*G06F 3/16* (2006.01)
*H04N 7/15* (2006.01)

(52) U.S. Cl.
CPC ....... *H04S 2400/01* (2013.01); *H04S 2400/13* (2013.01); *H04S 2420/01* (2013.01)

(56) References Cited

U.S. PATENT DOCUMENTS

| | | | |
|---|---|---|---|
| 8,831,238 B2 | 9/2014 | Rashid et al. |
| 9,148,717 B2 | 9/2015 | Shaffer |
| 9,210,498 B1 | 12/2015 | Shaffer |
| 9,385,546 B2 | 7/2016 | Wakayama et al. |
| 9,398,367 B1 | 7/2016 | Scott et al. |
| 9,807,491 B2 | 10/2017 | Kim |
| 9,894,452 B1 | 2/2018 | Termeulen et al. |
| 9,949,015 B1 | 4/2018 | Minoo et al. |
| 10,042,595 B2 | 8/2018 | Behzadi et al. |
| 10,045,111 B1 | 8/2018 | Bonner et al. |
| 10,133,358 B1 | 11/2018 | Chen et al. |
| 10,136,214 B2 | 11/2018 | Smus et al. |
| 10,157,037 B2 | 12/2018 | Patel et al. |
| 10,200,780 B2 | 2/2019 | Steiner |
| 10,405,165 B2 | 9/2019 | Llami et al. |
| 10,628,105 B2 | 4/2020 | Behzadi et al. |
| 10,735,554 B1 | 8/2020 | Jorgovanovic |
| 11,006,201 B2 | 5/2021 | Kumar et al. |
| 11,089,398 B1 | 8/2021 | Venkatraman et al. |
| 11,115,746 B1 | 9/2021 | Morrison et al. |
| 11,204,733 B2 | 12/2021 | Behzadi et al. |
| 11,211,819 B2 | 12/2021 | Ng et al. |
| 11,228,625 B1* | 1/2022 | Libin ............... G06V 40/176 |
| 2003/0223604 A1 | 12/2003 | Nakagawa |
| 2006/0135218 A1 | 6/2006 | Son et al. |
| 2006/0166718 A1 | 7/2006 | Seshadri et al. |
| 2006/0200358 A1 | 9/2006 | Ohnemus et al. |
| 2007/0206829 A1 | 9/2007 | Weinans et al. |
| 2007/0300063 A1 | 12/2007 | Adams et al. |
| 2008/0076489 A1 | 3/2008 | Rosener et al. |
| 2008/0166968 A1 | 7/2008 | Tang et al. |
| 2008/0226094 A1 | 9/2008 | Rutschman |
| 2008/0248748 A1 | 10/2008 | Sangster et al. |
| 2009/0081999 A1 | 3/2009 | Khasawneh et al. |
| 2009/0170431 A1 | 7/2009 | Pering et al. |
| 2009/0280871 A1 | 11/2009 | Hofer et al. |
| 2010/0041333 A1 | 2/2010 | Ungari et al. |
| 2010/0074451 A1 | 3/2010 | Usher et al. |
| 2010/0309284 A1* | 12/2010 | Samadani ............... H04N 7/15 348/E7.083 |
| 2010/0310087 A1 | 12/2010 | Ishida |
| 2011/0116643 A1 | 5/2011 | Tiscareno et al. |
| 2011/0159959 A1 | 6/2011 | Mallinson et al. |
| 2011/0222701 A1 | 9/2011 | Donaldson et al. |
| 2011/0286615 A1 | 11/2011 | Olodort et al. |
| 2012/0096188 A1 | 4/2012 | Cohen et al. |
| 2012/0144473 A1 | 6/2012 | Wyld |
| 2012/0215366 A1 | 8/2012 | Redmond et al. |
| 2012/0262537 A1 | 10/2012 | Baker et al. |
| 2012/0289157 A1 | 11/2012 | Palin et al. |
| 2012/0317194 A1 | 12/2012 | Tian |
| 2013/0121494 A1 | 5/2013 | Johnston |
| 2013/0154917 A1 | 6/2013 | Adermann et al. |
| 2013/0182867 A1 | 7/2013 | Knowles |
| 2013/0311694 A1 | 11/2013 | Bhamidipati et al. |
| 2014/0016803 A1 | 1/2014 | Puskarich |
| 2014/0037104 A1 | 2/2014 | Seo et al. |
| 2014/0126734 A1 | 5/2014 | Gauger, Jr. et al. |
| 2014/0152235 A1 | 6/2014 | Huang et al. |
| 2014/0247948 A1 | 9/2014 | Goldstein |
| 2014/0270200 A1 | 9/2014 | Usher et al. |
| 2014/0341399 A1 | 11/2014 | Dusse et al. |
| 2015/0054458 A1 | 2/2015 | Yoon et al. |
| 2015/0102879 A1 | 4/2015 | Jacobs et al. |
| 2015/0200558 A1 | 7/2015 | Castillo et al. |
| 2015/0230022 A1 | 8/2015 | Sakai et al. |
| 2015/0245126 A1 | 8/2015 | Shaffer |
| 2015/0245127 A1 | 8/2015 | Shaffer |
| 2015/0281257 A1 | 10/2015 | Gauger, Jr. et al. |
| 2015/0294662 A1 | 10/2015 | Ibrahim |
| 2015/0310846 A1 | 10/2015 | Andersen et al. |
| 2015/0319554 A1 | 11/2015 | Blanche et al. |
| 2015/0351143 A1 | 12/2015 | Seymour et al. |
| 2016/0007140 A1 | 1/2016 | Yae et al. |
| 2016/0014492 A1 | 1/2016 | McCarthy et al. |
| 2016/0029114 A1 | 1/2016 | Chen |
| 2016/0071409 A1 | 3/2016 | Suomela et al. |
| 2016/0072936 A1 | 3/2016 | Kim et al. |
| 2016/0073249 A1 | 3/2016 | Moore et al. |
| 2016/0094934 A1 | 3/2016 | Yang et al. |
| 2016/0109931 A1 | 4/2016 | Kobayashi |
| 2016/0119708 A1 | 4/2016 | Rodzevski et al. |
| 2016/0134141 A1 | 5/2016 | Jentz et al. |
| 2016/0165381 A1 | 6/2016 | Kapoor et al. |
| 2016/0180806 A1 | 6/2016 | Sharp et al. |
| 2016/0219358 A1 | 7/2016 | Shaffer et al. |
| 2016/0241972 A1 | 8/2016 | Gobeli et al. |
| 2016/0291666 A1 | 10/2016 | Hosoya et al. |
| 2016/0351183 A1 | 12/2016 | Gauger, Jr. et al. |
| 2017/0013345 A1 | 1/2017 | Kumar et al. |
| 2017/0048613 A1 | 2/2017 | Smus et al. |
| 2017/0108906 A1 | 4/2017 | Chandra et al. |
| 2017/0134845 A1 | 5/2017 | Milam et al. |
| 2017/0180840 A1 | 6/2017 | Yamkovoy |
| 2017/0193974 A1 | 7/2017 | Gadonniex et al. |
| 2017/0195466 A1 | 7/2017 | Chen |
| 2017/0214994 A1 | 7/2017 | Gadonniex et al. |
| 2017/0245039 A1 | 8/2017 | Chen |
| 2017/0251295 A1 | 8/2017 | Pergament et al. |
| 2017/0256978 A1 | 9/2017 | Sauterel et al. |
| 2017/0293577 A1 | 10/2017 | Gomzin et al. |
| 2017/0318374 A1 | 11/2017 | Dolenc et al. |
| 2017/0339483 A1 | 11/2017 | Ergezer et al. |
| 2018/0048960 A1 | 2/2018 | Jeffrey et al. |
| 2018/0067712 A1 | 3/2018 | Behzadi et al. |
| 2018/0088897 A1 | 3/2018 | Mathur |
| 2018/0114518 A1 | 4/2018 | Scanlan et al. |
| 2018/0132088 A1 | 5/2018 | Lee |
| 2018/0152781 A1 | 5/2018 | Boyer et al. |
| 2018/0206022 A1 | 7/2018 | Hsieh |
| 2018/0206025 A1 | 7/2018 | Rule et al. |
| 2018/0242085 A1 | 8/2018 | Dohmen et al. |
| 2018/0249266 A1 | 8/2018 | Termeulen et al. |
| 2018/0277123 A1 | 9/2018 | Boesen et al. |
| 2018/0279063 A1 | 9/2018 | Sun et al. |
| 2018/0286428 A1 | 10/2018 | Seider |
| 2018/0295439 A1 | 10/2018 | Garrett |
| 2018/0295455 A1 | 10/2018 | Eichfeld et al. |
| 2018/0301134 A1 | 10/2018 | Le et al. |
| 2018/0341448 A1 | 11/2018 | Behzadi et al. |
| 2018/0376528 A1 | 12/2018 | Lee et al. |
| 2019/0052951 A1 | 2/2019 | Kofman et al. |
| 2019/0075385 A1 | 3/2019 | Lee et al. |
| 2019/0081499 A1 | 3/2019 | Sun et al. |
| 2019/0124432 A1 | 4/2019 | Champy |
| 2019/0215611 A1 | 7/2019 | Lou et al. |
| 2019/0278556 A1 | 9/2019 | Usher et al. |
| 2019/0305591 A1 | 10/2019 | Ng et al. |
| 2019/0339825 A1 | 11/2019 | Anzures et al. |
| 2019/0341050 A1* | 11/2019 | Diamant ............... H04N 7/147 |
| 2019/0361666 A1 | 11/2019 | Oide et al. |
| 2020/0007989 A1 | 1/2020 | Gong et al. |

(56) References Cited

U.S. PATENT DOCUMENTS

| | | | |
|---|---|---|---|
| 2020/0014792 | A1 | 1/2020 | Lyren et al. |
| 2020/0067340 | A1 | 2/2020 | Batra et al. |
| 2020/0150740 | A1 | 5/2020 | Zhang et al. |
| 2020/0213705 | A1 | 7/2020 | Ding et al. |
| 2020/0213799 | A1 | 7/2020 | Lyren |
| 2020/0218486 | A1 | 7/2020 | Behzadi et al. |
| 2020/0275223 | A1 | 8/2020 | Usher et al. |
| 2021/0014610 | A1 | 1/2021 | Carrigan et al. |
| 2021/0014611 | A1 | 1/2021 | Carrigan et al. |
| 2021/0014612 | A1 | 1/2021 | Carrigan |
| 2021/0014613 | A1 | 1/2021 | Carrigan et al. |
| 2021/0126470 | A1 | 4/2021 | Banerjee et al. |
| 2021/0210967 | A1 | 7/2021 | Xiongbin |
| 2021/0218595 | A1 | 7/2021 | Liu et al. |
| 2021/0255816 | A1 | 8/2021 | Behzadi et al. |
| 2021/0281943 | A1 | 9/2021 | Lehnert |
| 2021/0377663 | A1 | 12/2021 | Carrigan et al. |
| 2021/0391739 | A1 | 12/2021 | Venkatraman et al. |
| 2022/0078864 | A1 | 3/2022 | Yang et al. |
| 2022/0107771 | A1 | 4/2022 | Behzadi et al. |

FOREIGN PATENT DOCUMENTS

| | | | |
|---|---|---|---|
| CN | 104365173 | A | 2/2015 |
| CN | 106291121 | A | 1/2017 |
| EP | 2190213 | A1 | 5/2010 |
| EP | 3188495 | A1 | 7/2017 |
| EP | 3001695 | B1 | 7/2018 |
| EP | 3456299 | A1 | 3/2019 |
| EP | 3599777 | A1 | 1/2020 |
| EP | 3664092 | A1 | 6/2020 |
| JP | 2009-532937 | | 9/2009 |
| JP | 2011-521504 | | 7/2011 |
| JP | 2013-051626 | A | 3/2013 |
| JP | 2017-126873 | A | 7/2017 |
| KR | 101236167 | B1 | 2/2013 |
| KR | 2014-0018701 | A | 2/2014 |
| KR | 2015-0021803 | A | 3/2015 |
| KR | 101518010 | B1 | 5/2015 |
| WO | WO 2008/000304 | A1 | 1/2008 |
| WO | WO 2012/170446 | A2 | 12/2012 |
| WO | WO 2013/030736 | A1 | 3/2013 |
| WO | WO 2013/064747 | A1 | 5/2013 |
| WO | WO 2015/006950 | A1 | 1/2015 |
| WO | WO 2015/185123 | A1 | 12/2015 |
| WO | WO 2016/036541 | A2 | 3/2016 |
| WO | WO 2016/063143 | A1 | 4/2016 |
| WO | WO 2016/066483 | A1 | 5/2016 |
| WO | WO 2020/204611 | A1 | 10/2020 |
| WO | WO 2021/136671 | A1 | 7/2021 |

OTHER PUBLICATIONS

Aguilera et al., "Spatial Audio for Audioconferencing in Mobile Devices: Investigating the Importance of Virtual Mobility and Private Communication and Optimizations", https://www.aes.og/e-lib=18138, 4 pages.
Anonymous, "RX-V3800AV Receiver Owner's Manual", Yamaha Music Manuals, Dec. 31, 2007, pp. 35, 36, 44-50.
Samsung Electronics America, Inc., "Gear Icon X SM-R150", User Manual, https://static.bhphtovideo.com/lit_files/268655.pdf, Aug. 6, 2016, 43 pages.
Office Action, dated Feb. 27, 2017, received in U.S. Appl. No. 15/271,114, 18 pages.
Final Office Action, dated Nov. 9, 2017, received in U.S. Appl. No. 15/271,114, 18 pages.
Notice of Allowance, dated Apr. 10, 2018, received in U.S. Appl. No. 15/271,114, 10 pages.
Innovation Patent, dated Aug. 16, 2017, received in Australian Patent Application No. 2017101032, which corresponds with U.S. Appl. No. 15/271,114, 4 pages.
Office Action, dated Nov. 6, 2017, received in Australian Patent Application No. 2017101032, which corresponds with U.S. Appl. No. 15/271,114, 5 pages.
Certificate of Exam, dated May 1, 2018, received in Australian Patent Application No. 2017101032, which corresponds with U.S. Appl. No. 15/271,114, 1 page.
Notice of Acceptance, dated Feb. 19, 2019, received in Australian Patent Application No. 2017324072, which corresponds with U.S. Appl. No. 15/271,114, 3 pages.
Certificate of Grant, dated Jun. 13, 2019, received in Australian Patent Application No. 2017324072, which corresponds with U.S. Appl. No. 15/271,114, 1 page.
Office Action, dated Sep. 25, 2019, received in Chinese Patent Application No. 201710741130.4, which corresponds with U.S. Appl. No. 15/271,114, 5 pages.
Office Action, dated Jun. 18, 2020, received in Chinese Patent Application No. 201710741130.4, which corresponds with U.S. Appl. No. 15/271,114, 10 pages.
Notice of Allowance, dated Nov. 27, 2020, received in Chinese Patent Application No. 201710741130.4, which corresponds with U.S. Appl. No. 15/271,114, 3 pages.
Patent, dated Jan. 22, 2021, received in Chinese Patent Application No. 201710741130.4, which corresponds with U.S. Appl. No. 15/271,114, 6 pages.
Office Action, dated Dec. 16, 2016, received in Danish Patent Application No. 201670727, which corresponds with U.S. Appl. No. 15/271,114, 7 pages.
Office Action, dated May 29, 2017, received in Danish Patent Application No. 201670727, which corresponds with U.S. Appl. No. 15/271,114, 6 pages.
Office Action, dated Dec. 13, 2017, received in Danish Patent Application No. 201670727, which corresponds with U.S. Appl. No. 15/271,114, 6 pages.
Office Action, dated Aug. 16, 2019, received in European Patent Application No. 17746593.7, which corresponds with U.S. Appl. No. 15/271,114, 6 pages.
Office Action, dated Jul. 5, 2019, received in Japanese Patent Application No. 2019-506652, which corresponds with U.S. Appl. No. 15/271,114, 4 pages.
Notice of Allowance, dated Oct. 18, 2019, received in Japanese Patent Application No. 2019-506652, which corresponds with U.S. Appl. No. 15/271,114, 5 pages.
Patent, dated Nov. 22, 2019, received in Japanese Patent Application No. 2019-506652, which corresponds with U.S. Appl. No. 15/271,114, 3 pages.
Office Action, dated Jun. 17, 2019, received in Korean Patent Application No. 2019-7004211, which corresponds with U.S. Appl. No. 15/271,114, 3 pages.
Notice of Allowance, dated Sep. 17, 2019, received in Korean Patent Application No. 2019-7004211, which corresponds with U.S. Appl. No. 15/271,114, 4 pages.
Patent, dated Dec. 4, 2019, received in Korean Patent Application No. 2019-7004211, which corresponds with U.S. Appl. No. 15/271,114, 4 pages.
Office Action, dated Oct. 3, 2019, received in U.S. Appl. No. 16/056,328, 11 pages.
Notice of Allowance, dated Jan. 15, 2020, received in U.S. Appl. No. 16/056,328, 7 pages.
Notice of Allowance, dated Feb. 22, 2021, received in Australian Patent Application No. 2019203626, which corresponds with U.S. Appl. No. 16/056,328, 3 pages.
Certificate of Grant, dated Jun. 24, 2021, received in Australian Patent Application No. 2019203626, which corresponds with U.S. Appl. No. 16/056,328, 3 pages.
Office Action, dated Jul. 2, 2021, received from Chinese Patent Application No. 202011538744.0, which corresponds with U.S. Appl. No. 16/056,328, 4 pages.
Office Action, dated Dec. 30, 2021, received from Chinese Patent Application No. 202011538744.0, which corresponds with U.S. Appl. No. 16/056,328, 2 pages.
Office Action, dated Mar. 29, 2022, received from Chinese Patent Application No. 202011538744.0, which corresponds with U.S. Appl. No. 16/056,328, 1 page.

(56) References Cited

OTHER PUBLICATIONS

Office Action, dated Jan. 12, 2021, received in Japanese Patent Application No. 2019-207313, which corresponds with U.S. Appl. No. 16/056,328, 5 pages.
Office Action, dated Oct. 18, 2021, received in Japanese Patent Application No. 2019-207313, which corresponds with U.S. Appl. No. 16/056,328, 2 pages.
Notice of Allowance, dated Mar. 11, 2022, received in Japanese Patent Application No. 2019-207313, which corresponds with U.S. Appl. No. 16/056,328, 2 pages.
Office Action, dated Apr. 6, 2020, received in Korean Patent Application No. 2019-7035730, which corresponds with U.S. Appl. No. 16/056,328, 2 pages.
Notice of Allowance, dated Jun. 23, 2020, received in Korean Patent Application No. 2019-7035730, which corresponds with U.S. Appl. No. 16/056,328, 2 pages.
Patent, dated Sep. 14, 2020, received in Korean Patent Application No. 2019-7035730, which corresponds with U.S. Appl. No. 16/056,328, 3 pages.
Office Action, dated Jun. 24, 2021, received in U.S. Appl. No. 16/920,303, 5 pages.
Notice of Allowance, dated Sep. 14, 2021, received in U.S. Appl. No. 16/920,303, 7 pages.
Office Action, dated Sep. 10, 2021, received in Australian Patent Application No. 2020-239693, which corresponds with U.S. Appl. No. 16/920,303, 2 pages.
Notice of Allowance, dated Oct. 15, 2021, received in Australian Patent Application No. 2020-239693, which corresponds with U.S. Appl. No. 16/920,303, 3 pages.
Patent, dated Feb. 17, 2022, 2022, received in Australian Patent Application No. 2020-239693, which corresponds with U.S. Appl. No. 16/920,303, 3 pages.
Office Action, dated Dec. 21, 2020, received in Danish Patent Application No. 2020-70630, which corresponds with U.S. Appl. No. 16/920,303, 8 pages.
Intention to Grant, Action, dated Mar. 3, 2021, received in Danish Patent Application No. 2020-70630, which corresponds with U.S. Appl. No. 16/920,303, 2 pages.
Notice of Allowance, dated Jun. 10, 2021, received in Danish Patent Application No. 2020-70630, which corresponds with U.S. Appl. No. 16/920,303, 2 pages.
Patent, dated Oct. 14, 2021, received in Danish Patent Application No. 2020-70630, which corresponds with U.S. Appl. No. 16/920,303, 6 pages.
Office Action, dated Feb. 21, 2022, received in Indian Patent Application No. 202017041564, which corresponds with U.S. Appl. No. 16/920,303, 6 pages.
Office Action, dated Jan. 7, 2022, received in Japanese Patent Application No. 2020-550113, which corresponds with U.S. Appl. No. 16/920,303, 2 pages.
Office Action, dated Nov. 24, 2021, received in U.S. Appl. No. 17/023,265, 16 pages.
Office Action, dated Sep. 4, 2020, received in U.S. Appl. No. 16/824,506, 17 pages.
Final Office Action, dated Mar. 22, 2021, received in U.S. Appl. No. 16/824,506, 22 pages.
Office Action, dated Aug. 5, 2021, received in U.S. Appl. No. 16/824,506, 20 pages.
Notice of Allowance, dated Oct. 18, 2021, received in U.S. Appl. No. 16/824,506, 9 pages.
Intent to Grant, dated Sep. 29, 2021, received in Australian Patent Application No. 2021201777, which corresponds with U.S. Appl. No. 16/824,506, 3 pages.
Notice of Acceptance, dated Nov. 29, 2021, received in Australian Patent Application No. 2021201777, which corresponds with U.S. Appl. No. 16/824,506, 3 pages.
Office Action, dated Jun. 9, 2021, received in Chinese Patent Application No. 202011544171.2, which corresponds with U.S. Appl. No. 16/824,506, 1 page.

Office Action, dated Nov. 11, 2021, received in Chinese Patent Application No. 202011544171.2, which corresponds with U.S. Appl. No. 16/824,506. (English translation is provided.) 5 pages.
Notice of Allowance, dated May 24, 2021, received in Korean Patent Application No. 2020-7026460, which corresponds with U.S. Appl. No. 16/824,506, 2 pages.
Notice of Allowance, dated Feb. 1, 2022, received in U.S. Appl. No. 17/031,637, 26 pages.
Notice of Allowance, dated Mar. 21, 2022, received in U.S. Appl. No. 17/031,637, 7 pages.
Office Action, dated Jan. 1, 2021, received in U.S. Appl. No. 17/028,936, 16 pages.
Final Office Action, dated Apr. 9, 2021, received in U.S. Appl. No. 17/028,936, 17 pages.
Notice of Allowance, dated Aug. 20, 2021, received in U.S. Appl. No. 17/028,936, 7 pages.
Notice of Allowance, dated Sep. 29, 2021, received in U.S. Appl. No. 17/028,936, 7 pages.
Office Action, dated Jan. 29, 2021, received in Danish Patent Application No. 2020-70718, which corresponds with U.S. Appl. No. 17/028,936, 7 pages.
Office Action, dated Oct. 22, 2021, received in Danish Patent Application No. 2020-70718, which corresponds with U.S. Appl. No. 17/028,936, 4 pages.
Intention to Grant, dated Jan. 7, 2022, received in Danish Patent Application No. 2020-70718, which corresponds with U.S. Appl. No. 17/028,936, 2 pages.
Office Action, dated Jan. 29, 2021, received in Danish Patent Application No. 2020-70719, which corresponds with U.S. Appl. No. 17/028,936, 7 pages.
Intention to Grant, dated Aug. 27, 2021, received in Danish Patent Application No. 2020-70719, which corresponds with U.S. Appl. No. 17/028,936, 2 pages.
Notice of Allowance, dated Dec. 16, 2021, received in Danish Patent Application No. 2020-70719, which corresponds with U.S. Appl. No. 17/028,936, 2 pages.
Patent, dated Mar. 21, 2022, received in Danish Patent Application No. 2020-70719, which corresponds with U.S. Appl. No. 17/028,936, 5 pages.
Office Action, dated Dec. 24, 2020, received in U.S. Appl. No. 17/028,947, 10 pages.
Final Office Action, dated Mar. 17, 2021, received in U.S. Appl. No. 17/028,947, 8 pages.
Office Action, dated Sep. 27, 2021, received in U.S. Appl. No. 17/028,947, 10 pages.
Notice of Allowance, dated Dec. 13, 2021, received in U.S. Appl. No. 17/028,947, 5 pages.
Office Action, dated Feb. 2, 2021, received in Danish Patent Application No. 202070720, which corresponds with U.S. Appl. No. 17/028,947, 3 pages.
Office Action, dated Nov. 4, 2021, received in Danish Patent Application No. 202070720, which corresponds with U.S. Appl. No. 17/028,947, 3 pages.
Office Action, dated Aug. 5, 2021, received in U.S. Appl. No. 17/306,898, 6 pages.
Notice of Allowance, dated Oct. 29, 2021, received in U.S. Appl. No. 17/306,898, 5 pages.
Office Action, dated Aug. 20, 2021, received in Korean Patent Application No. 2021-7022726, which corresponds with U.S. Appl. No. 17/306,898, 5 pages.
Final Office Action, dated Feb. 10, 2022, received in Korean Patent Application No. 2021-7022726, which corresponds with U.S. Appl. No. 17/306,898, 4 pages.
International Search Report and Written Opinion, dated Oct. 17, 2017, received in International Patent Application No. PCT/US2017/043047, which corresponds with U.S. Appl. No. 15/271,114, 12 pages.
Invitation to Pay Additional Fees, dated Oct. 8, 2020, received in International Patent Application No. PCT/2020/041074, which corresponds with U.S. Appl. No. 16/920,303, 24 pages.

(56) References Cited

OTHER PUBLICATIONS

International Search Report and Written Opinion, dated Dec. 3, 2020, received in International Patent Application No. PCT/US2020/041074, which corresponds with U.S. Appl. No. 16/920,303, 28 pages.

International Search Report and Written Opinion, dated Sep. 8, 2021, received in International Patent Application No. PCT/US2021/033200, which corresponds with U.S. Appl. No. 17/023,265, 17 pages.

Invitation to Pay Additional Fees, dated Nov. 18, 2021, received in International Patent Application No. PCT/2021/042402, which corresponds with U.S. Appl. No. 17/031,637, 22 pages.

International Search Report and Written Opinion, dated Jan. 11, 2022, received in International Patent Application No. US/2021/042402, which corresponds with U.S. Appl. No. 17/031,637, 22 pages.

Invitation to Pay Additional Fees, dated Mar. 9, 2022, received in International Patent Application No. PCT/US2021/052052, which corresponds with U.S. Appl. No. 17/483,741, 144 pages.

Office Action, dated Jun. 29, 2022, received in Chinese Patent Application No. 202011544171.2, which corresponds with U.S. Appl. No. 16/824,506, 5 pages.

Notice of Allowance, dated Jun. 29, 2022, received in U.S. Appl. No. 17/028,943, 7 pages.

Office Action, dated Jun. 23, 2022, received in U.S. Appl. No. 17/553,018, 17 pages.

Patent, dated Mar. 25, 2022, received in Japanese Patent Application No. 2019-207313, which corresponds with U.S. Appl. No. 16/056,328, 3 pages.

Office Action, dated Apr. 13, 2022, received in Korean Patent Application No. 2020-7027641, which corresponds with U.S. Appl. No. 16/920,303, 7 pages.

Final Office Action, dated Jun. 2, 2022, received in U.S. Appl. No. 17/023,265, 19 pages.

Patent, dated Mar. 31, 2022, received in Australian Patent Application No. 2021201777, which corresponds with U.S. Appl. No. 16/824,506, 3 pages.

Notice of Allowance, dated Apr. 26, 2022, received in Danish Patent Application No. 2020-70718, which corresponds with U.S. Appl. No. 17/028,936, 2 pages.

Office Action, dated May 25, 2022, received in U.S. Appl. No. 17/028,943, 5 pages.

Intent to Grant, dated May 5, 2022, received in Danish Patent Application No. 202070720, which corresponds with U.S. Appl. No. 17/028,947, 2 pages.

Office Action, dated Jun. 8, 2022, received in Korean Patent Application No. 2022-7016117, which corresponds with U.S. Appl. No. 17/553,018, 5 pages.

International Search Report and Written Opinion, dated May 3, 2022, received in International Patent Application No. PCT/US2021/052052, which corresponds with U.S. Appl. No. 17/483,741, 54 pages.

U.S. Appl. No. 10/951,043, filed Mar. 16, 2021, Behzadi et al.

U.S. Appl. No. 11/018,516, filed May 25, 2021, Cho et al.

U.S. Appl. No. 11/240,583, filed Feb. 1, 2022, DeMaio.

U.S. Appl. No. 11/269,575, filed Mar. 8, 2022, Behzadi et al.

Office Action, dated Sep. 1, 2022, received in U.S. Appl. No. 17/023,274, 16 pages.

Office Action, dated Aug. 12, 2022, received in Japanese Patent Application No. 2020-550113, which corresponds with U.S. Appl. No. 16/920,303, 2 pages.

Patent, dated Aug. 11, 2022, received in Danish Patent Application No. 2020-70718, which corresponds with U.S. Appl. No. 17/028,936, 3 pages.

Notice of Allowance, dated Jul. 28, 2022, received in Danish Patent Application No. 202070720, which corresponds with U.S. Appl. No. 17/028,947, 2 pages.

Extended European Search Report, dated Jul. 29, 2022, received in European Patent Application No. 22161118.9, which corresponds with U.S. Appl. No. 17/028,943, 8 pages.

\* cited by examiner

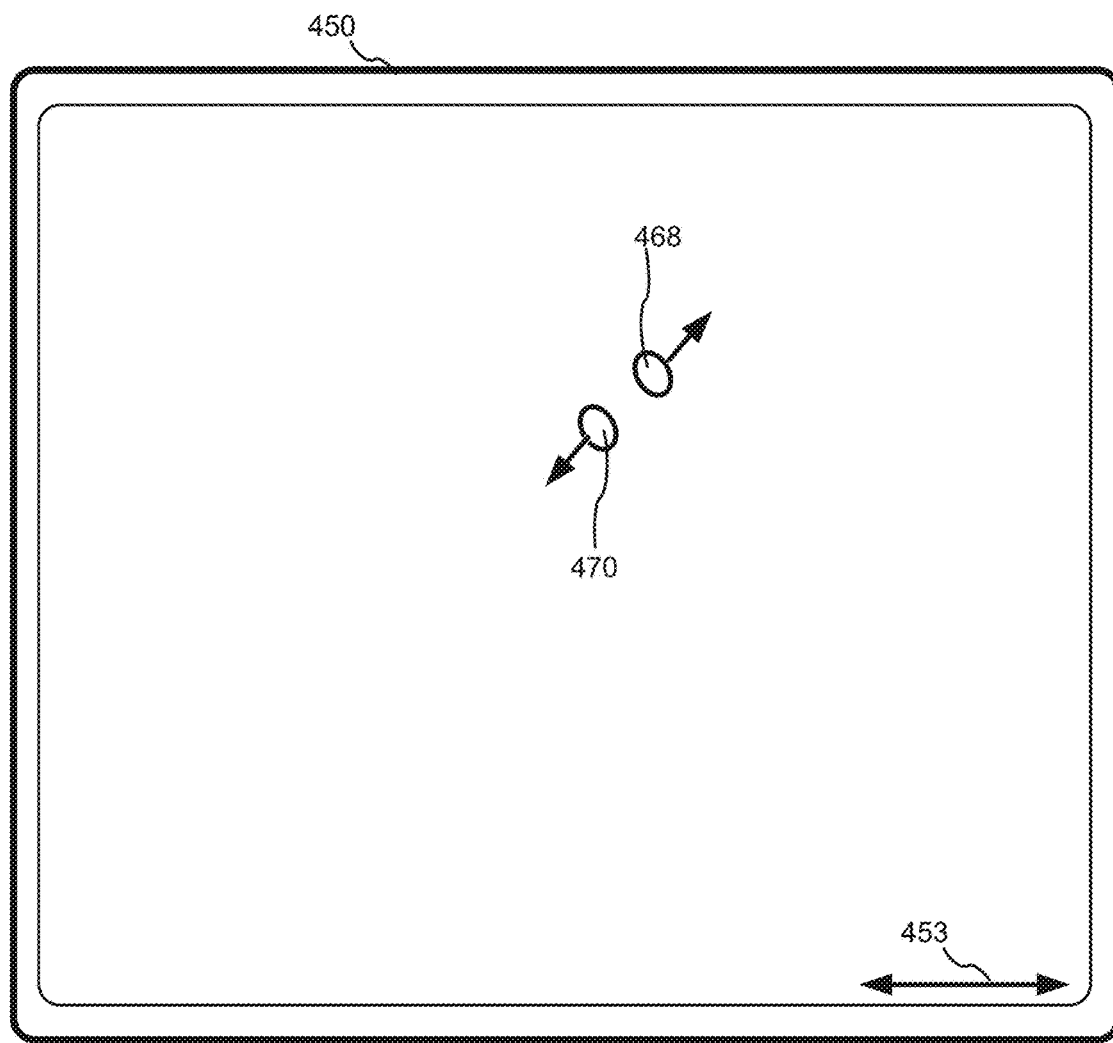
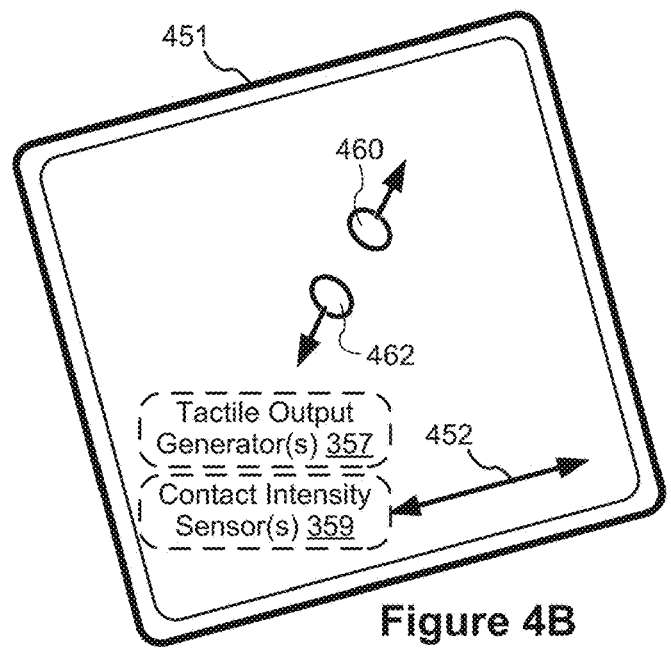
Figure 4B

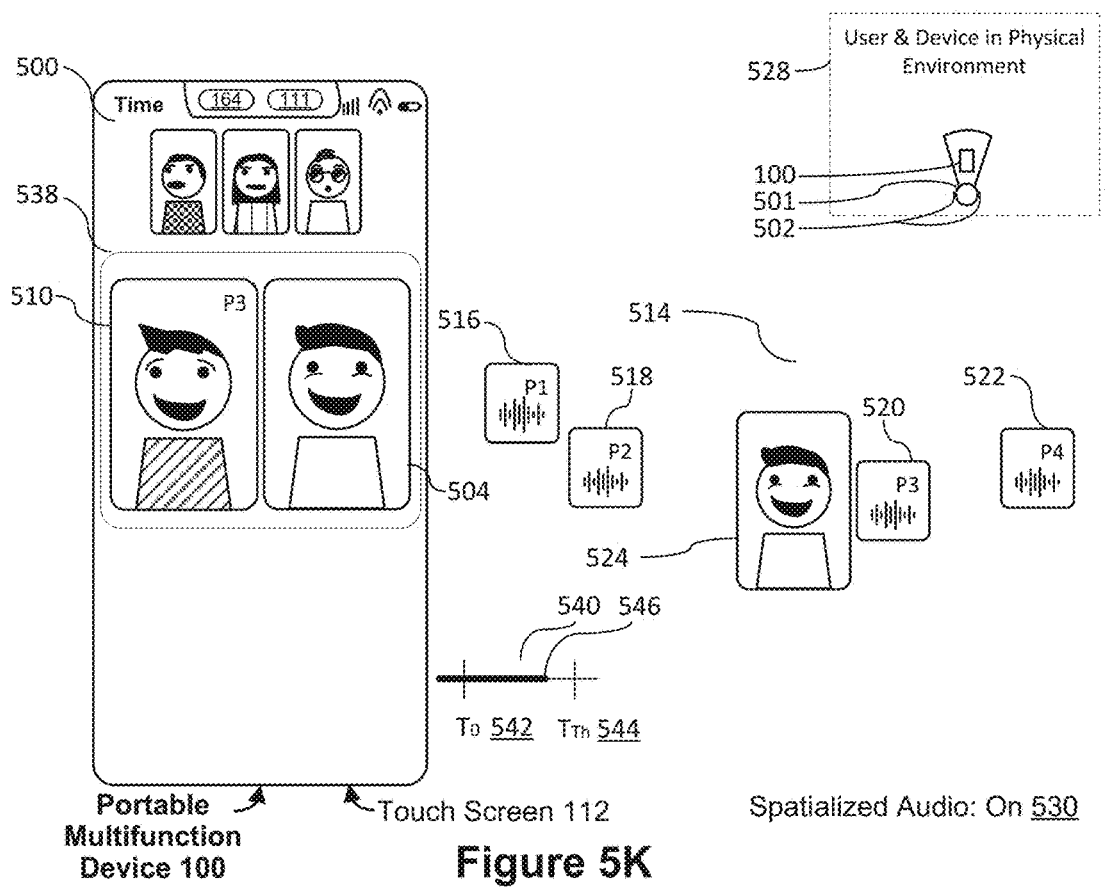
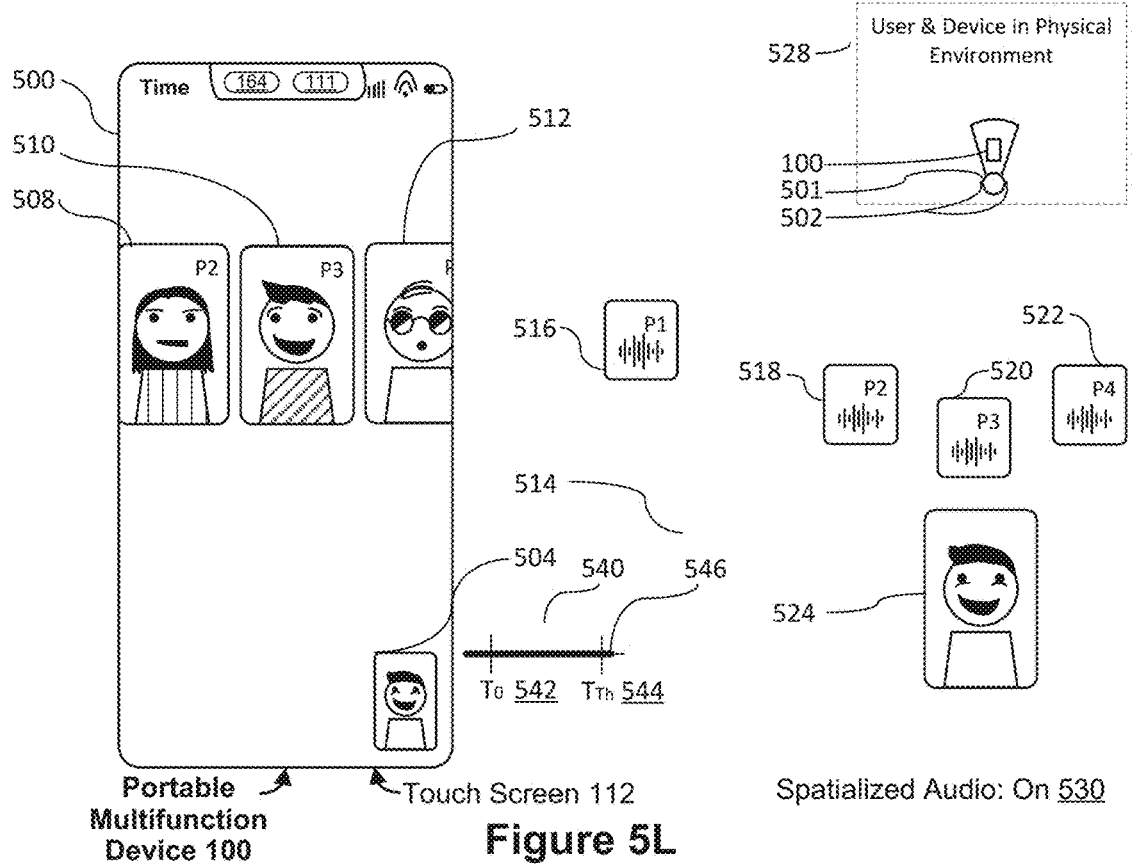

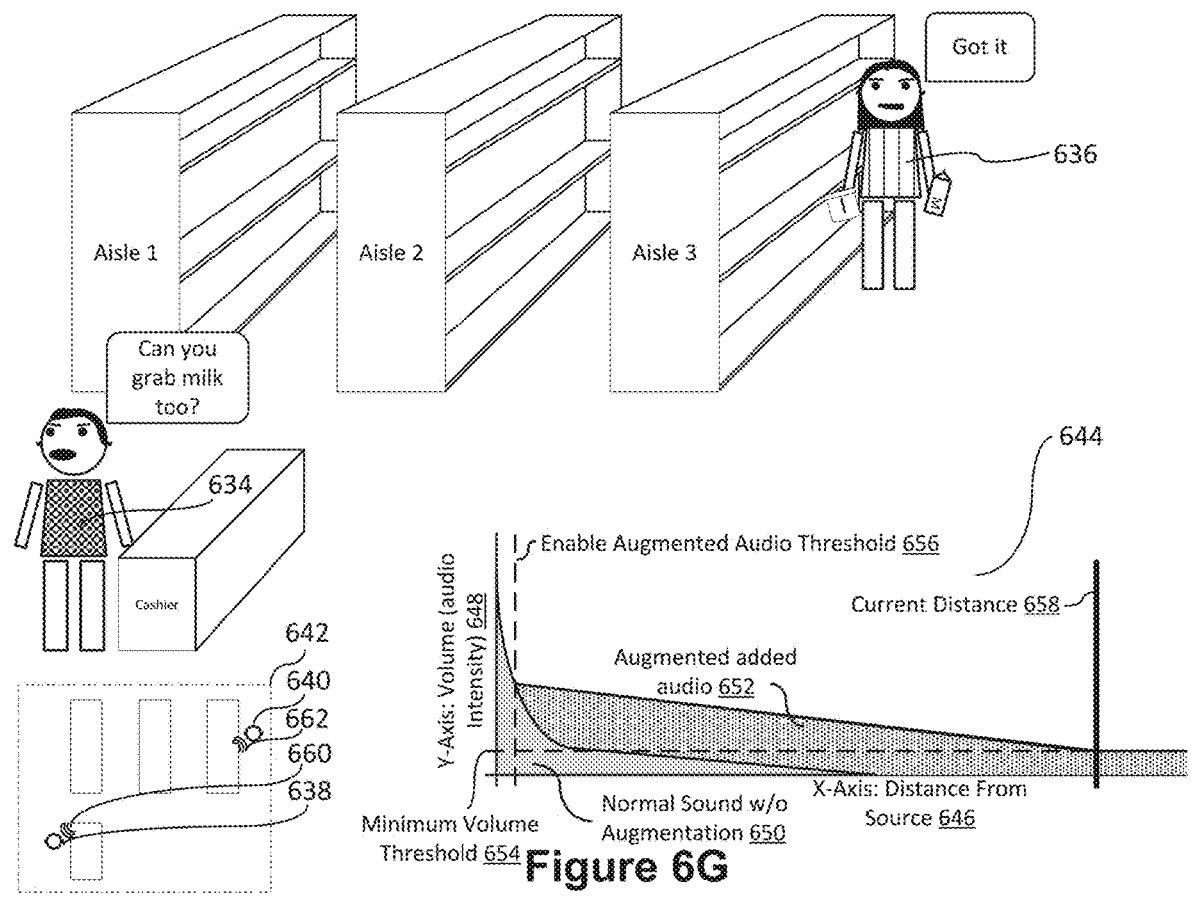

700

At an electronic device that is in communication with one or more display devices, one or more input devices, and a set of one or more wearable audio output devices:

702 Display, via the one or more display devices, a user interface including respective dynamic visual representations of a plurality of participants in a communication session, including displaying, at a first location in the user interface, a first dynamic visual representation of a first participant and displaying, at a second location in the user interface, a second dynamic visual representation of a second participant different from the first participant

704 Output, via the set of one or more wearable audio output devices, audio from the plurality of participants in the audio communication session, including:

706 Outputting first audio from the first participant, wherein the first audio is adjusted so as to maintain the first audio at a first simulated spatial location relative to a frame of reference of the audio communication session independently of a position of the set of one or more wearable audio output devices relative to the frame of reference, wherein the first simulated spatial location corresponds to the first location of the first dynamic visual representation in the user interface 708 Outputting second audio from the second participant, wherein the second audio is adjusted, so as to maintain the second audio at a second simulated spatial location relative to the frame of reference independently of a position of the set of one or more wearable audio output devices relative to the frame of reference, wherein the second simulated spatial location corresponds to the second location of the second dynamic visual representation in the user interface

710 Receive, via the one or more input devices, an input selecting the first dynamic visual representation of the first participant

712 In response to receiving the input selecting the first dynamic visual representation of the first participant:

714 Displaying the first dynamic visual representation of the first participant at a third location, different from the first location, in the user interface, and outputting the first audio from the first participant so as to position the first audio at a third simulated spatial location, relative to the frame of reference, that corresponds to the third location of the first dynamic visual representation in the user interface, wherein the third simulated spatial location is different from the first simulated spatial location

716 Displaying the second dynamic visual representation of the second participant at a fourth location in the user interface, and outputting the second audio from the second participant so as to position the second audio at a fourth simulated spatial location, relative to the frame of reference, that corresponds to the fourth location of the second dynamic visual representation in the user interface

718 The fourth location is different from the second location in the user interface, and the fourth simulated spatial location is different from the second simulated spatial location

720 The third location in the user interface is in a respective direction relative to the first location in the user interface, and the fourth location in the user interface is in the respective direction relative to the second location in the user interface; and
    the third simulated spatial location is substantially in the respective direction relative to the first simulated spatial location, and the fourth simulated spatial location is in substantially the respective direction relative to the second simulated spatial location

722 The first location in the user interface is outside a respective region of the user interface;
    the second location in the user interface is within the respective region;
    the third location in the user interface is within the respective region; and
    the fourth location in the user interface is outside the respective region

724 The third simulated spatial location is closer to a spatial location of the set of one or more wearable audio output devices than the first simulated spatial location and the second simulated spatial location, and the method includes, in response to receiving the input selecting the first dynamic visual representation of the first participant, emphasizing the first audio from the first participant relative to the second audio from the second participant

726 In response to receiving the input selecting the first dynamic visual representation of the first participant, the first audio is output so as to be positioned at the third simulated spatial location for a first predefined amount of time, and the method includes, after the first audio is output so as to be positioned at the third simulated spatial location for the first predefined amount of time, outputting the first audio at a simulated spatial location that is further from the spatial location of the set of one or more wearable audio output devices than the third simulated spatial location

728 The input selecting the first dynamic visual representation of the first participant includes selection of a representation of a user of the electronic device, displayed in the user interface, and a drag gesture to move the representation of the user in the user interface to within a predefined distance of the first dynamic visual representation of the first participant, and the method includes, in response to receiving the input selecting the first dynamic visual representation of the first participant, displaying an indication that the first dynamic visual representation of the first participant is associated with the representation of the user

730 In response to receiving the input selecting the first dynamic visual representation of the first participant, transmitting, to the first participant, a request to establish a partial communication session between the user and the first participant; and
    in response to receiving an indication of the first participant accepting the request to establish the partial communication session, displaying an indication that the first dynamic visual representation of the first participant is associated with the representation of the user

732 receiving the input selecting the first dynamic visual representation of the first participant includes detecting, via the one or more input devices, the input at an initial location corresponding to the first dynamic visual representation and continuing to detect the input at the initial location for at least a second predefined amount of time

734 Receiving the input selecting the first dynamic visual representation of the first participant includes concurrently detecting, via the one or more input devices, a first input point concurrently with a second input point, and movement of the first input point towards or away from the second input point 736 The input selecting the first dynamic visual representation of the first participant includes selection of the first dynamic visual representation while the first dynamic visual representation is displayed at the first location in the user interface and a drag gesture to move the first dynamic visual representation to the third location in the user interface 738 Scroll the user interface in response to detecting movement of the electronic device relative to a physical environment in which the electronic device is located, wherein, while the first dynamic visual representation is displayed at the first location in the user interface, the first dynamic visual representation of the first participant is outside a focal region of the user interface, and receiving the input selecting the first dynamic visual representation of the first participant includes detecting movement of the electronic device to scroll the user interface such that the first dynamic visual representation is within the focal region of the user interface 740 The audio from the plurality of participants in the audio communication session is output at a plurality of simulated spatial locations relative to the frame of reference, and the method includes:
    receiving a request to output, in the communication session, respective audio from the electronic device; and
    in response to receiving the request to output the respective audio, outputting, via the set of one or more wearable audio output devices, the respective audio, including adjusting the respective audio so as to maintain the respective audio at a first respective simulated spatial location, relative to the frame of reference, that is different from the plurality of simulated spatial locations ( B )

742 The respective audio is output via the communication session to the plurality of participants

744 Receiving a request to reposition the respective audio; and
in response to receiving the request to reposition the respective audio, outputting the respective audio, including adjusting the respective audio so as to maintain the respective audio at a second respective simulated spatial location, relative to the frame of reference, that is different from the plurality of simulated spatial locations and different from the first respective simulated spatial location

746 A distance between respective simulated spatial locations of any two participants of the plurality of participants in the audio communication session is less than a distance between a simulated spatial location of the respective audio and a simulated spatial location of any respective participant of the plurality of participants

748 Detect movement of the set of one or more wearable audio output devices relative to the frame of reference without detecting movement of the electronic device and without detecting input directed to the user interface; and
    in response to detecting the movement of the set of one or more wearable audio output devices relative to the frame of reference, output respective audio from the plurality of participants in the audio communication session at respective simulated spatial locations, including adjusting the respective audio from the plurality of participants as the set of one or more wearable audio output devices moves relative to the frame of reference so as to maintain the respective audio at the respective simulated spatial locations relative to the frame of reference independently of a position of the set of one or more wearable audio output devices relative to the frame of reference

750 The electronic device is in communication with one or more cameras in a physical environment, and the method includes displaying in the user interface, via the one or more display devices, a representation of a portion of the physical environment that is in a field of view of the one or more cameras, wherein the respective dynamic visual representations of the plurality of participants in the communication session are displayed at respective locations in the representation of the field of view of the one or more cameras corresponding to respective physical locations in the physical environment 752 Display the first dynamic visual representation of the first participant with a first size, wherein the first size is determined in accordance with a distance between a current simulated spatial location of the first audio from the first participant and a spatial location of the set of one or more wearable audio output devices; and
    display the second dynamic visual representation of the second participant with a second size, wherein the second size is determined in accordance with a distance between a current simulated spatial location of the second audio from the second participant and the spatial location of the set of one or more wearable audio output devices

754 Display in the user interface, in a roster region of the user interface, separate from locations at which the first dynamic visual representation of the first participant and the second dynamic visual representation of the second participant are displayed, dynamic visual representations of third and fourth participants in the communication session, and outputting, via the set of one or more audio output devices, audio from the third and fourth participants, wherein the audio from the third and fourth participants is deemphasized relative to audio output from the first and second participants

756 The audio from the third and fourth participants is deemphasized relative to audio output from the first and second participants by outputting the audio from the third and fourth participants with a different ratio of direct to reverberated sound than a ratio of direct to reverberated sound for the first participant and second participant > 758 The audio from the third and fourth participants is deemphasized relative to audio output from the first and second participants by outputting the audio from the third and fourth participants at one or more simulated spatial locations that are further from a first spatial location, for the electronic device, than simulated spatial locations at which audio from the first participant and second participant are output > 760 The audio from the third and fourth participants is deemphasized relative to audio output from the first and second participants by changing volume of the audio from the third and fourth participants relative to audio from the first participant and second participant are output > 762 Identify the third and fourth participants as roster participants, in accordance with predefined characteristics of the audio from the third and fourth participants meeting predefined roster criteria, and in accordance with the identification of the third and fourth participants as roster participants, displaying the dynamic visual representations of third and fourth participants in the roster region of the user interface and deemphasizing the audio output, via the set of one or more audio output devices, from the third and fourth participants, relative to audio output from the first and second participants

764 Determining one or more metrics of overlapping audio from two or more participants in the communication session, and in accordance with a determination that the one or more metrics of overlapping audio meet predefined overlap criteria, positioning simulated spatial locations of audio from the plurality of participants at wider angles, relative to each other, than default angles at which the simulated spatial locations of audio from the plurality of participants are positioned in accordance with a determination that the one or more metrics of overlapping audio do not meet the predefined overlap criteria

---

766 The first audio from the first participant is output at the first simulated spatial location and the second audio from the second participant is output at the second simulated spatial location while the one or more display devices of the electronic device has a first orientation relative to a physical environment in which the electronic device is located;
the method further includes:
   detecting a change in the orientation of the electronic device from the first orientation to a second orientation relative to the physical environment in which the electronic device is located, and
   in response to detecting the change in the orientation of the electronic device from the first orientation to a second orientation relative to the physical environment in which the electronic device is located, changing at least one of a simulated spatial location at which the first audio from the first participant is output and a simulated spatial location at which the second audio from the second participant is output so as to change a distance between the simulated spatial locations at which the first audio from the first participant is output and the simulated spatial location at which the second audio from the second participant is output 768 In response to detecting the change in the orientation of the electronic device from the first orientation to a second orientation relative to the physical environment in which the electronic device is located, change at least one of a location of the first dynamic visual representation of the first participant in the user interface and a location of the second dynamic visual representation of the second participant in the user interface so as to change a distance between the locations of the first dynamic visual representation of the first participant and the second dynamic visual representation of the second participant in the user interface

At first set of one or more wearable audio output devices associated with a first user, that is in communication with a second set of one or more wearable audio output devices, associated with a second user:

802 While the first set of one or more wearable audio output devices and the second set of one or more wearable audio output devices are engaged in an audio communication session, output, via the first set of one or more wearable audio output devices, respective audio from the second set of one or more wearable audio output devices, including, as the first set of one or more wearable audio output devices is moved relative to the second set of one or more wearable audio output devices:

804 Adjusting the respective audio so as to position the respective audio at a simulated spatial location relative to the first set of one or more wearable audio output devices that is determined based on a respective position of the second set of one or more wearable audio output devices relative to the first set of one or more wearable audio output devices 806 Adjusting an output property other than a simulated spatial location of the respective audio based on a distance of the second set of one or more wearable audio output devices from the first set of one or more wearable audio output devices 808 Adjusting the output property of the respective audio based on the distance includes adjusting a volume of the respective audio 810 As the first set of one or more wearable audio output devices is moved relative to the second set of one or more wearable audio output devices, detect a change in distance between the first set of one or more wearable audio output devices and the second set of one or more wearable audio output devices; wherein:
 the change in distance is associated with a first amount of change in volume of unaided voice audio audible at a location of the first set of one or more wearable audio output devices from a location of the second set of one or more wearable audio output devices, and
 adjusting the output property of the respective audio based on the distance includes, in response to detecting the change in distance, changing the volume of the respective audio by a second amount that is different from the first amount

812 Adjust the volume of the respective audio without decreasing the volume of the respective audio below a respective volume threshold (D)

814 Adjusting the output property of the respective audio based on the distance includes changing an amount of reverberation of the respective audio 816 In accordance with a determination that the second set of one or more wearable audio output devices is within a threshold distance from the first set of one or more wearable audio output devices, outputting one or more pass-through audio components selected so as to increase audio pass-through of ambient sound from a physical environment surrounding the first set of one or more wearable audio output devices 818 Prior to the first set of one or more wearable audio output devices and the second set of one or more wearable audio output devices being engaged in an audio communication session:
    receiving a request to establish communication between the first set of one or more wearable audio output devices and the second set of one or more wearable audio output devices; and
    while the first set of one or more wearable audio output devices is in communication with the second set of one or more wearable audio output devices, initiating the audio communication session 820 Determine that the second set of one or more wearable audio output devices is in a respective direction relative to the first set of one or more wearable audio output devices, wherein the simulated spatial location at which the respective audio is positioned is in the respective direction relative to the first set of one or more wearable audio output devices 822 Output the respective audio, including adjusting the respective audio so as to position the respective audio at the simulated spatial location and adjusting the output property other than the simulated spatial location of the respective audio, is performed without regard to whether a direct path between the first set of one or more wearable audio output devices and the second set of one or more wearable audio output devices is obstructed

Figure 8B

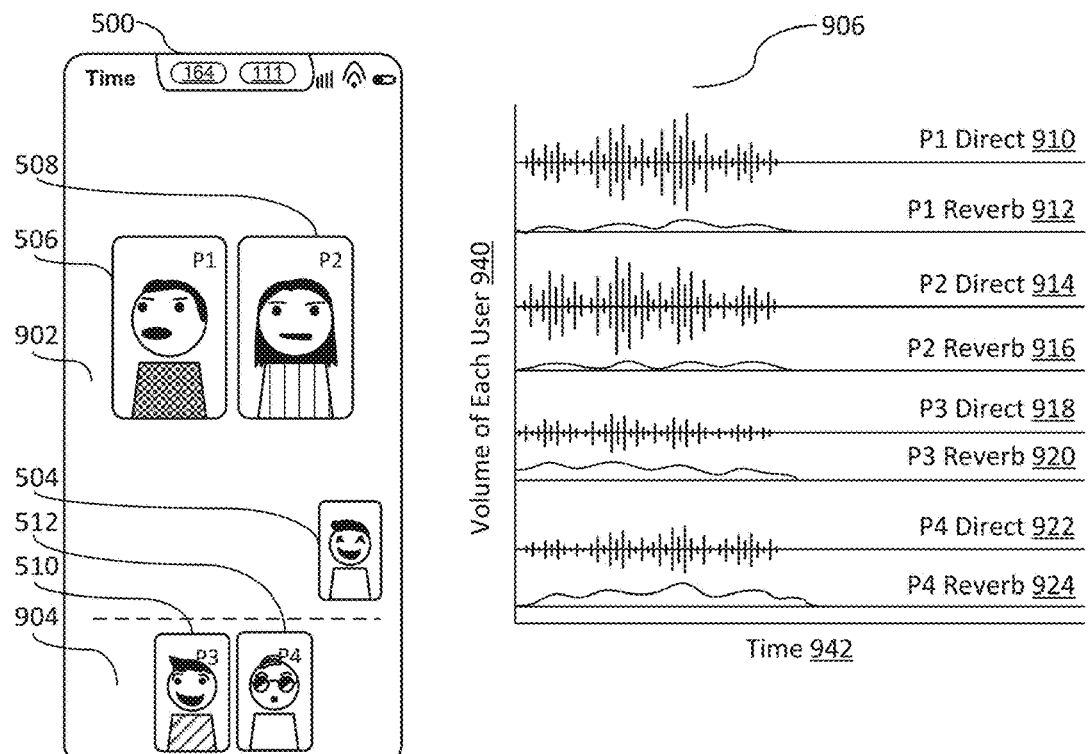
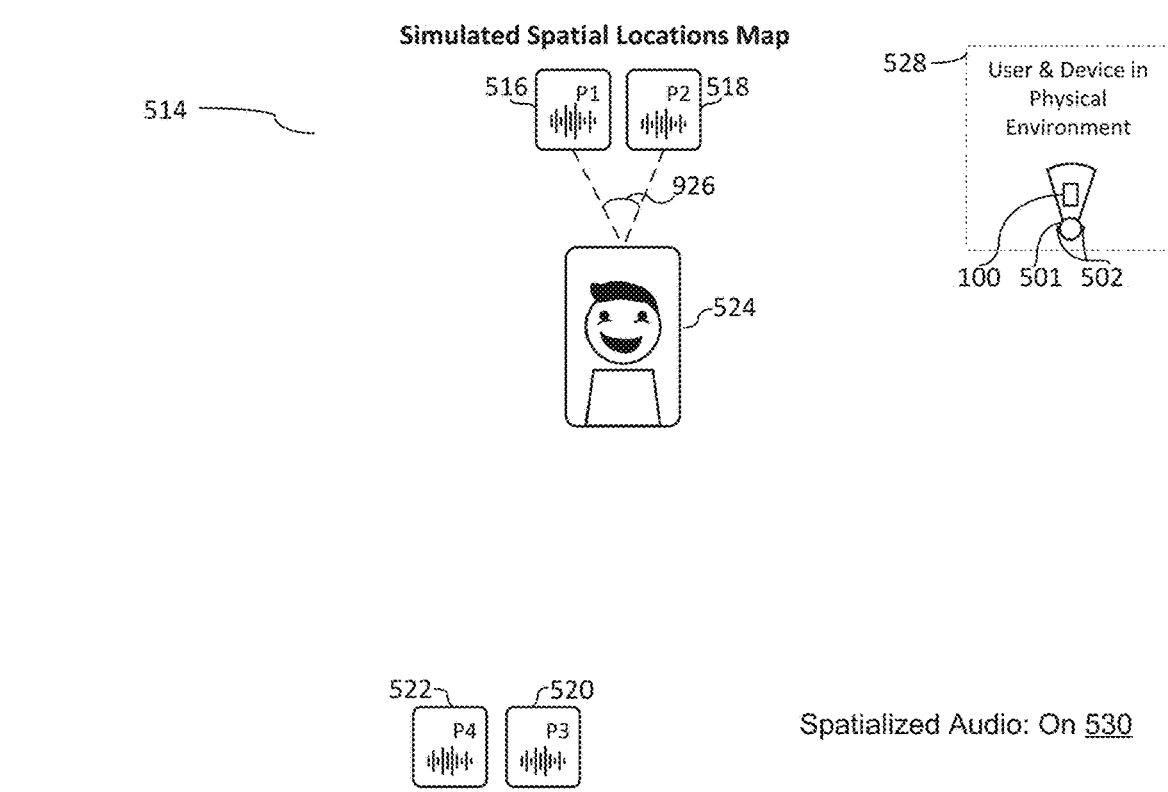
Figure 9A

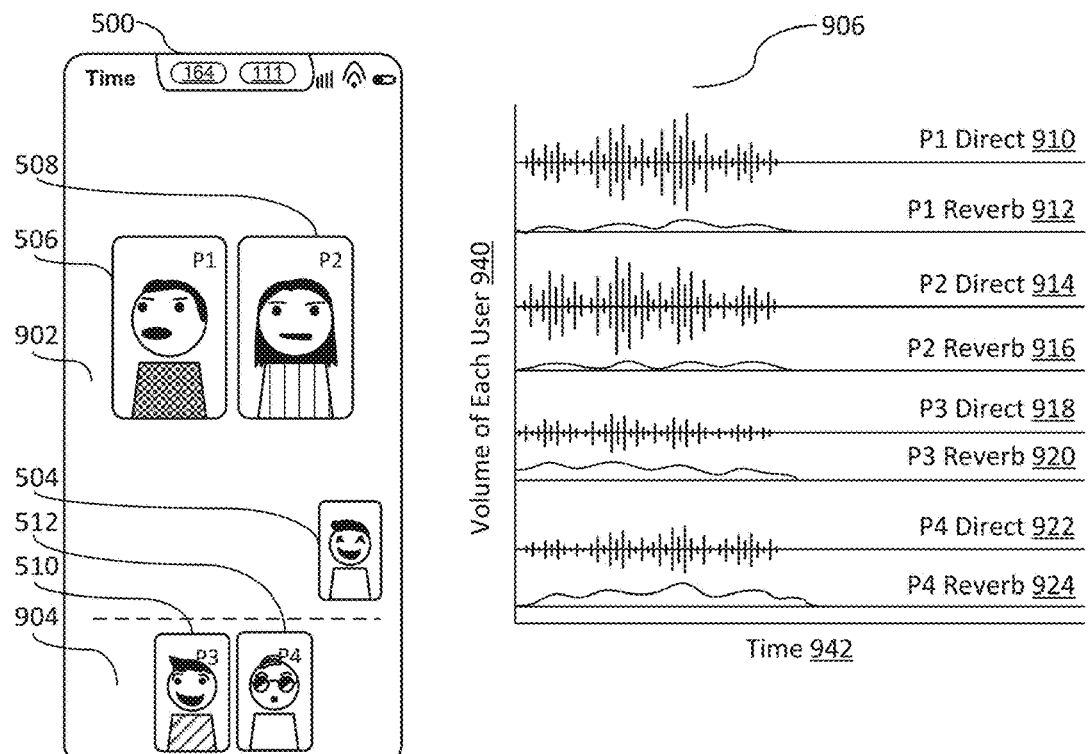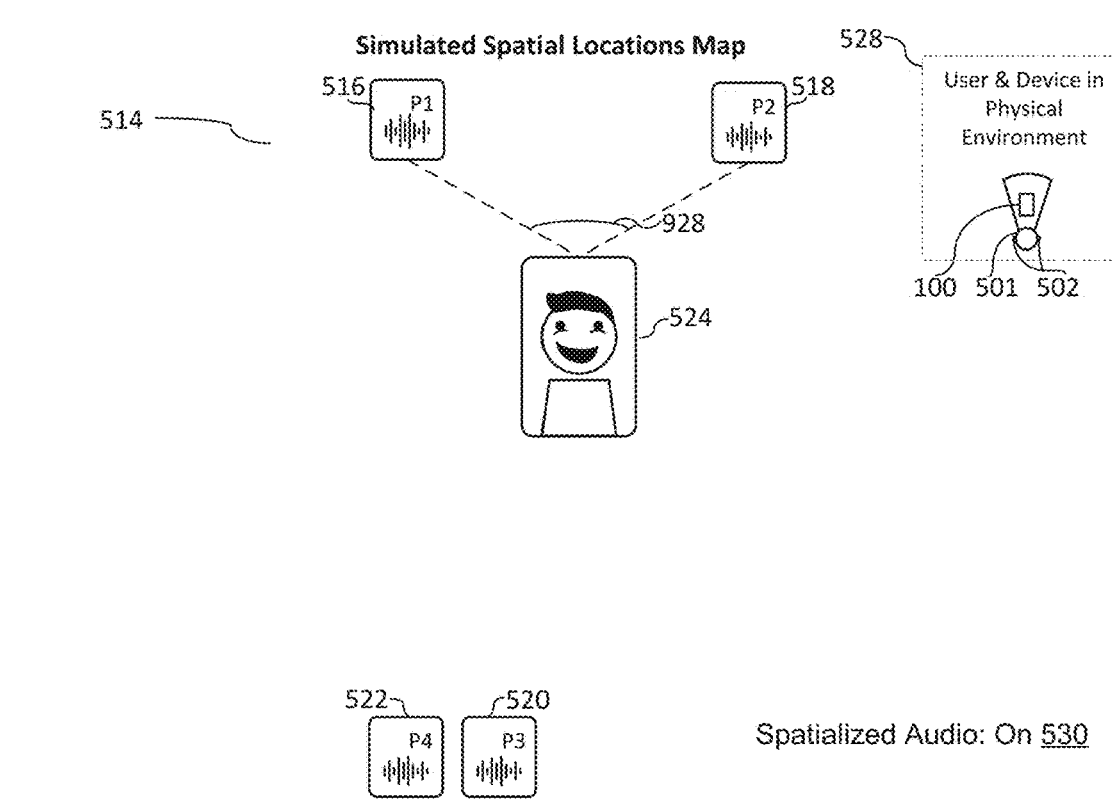
Figure 9B

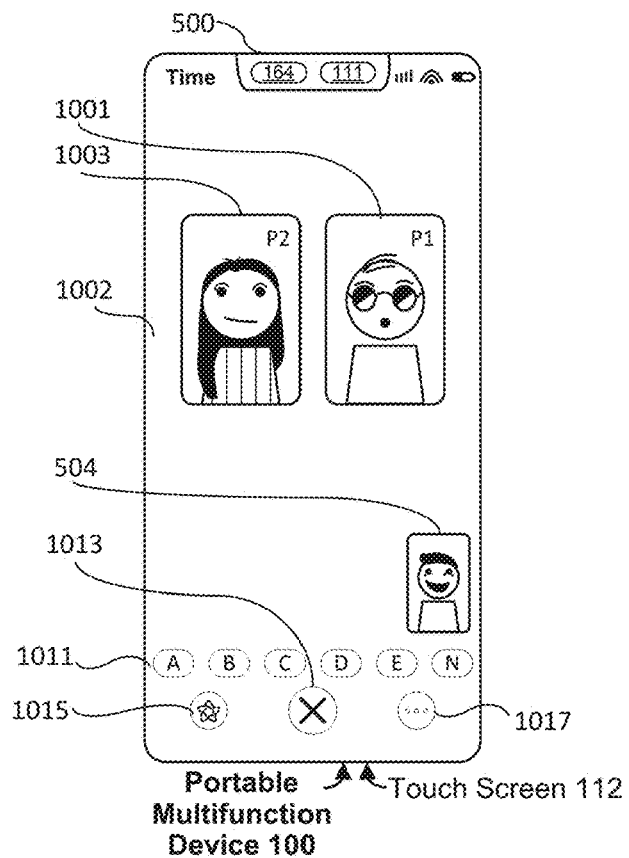
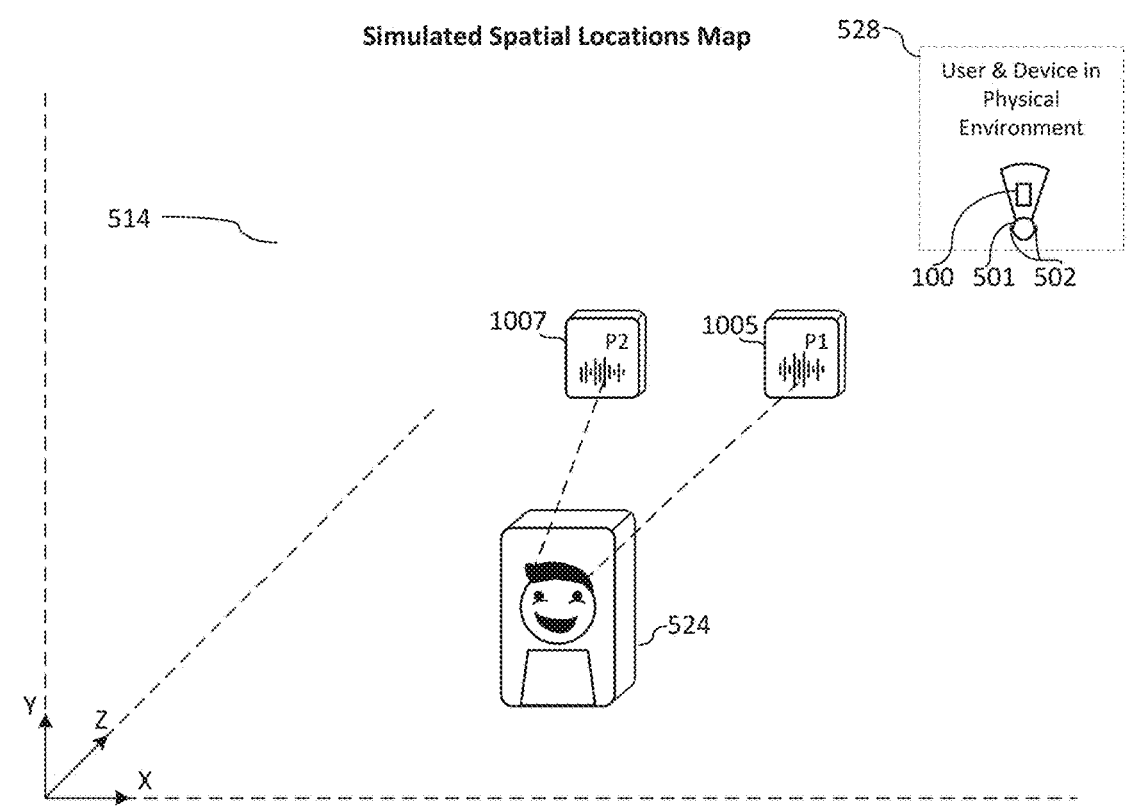
Figure 10A

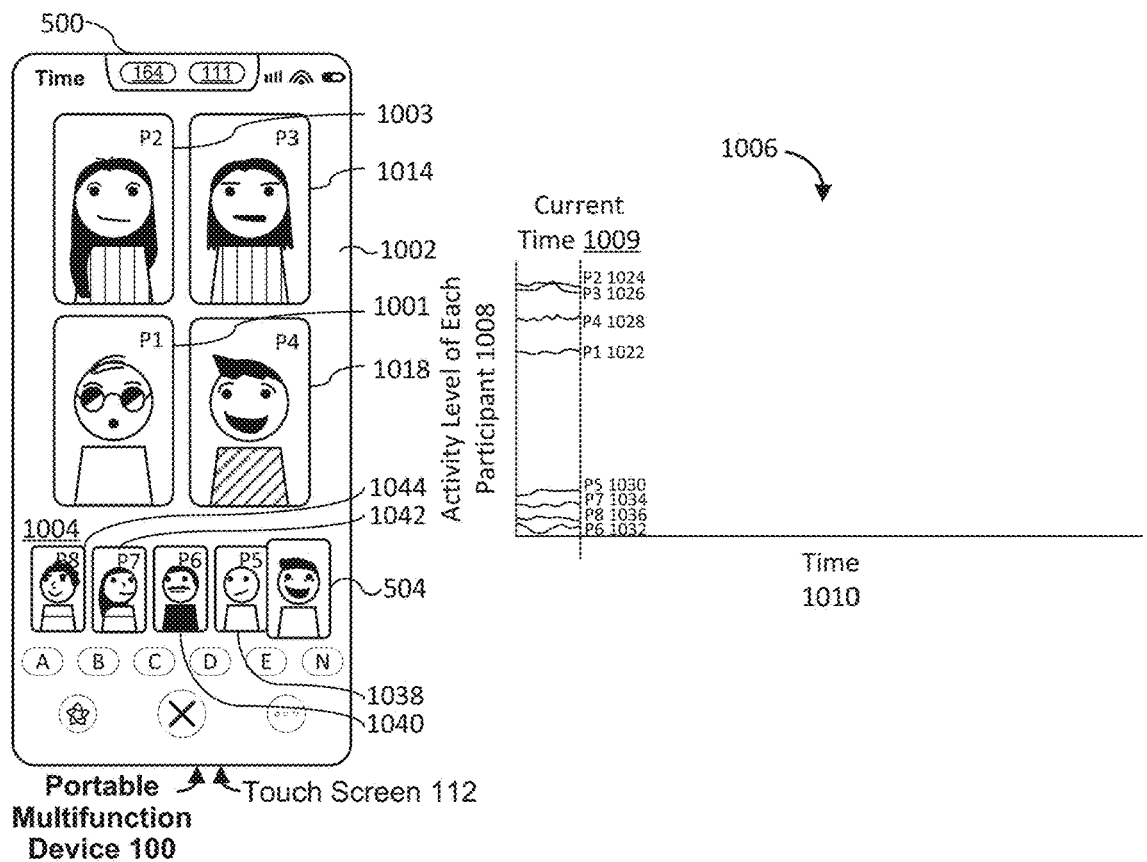
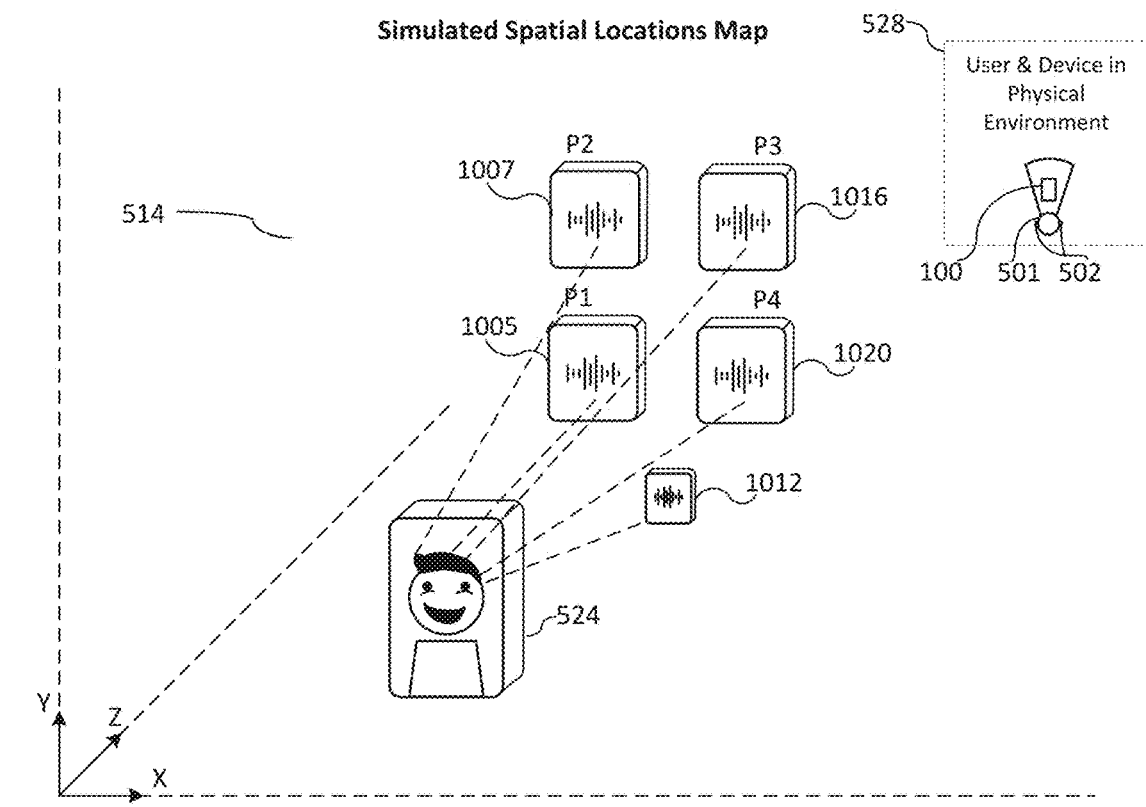
Figure 10B

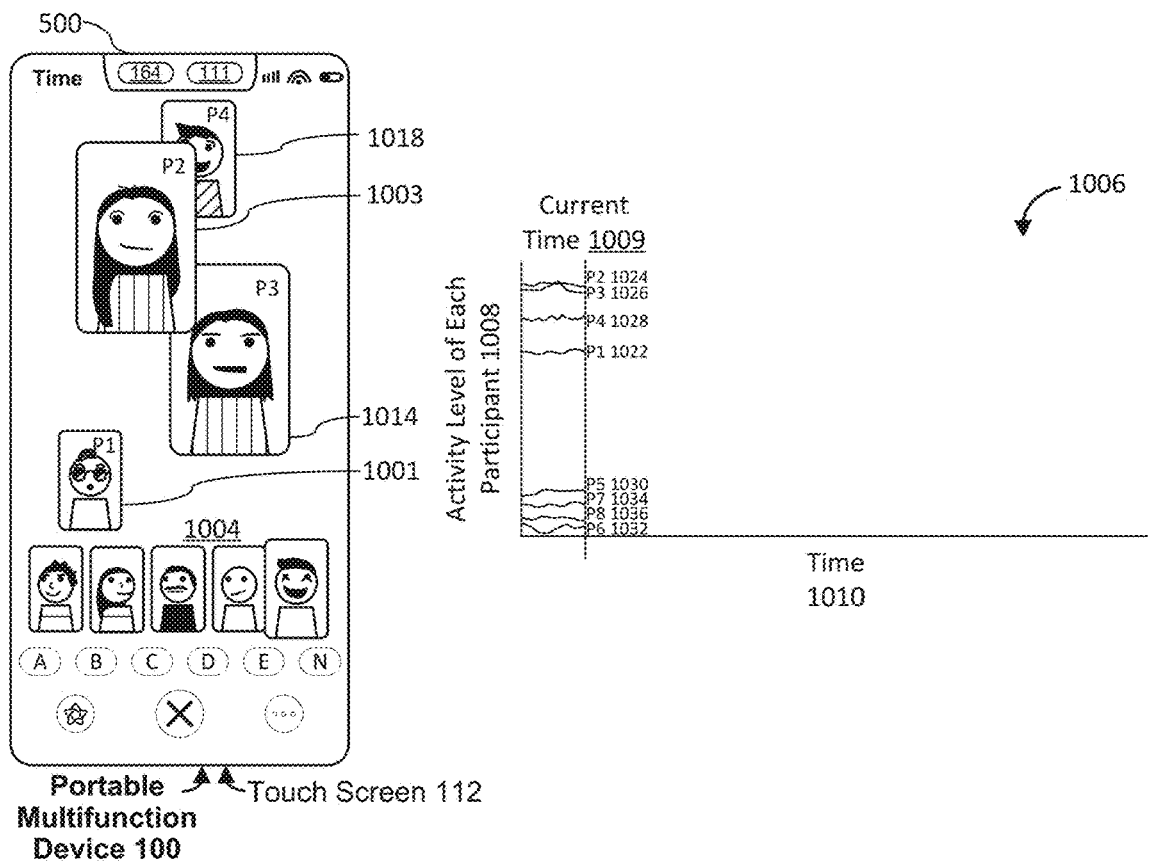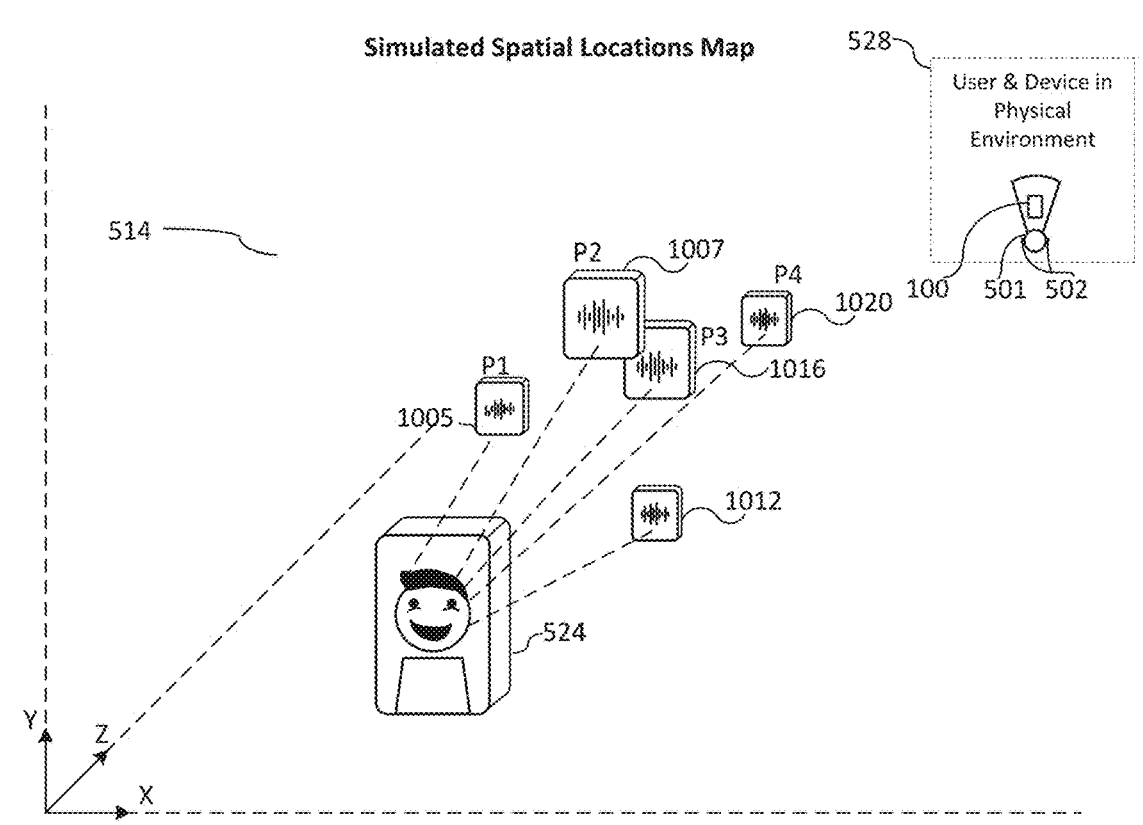
Figure 10C

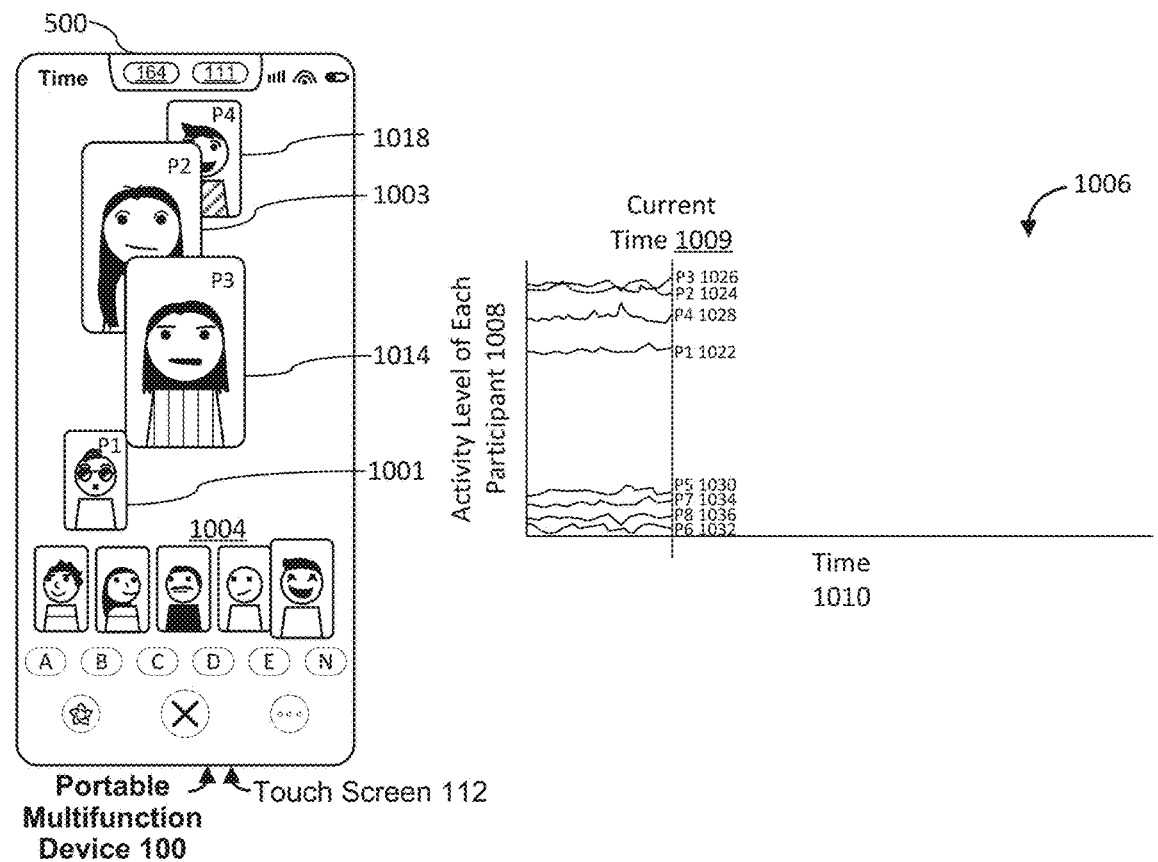
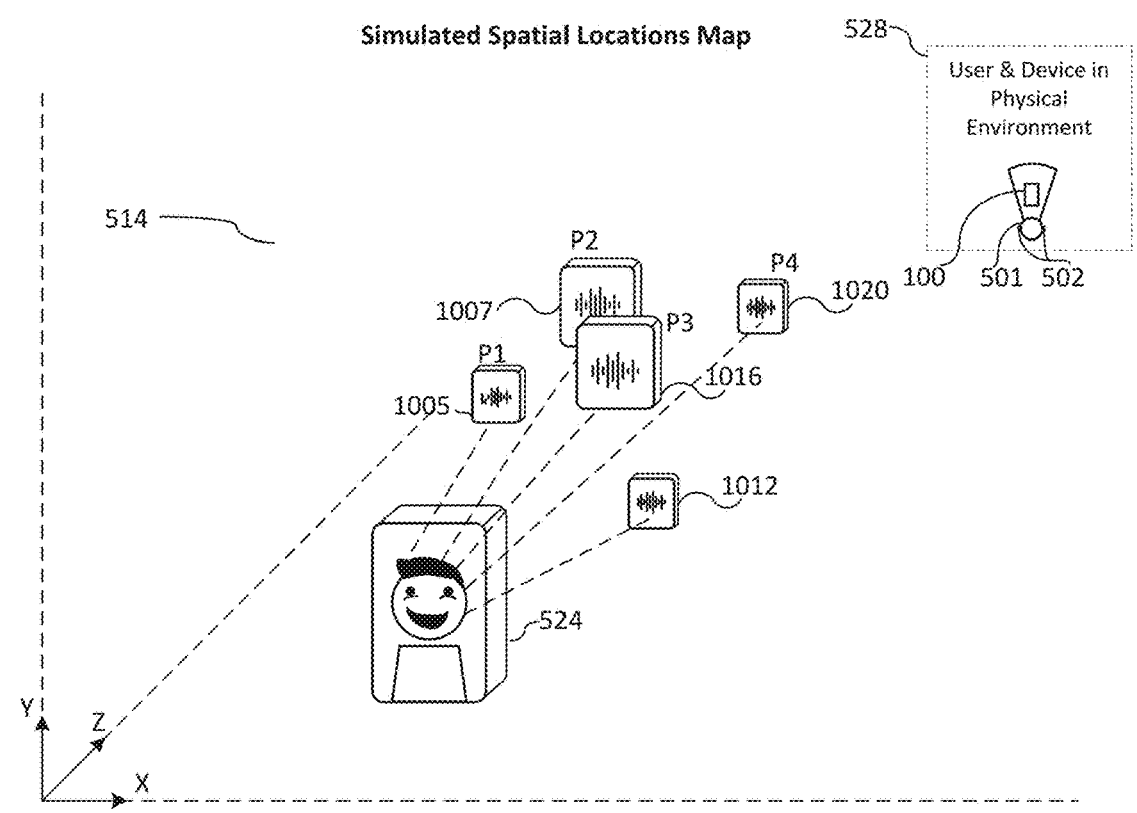
Figure 10D

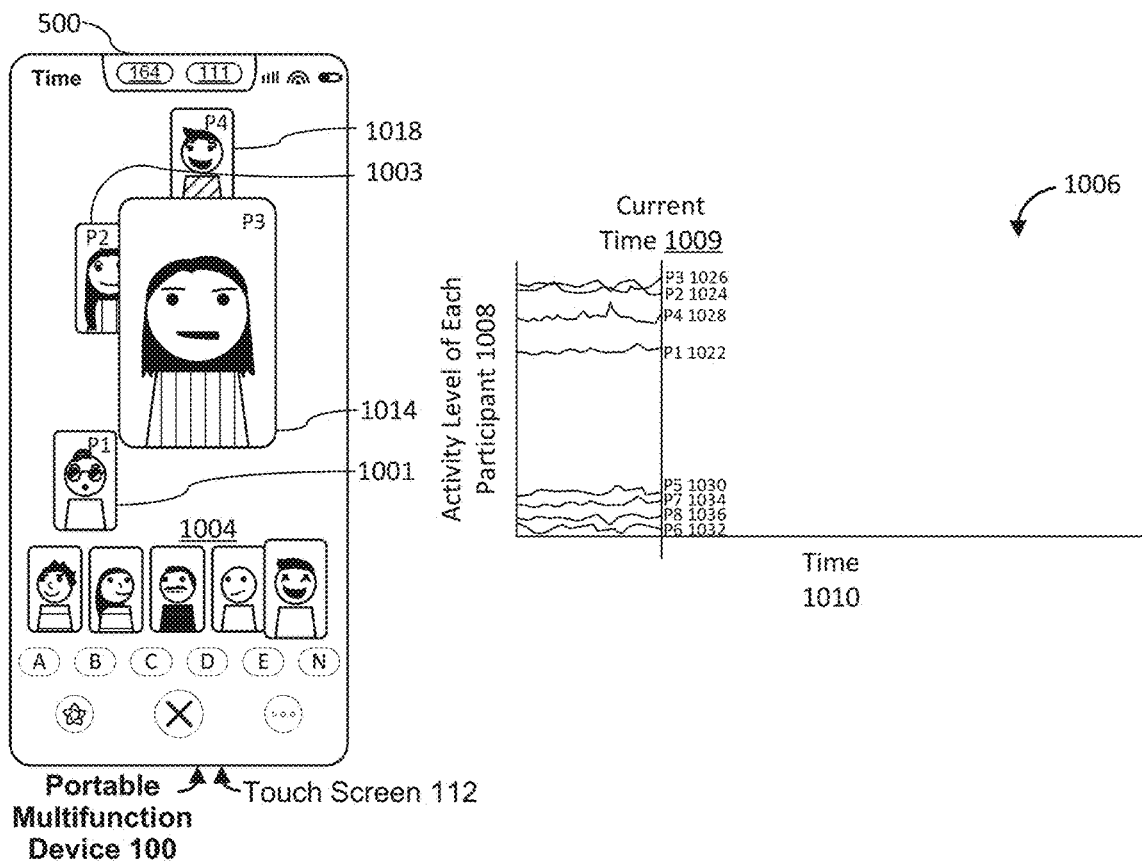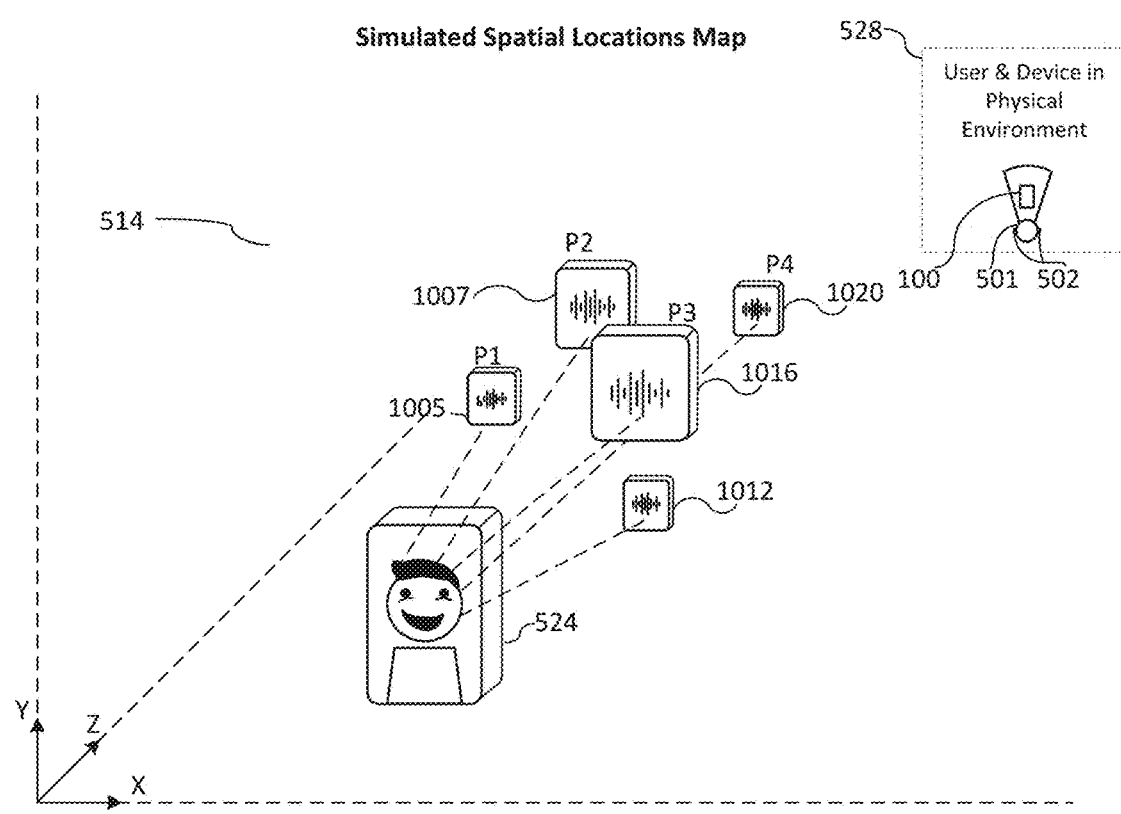
Figure 10E

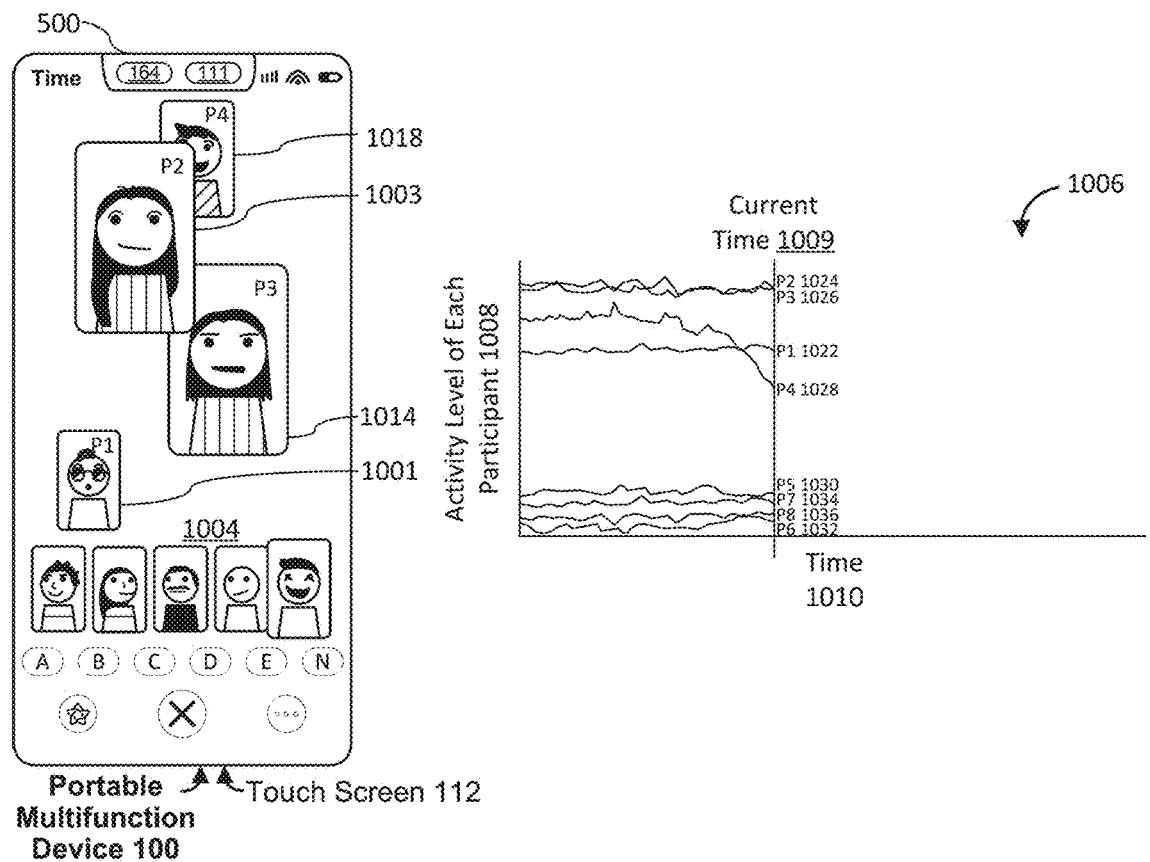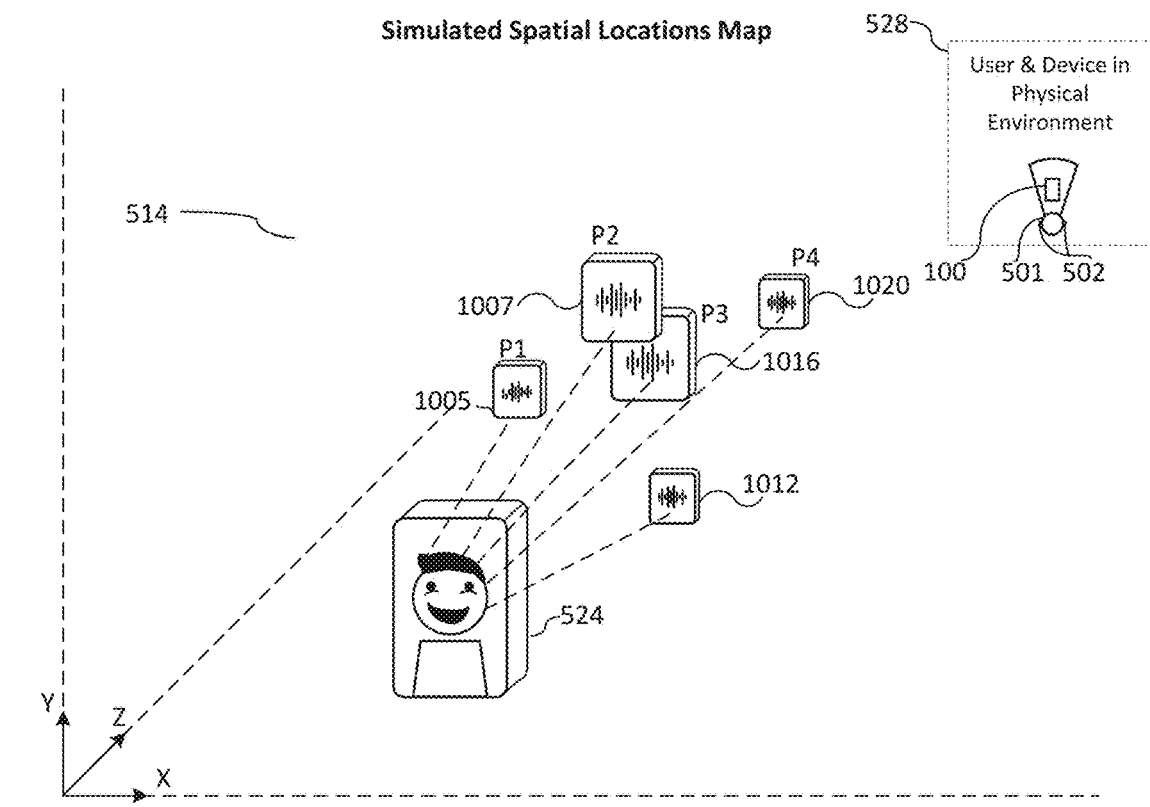
Figure 10F

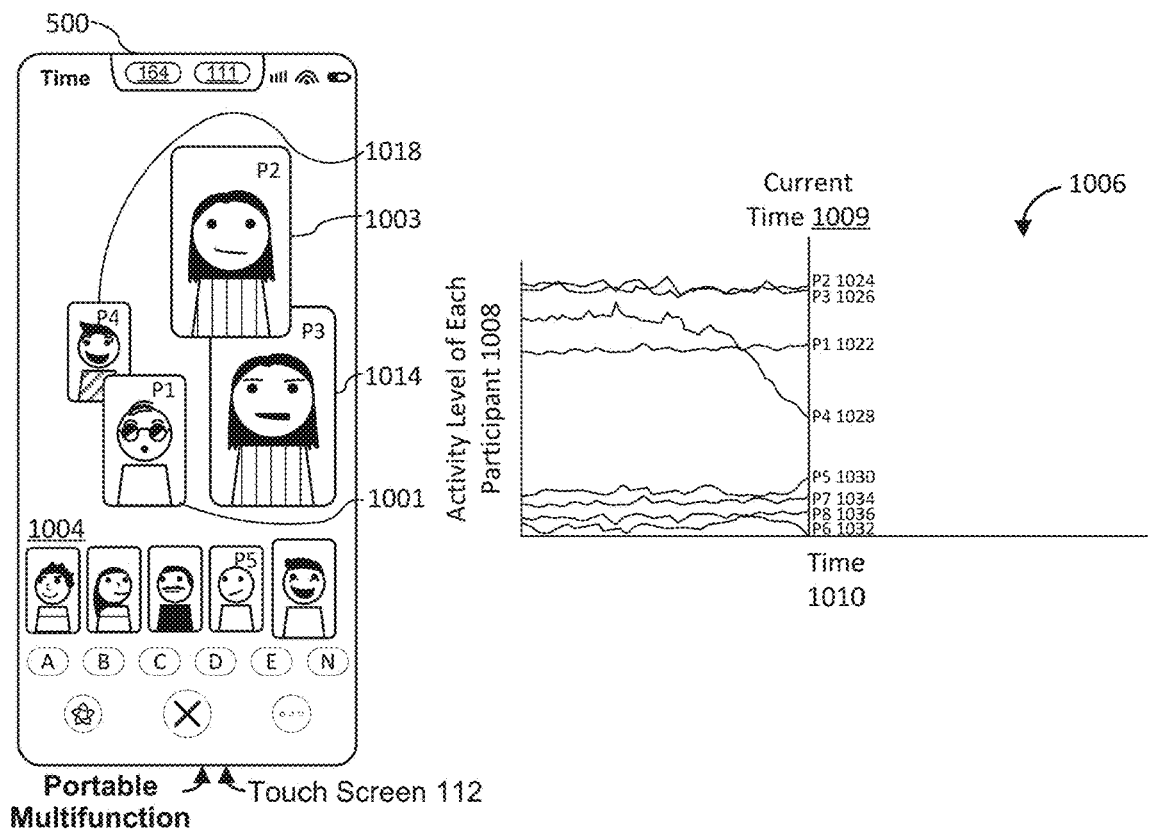
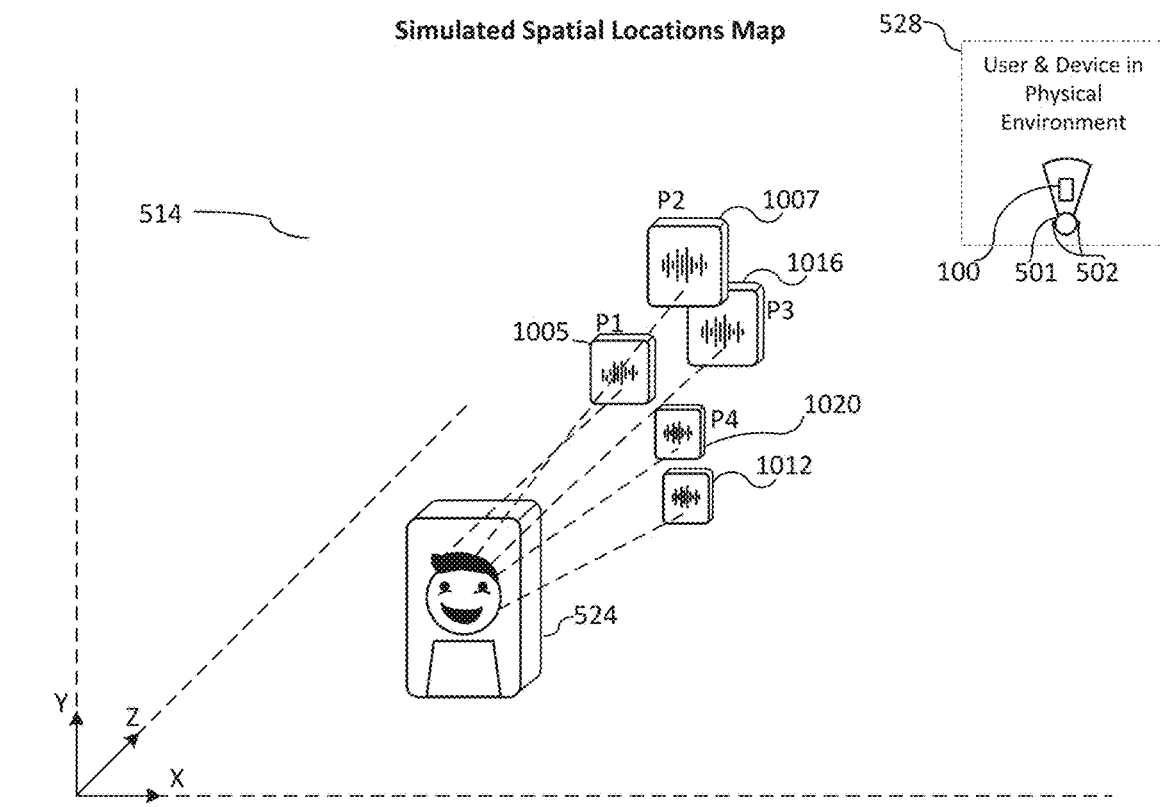
Figure 10G

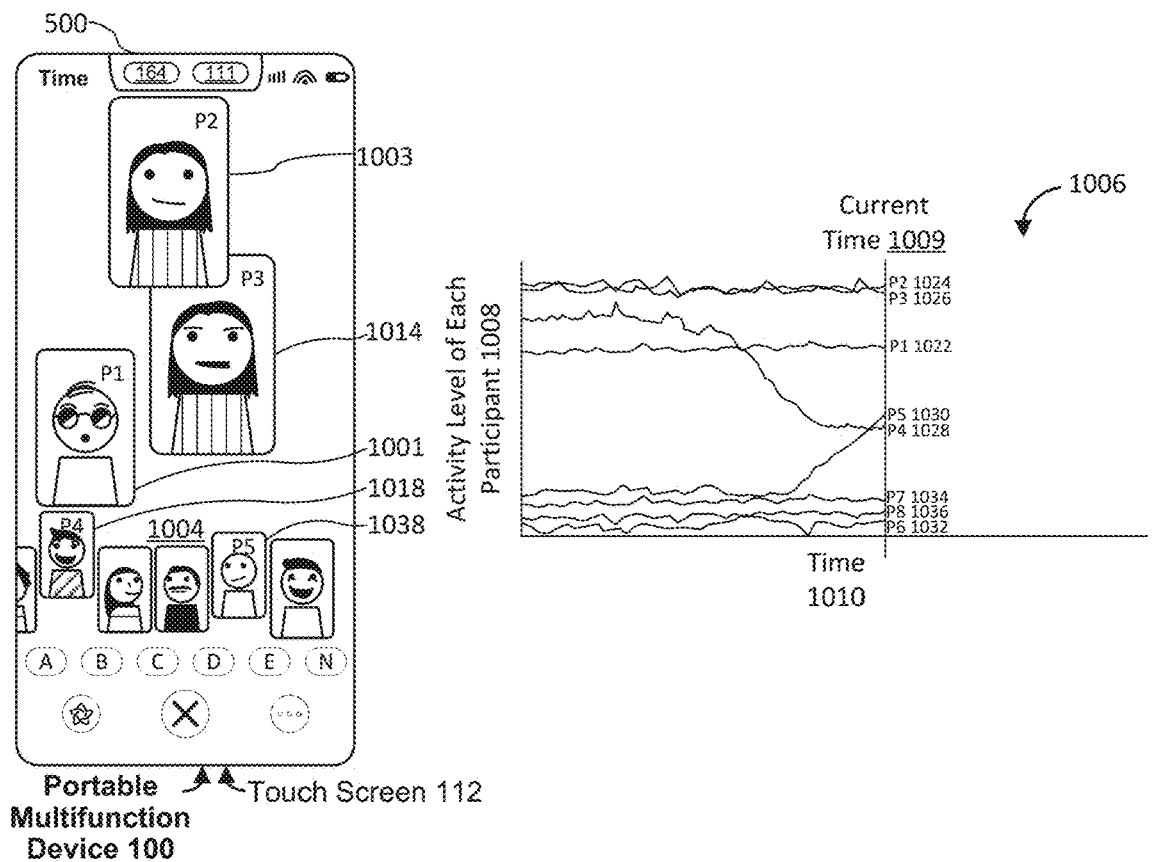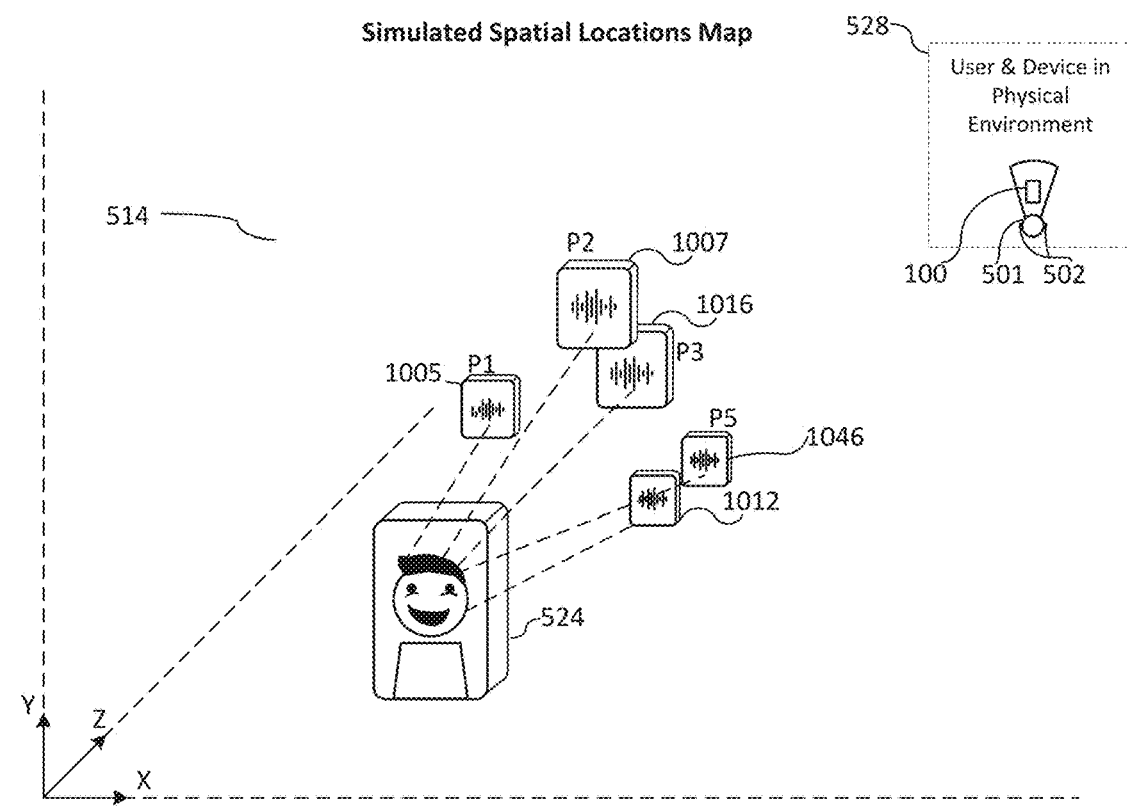
Figure 10H

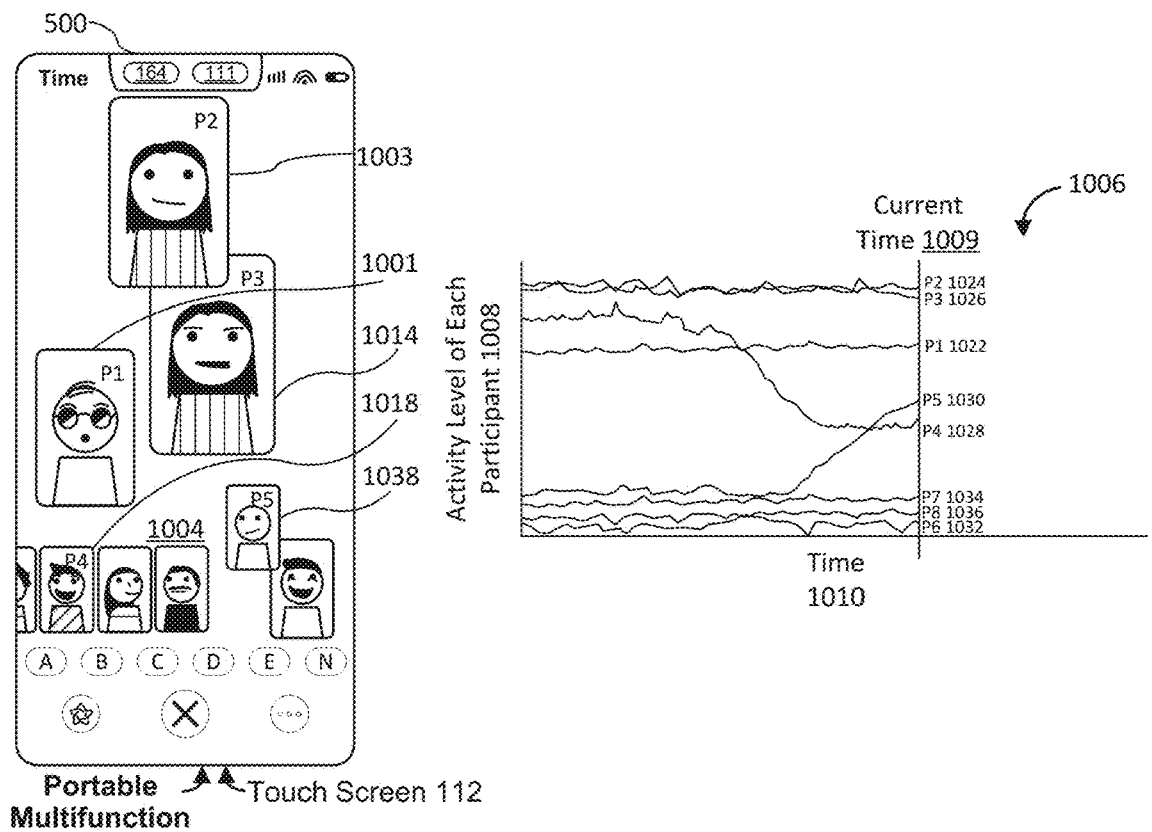
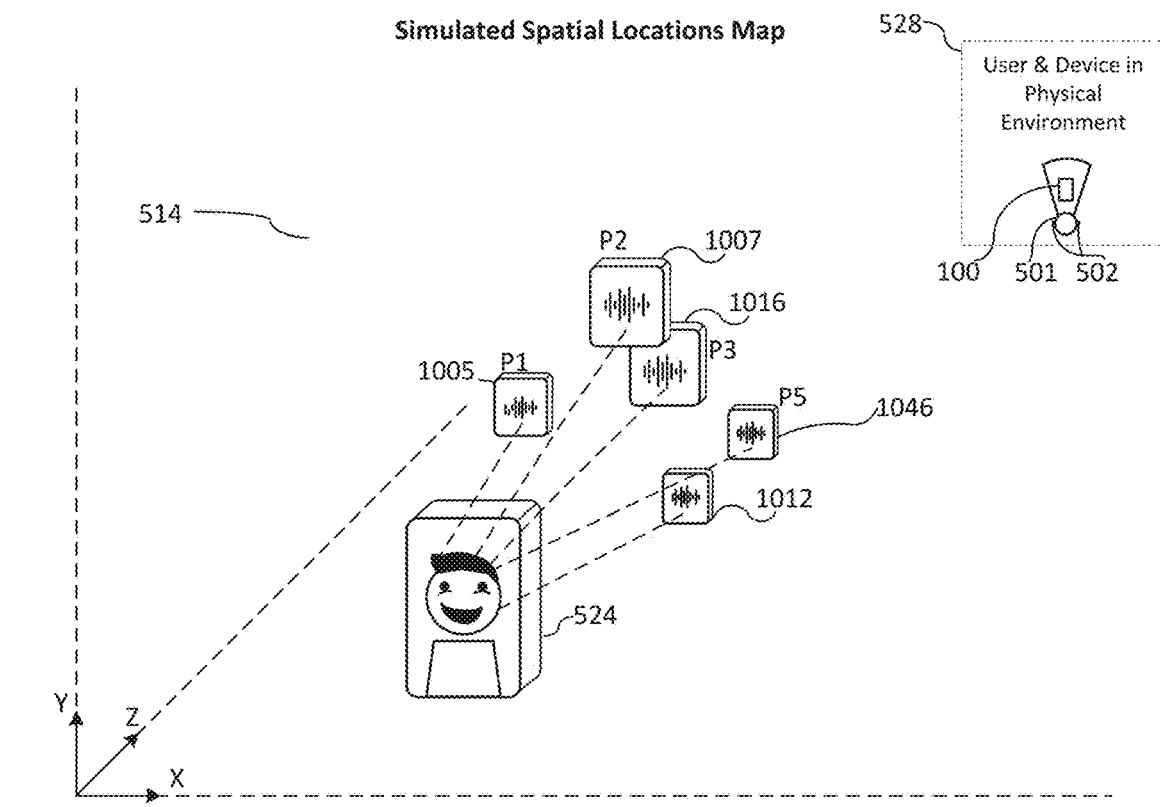
Figure 10I

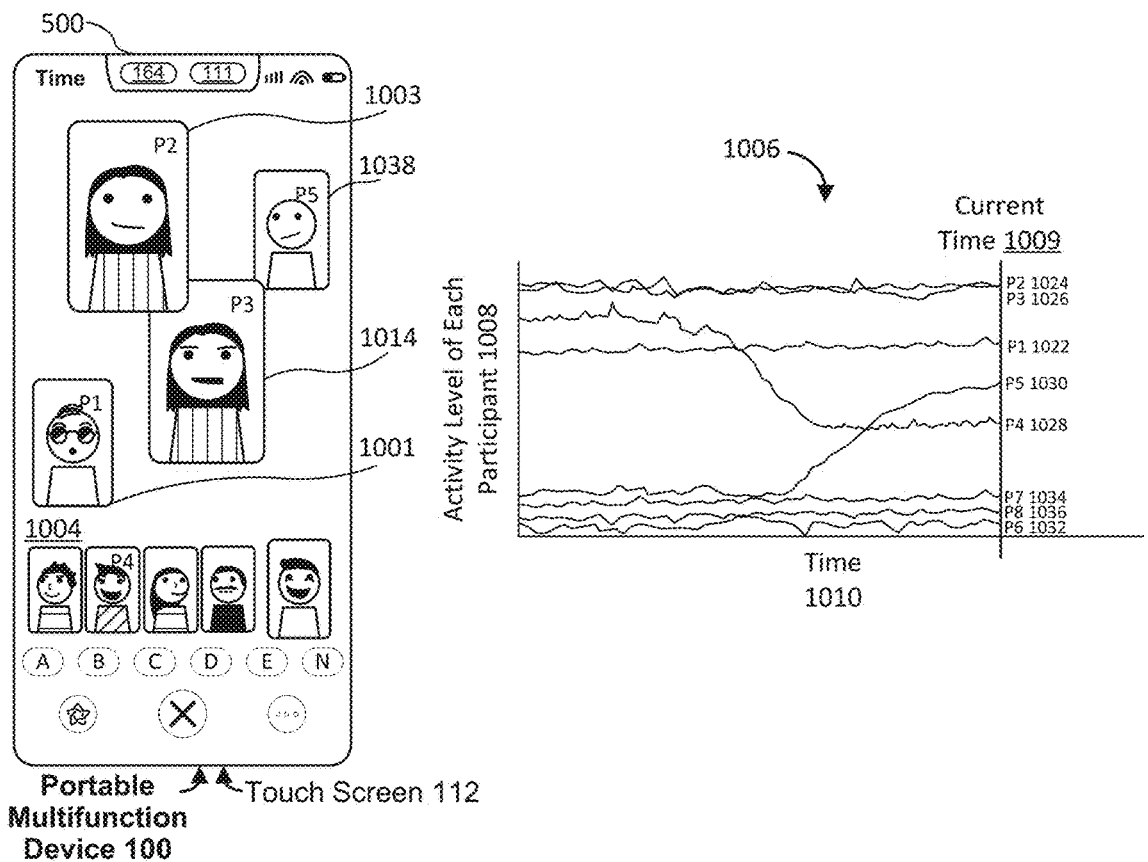
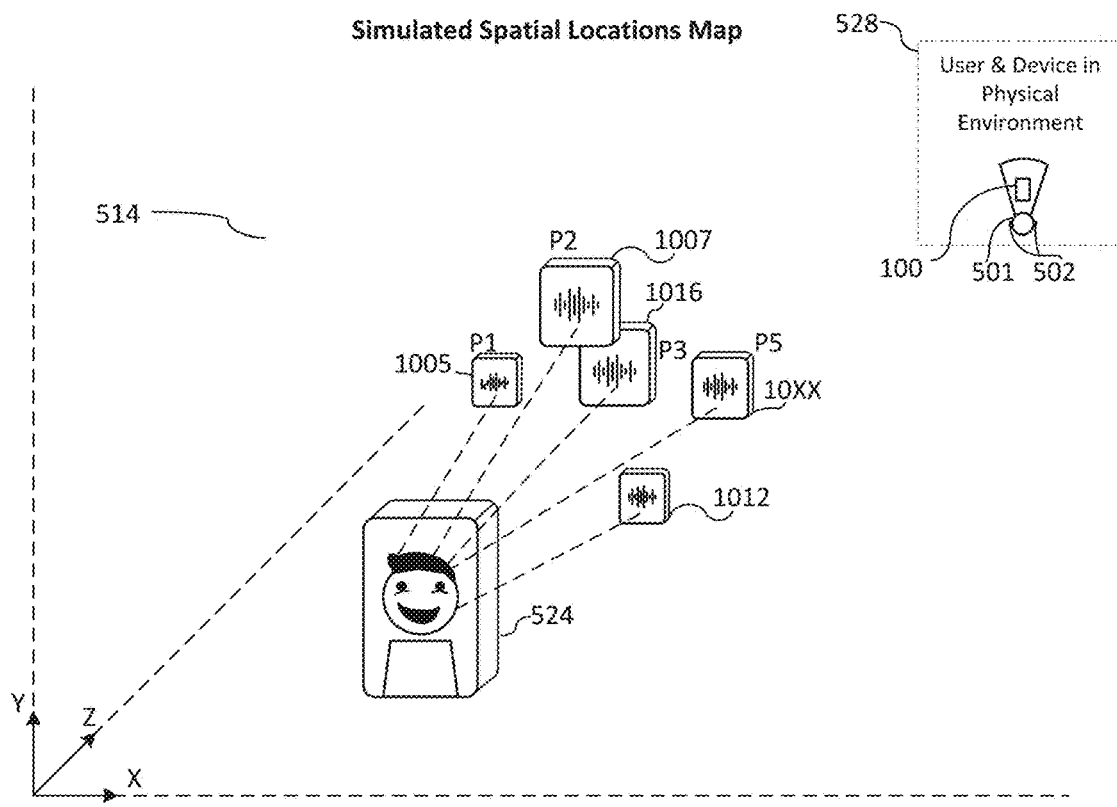
Figure 10J

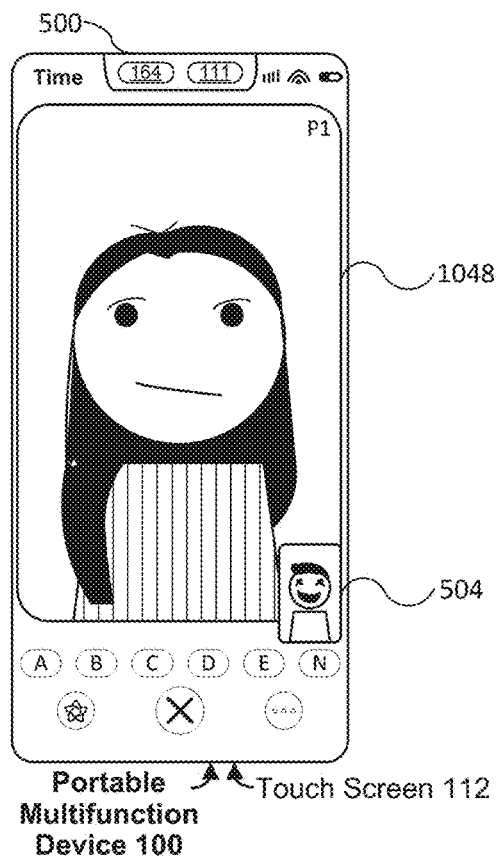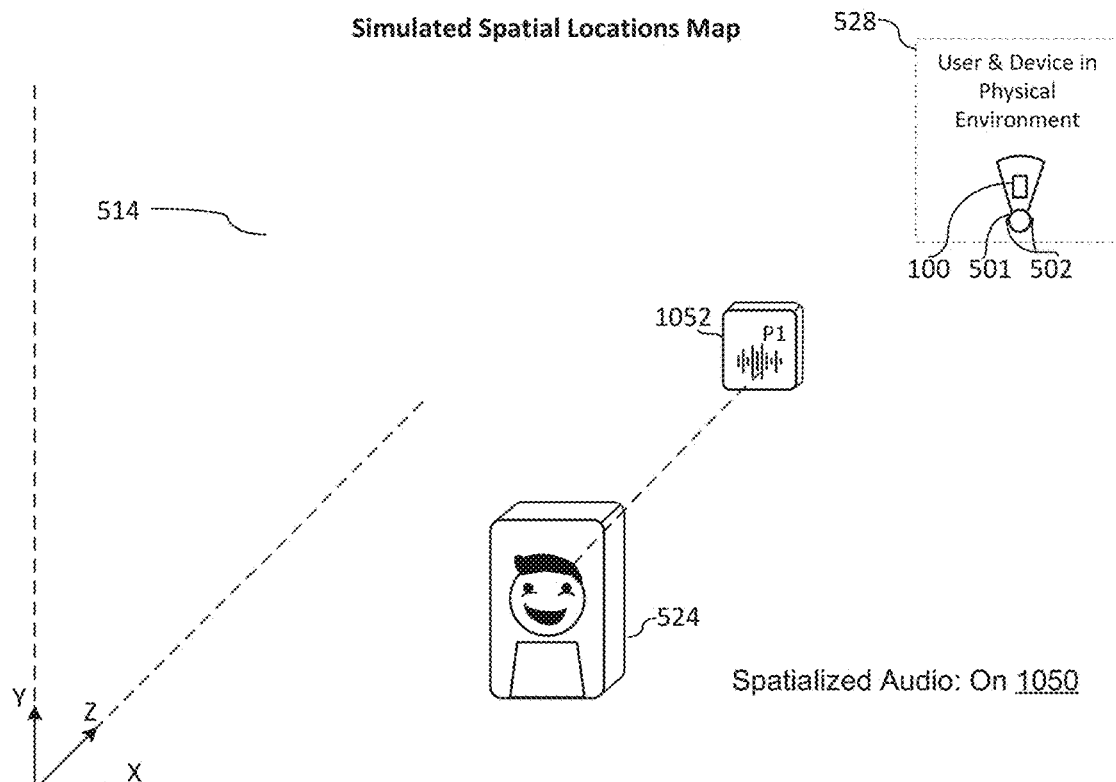
Figure 10K

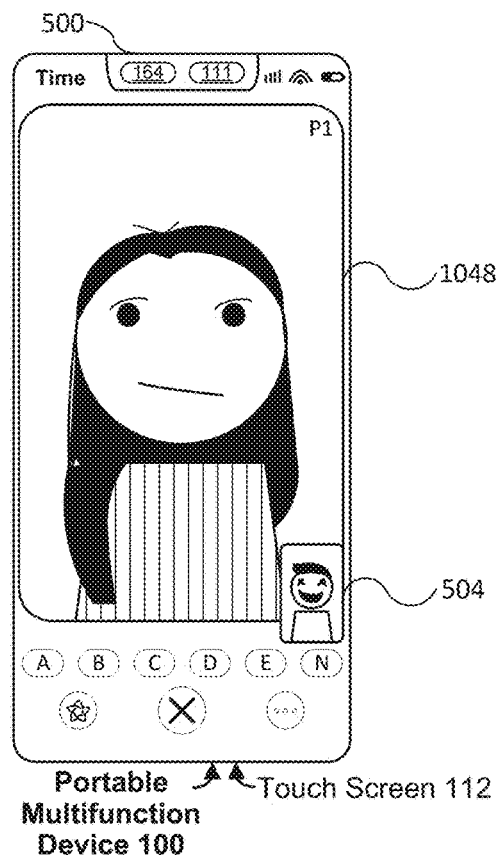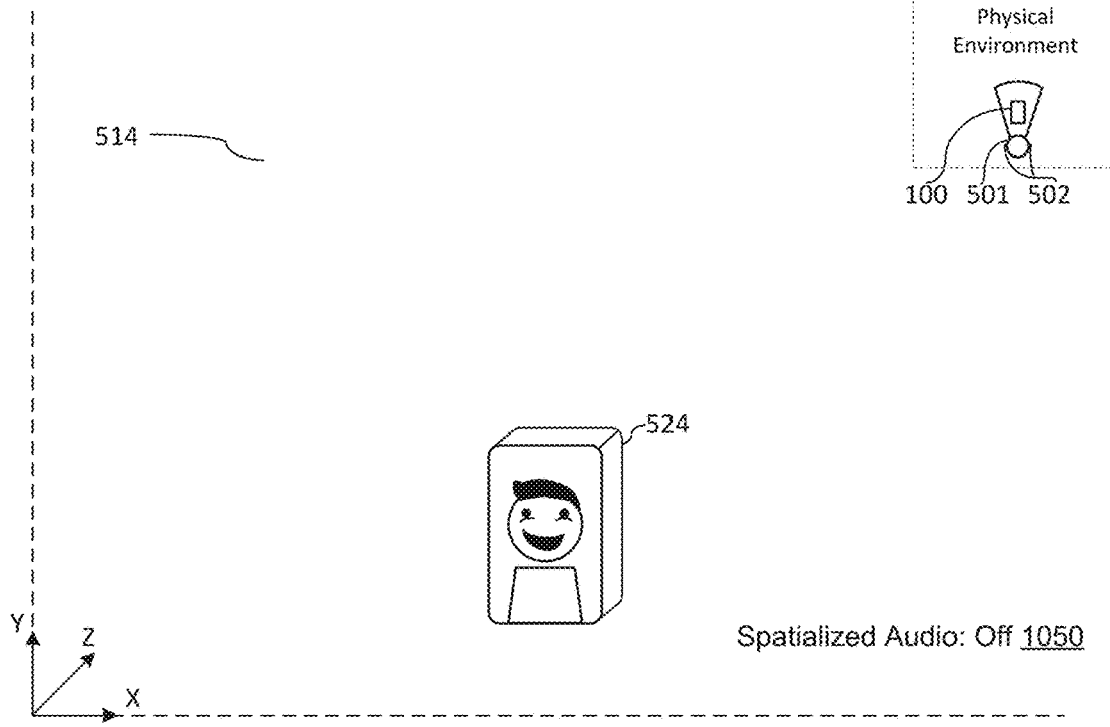
Figure 10L

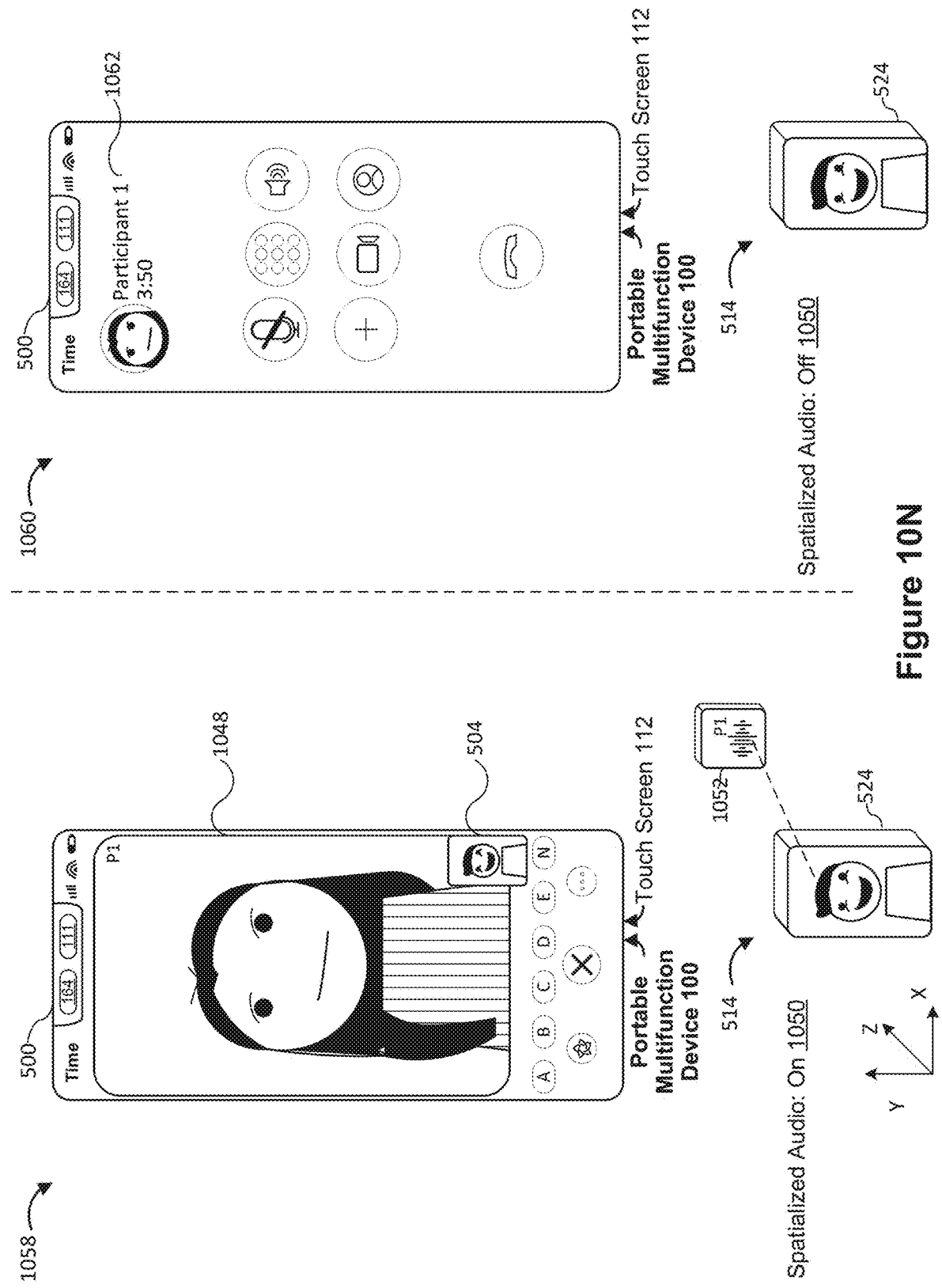

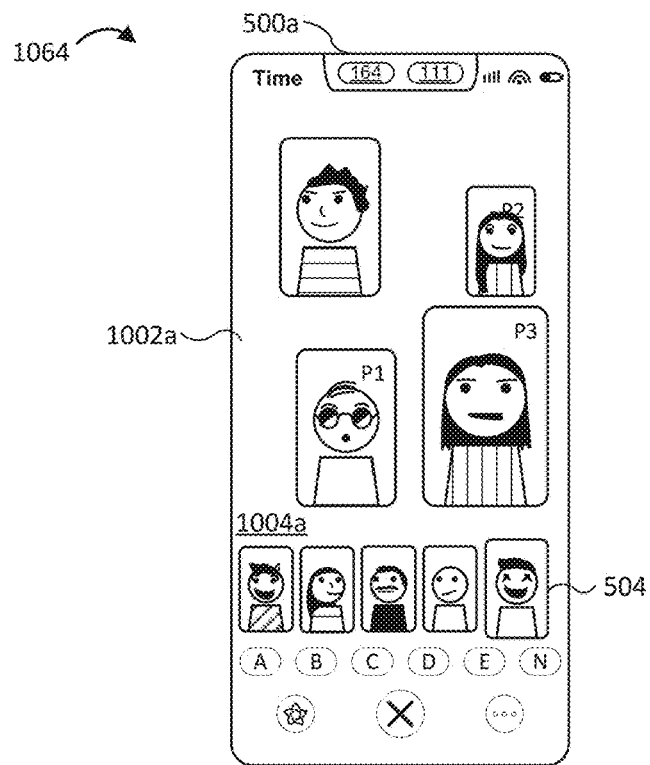
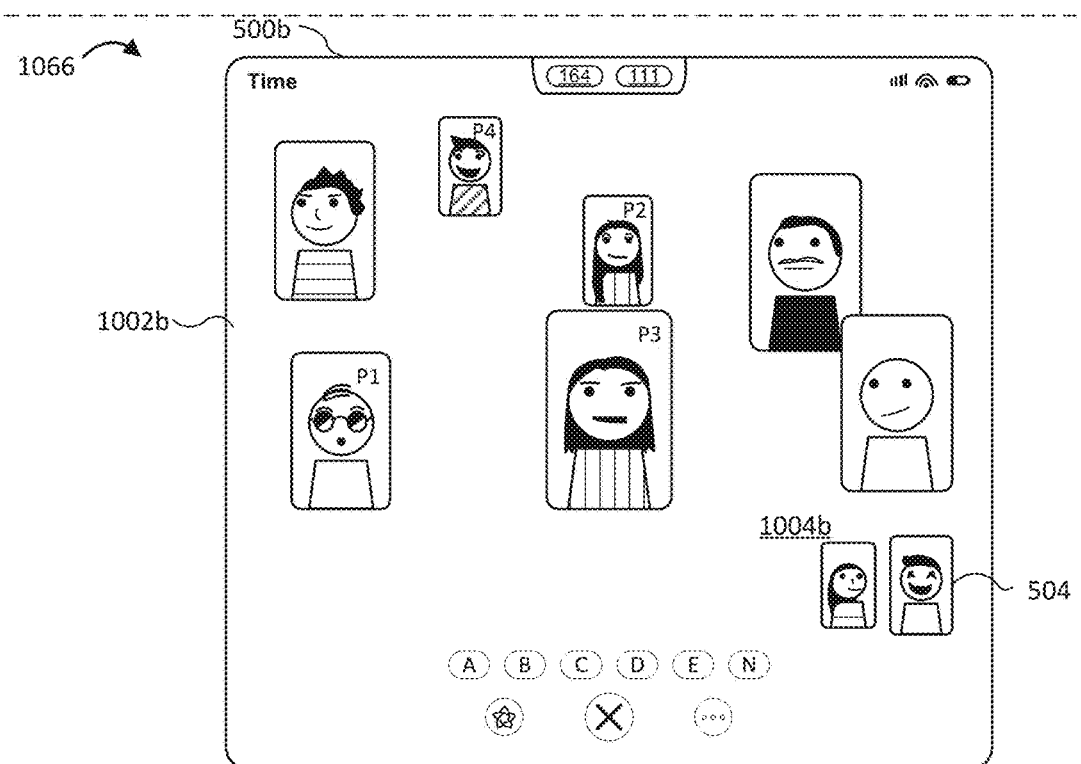
Figure 10O

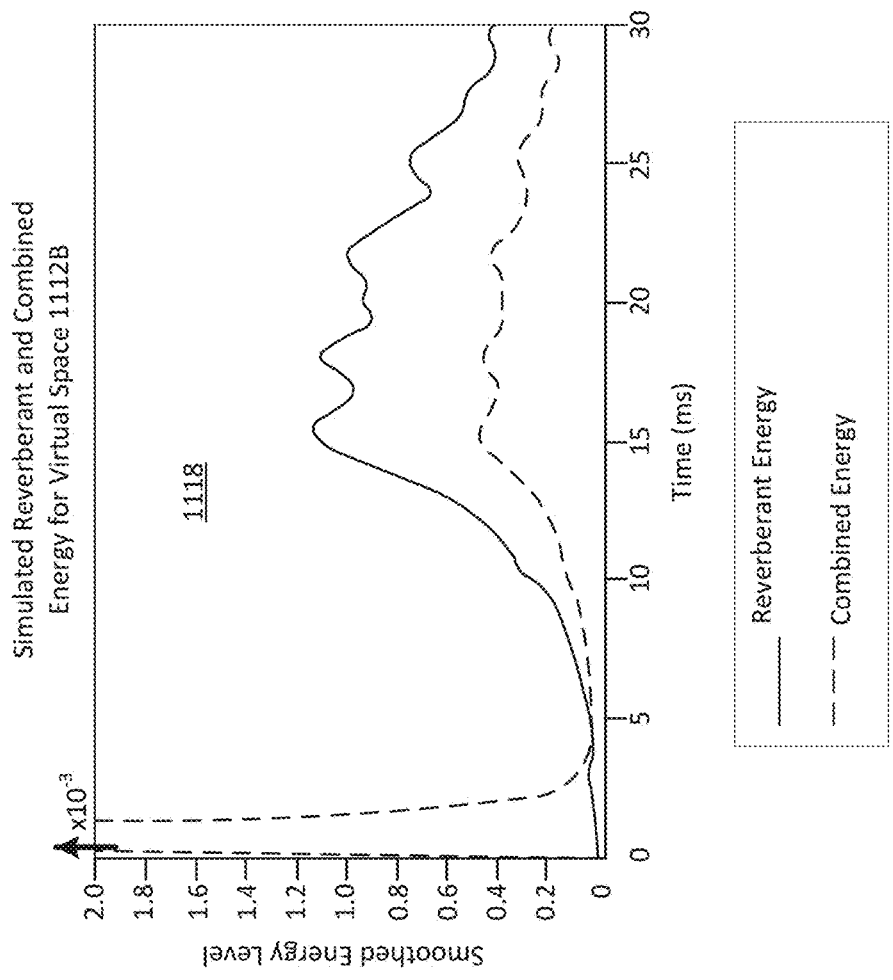
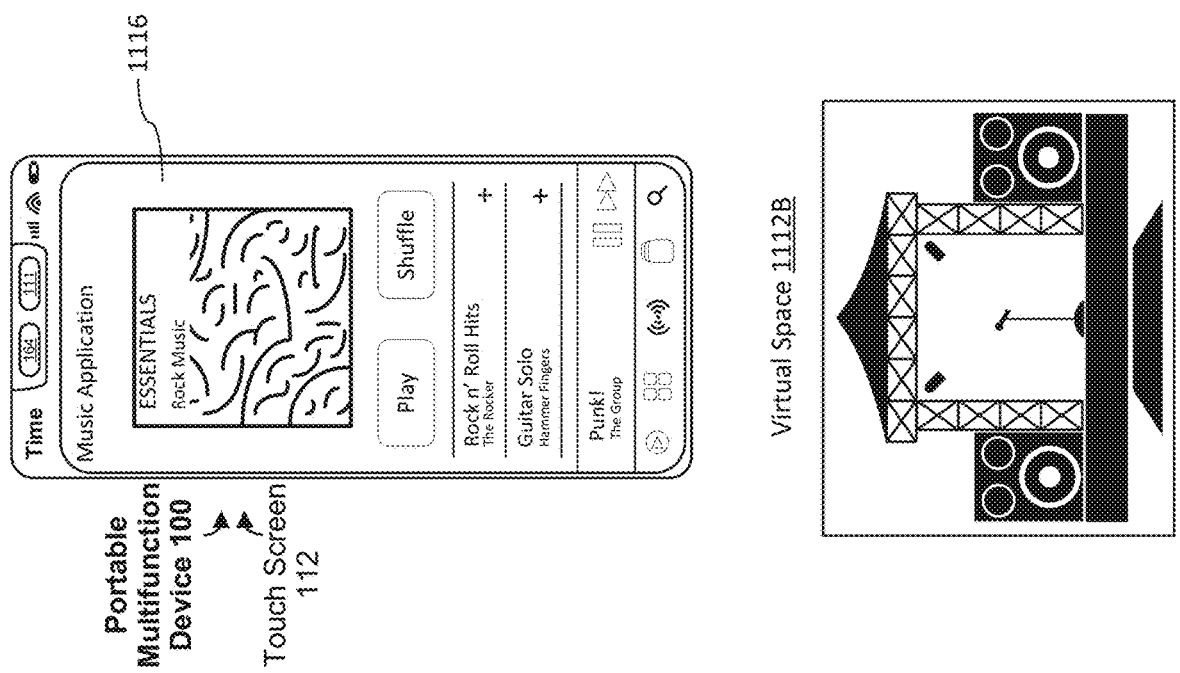
Figure 11C

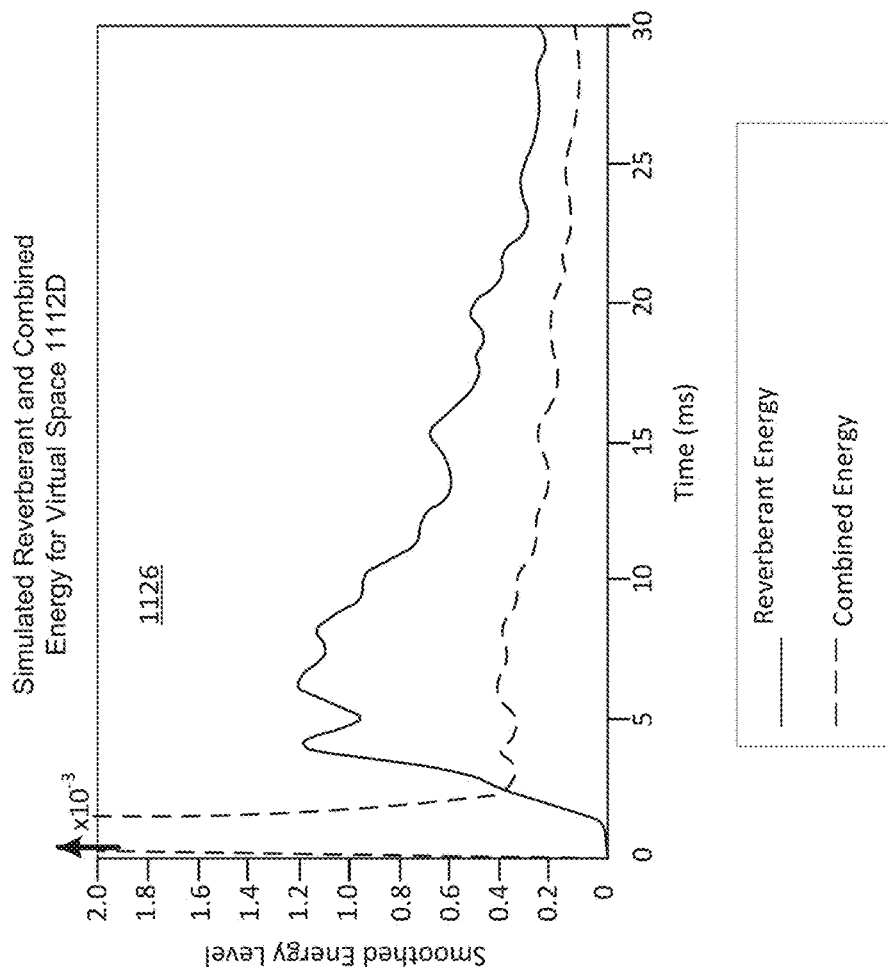
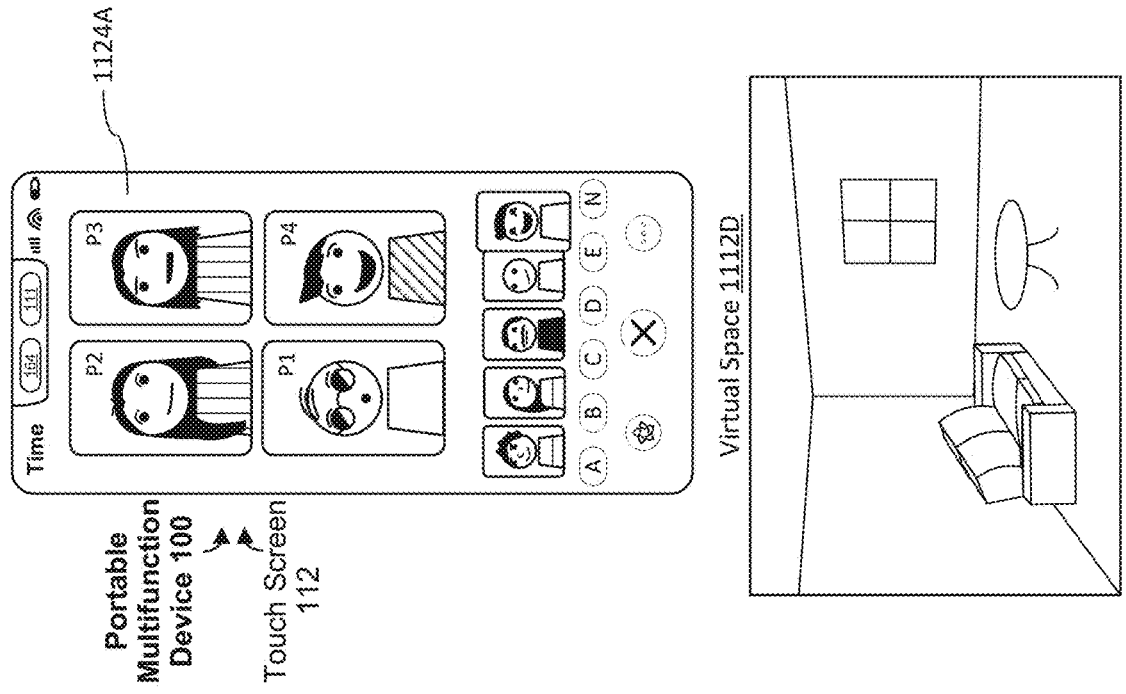
Figure 11F

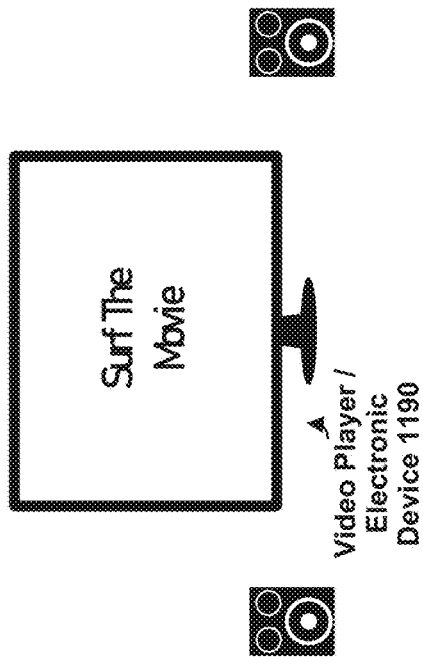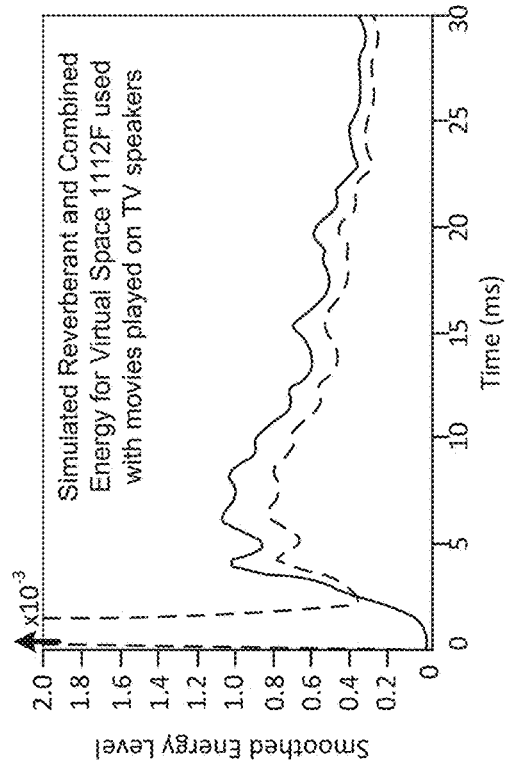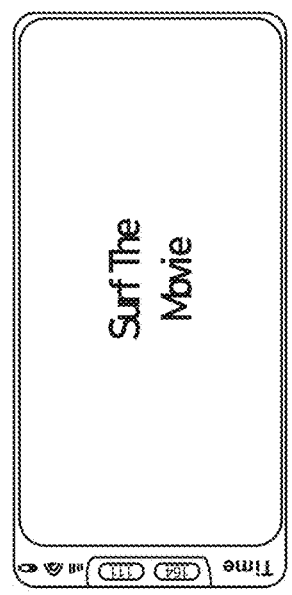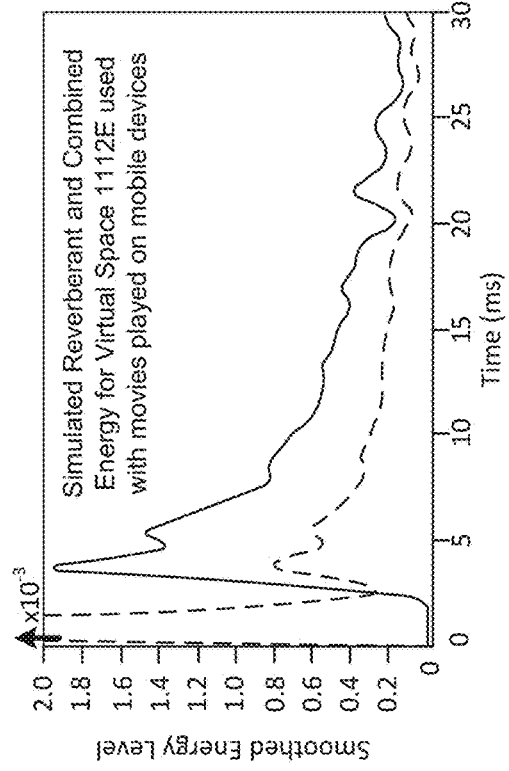
Figure 11T

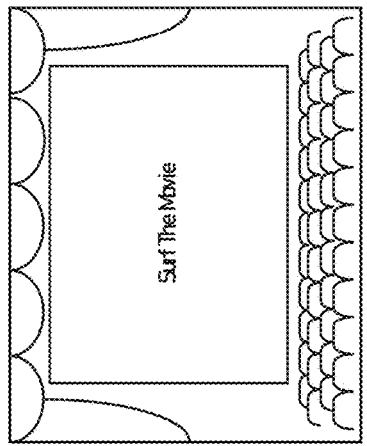
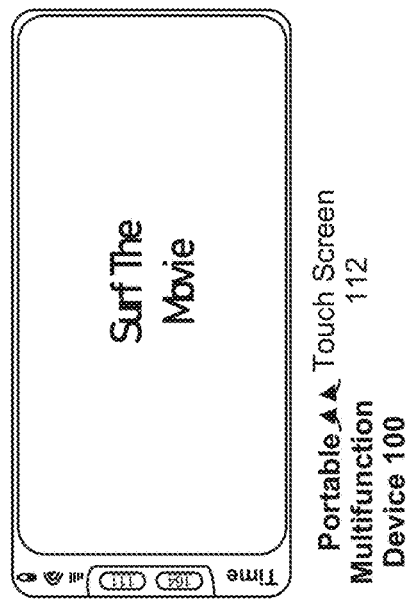
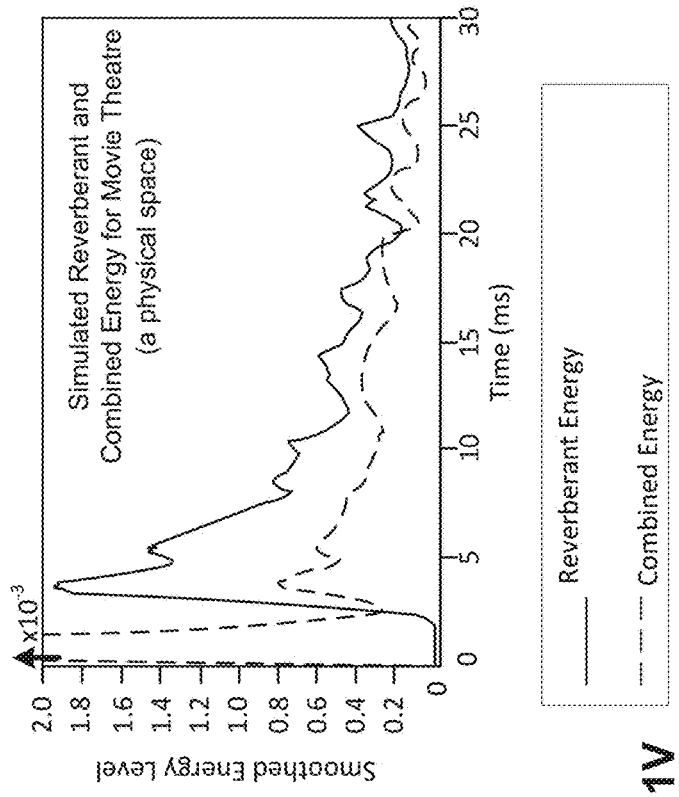
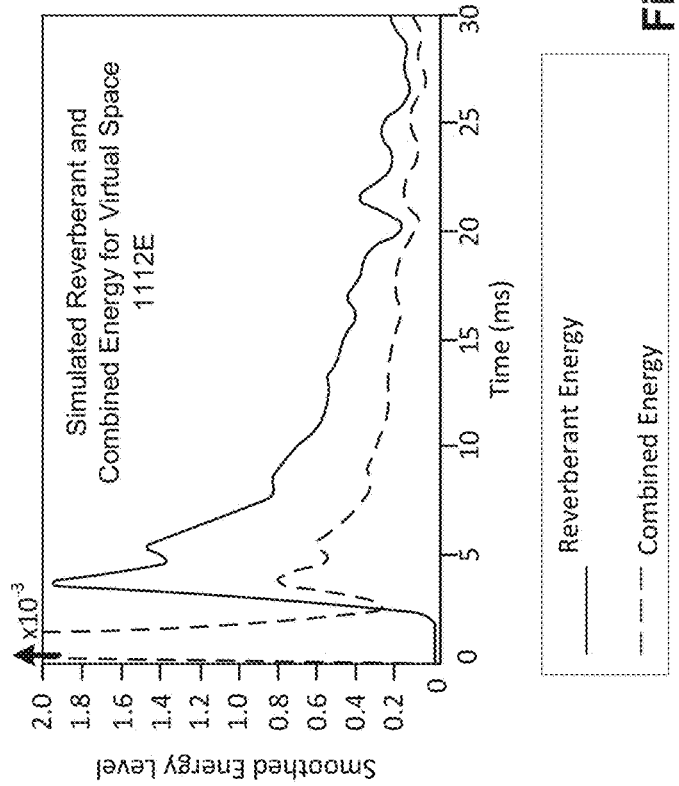
Figure 11V

1210 Two or more of the plurality of participants comprise a first subset of the participants, and the plurality of participants other than the first subset comprise a second subset of the plurality of participants; and in accordance with the determination that the plurality of participants comprises the second number of participants, display in the user interface visual representations of the participants in the second subset and visual representations of the participants in the first subset, wherein the visual representations of the participants in the first subset are smaller than the visual representations of the participants in the second subset

---

1212 The set of one or more audio output devices is a set of one or more wearable audio output devices

---

1214 The first visual representation of the first participant is a dynamic visual representation of the first participant, and the second visual representation of the second participant is a dynamic visual representation of the second participant

---

1216 In accordance with a change in an activity state of a respective participant of the plurality of participants, change visual prominence of the respective participant's visual representation in the user interface or change audio prominence of audio from the respective participant output by the set of one or more audio output devices 1218 Changing visual prominence of the respective participant's visual representation comprises one or more of:
    changing a size of the respective participant's visual representation, and
    changing a layer in a sequence of display layers at which the respective participant's visual representation is displayed

Figure 12B

1220 In accordance with an activity state of a respective participant of the plurality of participants changing from an activity state that does not satisfy activity criteria to an activity state that satisfies the activity criteria, perform a transition operation, the transition operation including causing the set of one or more audio output devices to change a simulated spatial location of audio from the respective participant from the shared simulated spatial location to a respective simulated spatial location different from the shared simulated spatial location 1222 In accordance with the activity state of the respective participant of the plurality of participants changing from an activity state that does not satisfy activity criteria to an activity state that satisfies the activity criteria, gradually move a visual representation of the respective participant from a first region of the user interface, at which visual representations of participants whose activity state does not satisfy the activity criteria are displayed, to a second region of the user interface, at which visual representations of participants whose activity state satisfies the activity criteria are displayed 1224 The transition operation includes gradually changing the simulated spatial location of audio of the respective participant from the shared simulated spatial location to the respective simulated spatial location 1226 In accordance with an activity state of a respective participant of the plurality of participants changing from an activity state that satisfies activity criteria to an activity state that does not satisfy the activity criteria, perform a second transition operation, the second transition operation including causing the set of one or more audio output devices to change a simulated spatial location of audio from the respective participant from a non-shared simulated spatial location that is different than the shared simulated spatial location to the shared simulated spatial location 1228 The second transition operation includes gradually moving a visual representation of the respective participant from a region of the user interface at which visual representations of participants whose activity state satisfies the activity criteria are displayed to a region of the user interface at which visual representations of participants whose activity state does not satisfy the activity criteria are displayed 1230 The second transition operation includes gradually changing the simulated spatial location of audio from the respective participant from the non-shared simulated spatial location to the shared simulated spatial location

Figure 12C

1232 While the electronic device is in a first virtual display mode, cause the set of one or more audio output devices to output audio from up to, but no more than, a third number of participants of the plurality of participants at individual simulated spatial locations, and
   while the electronic device is in a second virtual display mode, cause the set of one or more audio output devices to output audio from up to, but no more than, a fourth number of participants of the plurality of participants at individual simulated spatial locations, wherein the fourth number is different from the third number 1234 A number of participants of the plurality of participants for whom audio is output at individual simulated spatial locations is determined in accordance with a size of a user interface window in which the user interface is displayed using the one or more display generation components 1236 In accordance with a determination that a number of participants in the communication session changes from more than two participants to exactly two participants, the two participants including the first participant, change from outputting audio from the first participant from a simulated spatial location to outputting audio from the first participant without spatialization 1238 Two or more of the plurality of participants, for whom audio is output at individual simulated spatial locations, comprise a third subset of the plurality of participants; two or more other participants of the plurality of participants, for whom audio is output at the shared simulated spatial location, comprise a fourth subset of the plurality of participants; the third subset of participants' respective visual representations are displayed at a plurality of different sizes; and the fourth subset of participants' respective visual representations are each displayed in the user interface at the same size 1240 While in a second communication session:
   in accordance with a determination that the plurality of participants includes a single external participant and there is no visual representation associated with the single external participant, output, via the set of one or more audio output devices, non-spatialized audio corresponding to the single external participant; and
   in accordance with a determination that the plurality of participants includes the single external participant and a visual representation associated with the single external participant is available for display at the electronic device, output, via the set of one or more audio output devices, audio at a simulated spatial location corresponding to the single external participant

Figure 12D

1242 While in a second communication session:
   determine that an additional participant is joining the second communication session; and
   in response to determining that the additional participant is joining the second communication session:
       in accordance with a determination that visual representations of participants in the second communication session are displayed, continue to output audio from the participants in the second communication session at simulated spatial locations; and
       in accordance with a determination that visual representations of participants in the second communication session are not displayed, transition from outputting audio from the participants in the second communication session without spatialization to outputting audio from the participants in the second communication session at simulated spatial locations 1244 The shared simulated spatial location is lower in a three dimensional environment than individual simulated spatial locations at which audio is output for two or more of the plurality of participants for whom audio is output at the individual simulated spatial locations 1246 Display visual representations in the user interface for two or more of the plurality of participants, for whom audio is output at individual simulated spatial locations, at locations in the user interface corresponding to the individual simulated spatial locations 1248 In accordance with a change in position within the user interface of a respective visual representation associated with a participant of the plurality of participants, change a respective simulated spatial location of the participant

At an electronic device that is in communication with one or more input devices, and a set of one or more audio output devices:

1302 Receive a request to output audio content via the one or more audio output devices 1304 In response to receiving the request to output the audio content via the one or more audio output devices, and in accordance with a determination that the audio content includes information that enables spatialization of the audio content, output, via the set of one or more audio output devices, the audio content in a simulated three-dimensional environment, including:

1306 In accordance with a determination that the audio content corresponds to a first category of content, cause the one or more audio output devices to simulate production of the audio content in a first virtual space; and 1308 In accordance with a determination that the audio content corresponds to a second category of content, cause the one or more audio output devices to simulate production of the audio content in a second virtual space 1312 In accordance with a determination that the audio content corresponds to a third category of content different from the first category and second category, cause the one or more audio output devices to simulate production of the audio content in a third virtual space that has different simulated acoustic properties than simulated acoustic properties of the first virtual space and simulated acoustic properties of the second virtual space (A) (B) (C) (D)

1310 In response to receiving the request to output the audio content via the one or more audio output devices, and in accordance with a determination that the audio content does not include information that enables spatialization of the audio content, output the audio content without spatializing the audio content

1314 The respective audio source is a respective application; determine a category of the audio content in accordance with the respective application 1316 The respective audio source is a respective application, and a category corresponding to the audio content is determined in accordance with the respective application and without regard to a content type of media being played by the respective application while the set of one or more audio output devices output the audio content 1317 While the respective application is playing audio content of a first type, cause the one or more audio output devices to simulate production of the audio content of the first type in the first virtual space, and while the respective application is playing audio content of a second type, causing the one or more audio output devices to simulate production of the audio content of the second type in the first virtual space 1318 The respective audio source is an application that includes first audio content and second audio content; while the application is executing:
  in accordance with a determination that the first audio content corresponds to the first category of content, cause the one or more audio output devices to simulate production of the audio content in the first virtual space; and
  in accordance with a determination that the second audio content corresponds to the second category of content, cause the one or more audio output devices to simulate production of the audio content in the first virtual space 1320 The respective audio source is a respective application; determine a category of the audio content in accordance with a content type of respective media being played and without regard to the respective application providing the audio content 1322 Output, via the set of one or more audio output devices, audio content from a second respective audio source comprising a second application different from the respective application, including in accordance with a determination that the audio content from the second respective audio source corresponds to the first category of content, causing the one or more audio output devices to simulate production of the audio content from the second respective audio source in the first virtual space

1330 The audio content is categorized in accordance based on both a type of content and which application is providing the audio content 1332 The simulated acoustic properties of the first virtual space correspond to detected acoustic properties of a first physical space and the simulated acoustic properties of the second virtual space correspond to detected acoustic properties of a second physical space that is different from the first physical space 1333 The acoustic response characteristics of the first virtual space have a modified acoustic response to audio content in one or more frequency ranges in comparison with acoustic response characteristics of the corresponding first physical space 1334 Simulating production of audio content in the first virtual space includes simulating a different amount of reverberation than simulating production of audio content in the second virtual space 1336 Simulating production of audio content in the first virtual space includes simulating a different direction of reverberation than simulating production of audio content in the second virtual space 1338 Simulating production of audio content in the first virtual space includes simulating a different frequency range of reverberation than simulating production of audio content in the second virtual space 1340 The first virtual space has a first simulated size and the second virtual space has a second simulated size different from the first simulated size

1342 Display displaying, via one or more display devices, a user interface that includes a control for changing a spatial audio characteristic of audio output via the set of one or more audio output devices;

1344 Detecting an input at the control for changing the spatial audio characteristic; in response to detecting the input:

1346 In accordance with a determination that the control for changing the spatial audio characteristic is selected while audio content that corresponds to the first category of content is being output by the set of one or more audio output devices,
  change the spatial audio characteristic of the audio content that is being output by the set of one or more audio output devices

1347 In accordance with a determination that the control for changing the spatial audio characteristic is selected while audio content that corresponds to the second category of content is being output by the set of one or more audio output devices,
  forgo changing the spatial audio characteristic 1348 In accordance with a determination that the audio content corresponds to a video communication session between a plurality of participants, cause the one or more audio output devices to simulate production of the audio content in a third virtual space that has different simulated acoustic properties than the simulated acoustic properties of the first virtual space and the second virtual space

1350 While the plurality of participants share media content and the audio content includes audio from the shared media content, continue to cause the one or more audio output devices to simulate production of the audio content in the third virtual space 1352 The audio content that corresponds to the first category is communication audio content, the audio content that corresponds to the second category is media audio content, and the first virtual space simulates a smaller space than the second virtual space

1354 The audio content that corresponds to the first category is communication audio content, the audio content that corresponds to the second category is media audio content, and the first virtual space simulates a more acoustically damped space than the second virtual space 1356 The audio content that corresponds to the first category is music audio content, the audio content that corresponds to the second category is audio content associated with video, and the first virtual space simulates a smaller space than the second virtual space 1358 The audio content that corresponds to the first category is music audio content, the audio content that corresponds to the second category is audio content associated with video, and the first virtual space is more acoustically damped than the second virtual space 1360 The audio content that corresponds to the first category is music audio content of a first type, and the audio content that corresponds to the second category is audio content of a second type 1362 Determine a category of the audio content based at least in part on a type of the electronic device

Figure 13E

SYSTEMS, METHODS, AND GRAPHICAL USER INTERFACES FOR USING SPATIALIZED AUDIO DURING COMMUNICATION SESSIONS

RELATED APPLICATIONS

This application claims priority to U.S. Provisional Patent Application No. 63/197,483, filed Jun. 6, 2021, U.S. Provisional Patent Application No. 63/152,796, filed Feb. 23, 2021, and U.S. Provisional Patent Application No. 63/083,807, filed Sep. 25, 2020, each of which is hereby incorporated by reference in its entirety.

TECHNICAL FIELD

This relates generally to audio output systems, including but not limited to systems for spatializing audio, output by audio output devices, associated with participants during a communication session, optionally, displaying video-conferencing user interfaces on one or more display devices, with one or more input devices.

BACKGROUND

Audio output devices, including wearable audio output devices such as headphones, earbuds, and earphones, are widely used to provide audio outputs to a user during communication sessions.

But conventional methods for playing audio during communication sessions (e.g., multi-participant video conference calls) on wearable audio output devices are limited in the types of audio output modes in which the wearable audio output devices can output audio. For example, conventionally-used audio output modes, such as stereo and mono audio output modes, provide audio with respect to a frame of reference that is tied to the audio output devices, which can cause the listening experience less immersive (e.g., multiple participants voices are all perceived to be coming from one overlapping point in space) and less realistic than the listening experience provided when outputting audio using a spatial audio output mode, which simulates a more realistic listening experience in which audio seems to come from sources of sound in a separate frame of reference, such as the physical environment surrounding the user. Furthermore, a wearable audio output device that supports a spatial audio output, in which the positioning of simulated sources of sound is independent of movement of the audio output devices, enables the realistic and immersive aspects of a public listening experience while also providing the non-intrusiveness of a private listening experience. Further applying the spatial audio output mode to communication sessions allows users to communicate in a more realistic manner, as each participant will sound as though they are in separate locations. Moreover, conventional methods for communication sessions that include a visual component (e.g., a video call) may have participants placed across the user interface, but have their respective voices coming from a single perceived location in space, which can confuse the user. In addition, conventional methods take longer and require more user interaction than necessary (e.g., constant pauses as participants are always interrupting each other whenever they speak), which results in increased user mistakes and, more generally, wasted energy. These latter considerations are particularly important in battery-operated devices.

SUMMARY

Accordingly, there is a need for audio output devices and in some embodiments associated electronic devices with improved methods and interfaces for spatializing audio during communication sessions and communication session that include a visual component (e.g., a video call). Such methods and interfaces optionally complement or replace conventional methods for stereo and mono audio output modes in communication sessions. Such methods and interfaces reduce the number, extent, and/or nature of the inputs from a user and produce a more efficient human-machine interface. For battery-operated systems and devices, such methods and interfaces conserve power and increase the time between battery charges.

The above deficiencies and other problems associated with user interfaces for electronic devices in communication with a set of one or more wearable audio output devices are reduced or eliminated by the disclosed devices. In some embodiments, the electronic device is a desktop computer. In some embodiments, the electronic device is portable (e.g., a notebook computer, tablet computer, or handheld device). In some embodiments, the electronic device is a personal electronic device (e.g., a wearable electronic device, such as a watch). In some embodiments, the electronic device has a touchpad. In some embodiments, the electronic device has a touch-sensitive display (also known as a "touch screen" or "touch-screen display"). In some embodiments, the electronic device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music/audio playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device that is in communication with one or more display devices, one or more input devices, and a set of one or more wearable audio output devices. The method includes displaying, via the one or more display devices, a user interface including respective dynamic visual representations of a plurality of participants in a communication session, including displaying, at a first location in the user interface, a first dynamic visual representation of a first participant and displaying, at a second location in the user interface, a second dynamic visual representation of a second participant different from the first participant. The method includes outputting, via the set of one or more wearable audio output devices, audio from the plurality of participants in the communication session. The method includes outputting first audio from the first participant. The first audio is adjusted so as to maintain the first audio at a first simulated spatial location relative to a frame of reference of the communication session independently of a position of the set of one or more wearable audio output devices relative to the frame of reference. The first simulated spatial location corresponds to the first location of the first dynamic visual representation in the user interface. The method includes outputting second audio from the second participant. The second audio is adjusted, so as to maintain the second audio at a second simulated spatial location relative to the frame of reference independently of a position of the set of one or more wearable audio output devices relative to the frame of reference, wherein the second simulated spatial location corresponds to the second location of the second dynamic visual representation in the user interface. The method includes receiving, via the one or more input devices, an input selecting the first dynamic visual representation of the first participant. The method includes, in response to receiving the input selecting the first dynamic visual representation of the first participant, displaying the first dynamic visual representation of the first participant at a third location, different from the first location, in the user interface, and outputting the first audio from the first participant so as to position the first audio at a third simulated spatial location, relative to the frame of reference, that corresponds to the third location of the first dynamic visual representation in the user interface. The third simulated spatial location is different from the first simulated spatial location. The method includes, in response to receiving the input selecting the first dynamic visual representation of the first participant, displaying the second dynamic visual representation of the second participant at a fourth location in the user interface, and outputting the second audio from the second participant so as to position the second audio at a fourth simulated spatial location, relative to the frame of reference, that corresponds to the fourth location of the second dynamic visual representation in the user interface.

In accordance with some embodiments, a method is performed at a first set of one or more wearable audio output devices, associated with a first user, that is in communication with a second set of one or more wearable audio output devices, associated with a second user. The method includes, while the first set of one or more wearable audio output devices and the second set of one or more wearable audio output devices are engaged in an audio communication session, outputting, via the first set of one or more wearable audio output devices, respective audio from the second set of one or more wearable audio output devices, including, as the first set of one or more wearable audio output devices is moved relative to the second set of one or more wearable audio output devices. The method includes adjusting the respective audio so as to position the respective audio at a simulated spatial location relative to the first set of one or more wearable audio output devices that is determined based on a respective position of the second set of one or more wearable audio output devices relative to the first set of one or more wearable audio output devices. The method includes adjusting an output property other than a simulated spatial location of the respective audio based on a distance of the second set of one or more wearable audio output devices from the first set of one or more wearable audio output devices.

In accordance with some embodiments, a method is performed at an electronic device that is in communication with one or more display generation components, one or more input devices, and a set of one or more audio output devices. The method includes displaying, via the one or more display generation components, a user interface including respective visual representations of a plurality of participants in a communication session, including displaying, at a first location in the user interface, a first visual representation of a first participant and displaying, at a second location in the user interface, a second visual representation of a second participant different from the first participant. The method includes outputting, via the set of one or more audio output devices, audio from the plurality of participants in the communication session, including: in accordance with a determination that the plurality of participants comprises a first number of participants, causing the set of one or more audio output devices to output audio from the plurality of participants from a plurality of different simulated spatial locations without outputting audio from more than one participant of the plurality of participants from a single simulated spatial location of the plurality of different simulated spatial locations; and in accordance with a determination that the plurality of participants comprises a second number of participants, causing the set of one or more audio output devices to output audio from two or more of the plurality of participants from a shared simulated spatial location.

In accordance with some embodiments, a method is performed at an electronic device that is in communication with one or more input devices and a set of one or more audio output devices. The method includes receiving a request to output audio content via the one or more audio output devices; and in response to receiving the request to output the audio content via the one or more audio output devices, and in accordance with a determination that the audio content includes information that enables spatialization of the audio content, outputting, via the set of one or more audio output devices, the audio content in a simulated three-dimensional environment. Outputting the audio content includes: in accordance with a determination that the audio content corresponds to a first category of content, causing the one or more audio output devices to simulate production of the audio content in a first virtual space; and, in accordance with a determination that the audio content corresponds to a second category of content, causing the one or more audio output devices to simulate production of the audio content in a second virtual space that has different simulated acoustic properties than simulated acoustic properties of the first virtual space.

In accordance with some embodiments, an electronic device includes or is in communication with one or more display devices, one or more audio output devices, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device as described herein cause the electronic device to perform or cause performance of the operations of any of the methods described herein. In accordance with some embodiments, a graphical user interface on an electronic device as described herein includes one or more of the elements displayed in any of the methods described herein, which are updated in response to inputs, as described in any of the methods described herein. In accordance with some embodiments, an electronic device as described herein includes means for performing or causing performance of the operations of any of the methods described herein. In accordance with some embodiments, an information processing apparatus, for use in an electronic as described herein includes means for performing or causing performance of the operations of any of the methods described herein.

Thus, electronic devices that include or are in communication with one or more display, one or more input devices, one or more audio output devices, optionally one or more sensors to detect intensities of contacts with the touch-sensitive surface, optionally one or more tactile output generators are provided with improved methods and interfaces for interacting with participants during a communication session that relies on spatialized audio, thereby increasing the effectiveness, efficiency, and user satisfaction with such devices. Such methods and interfaces may complement or replace conventional methods for interacting with participants during communication sessions.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8B are flow diagrams of a process for at least two nearby users initiating and having a communication session via wearable audio output devices, and the at least two nearby users hear simulated spatial audio to indicate direction and distance of other users in the communication session in accordance with some embodiments.

FIGS. 9A-9G illustrate example user interfaces for a dynamic visual communication session (e.g., user interfaces of a video call application during a communication session) with multiple participants, and representations of simulated spatial audio locations of participants relative to a user of the device in accordance with some embodiments.

FIGS. 12A-12E are flow diagrams of a process for displaying a dynamic visual communication session (e.g., user interfaces of a video call application during a communication session) with multiple participants and for outputting audio of participants at simulated spatial audio locations relative to a user of the device, based on activity levels of participants, in accordance with some embodiments.

FIGS. 13A-13E are flow diagrams of processes for causing audio output devices to simulate production of spatial audio content in one of a number of virtual spaces, in accordance with some embodiments.

DESCRIPTION OF EMBODIMENTS

Figure 1A:
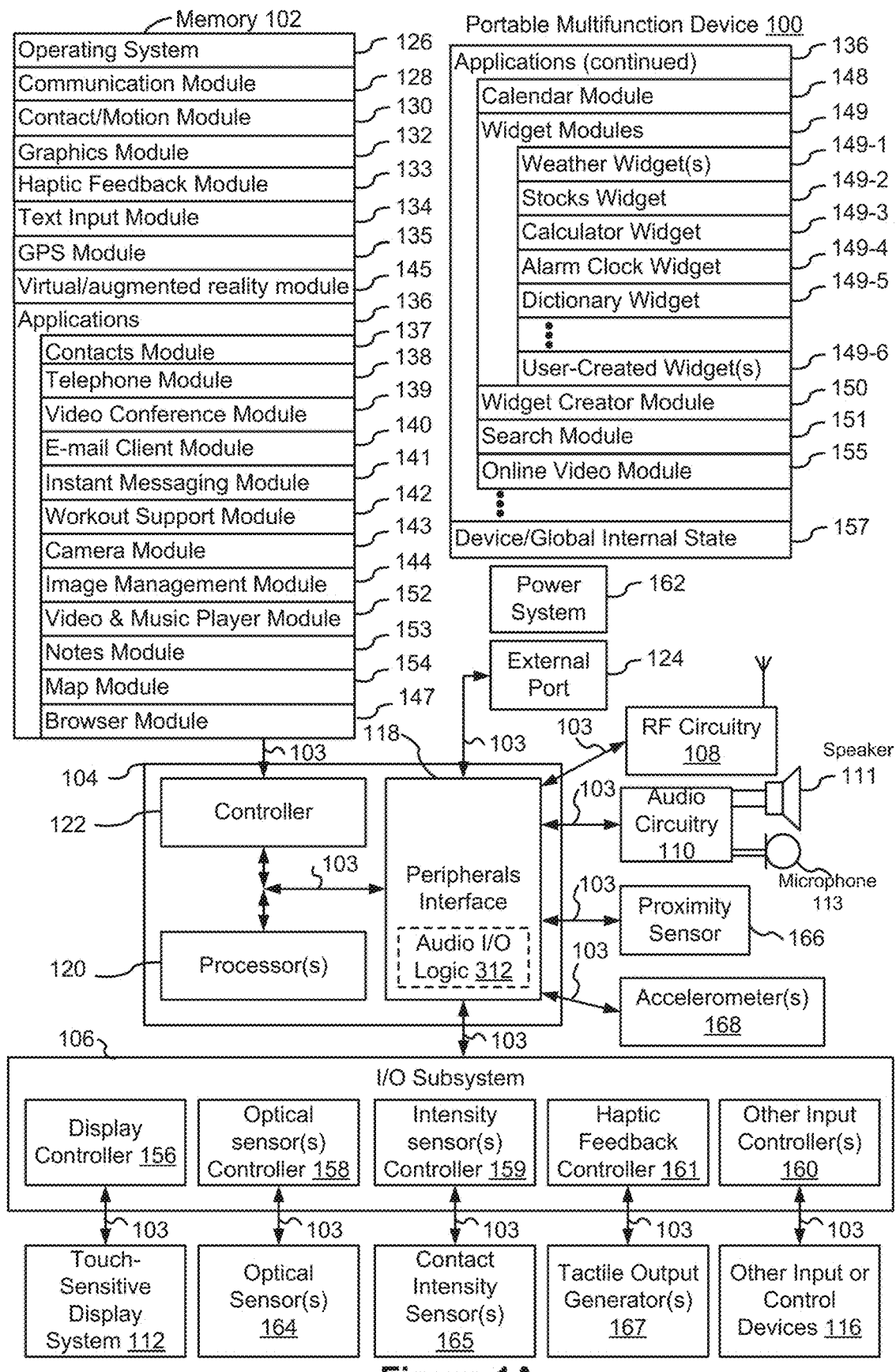
FIG. 1A is a block diagram illustrating a portable multifunction device with a touch-sensitive display in accordance with some embodiments.

As noted above, audio output devices such as wearable audio output devices are widely used to provide audio outputs to a user during a communication session. Many electronic devices that include or are in communication with wearable output devices fail to provide the ability to spatialize participants' audio during a communication session, and/or fail to simulate that each participant is speaking from their own point in space. The methods, systems, and user interfaces/interactions described herein improve in multiple ways how a user can effectively communicate with participants during a communication session. For example, embodiments disclosed herein describe improved ways of spatializing each participants audio during a communication session to allow the user and participants to communicate more effectively.

The processes described below enhance the operability of the devices and make the user-device interfaces more efficient (e.g., by helping the user to provide proper inputs and reducing user mistakes when operating/interacting with the device) through various techniques, including by providing improved visual, audio, and/or haptic feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

Below, FIGS. 1A-1B, 2, and 3A-3C, 4A-4B provide a description of example devices. FIGS. 5A-5T illustrate example user interfaces for a dynamic visual communication session (e.g., a video call application) with multiple participants, and representations of simulated spatial audio locations of participants relative to a user of the device. FIGS. 6A-6G illustrate at least two nearby users initiating and having a communication session via wearable audio output devices, and the at least two nearby users hear simulated spatial audio to indicate direction and distance of other users in the communication session. FIGS. 7A-7H illustrate a flow diagram of a method of displaying a dynamic visual communication session (e.g., a video call application) with multiple participants, and representations of simulated spatial audio locations of participants relative to a user of the device. FIGS. 8A-8B illustrate a flow diagram of a method of at least two nearby users initiating and having a communication session via wearable audio output devices, and the at least two nearby users hear simulated spatial audio to indicate direction and distance of other users in the communication session. FIGS. 9A-9G illustrate example user interfaces for a dynamic visual communication session (e.g., user interfaces of a video call application during a communication session) with multiple participants, charts illustrating ratios of reverberated to direct sound for participants, and representations of simulated spatial audio locations of participants relative to a user of the device. The user interfaces in FIGS. 5A-5T and 9A-9G are used to illustrate the processes in FIGS. 7A-7H, and the user interfaces in FIGS. 6A-6G are used to illustrate the processes in FIGS. 8A-8B. FIGS. 10A-10O illustrate example user interfaces for a dynamic visual communication session (e.g., user interfaces of a video call application during a communication session) with multiple participants, charts illustrating activity levels of participants, and representations of simulated spatial audio locations of participants relative to a user of the device. FIGS. 11A-11V illustrate user interfaces associated with simulating production of various categories of audio content in simulated virtual environments, also herein called virtual spaces or virtual rooms, each having different simulated acoustic properties; user interfaces for selecting audio output settings; and diagrams representing audio characteristics of a number of virtual spaces used to simulate production of audio content, in accordance with some embodiments. The user interfaces in FIGS. 10A-10O and 11A-11V are used to illustrate the processes in FIGS. 12A-12E and 13A-13E, respectively.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes or is in communication with one or more other physical user-interface devices, such as a physical keyboard, a mouse, and/or a joystick. In some embodiments, the touch-sensitive surface and/or the other aforementioned physical user-interface devices are replaced by or supplemented by a voice recognition device or subsystem for receiving orally delivered user inputs, and/or a user gaze determination device or subsystem that determines a location (e.g., in a user interface, or in a two or three dimensional environment) or sequence of locations at which a user is gazing or focusing.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone). In some embodiments, peripherals interface 118, in conjunction with RF circuitry 108 and optionally audio circuitry 110, communicates wirelessly with one or more peripheral audio output devices, such as wearable audio output device 301 (FIG. 3B), to control audio outputs and other functions of the peripheral audio output devices.

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button (e.g., or an up button and a separate down button) for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object).

Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (e.g., touchpad 355 discussed below with reference to FIG. 3A) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen. Furthermore, in some embodiments, in place of a touch screen, or in addition to a touch screen, device 100 includes a display generation component (e.g., a display driver, for displaying images using a peripheral device, such as display or headset with a holographic image generation component) and a device, such as a touchpad, with a touch-sensitive surface, and/or other input device(s), such as a voice recognition device or subsystem for receiving orally delivered user inputs, and/or a user gaze determination device or subsystem that determines a location (e.g., in a user interface, or in a two or three dimensional environment) or sequence of locations at which a user is gazing or focusing, and thus receives or determines inputs in the form of gestures performed with the user's gaze (e.g., the user input may include gazing at or focusing on a respective user interface element, moving the user's gaze position along a path or trajectory, blinking the user's eyes, and other gaze based inputs).

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer, and/or a GPS (or GLONASS or other global navigation system) receiver for obtaining information concerning the location and orientation (e.g., portrait or landscape) of device 100.

Figure 11A:
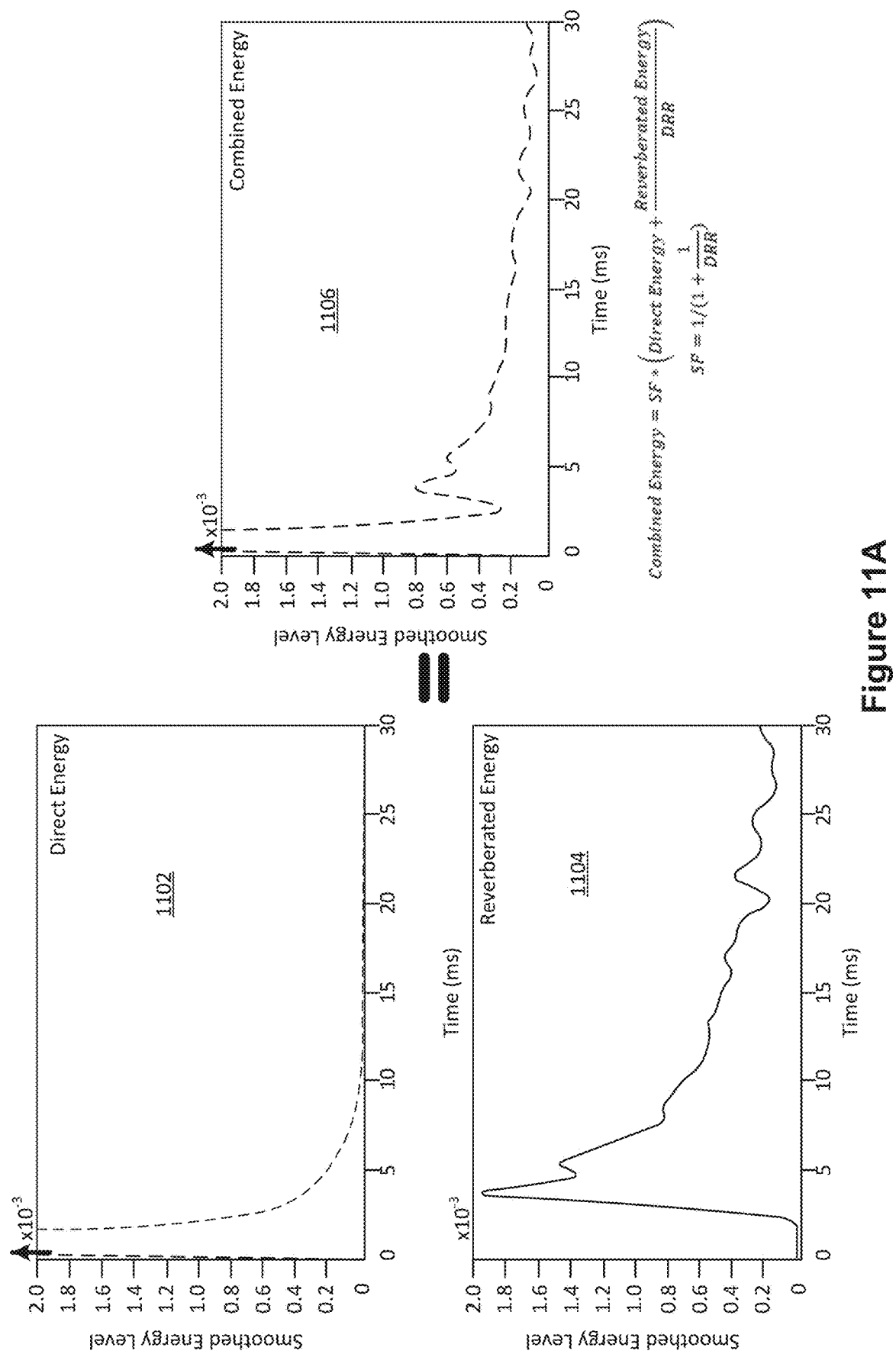
FIGS. 11A-11V illustrate user interfaces associated with simulating production of various categories of audio content in virtual spaces each having different simulated acoustic properties, user interfaces for selecting audio output settings, and diagrams representing audio characteristics of a number of virtual spaces used to simulate production of audio content, in accordance with some embodiments.
Figure 11B:
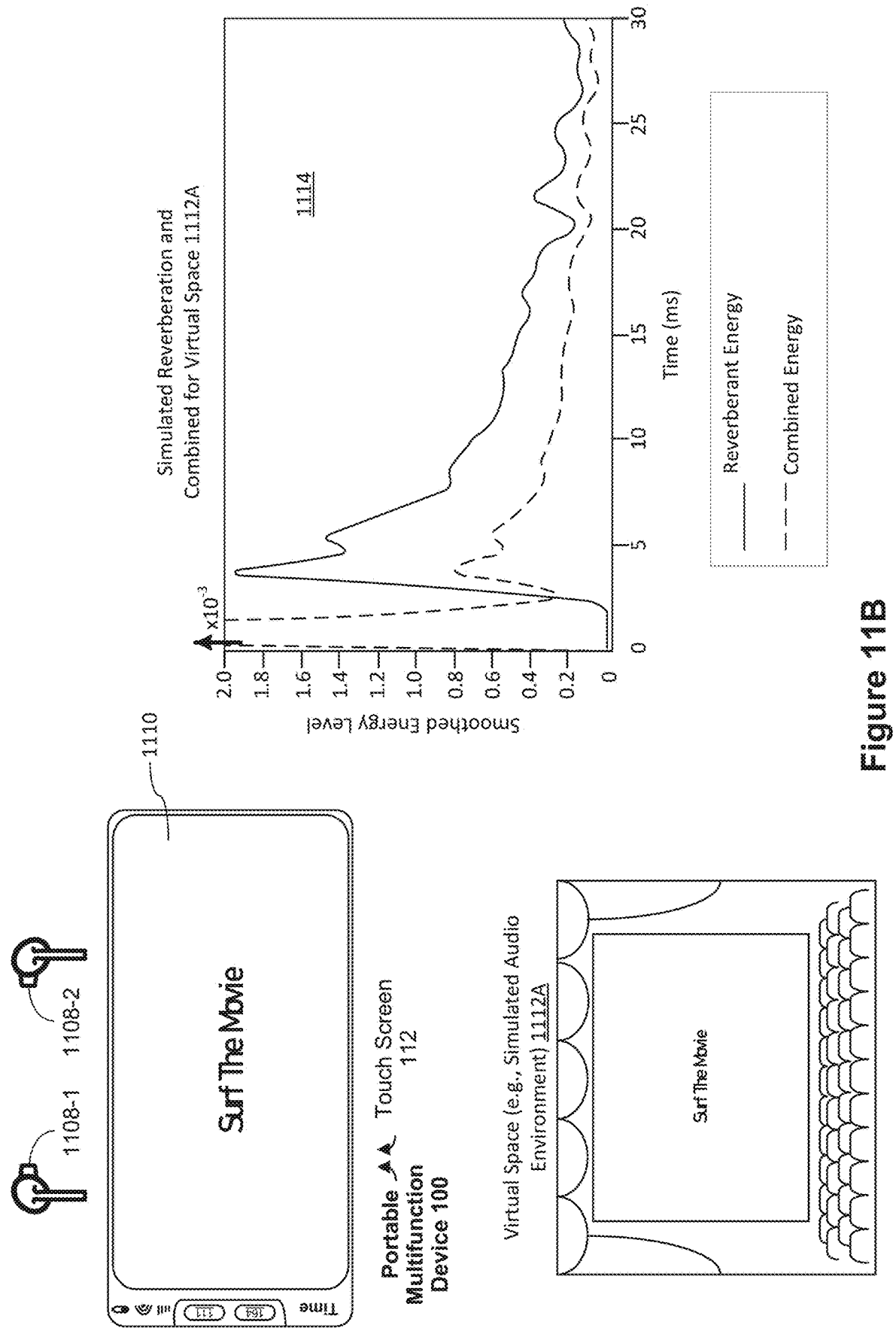

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast, or other visual property) of graphics that are displayed. As used herein, the term "graphics" includes any object that can be displayed to a user, including without limitation text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Virtual/augmented reality module 145 provides virtual and/or augmented reality logic to applications 136 that implement augmented reality, and in some embodiments virtual reality, features. Virtual/augmented reality module 145 facilitates superposition of virtual content, such as a virtual user interface object, on a representation of at least a portion of a field of view of the one or more cameras. For example, with assistance from the virtual/augmented reality module 145, the representation of at least a portion of a field of view of the one or more cameras may include a respective physical object and the virtual user interface object may be displayed at a location, in a displayed augmented reality environment, that is determined based on the respective physical object in the field of view of the one or more cameras or a virtual reality environment that is determined based on the pose of at least a portion of a computer system (e.g., a pose of a display device that is used to display the user interface to a user of the computer system).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches);

receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
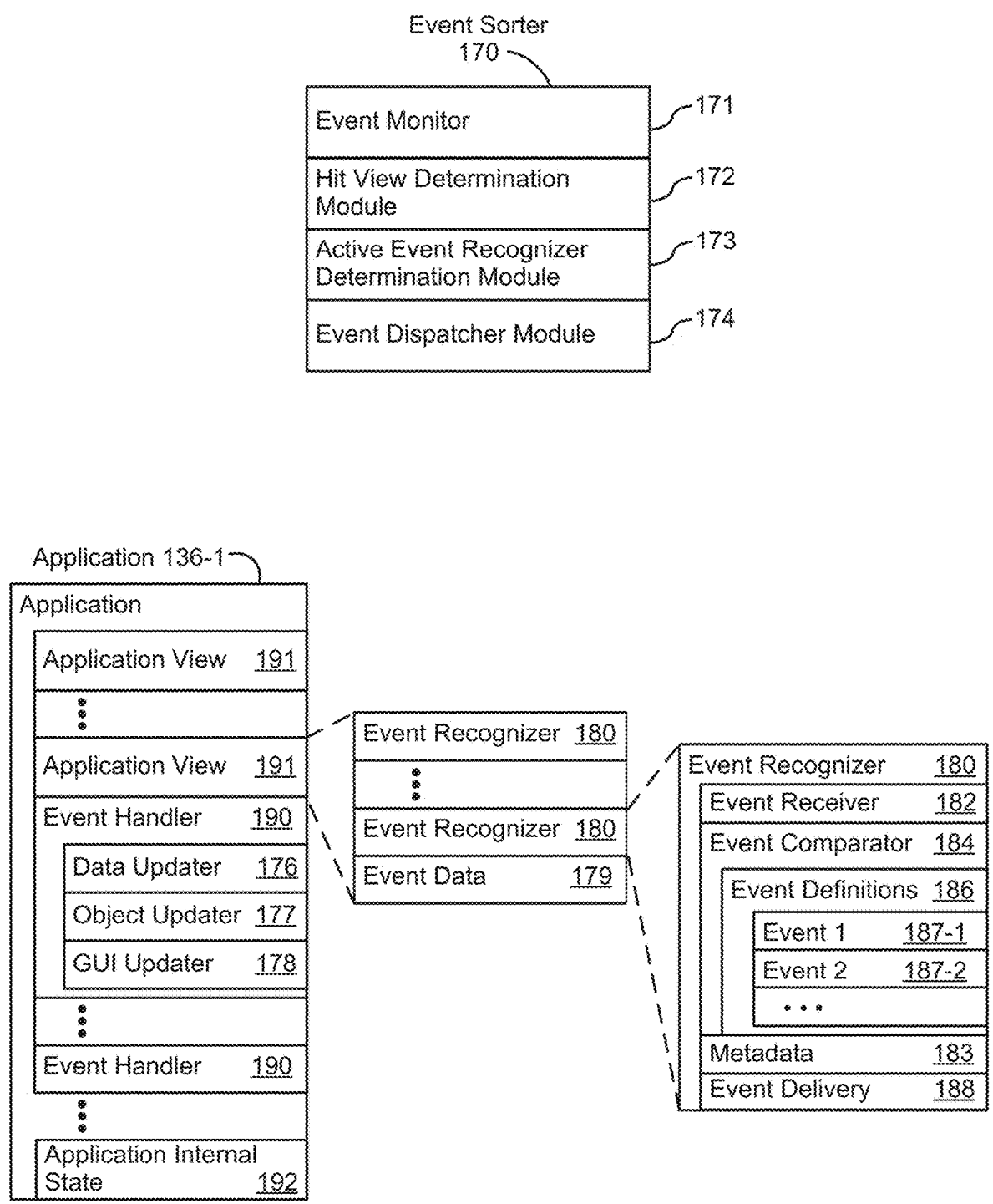
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event (i.e., the first sub-event in the sequence of sub-events that form an event or potential event) occurs. Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
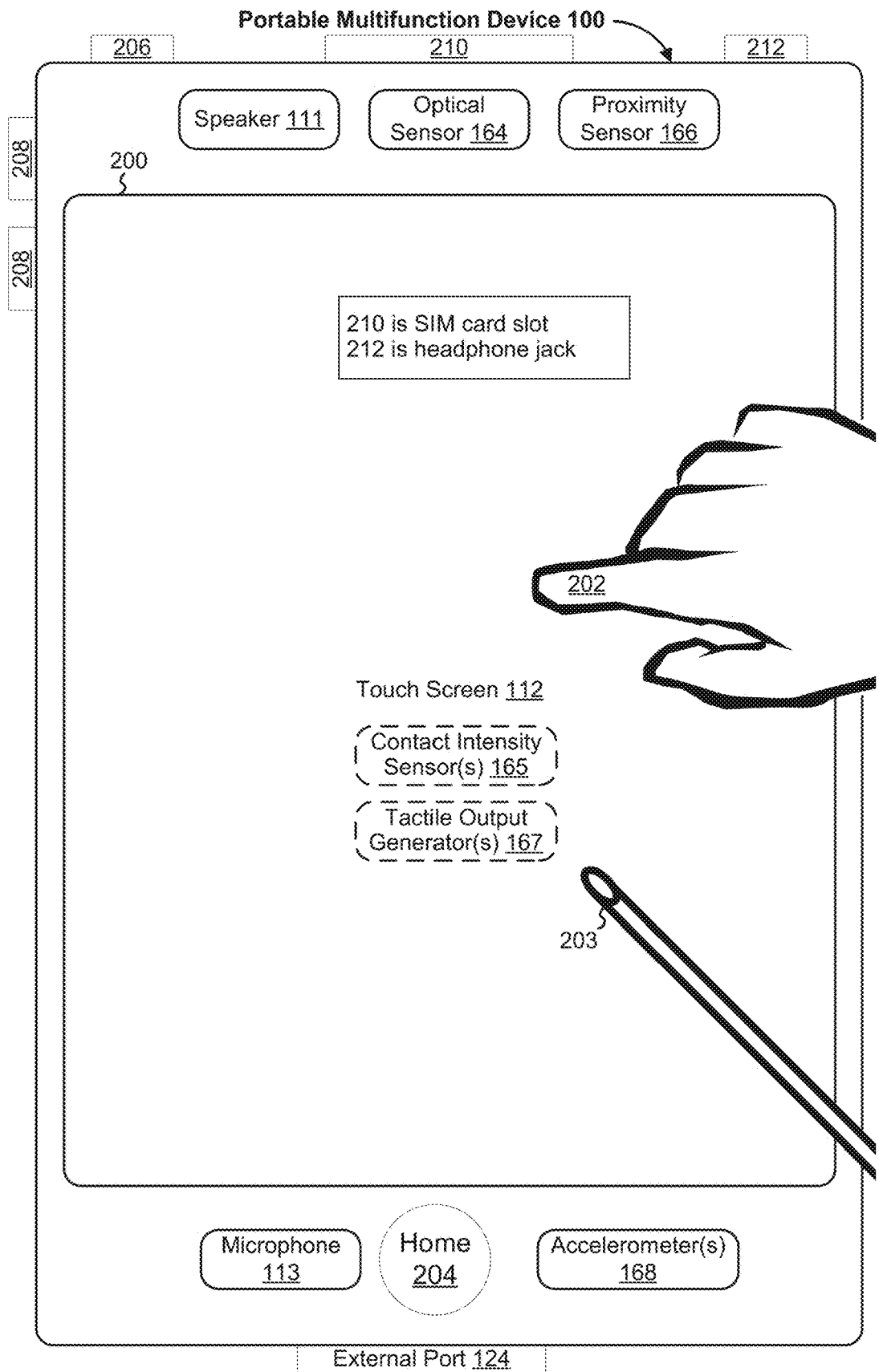
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

Figure 3A:
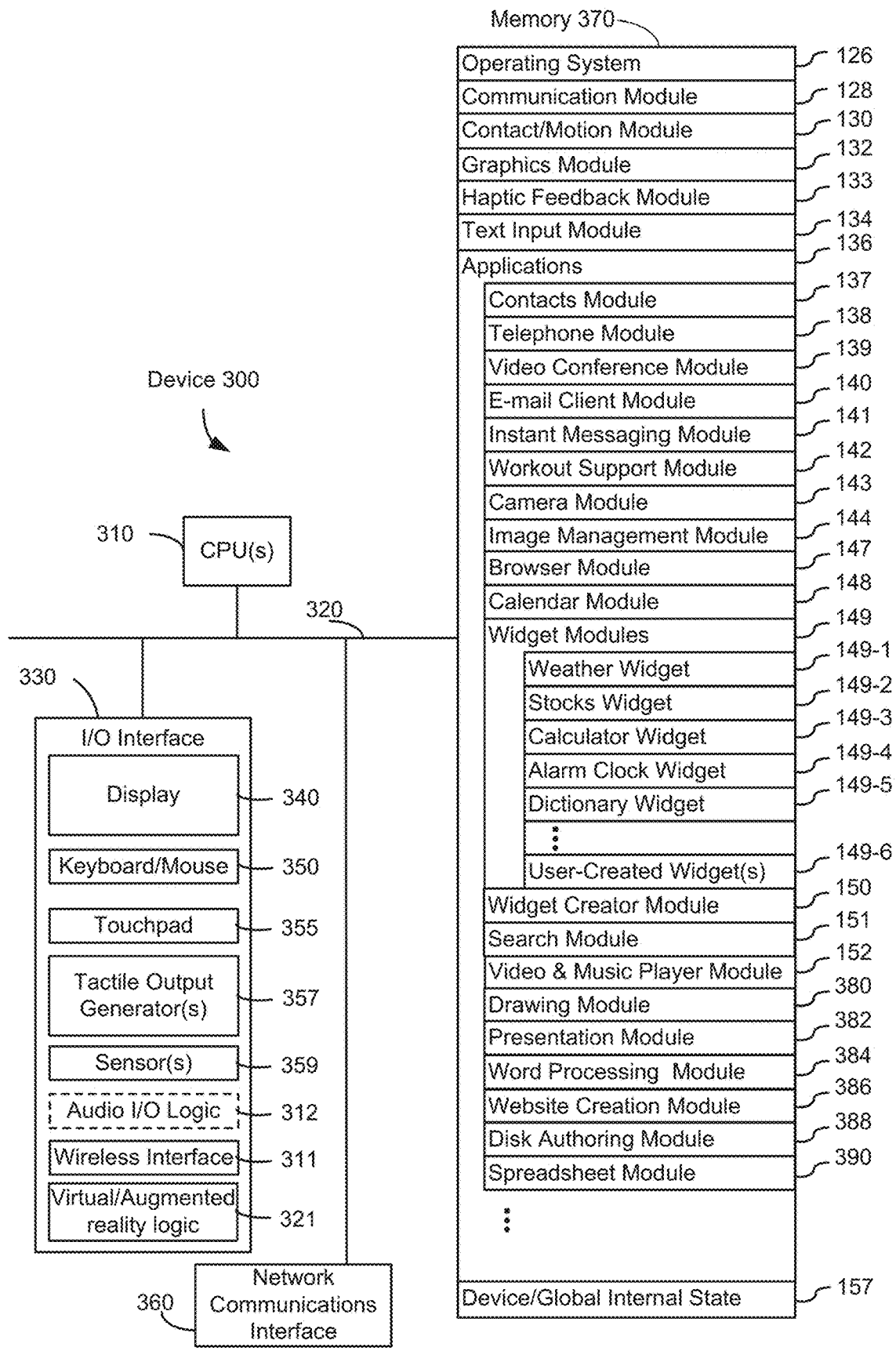
FIG. 3A is a block diagram of an example multifunction device with a display and a touch-sensitive surface in accordance with some embodiments.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). In some embodiments, device 300 includes a wireless interface 311 for communication with one or more wearable audio output devices 301. In some embodiments, device 300 includes and/or is in communication with virtual/augmented reality logic 321 (e.g., virtual/augmented reality module 145).

Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
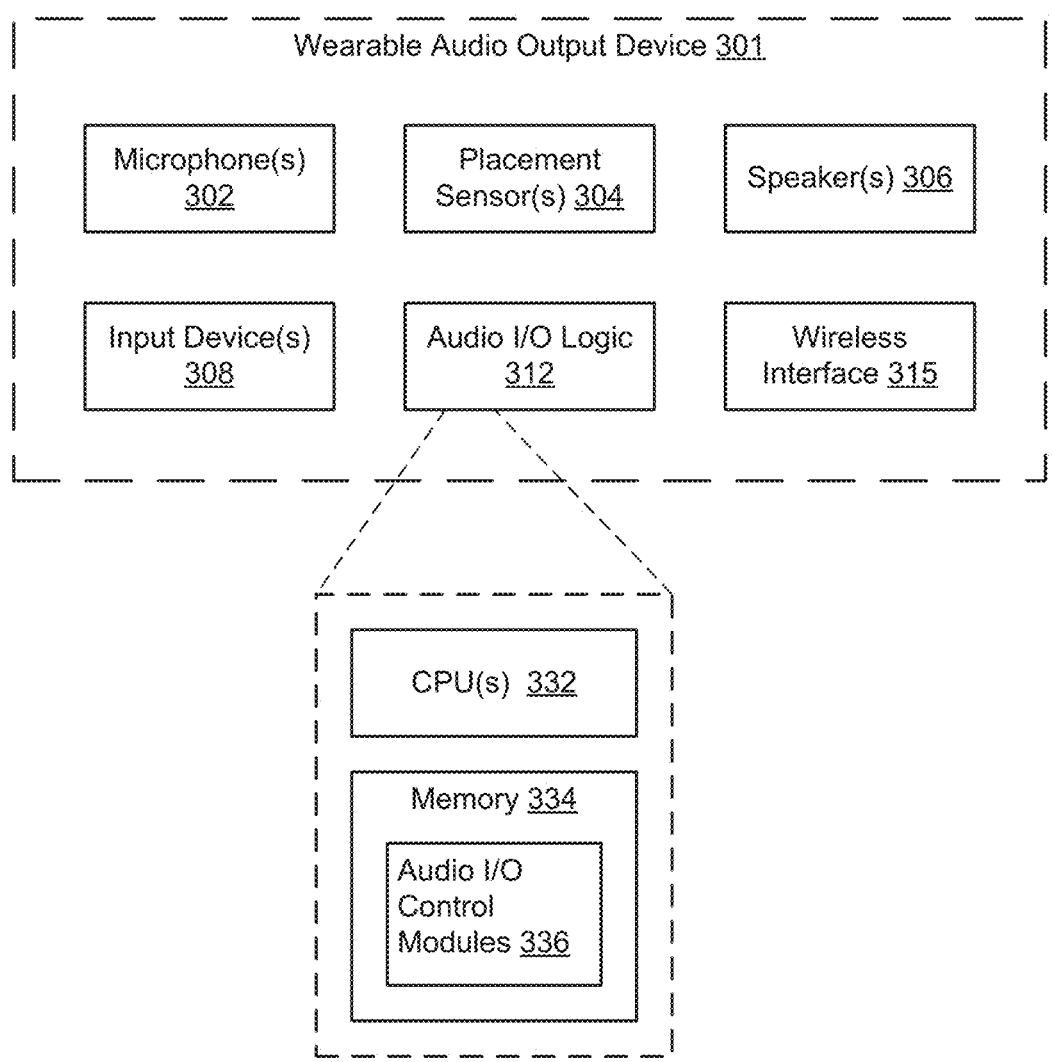
FIG. 3B is a block diagram of an example wearable audio output device in accordance with some embodiments.

FIG. 3B is a block diagram of an example wearable audio output device 301 in accordance with some embodiments. In some embodiments, wearable audio output device 301 is one or more in-ear earphone(s), earbud(s), over-ear headphone (s), or the like. In some examples, wearable audio output device 301 includes a pair of earphones or earbuds (e.g., one for each of a user's ears). In some examples, wearable audio output device 301 includes over-ear headphones (e.g., headphones with two over-ear earcups to be placed over a user's ears and optionally connected by a headband). In some embodiments, wearable audio output device 301 includes one or more audio speakers 306 for providing audio output (e.g., to a user's ear). In some embodiments, wearable audio output device 301 includes one or more placement sensors 304 to detect positioning or placement of wearable audio output device 301 relative to a user's ear, such as to detect placement of wearable audio output device 301 in a user's ear. In some embodiments, wearable audio output device 301 conditionally outputs audio based on whether wearable audio output device 301 is in or near a user's ear (e.g., wearable audio output device 301 forgoes outputting audio when not in a user's ear, to reduce power usage). In some embodiments where wearable audio output device 301 includes multiple (e.g., a pair) of wearable audio output components (e.g., earphones, earbuds, or earcups), each component includes one or more respective placement sensors, and wearable audio output device 301 conditionally outputs audio based on whether one or both components is in or near a user's ear, as described herein.

In some embodiments, wearable audio output device 301 includes audio I/O logic 312, which determines the positioning or placement of wearable audio output device 301 relative to a user's ear based on information received from placement sensor(s) 304, and, in some embodiments, audio I/O logic 312 controls the resulting conditional outputting of audio as well as adjustment of the audio output by speaker(s) 306 so as to implement spatial audio and other audio features disclosed elsewhere in this document. In some embodiments, audio I/O logic 312 includes one or more processors 332, and memory 334 (e.g., a computer readable storage medium, or non-transitory computer readable storage medium) storing one or more programs 336 (e.g., one or more audio I/O control modules) configured to be executed by the one or more processors 332. In some embodiments, the one or more programs 336 include instructions for performing various aspects of method 700, method 800, method 1200, and/or method 1300, described herein. For example, in some embodiments, the one or more programs 336 include instructions that, when executed by the one or more processors 332, cause the wearable audio output device 301, or a set of such wearable audio output devices, to perform many of the audio processing and adjusting operations of method 700, method 800, method 1200, and/or method 1300.

In some embodiments, wearable audio output device 301 includes a wireless interface 315 for communication with one or more multifunction devices, such as device 100 (FIG. 1A) or device 300 (FIG. 3A). In some embodiments, interface 315 is a wired interface for connection with a multifunction device, such as device 100 (FIG. 1A) or device 300 (FIG. 3A) (e.g., via a headphone jack or other audio port). In some embodiments, a user can interact with and provide inputs (e.g., remotely) to wearable audio output device 301 via interface 315. In some embodiments, wearable audio output device 301 is in communication with multiple multifunction devices, and audio I/O logic 312 determines, which of the multifunction devices from which to accept instructions for outputting audio.

In some embodiments, wearable audio output device 301 includes one or more microphones 302 for receiving audio input. In some embodiments, microphone(s) 302 detect speech from a user wearing wearable audio output device 301 and/or ambient noise around wearable audio output device 301. In some embodiments, as described in more detail herein with reference to FIG. 3C, multiple microphones of microphones 302 are positioned at different locations on wearable audio output device 301 to measure speech and/or ambient noise at different locations around wearable audio output device 301. In some embodiments where wearable audio output device 301 includes multiple (e.g., a pair) of wearable audio output components (e.g., earphones or earbuds), each component includes one or more respective microphones. In some embodiments, audio I/O logic 312 detects or recognizes speech or ambient noise based on information received from microphone(s) 302.

Figure 3C:
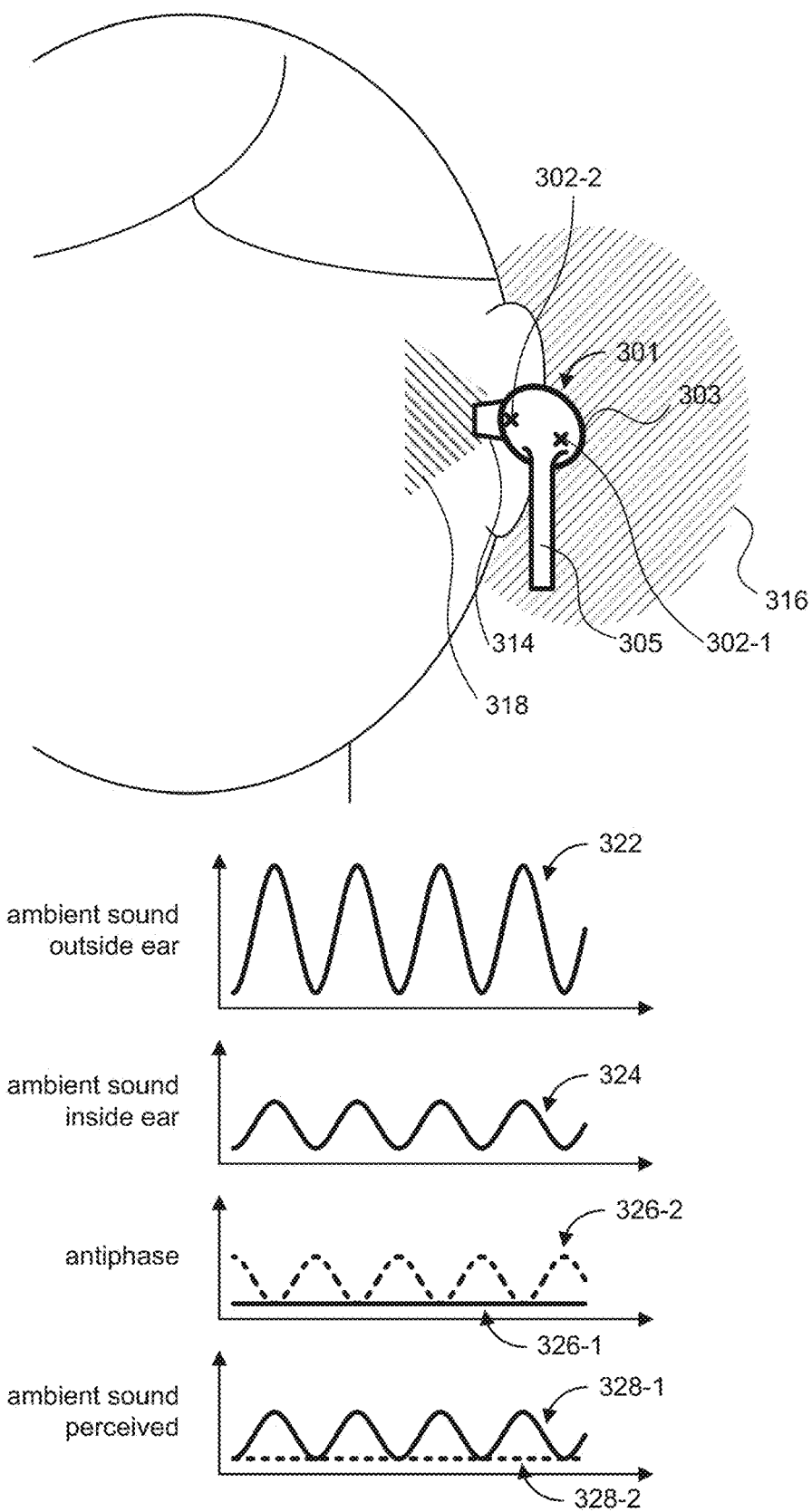
FIG. 3C illustrates example audio control by a wearable audio output device in accordance with some embodiments.

In some embodiments, wearable audio output device 301 includes one or more input devices 308. In some embodiments where wearable audio output device 301 includes multiple (e.g., a pair) of wearable audio output components (e.g., earphones, earbuds, or earcups), each component includes one or more respective input devices. In some embodiments, input device(s) 308 includes a pressure-sensitive (e.g., intensity-sensitive) input device, which in some embodiments is located within a portion of wearable audio output device 301, sometimes called a "stem," that physically extends from a portion of wearable audio output device 301 that is configured to be inserted in a user's ear (e.g., stem 305 as shown in FIG. 3C). In some embodiments, the pressure-sensitive input device detects inputs from a user in response to the user squeezing the input device (e.g., by pinching the stem of wearable audio output device 301 between two fingers). In some embodiments, input device(s) 308 include a touch-sensitive surface (for detecting touch inputs), accelerometer(s) and/or attitude sensor(s) (for determining an attitude of wearable audio output device 301 relative to a physical environment and/or changes in attitude of the device, and/or other input device by which a user can interact with and provide inputs to wearable audio output device 301. In some embodiments, input device(s) 308 include one or more volume control hardware elements (e.g., an up/down button for volume control, or an up button and a separate down button, as described herein with reference to FIG. 1A) for volume control (e.g., locally) of wearable audio output device 301. In some embodiments, inputs provided via input device(s) 308 are processed by audio I/O logic 312. In some embodiments, audio I/O logic 312 is in communication with a separate device (e.g., device 100, FIG. 1A, or device 300, FIG. 3A) that provides instructions or content for audio output, and that optionally receives and processes inputs (or information about inputs) provided via microphone(s) 302, placement sensor(s) 304, and/or input device(s) 308, or via one or more input devices of the separate device. In some embodiments, audio I/O logic 312 is located in device 100 (e.g., as part of peripherals interface 118, FIG. 1A) or device 300 (e.g., as part of I/O interface 330, FIG. 3A), instead of device 301, or alternatively is located in part in device 100 and in part in device 301, or in part in device 300 and in part in device 301.

FIG. 3C illustrates example audio control by a wearable audio output device in accordance with some embodiments. In some embodiments, when a wearable audio output device having earbuds to which interchangeable eartips may be attached are worn in a user's ears, the earbuds and eartips together act as physical barriers that block at least some ambient sound from the surrounding physical environment from reaching the user's ear. For example, in FIG. 3C, wearable audio output device 301 is worn by a user such that earbud 303 and eartip 314 are in the user's left ear. Eartip 314 extends at least partially into the user's ear canal. Preferably, when earbud 303 and eartip 314 are inserted into the user's ear, a seal is formed between eartip 314 and the user's ear so as to isolate the user's ear canal from the surrounding physical environment. However, in some circumstances, earbud 303 and eartip 314 together block some, but not necessarily all, of the ambient sound in the surrounding physical environment from reaching the user's ear. Accordingly, in some embodiments, a first microphone (or, in some embodiments, a first set of one or more microphones) 302-1 (e.g., of microphones 302, FIG. 3B) is located on wearable audio output device 301 so as to detect ambient sound, represented by waveform 322, in region 316 of a physical environment surrounding (e.g., outside of) earbud 303. In some embodiments, a second microphone (or, in some embodiments, a second set of one or more microphones) 302-2 (e.g., of microphones 302, FIG. 3B) is located on wearable audio output device 301 so as to detect any ambient sound, represented by waveform 324, that is not completely blocked by earbud 303 and eartip 314 and that can be heard in region 318 inside the user's ear canal.

Accordingly, in some circumstances in which wearable audio output device 301 is not producing a noise-cancelling (also called "antiphase") audio signal to cancel (e.g., attenuate) ambient sound from the surrounding physical environment, as indicated by waveform 326-1, ambient sound waveform 324 is perceivable by the user, as indicated by waveform 328-1. In some circumstances in which wearable audio output device 301 is producing an antiphase audio signal to cancel ambient sound, as indicated by waveform 326-2, ambient sound waveform 324 is not perceivable by the user, as indicated by waveform 328-2.

In some embodiments, ambient sound waveform 322 is compared to attenuated ambient sound waveform 324 (e.g., by wearable audio output device 301 or a component of wearable audio output device 301, such as audio I/O logic 312, or by an electronic device that is in communication with wearable audio output device 301) to determine the passive attenuation provided by wearable audio output device 301. In some embodiments, the amount of passive attenuation provided by wearable audio output device 301 is taken into account when providing the antiphase audio signal to cancel ambient sound from the surrounding physical environment. For example, antiphase audio signal waveform 326-2 is configured to cancel attenuated ambient sound waveform 324 rather than unattenuated ambient sound waveform 322.

In some embodiments, wearable audio output device 301 is configured to operate in one of a plurality of available audio output modes, such as an active noise control audio output mode, an active pass-through audio output mode, and a bypass audio output mode (also sometimes called a noise control off audio output mode). In the active noise control mode (also called "ANC"), wearable audio output device 301 outputs one or more audio-cancelling audio components (e.g., one or more antiphase audio signals, also called "audio-cancellation audio components") to at least partially cancel ambient sound from the surrounding physical environment that would otherwise be perceivable to the user. In the active pass-through audio output mode, wearable audio output device 301 outputs one or more pass-through audio components (e.g., plays at least a portion of the ambient sound from outside the user's ear, received by microphone 302-1, for example) so that the user can hear a greater amount of ambient sound from the surrounding physical environment than would otherwise be perceivable to the user (e.g., a greater amount of ambient sound than would be audible with the passive attenuation of wearable audio output device 301 placed in the user's ear). In the bypass mode, active noise management is turned off, such that wearable audio output device 301 outputs neither any audio-cancelling audio components nor any pass-through audio components (e.g., such that any amount of ambient sound that the user perceives is due to physical attenuation by wearable audio output device 301).

In some embodiments, wearable audio output device 301 represents a set of headphones with on-ear earcups to be worn on a user's ears, or over-ear earcups to be worn over a user's ears, rather than one or more earbuds to be worn in the user's ears. In some such embodiments, the earcups act as the physical barriers that block at least some ambient sound from the surrounding physical environment from reaching the user's ear. At least one of the earcups includes microphones 302-1 and 302-2 to detect, respectively, ambient sound in the physical environment (corresponding to ambient sound in region 316, represented by waveform 322 in FIG. 3C) and ambient sound that is not completely blocked by the earcup (corresponding to ambient sound that can be heard in region 318, represented by waveform 324 in FIG. 3C). In some embodiments, both earcups include respective pairs of microphones 302 for detecting ambient sound with respect to each earcup.

Attention is now directed towards embodiments of user interfaces ("UI") that are, optionally, implemented on portable multifunction device 100.

Figure 4A:
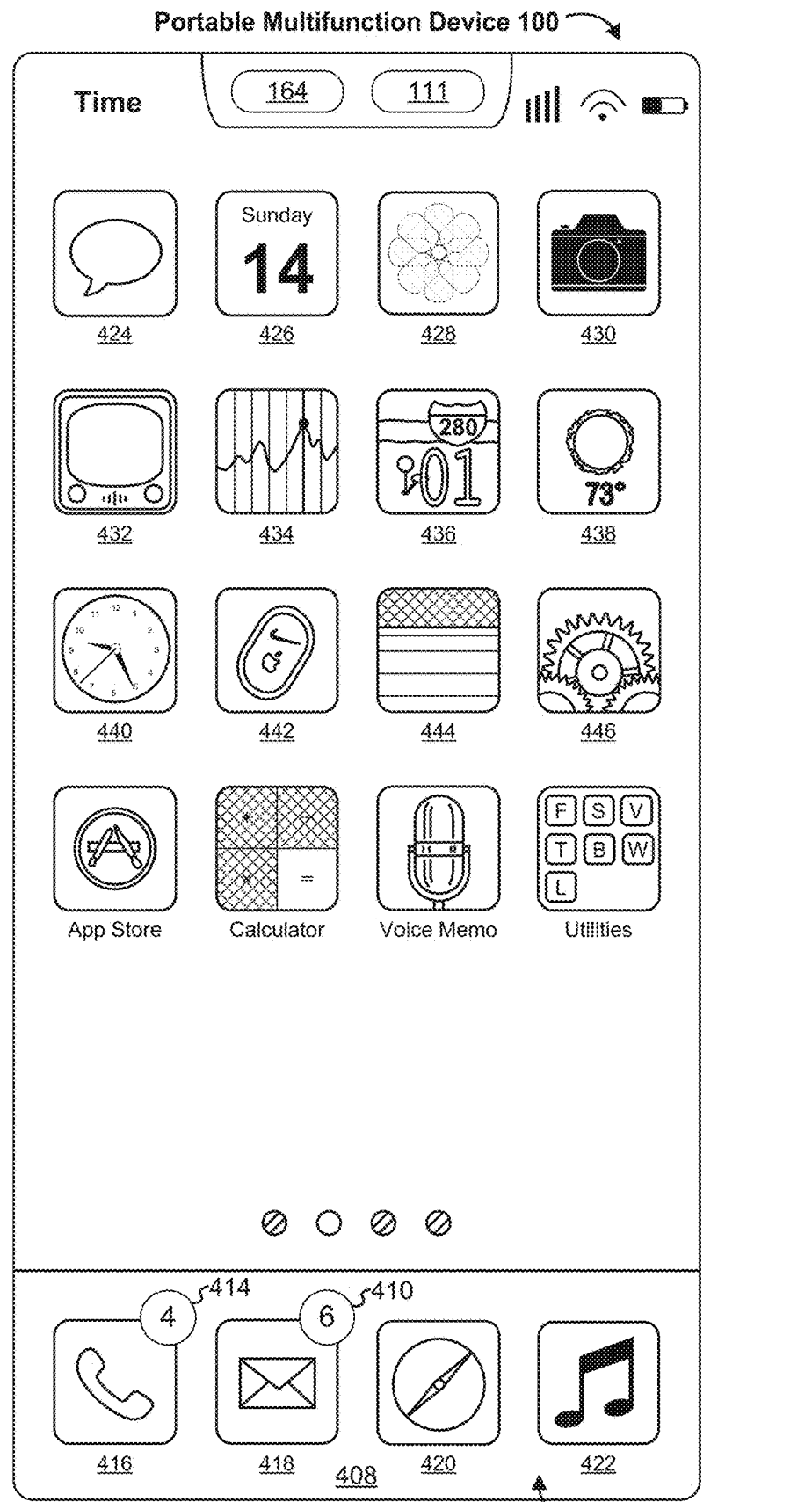
FIG. 4A illustrates an example user interface for a menu of applications on a portable multifunction device in accordance with some embodiments.
Figure 5A:
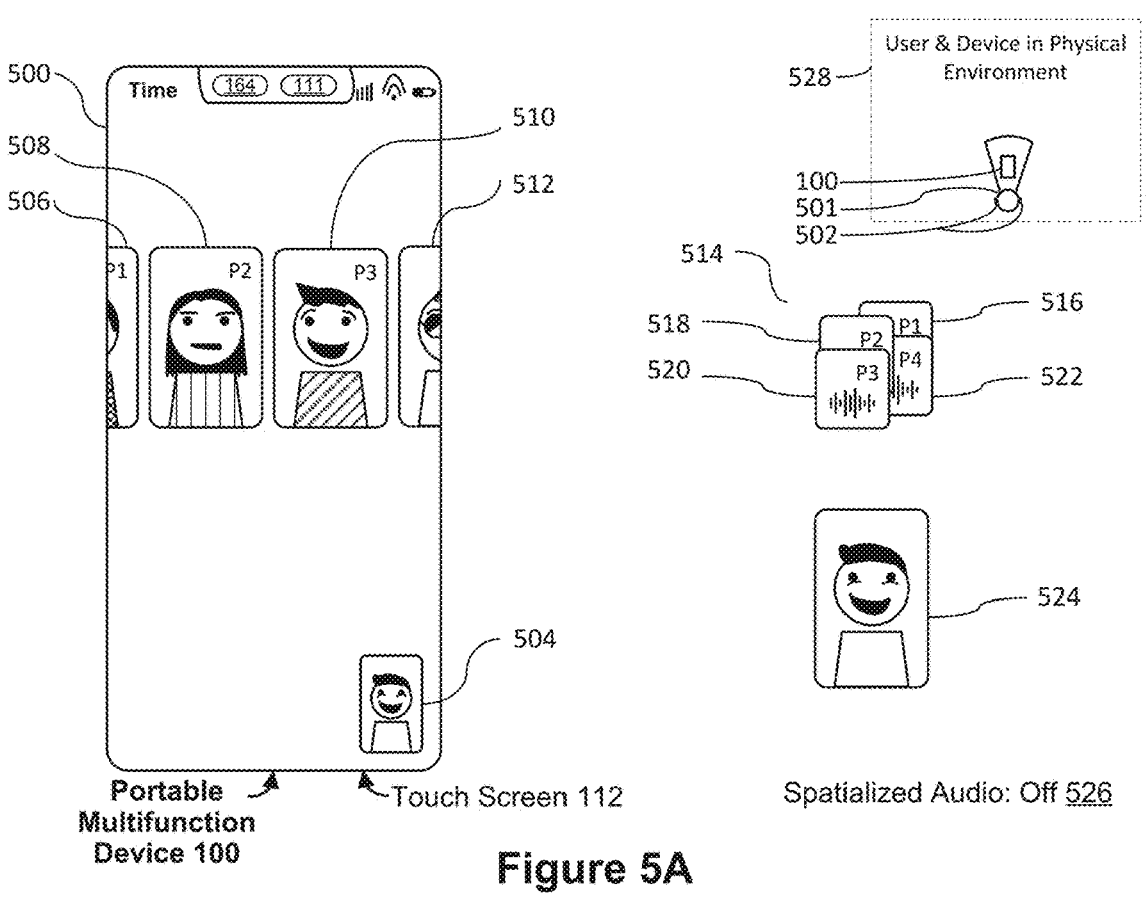
FIGS. 5A-5T illustrate example user interfaces for a dynamic visual communication session (e.g., user interfaces of a video call application during a communication session) with multiple participants, and representations of simulated spatial audio locations of participants relative to a user of the device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, labeled "Music;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3A) with a touch-sensitive surface 451 (e.g., a tablet or touchpad 355, FIG. 3A) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. Furthermore, as described above, in some embodiments, other input devices and methodologies are used to receive user inputs. It should be understood that similar methods are, optionally, used for other user interfaces described herein.

In some embodiments, the response of the device to inputs detected by the device depends on criteria based on characteristics of the input, such as the duration of the input or the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria. Alternatively, in some embodiments, for some light press inputs, the duration of the input exceeding a first threshold amount of time (e.g., since the input was detected) triggers a first response; and in some embodiments, for some deep press inputs, the duration of the input exceeding a second threshold amount of time (e.g., since the input was detected), greater than the first threshold amount of time, triggers a second response different from the first response.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

User Interfaces and Associated Processes

Attention is now directed towards embodiments of user interfaces ("UI") and associated processes that may be implemented on an electronic device (e.g., portable multifunction device 100 (FIG. 1A) or device 300 (FIG. 3A)) that is in communication with one or more display devices (e.g., touch-sensitive display system 112 (FIG. 1A), or display 340 (FIG. 3A)), one or more input devices (e.g., touch-sensitive display system 112 (FIG. 1A) or touchpad 355 (FIG. 3A)), and one or more wearable audio output devices (e.g., a set of one or more wearable audio output devices 301 (FIG. 3B), such as a set of on-ear or over-ear headphones, a pair of earbuds or earphones, etc.). In some embodiments, the user interfaces and associated processes may be implemented at least in part on one or more wearable audio output devices (e.g., one or more wearable audio output devices 301 (FIG. 3B)), and in some embodiments at least in part on one or more electronic devices, such as portable multifunction device 100 (FIG. 1A) or device 300 (FIG. 3A). In some embodiments, the user interfaces and associated processes may be implemented on a system, optionally a wearable system, that includes or is in communication with one or more wearable audio output devices (e.g., a set of one or more wearable audio output devices 301 (FIG. 3B)), and that includes or is in communication with one or more electronic devices (e.g., portable multifunction device 100 (FIG. 1A) or device 300 (FIG. 3A)).

FIGS. 5A-5T illustrate example user interfaces for a dynamic visual communication session (e.g., user interfaces of a video call application during a communication session) with multiple participants, and representations of simulated spatial audio locations of participants relative to a user of the device in accordance with some embodiments. FIGS. 6A-6G illustrate at least two nearby users initiating and having a communication session via wearable audio output devices, and the at least two nearby users hear simulated spatial audio to indicate direction and distance of other users in the communication session in accordance with some embodiments. FIGS. 9A-9G illustrate example user interfaces for a dynamic visual communication session (e.g., user interfaces of a video call application during a communication session) with multiple participants, and representations of simulated spatial audio locations of participants relative to a user of the device in accordance with some embodiments. The user interfaces in these figures are used to illustrate the processes described below, including the processes illustrated in FIGS. 7A-7H, and 8A-8B. For convenience of explanation, some of the embodiments will be discussed with reference to operations performed on an electronic device 100 having a touch-sensitive display system 112 and that is in communication with a set of one or more wearable audio output devices. However, analogous operations are, optionally, performed on other types of devices with other types of input devices. For example, analogous operations may be performed using a device with a display 450 and a separate touch-sensitive surface 451 (FIG. 4B) in response to detecting inputs on the touch-sensitive surface 451 while displaying the user interface shown in the figures on the display 450. In other examples, the touch-sensitive display and/or the other aforementioned physical user-interface devices are replaced by or supplemented by other forms of providing input such as a voice recognition device or subsystem for receiving orally delivered user inputs, one or more cameras or a camera subsystem tracking the position of a physical input device that in some cases is separate from (e.g., held or worn by) the user or that in some cases is a feature of the user such as the user's hand, and/or a user gaze determination device or subsystem that determines a location (e.g., in a user interface, or in a two or three dimensional environment) or sequence of locations at which a user is gazing or focusing. In addition, while some of the embodiments will be discussed with reference to a set of wearable audio output devices that includes a pair of earbuds 502, analogous operations are, optionally, performed using a wearable audio output device that is a pair of on-ear or over-ear headphones, and that includes a pair of earcups. In such cases, an operation described below as being performed with respect to one earbud of the pair of earbuds is analogously performed using one earcup of the pair of headphones (e.g., placement of an earbud in the user's ear is analogous to placement of an earcup over the user's ear, and removal of an earbud from a user's ear is analogous to removal of an earcup from the user's ear).

FIGS. 5A-5T illustrate example user interfaces (e.g., user interfaces within a video call application) for a dynamic visual communication session with multiple participants, and representations of simulated spatial audio locations of participants relative to the user of the device in accordance with some embodiments.

FIG. 5A illustrates portable multifunction device 100 displaying an example user interface 500 (e.g., a video call user interface, conference call user interface, or communications application user interface) on touch screen 112 of an ongoing video call between multiple participants and a user of the device. The user interface distinguishes between the dynamic visual representations of the user of the device (e.g., shown in the user interface 500 as video representation of a user 504), and the dynamic visual representations of the other participants (P1-P4) in the video call (e.g., shown in the user interface 500 as video representation of participant one (P1), video representation 508 of participant two (P2), video representation 510 of participant three (P3), and video representation 512 of participant four (P4) (collectively also referred to as representations 506-512 of participants)). Throughout the following discussion of FIGS. 5A-5T, while representation 504 of user and representations 506-512 of participants are described as video representations for ease of exposition, it shall be understood that in some embodiments those representations are dynamic visual representations, which may include representations, such as animated avatars, other than video representations.

In traditional video calls (e.g., in a communication session) between multiple participants and a user of the device, the audio from all participants is perceived to be originating from the same location relative to a user of the device (e.g., as if the participants were all directly speaking over each other from the same point in space). Such an interaction leads to many interruptions as only one participant may speak at a time in order to be heard. To illustrate this, a simulated audio location map 514 (of a simulated space or environment for the communication session) that includes representations of simulated audio locations of the participants relative to a user of a device is displayed to the right of the user interface 500. Specifically, simulated audio location map 514 shows simulated audio location 516 of participant one, simulated audio location 518 of participant two, simulated audio location 520 of participant three, and simulated audio location 522 of participant four (collectively referred to as simulated audio locations 516-522 of the participants). These simulated audio locations 516-522 of the participants are placed in a simulated space for the communication session, to show where a user of the device (e.g., represented by representation of a user's location or simulated audio location 524) perceives the audio to be coming from. To indicate this, the simulated audio locations 516-522 of the participants are placed in an overlapping location in the simulated space as aurally perceived by a user of the device, via audio heard from earbuds 502. FIG. 5A also shows that spatialized audio is not enabled (represented by "Off" 526), which leads to this undesirable overlapping effect. Spatialized audio is discussed in more detail in relation to FIG. 5B.

Lastly, FIG. 5A also shows a top-down map 528 (e.g., birds eye view map) that illustrates a user of the device wearing audio output devices (e.g., earbuds 502) in physical space, and illustrates the position of the portable multifunction device 100 relative to a user 501 of the device.

Figure 5B:
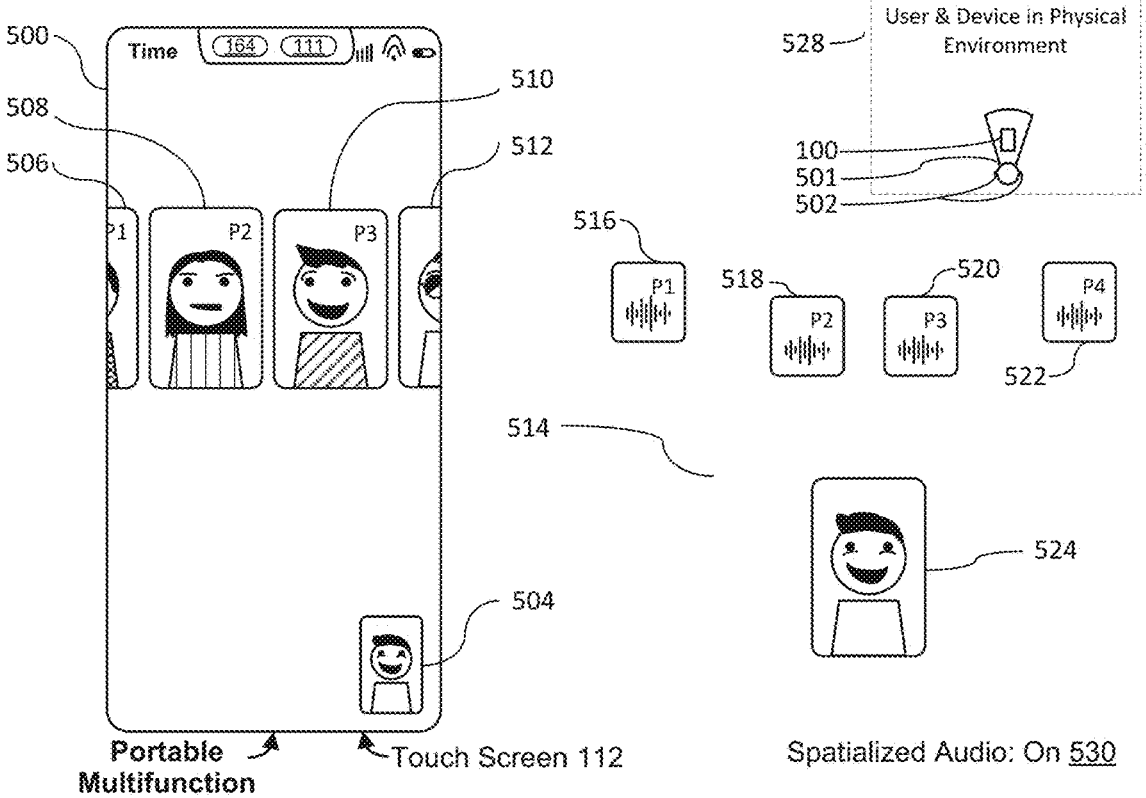

FIG. 5B visually illustrates how audio is perceived by a user 501 of the device 100 when the spatialized audio feature is enabled (represented by "On" 530). To aid in explanation of FIG. 5B, a brief discussion on how spatial audio works is discussed below. When spatial audio is enabled, the audio that is output from the earbuds 502 sounds as though the respective audio from each participant is coming from a different, simulated spatial location (which may change over time) (in a frame of reference, such as a physical environment (e.g., a surround sound effect). The "simulated spatial locations" of the participants, or other audio sources, are the spatial locations perceived by the wearer of earbuds 502 due to the use of spatialized audio. Furthermore, the positioning (simulated spatial locations) of the sources of sound (e.g., the audio from each participant) is independent of movement of earbuds 502 relative to the frame of reference. This avoids the undesirable situation discussed with reference to FIG. 5A where a user perceives all of the participants speaking from the same location. Typically, the simulated spatial locations of the one or more sound sources, when fixed, are fixed relative to the frame of reference, and, when moving, move relative to the frame of reference. For example, where the frame of reference is a physical environment, the one or more sound sources (e.g., the audio from each participant) have respective simulated spatial locations in the physical environment. As earbuds 502 move about the physical environment, due to movement of the user, the audio output from earbuds 502 is automatically adjusted so that the audio continues to sound as though it is coming from the one or more sound sources (e.g., the audio from each participant) at their respective spatial locations in the physical environment (e.g., as illustrated in FIG. 5Q). Where the one or more sound sources are moving sources that move through a sequence of (real or simulated) spatial locations about the physical environment, the audio output from earbuds 502 is adjusted so that the audio continues to sound as though it is coming from the one or more sound sources at the sequence of spatial locations in the physical environment. Such adjustment for moving sound sources also takes into account any movement of earbuds 502 relative to the physical environment (e.g., if earbuds 502 move relative to the physical environment along an analogous path as the moving source of sound so as to maintain a constant spatial relationship with the source of sound, the audio would be output so that the sound does not appear to move relative to earbuds 502).

In some embodiments, the frame of reference for the spatial audio effect is fixed to an electronic device, such as device 100, that is outputting audio via earbuds 502 (e.g., the sound follows the device), and is referred to herein as the "follow device" feature (see e.g., FIG. 5Q for an example of the "follow device" feature). For example, if device 100 moves in the physical environment, e.g., because the user moves or changes the position at which the user 501 is holding device 100, the simulated spatial locations of the sources of the audio in the physical environment move corresponding to the movement of device 100 in the physical environment. With respect to the remaining Figures (e.g., FIGS. 5B-5T) it should be understood that the frame of reference for the spatial audio effect is fixed to device 100. Alternatively, when the follow device feature is not enabled, the audio output does not follow the movement of device 100. For example, when the follow device feature is not enabled, spatial audio is positioned relative to a frame of reference that is not fixed to device 100 (e.g., such that the spatial audio is not moved based on movement of device 100 even as device 100 moves relative to the frame of reference). In addition, non-spatial stereo or mono audio is positioned relative to the position of the earbuds, and is not moved based on device 100 being moved (see e.g., FIG. 5A, which shows how audio is perceived when operating in a non-spatial audio mode).

Returning back to the explanation of FIG. 5B, FIG. 5B shows a simulated audio location map 514 that includes simulated audio locations of participants 516-522 placed in a simulated space relative to a user of the device (e.g., represented by representation of a user's location or simulated audio location 524). These simulated audio locations of participants 516-522 correspond to (or mimic) the representations of participants 506-512 that are displayed in example user interface 500 of device 100. This allows a user 501 of the device 100 to aurally perceive the voices of group of people as coming from different positions, instead of perceiving everyone's voice emanating from a single point in space. To better simulate this experience, the voices of the participants who are fully in frame on the example user interface 500 (e.g., video representation 508 of participant two, video representation 510 of participant three), or the participants that are in focus on the display, are presented by earbuds to user 501 as being physically closer to user 501 than the other participants (e.g., by changing audio characteristics of some or all of the participants). To indicate this visually, simulated audio location map 514 shows that simulated audio location 518 of participant two and simulated audio location 520 of participant three are closer to the representation of a user's location or simulated audio location 524. In addition, simulated audio location 516 of participant one and simulated audio location 522 of participant four are farther way from the representation of a user's location or simulated audio location 524 (e.g., in the periphery of the simulated space for the communication session).

Figure 5C:
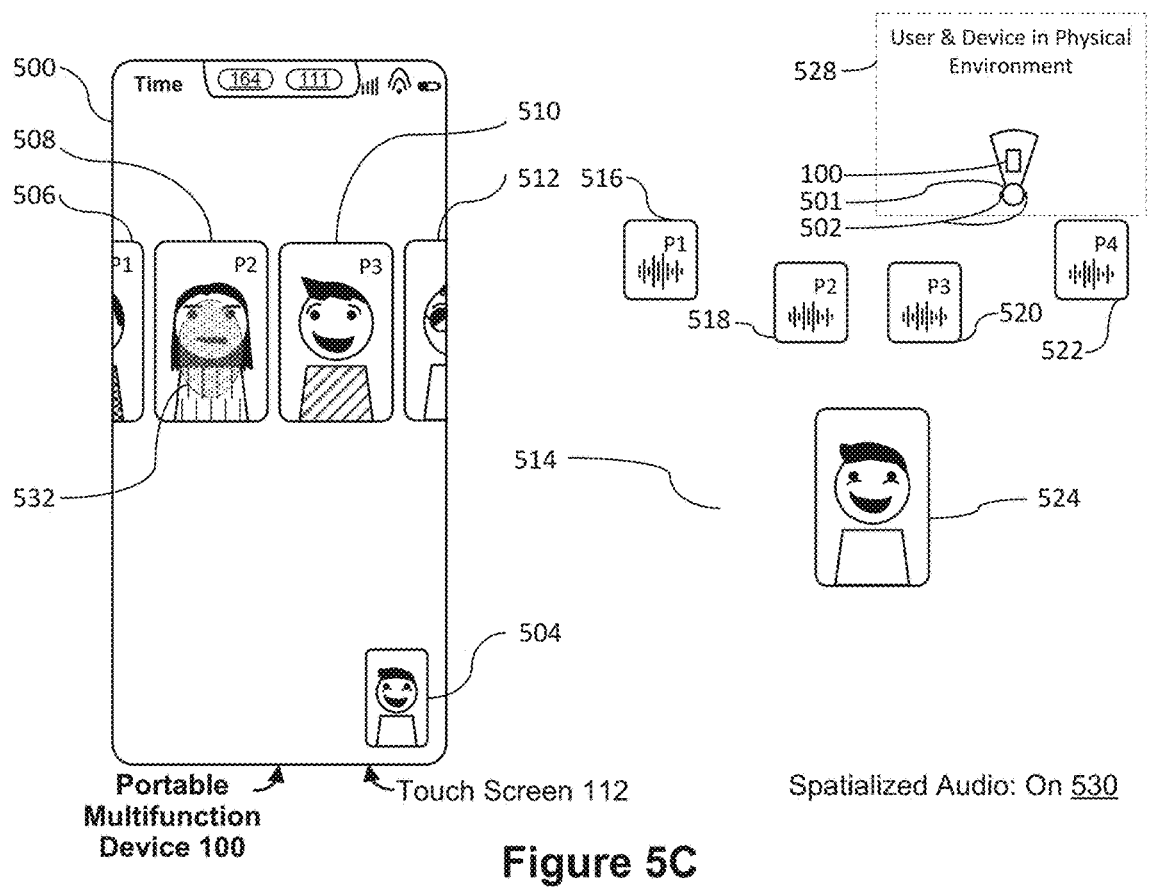
Figure 5D:
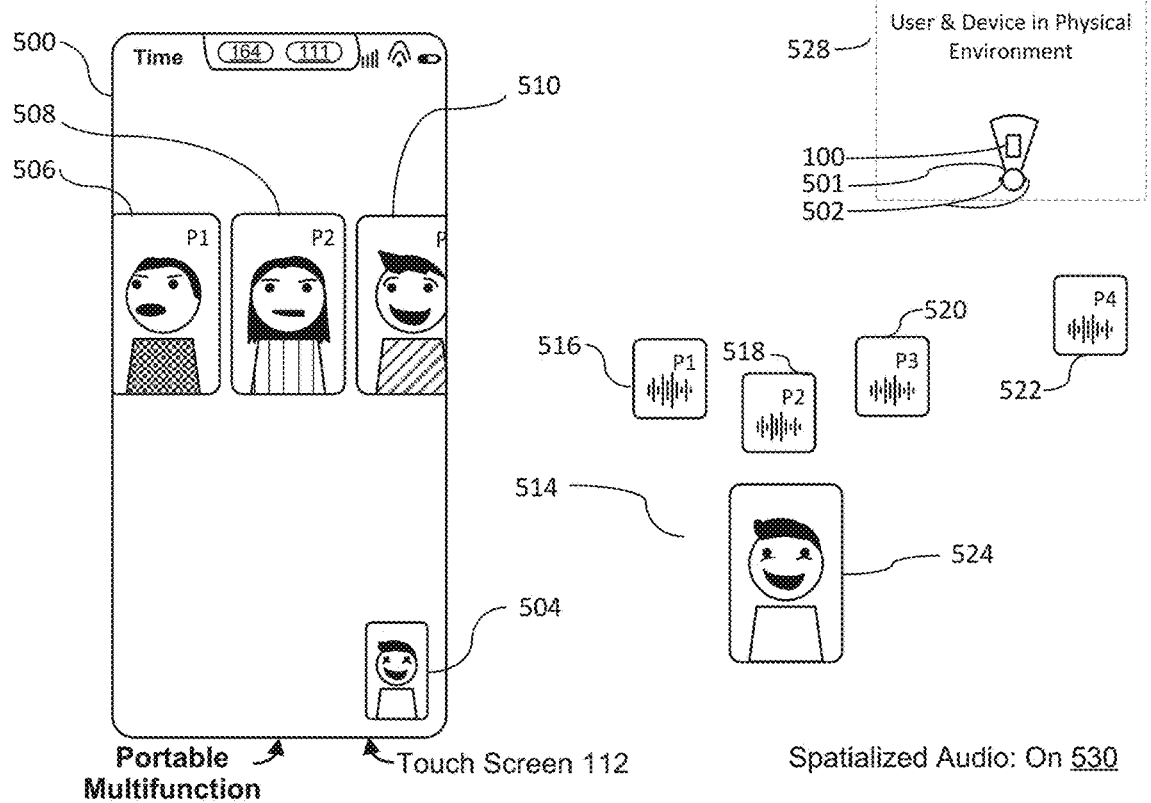

FIG. 5C shows the same user interface 500 illustrated in FIGS. 5A-5B. FIG. 5C, however, shows an input 532 (e.g., a tap input) being received over (or at) video representation 508 of participant two. In some embodiments, input 532 is a press and hold input. FIG. 5D shows that in response to receiving input 532 over video representation 508 of participant two, (i) video representation 508 of participant two is positioned to a center location in example user interface 500, and (ii) all of the other participants are shifted to different locations in the example user interface 500 (e.g., video representation 506 of participant one is brought closer to the center of the example user interface 500, video representation 510 of participant three is moved away from the center of the example user interface 500, and video representation 512 of participant four is shifted out of view). In other words, in response to a single input, multiple participants are shifted on the user interface.

FIG. 5D shows simulated audio location map 514 being updated, relative to FIG. 5C, to reflect the changes in positions of representations 506-512 of participants P1-P4. Since video representation 508 of participant two is at the center of the example user interface 500, the audio location map 514 shows simulated audio location 518 of participant two moved closer to the representation of the user's location or simulated audio location 524 (e.g., the simulated audio location 518 of participant two is aurally perceived by the user 501 of the device as being the closest). Additionally, since video representation 506 of participant one and video representation 510 of participant three are not in the center of the example user interface 500, their corresponding simulated audio locations in audio location map 514 are correspondingly shifted. Lastly, since video representation 512 of participant four has been shifted out of view, the simulated audio location 522 of participant four is moved farther away from the representation of a user's location or simulated audio location 524. In some embodiments, when a participant is no longer shown in the example user interface (e.g., video representation 512 of participant four) their corresponding audio is perceived by a user of the device to be emanating from the periphery of the simulated space for the communication session (e.g., the background).

Figure 5E:
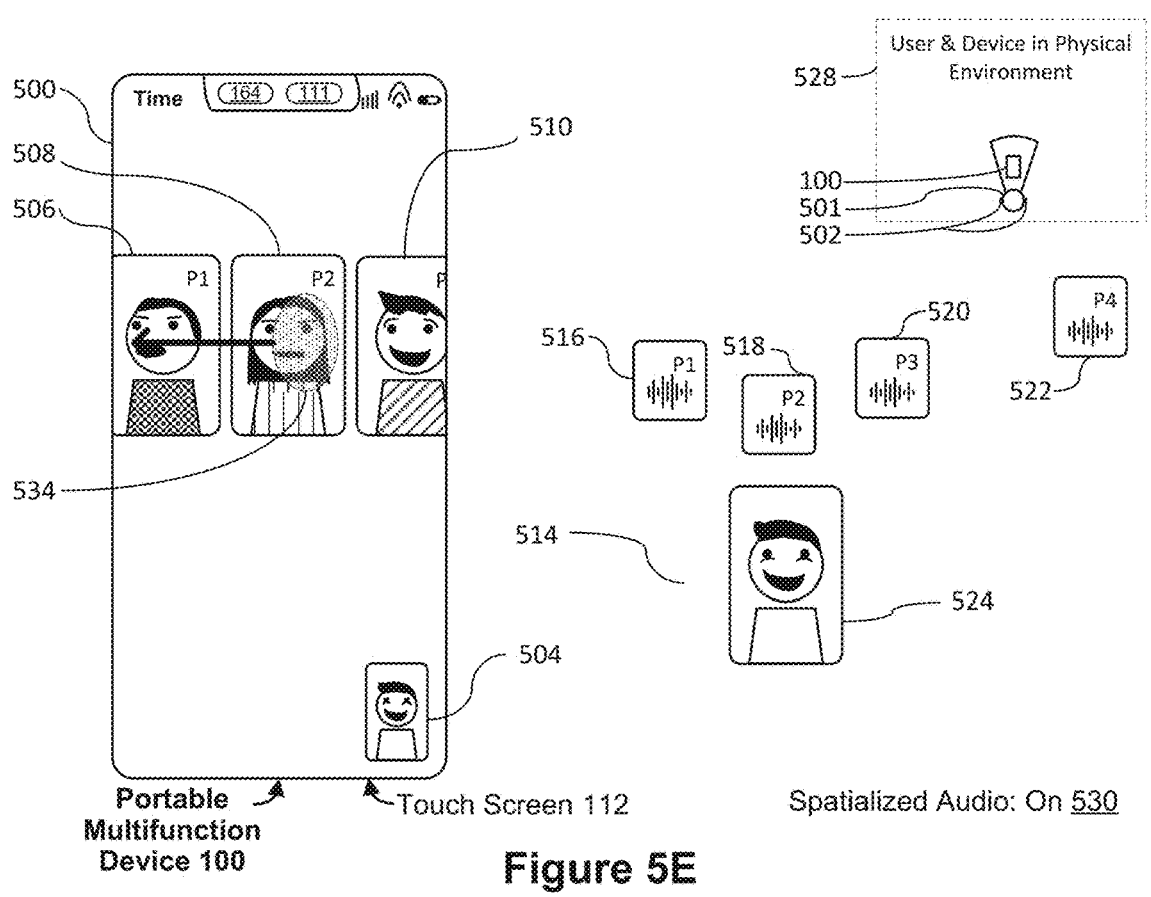
Figure 5F:
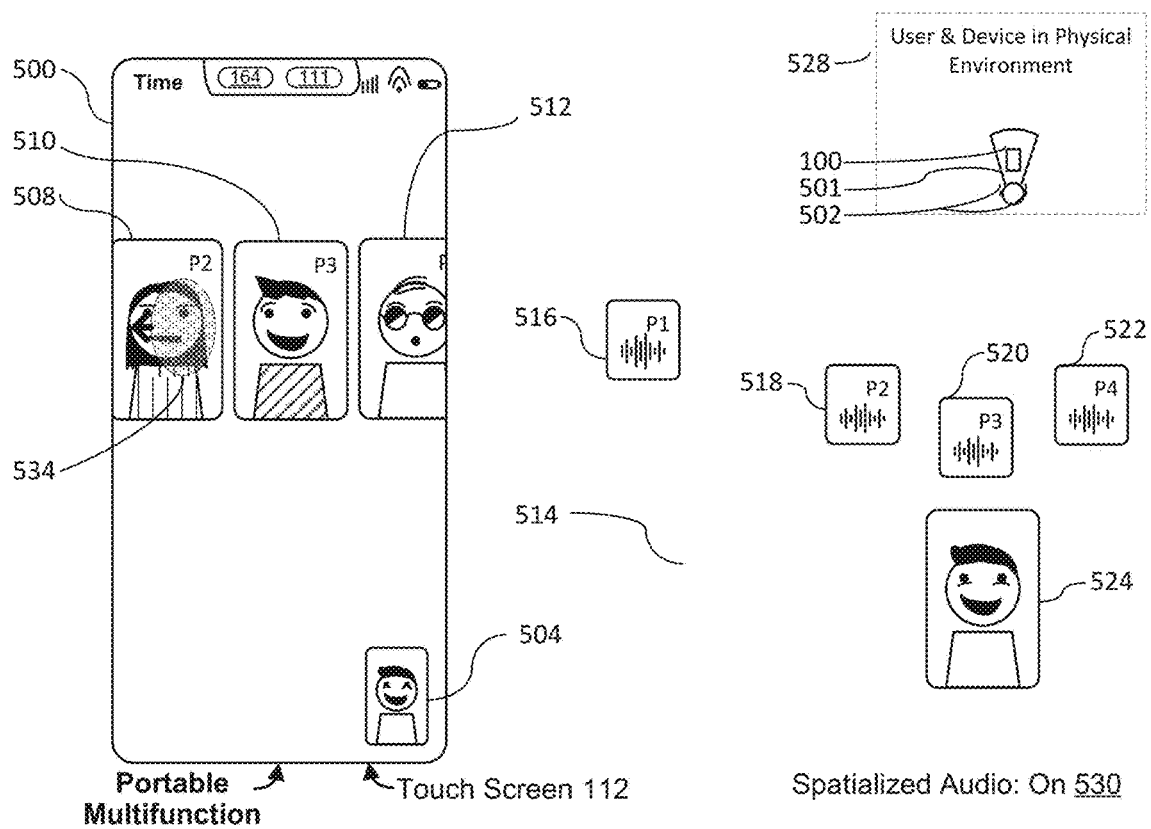

FIG. 5E shows the same user interface 500 illustrated in FIG. 5D. FIG. 5E, however, shows an input 534 (e.g., a drag gesture) being received over (or at) video representation 508 of participant two. FIG. 5F shows that in response to the input 534 (e.g., a slide gesture) being received over (or at) video representation 508 of participant two, the participants, displayed in the user interface 500, are shifted in the same direction (e.g., in the leftward direction).

FIG. 5F also shows simulated audio location map 514 being updated, relative to FIG. 5E, to reflect the change of position of representations of participants in the user interface 500. Since video representation 510 of participant three is at the center of the example user interface 500 (e.g., in focus), the audio location map 514 shows simulated audio location 520 of participant three closest to the representation of a user's location or simulated audio location 524. Additionally, since video representation 508 of participant two and video representation 512 of participant four are not in the center of the example user interface, their corresponding simulated audio locations in audio location map 514 are correspondingly shifted. Lastly, since video representation 506 of participant one has been shifted out of view, the simulated audio location 516 of participant one is moved farther away from the representation of a user's location or simulated audio location 524.

Figure 5G:
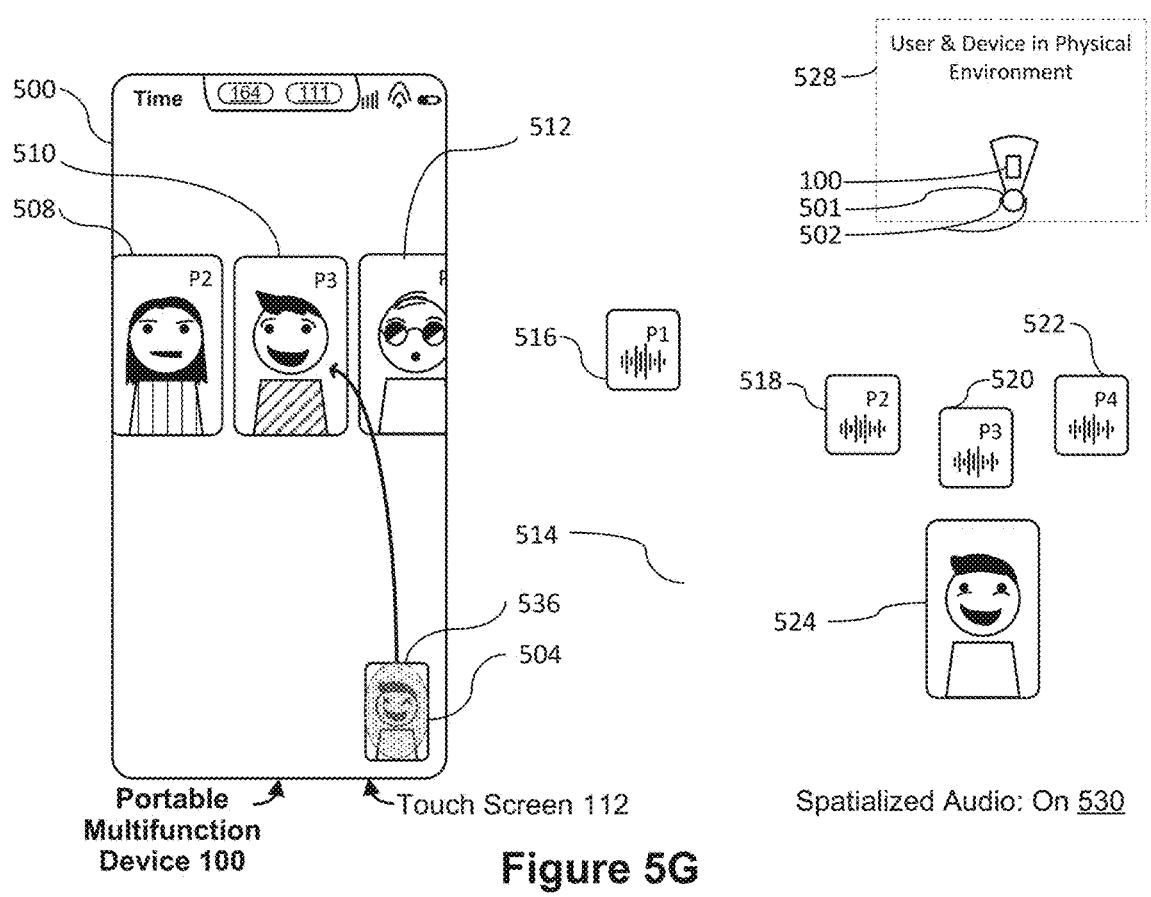
Figure 5H:
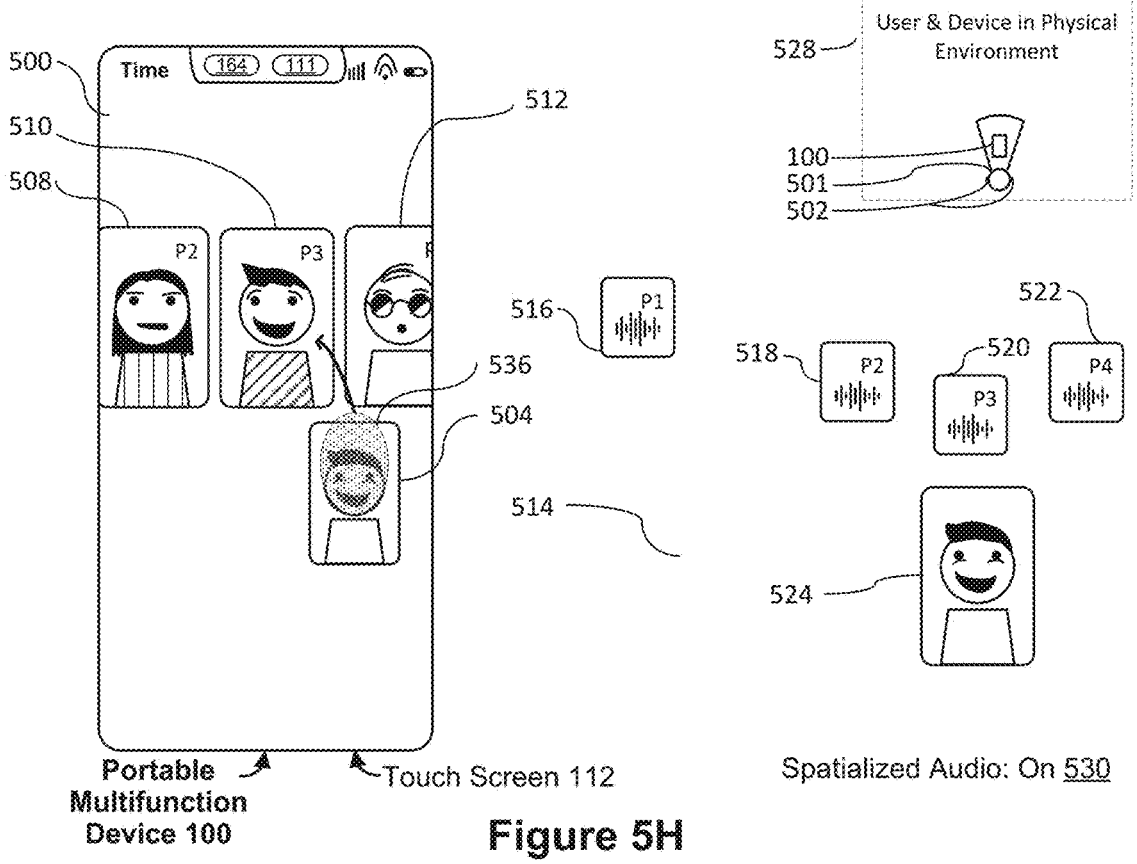
Figure 5I:
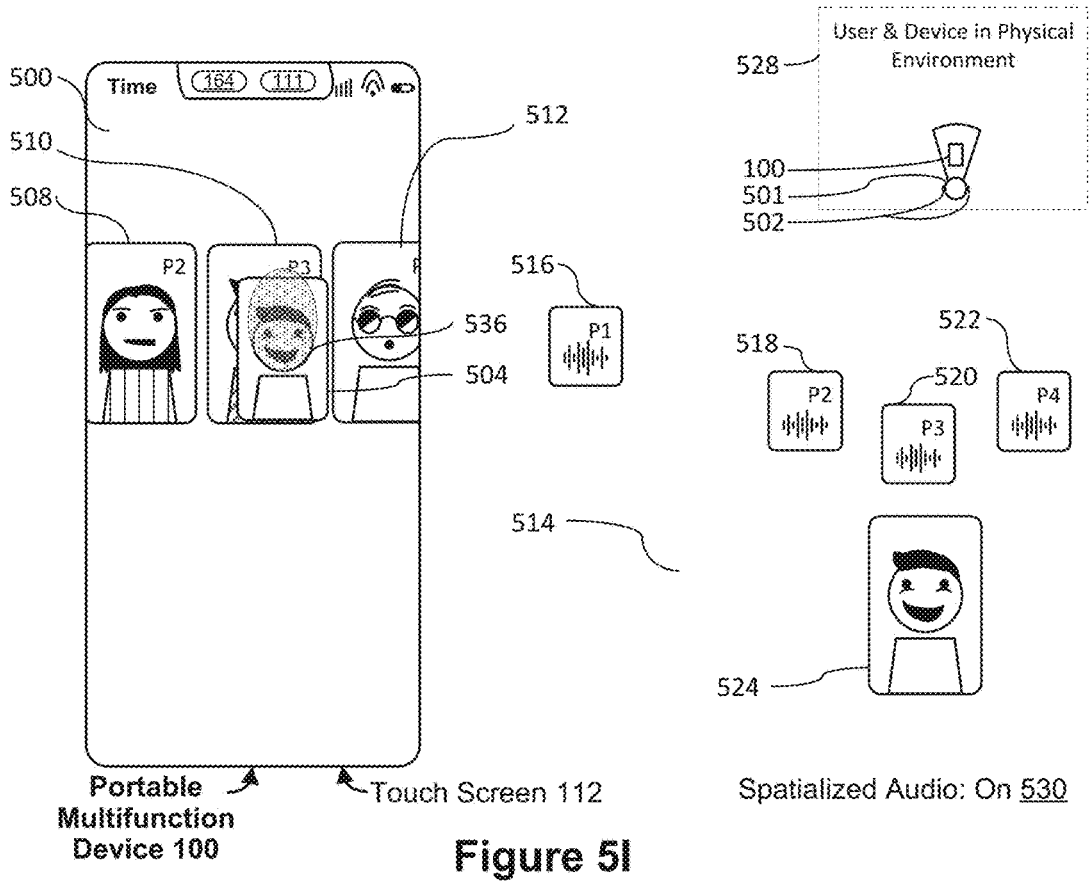

FIGS. 5G-5L show an interaction (e.g., a drag input) on the touch screen 112 that allows a user 501 of the device to "aurally move closer" to a specific participant of the participants attending an ongoing video call. In a real world situation, this would be similar to moving or leaning over and having a somewhat private conversation with a specific person during a group conversation. This interaction will hereinafter be referred to as the "lean-in" interaction. FIG. 5G-5I shows how the lean-in interaction is invoked, and FIGS. 5H-5L show the resulting lean-in user interface displayed in response to the invocation.

FIG. 5G shows a dragging input 536 beginning at video representation 504 of the user of the portable multifunction device 100. FIG. 5H shows the dragging input 536 continuing towards video representation 508 of participant two, and the video representation 504 of the user moving with the dragging input 536. FIG. 5I shows the dragging input 536 stopping at a location that corresponds to the location video representation 508 of participant two. FIG. 5I also shows the video representation of a user 504 placed on top of video representation 508 of participant two. In some embodiments, audio location map 514 is updated continuously updated in response to the movement of video representation 504 of the user. While FIGS. 5G-5I show a drag input that drags the video representation 504 of the user toward the video representation of another participant (e.g., the video representation of participant 510) to invoke a lean-in interaction, in some embodiments a lean-in interaction is also invoked by a drag gesture that drags the video representation of the other participant (e.g., the video representation of participant 510) toward the video representation 504 of the user.

Figure 5J:
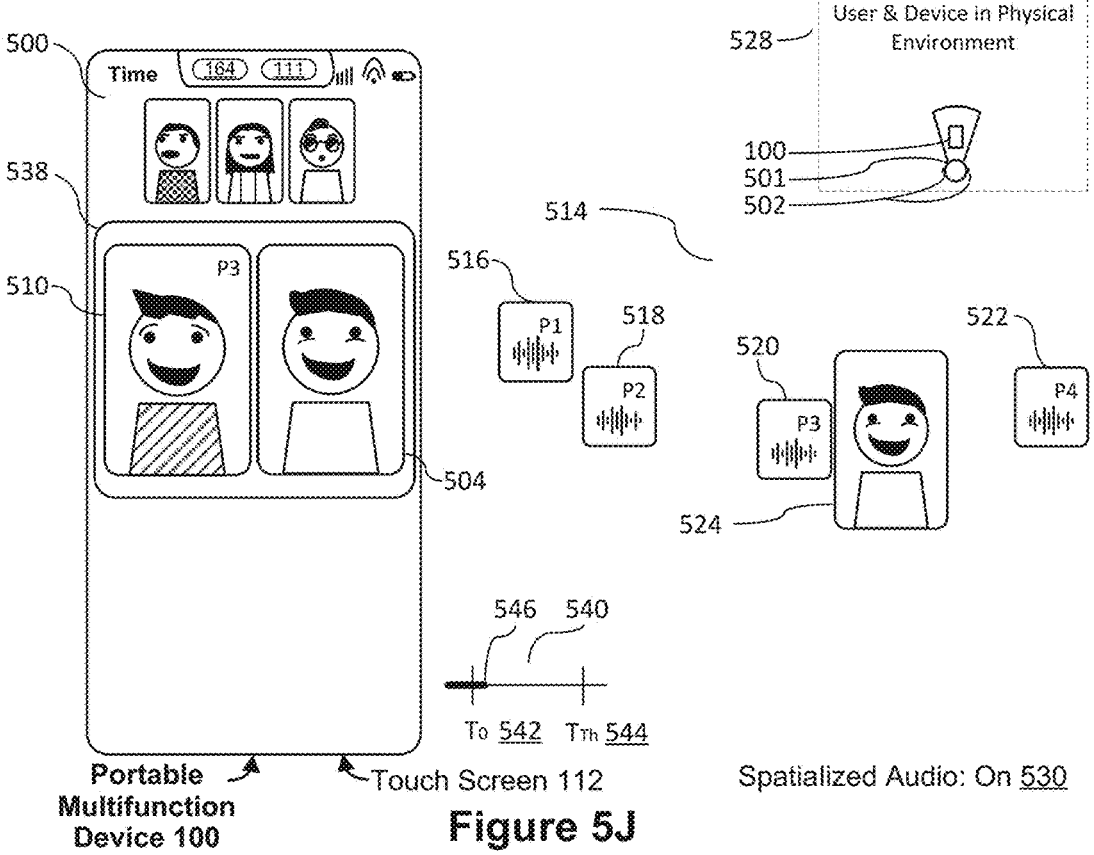

FIG. 5J shows an update to user interface 500 in response to the video representation of a user 504 being placed on top of video representation 508 of participant two, invoking a lean-in interaction. In some embodiments, a lean-in interaction is only invoked upon detecting lift-off of the input 536. In some embodiments, the lean-in interaction is invoked and maintained so long as the input 536 remains in contact with the display after resting atop a representation of a participant for a predefined amount of time (e.g., the predefined amount of time may fall in the range of 0.5 seconds to 2.0 seconds). In some embodiments, the lean-in interaction is initiated by a press and hold over a video representation of a participant (e.g., video representation 510 of participant three), and in some embodiments continues as long as contact is maintained on the display from the initial press and hold input.

To visually illustrate that a lean-in interaction has been invoked, the example user interface 500 now includes a new window 538 that shows an expanded bubbled view of video representation 504 of the user and video representation 510 of participant three. In this example, window 538 is a visual representation of the lean-in interaction, and the display of window 538, with representations of the user and other participant, signifies that both a user of the device (e.g., indicated by video representation 504 of the user) and participant three (e.g., indicated by video representation 510 of participant three) are currently communicating (e.g., the linked together) in a lean-in interaction. In some embodiments, the new window 538 is also shown on a device used by the participant three; and thus, in such embodiments, invoking the lean-in interaction on one device causes a lean-in interaction user interface to be shown on both (i) the initiating device and (ii) the device corresponding to the requested participant (e.g., a device used by the requested participant to participate in the communication session). In some embodiments, the device of the requested participant prompts the requested participant (e.g., participant three) to accept or decline the requested lean-in communication session.

FIG. 5J shows an updated simulated audio location map 514 that visually illustrates how a user of the device (e.g., represented by the user's location or simulated audio location 524) aurally perceives the audio from other participants when a lean-in communication session is active. In the lean-in communication session, the simulated audio location 520 of participant three is closest to the user's location or simulated audio location 524, which emulates the two participants being next to each other, having a somewhat private conversation in a physical environment. In some embodiments, the voices of the other participants are aurally perceived to be coming from the periphery of the simulated space for the communication session, as indicated in FIG. 5J by the simulated audio location 516 of participant one, simulated audio location 518 of participant two, and simulated audio location 522 of participant four. In some embodiments, the other participants' simulated audio locations may differ from what is displayed in the example user interface 500 of FIG. 5J.

In some embodiments, the lean-in interaction is temporary and only occurs for a brief period of time (e.g., 5 seconds, 10 seconds, 15 seconds, etc.). To illustrate this, FIG. 5J shows an elapsed time chart 540 to indicate how long the lean-in interaction occurs. The elapsed time chart 540 includes an initial start time, indicated by $T_0$ 542, which represents the time at which the lean-in interaction began. The elapsed time chart 540 also includes an end time, indicated by $T_{Th}$ 544, which represents an end time for the lean-in interaction. In some embodiments, the lean-in interaction can be extended for another set period of time by the use of a predefined input or gesture by the user or the other participant (e.g., a touch input, or hold and press input, in the window 538, representing the lean-in interaction).

FIG. 5K shows a time indicator line 546 progressing towards the end time on the elapsed time chart 540 (e.g., as indicated by $T_{Th}$ 544), but not meeting or exceeding the end time. FIG. 5L shows the time 546 meeting or exceeding the end time, indicated by $T_{Th}$ 544, in the elapsed time chart 540. FIG. 5L also shows that when the time indicator line 546 meets or exceeds the end time, as indicated by $T_{Th}$ 544, user interface 500 ceases to display the new window 538, and stops the lean-in interaction. Once the lean-in interaction has ceased, the user interface 500 reverts to the arrangement that was previously displayed prior to the initiation of the lean-in interaction (e.g., the arrangement shown in FIG. 5F). Accordingly, the simulated spatial locations of the user and other participants in the communication session, as represented by simulated audio location map 514 of FIG. 5L, reverts to simulated spatial locations used prior to the initiation of the lean-in interaction (e.g., the arrangement shown in the simulated audio location map 514 of FIG. 5F).

Figure 5M:
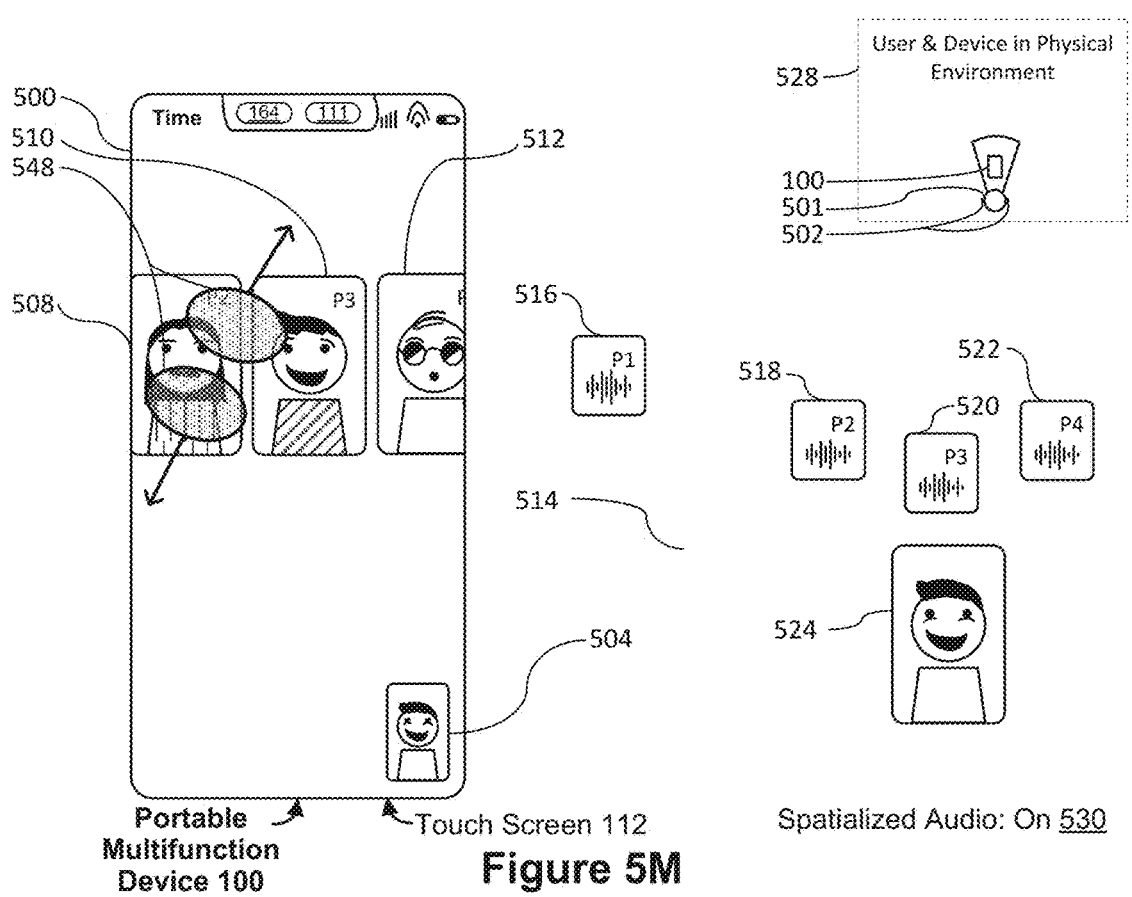
Figure 5N:
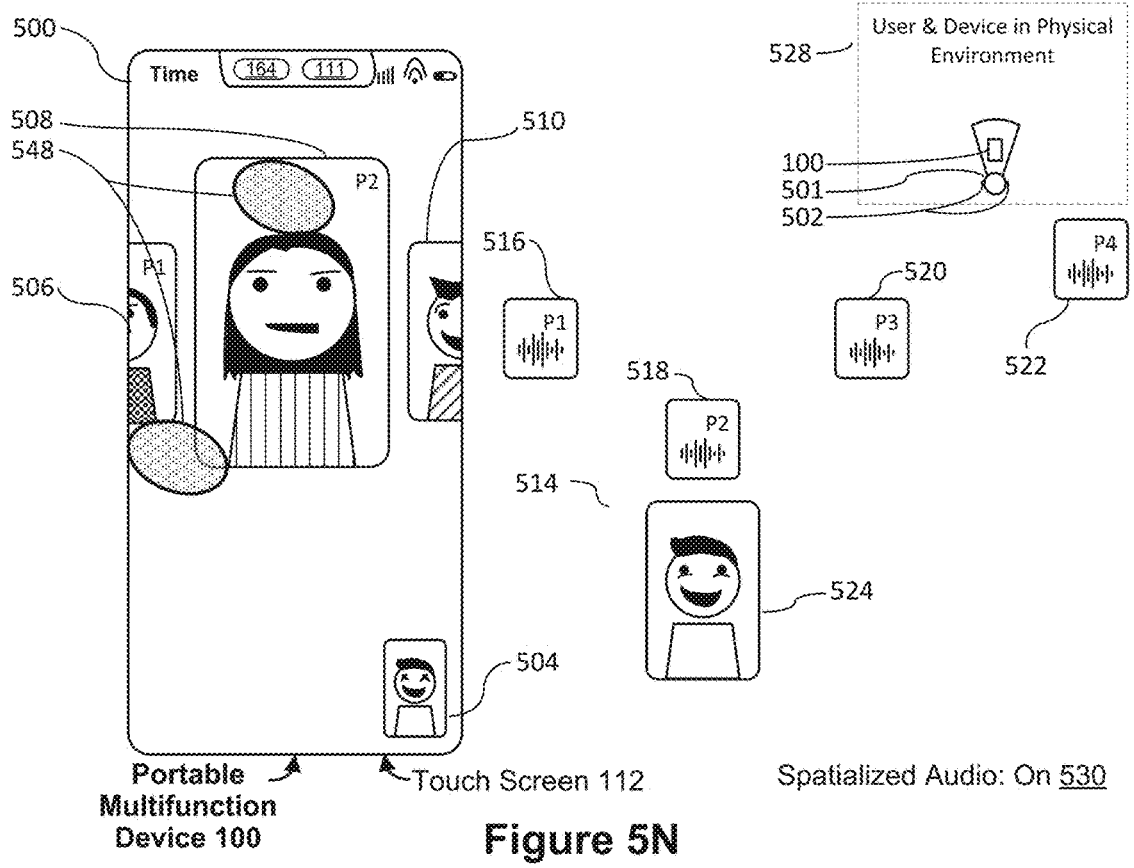
Figure 5O:
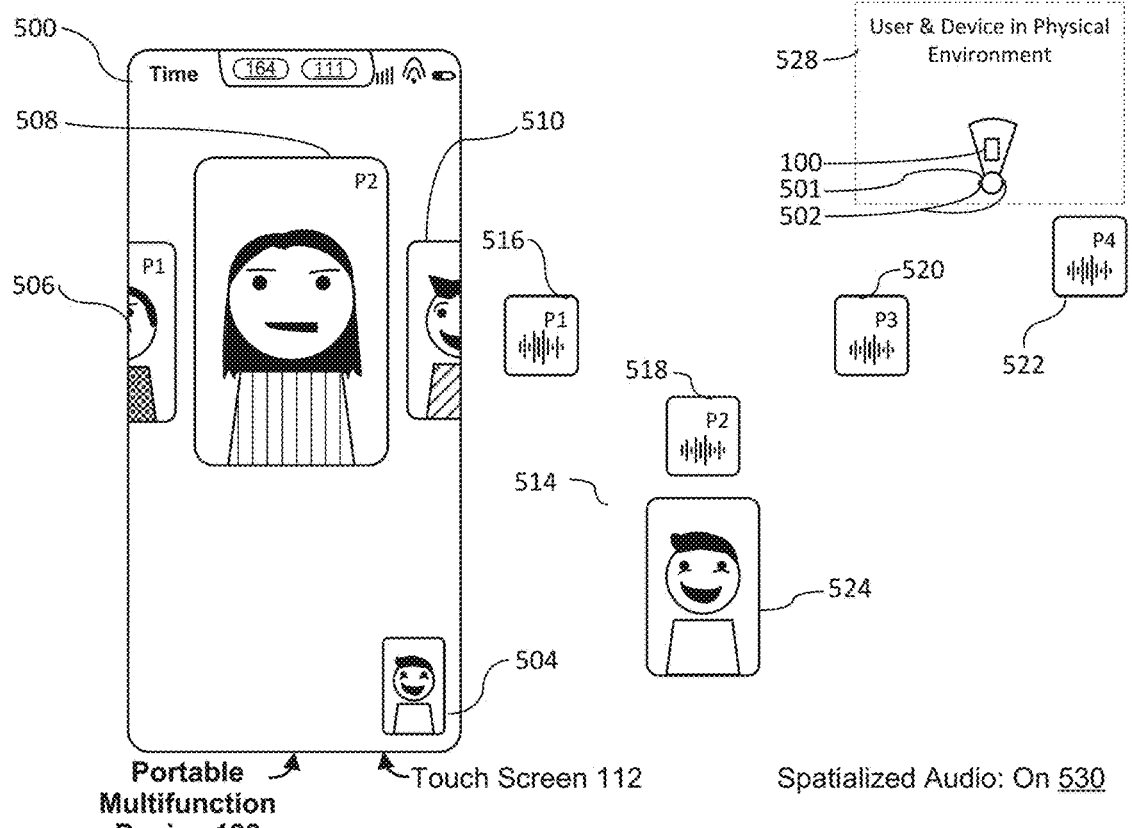

FIGS. 5M-5O show a de-pinch input over a representation of a respective participant (e.g., video representation 508 of participant two), which results the user's device 100 presenting audio from the respective participant from a simulated position that is closer to the user of the device than the simulated position of the respective participant immediately prior to the de-pinch gesture. From an aural perception viewpoint, the de-pinch gesture causes the user 501 to aurally perceive that they are getting closer to the respective participant as the de-pinch gesture progresses. In some embodiments, a pinch gesture over a representation of a respective participant, opposite of a de-pinch gesture, can also cause a user of the device to aurally perceive as though they are getting farther away from the respective participant.

FIG. 5M shows a de-pinch gesture 548 occurring primarily at video representation 508 of participant two. FIG. 5N shows de-pinch gesture 548 continuing, and in response to the ongoing de-pinch gesture 548, the video representation 508 of participant two is brought into focus on the display (e.g., enlarged and brought to the center of the touch screen 112, in user interface 500). FIG. 5N also shows that while de-pinch gesture 548 is ongoing, audio location map 514 is continuously updated based on the state of the de-pinch gesture 548. For example, as video representation 508 of participant two is enlarged, the simulated audio location 518 of participant two is aurally perceived to be moving closer to the user of the device (e.g., by moving the simulated audio location 518 closer to the user's location or simulated audio location 524) than the other participants, or at least closer than the simulated audio location 518 of participant two prior to the de-pinch gesture 548. In some embodiments, the other participants voices are aurally perceived to be coming from the periphery of the simulated space for the communication session (e.g., as represented by simulated audio location 516 of participant one, simulated audio location 520 of participant three, and simulated audio location 522 of participant four). FIG. 5O shows example user interface 500 updated in response to the de-pinch gesture ceasing to be detected, and shows audio location map 514 correspondingly updated.

Figure 5P:
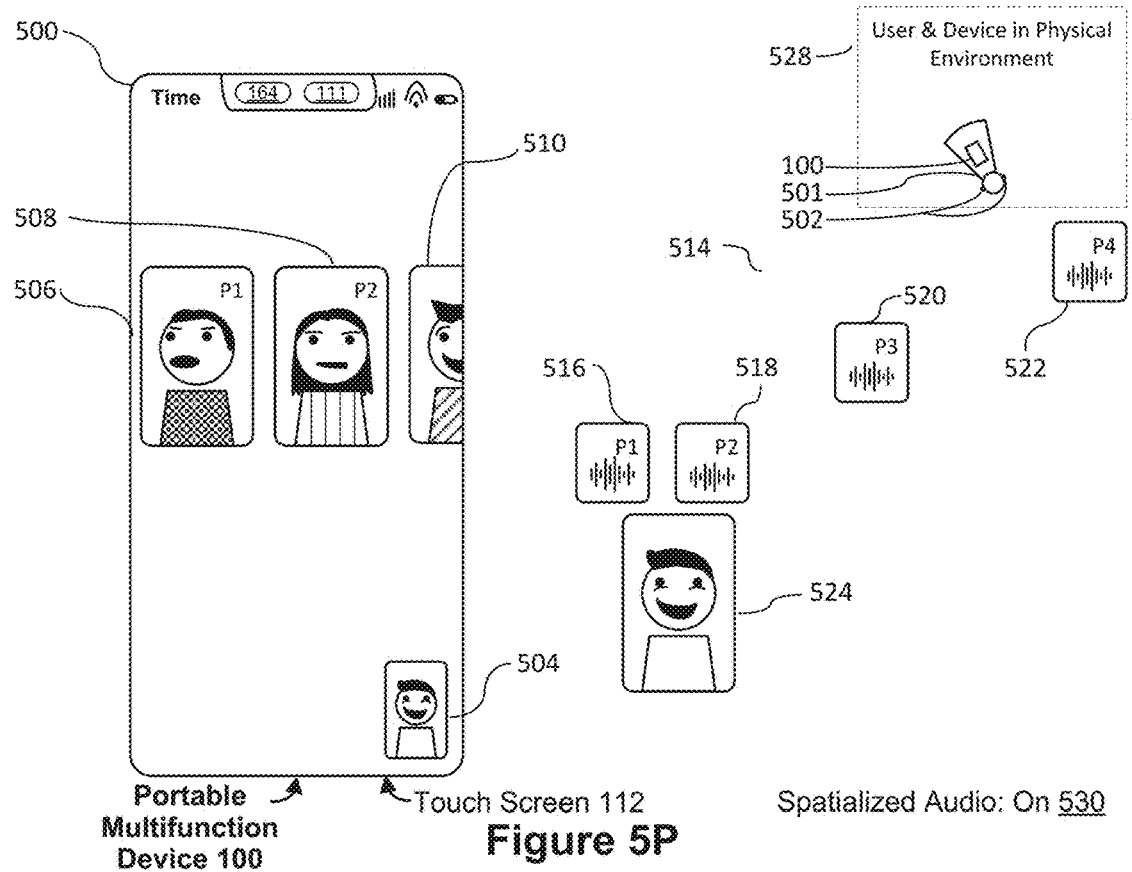
Figure 5Q:
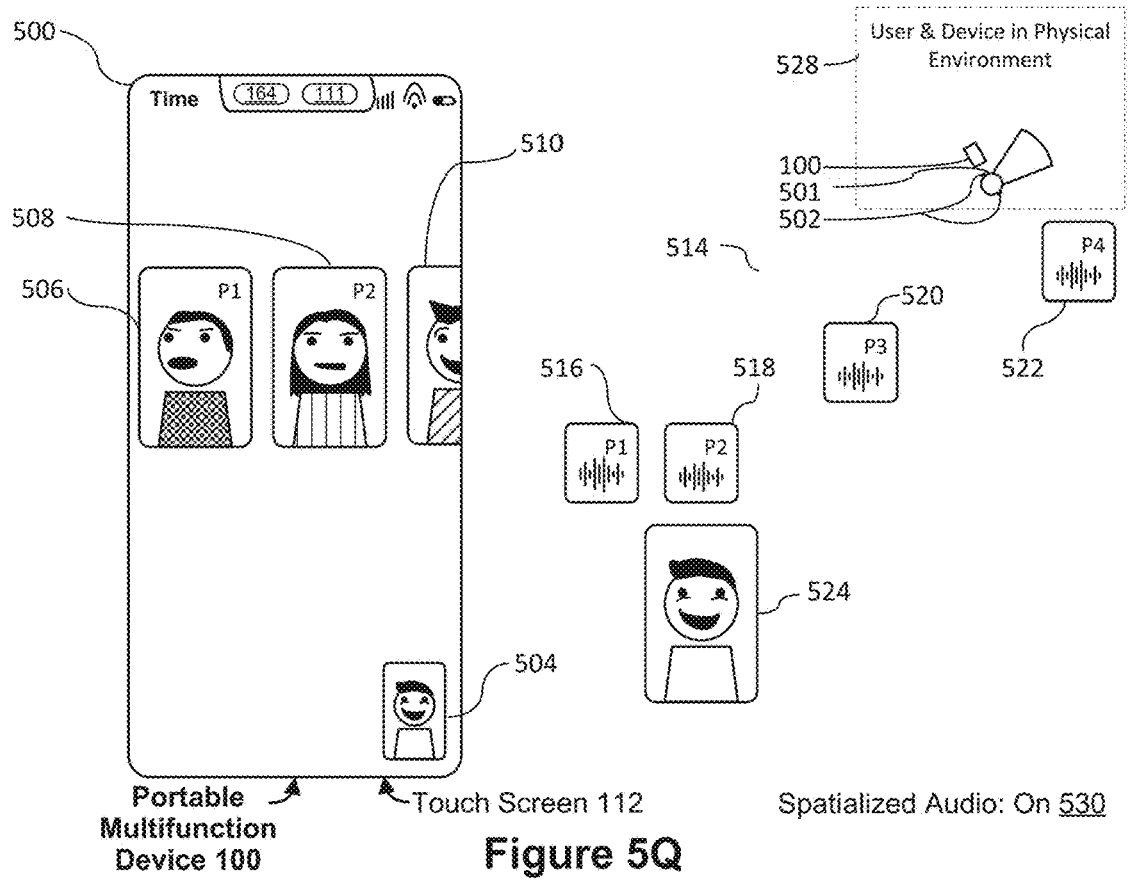

FIG. 5P illustrates an example user interface 500 updating and audio location map 514 updating in response to the portable multifunction device 100 moving in space (e.g., as illustrated by top-down map 528 that shows the portable multifunction device 100 rotating counterclockwise around the user 501 of the device 100). In response to the device 100 rotating counterclockwise about the user 501, the example user interface shifts video representations 516-520 of participants to the right and the device's frame of reference is altered. Accordingly, the audio location map 514 is also updated to reflect the alteration of the frame of reference.

FIG. 5Q illustrates the "follow device" feature discussed in reference to FIG. 5B. This feature, as discussed previously, allows a user to move their head while wearing earbuds 502, and are able to still aurally perceive that the sound is emanating from the same locations in space despite the movement of the earbuds. Top-down Map 528 illustrates that the portable multifunction device 100 remains in the same location as is shown in FIG. 5P, and top-down map 528 also shows that user 501 of the device 100 moves their head while wearing earbuds 502 in a clockwise direction when viewed from above. As shown by the audio location map 415 in FIG. 5Q, the simulated audio locations of the participants remain fixed in space, at the same positions (e.g., as shown by the audio location map 514 of FIG. 5P) as before the user moved their head in the clockwise direction. Thus, use of the "follow device" feature avoids the undesirable outcome of the user 501 rotating their head along with earbuds 502 causing the perceived locations of the other participants rotating along with the user's head. In a real world scenario, the effect experienced by a user of the device is similar to a person turning their head while the people they are conversing with remain in their same locations. Since the frame of reference is unaltered by movement of earbuds 502, the example user interface 500 and the audio location map 514 do not change from the ones shown in FIG. 5P.

Figure 5R:
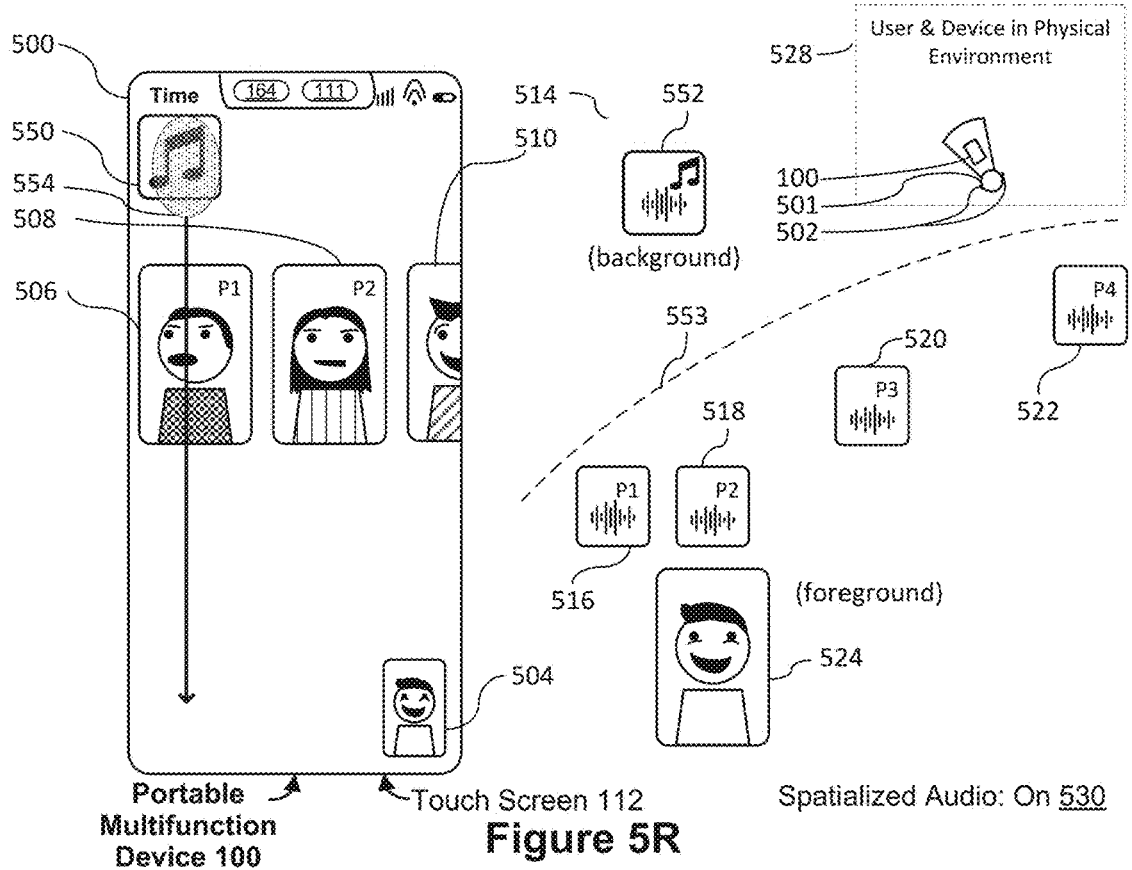

In some embodiments, there may be a need for playing additional audio, other than participants' voices, in the background of the video call (e.g., background music or the audio from a live or recorded program or media item, that is heard by all the participants in the communication session). To that end, FIG. 5R illustrates that background audio, distinct from the participants voices, may be played during a video call, so as to be heard by all the participants, without interfering with the communication between the participants. The effect of background audio being played would be similar to having a speaker in the back of the room softly playing the radio or background music during a conversation. To visualize this, the example user interface 500 includes an icon 550 to indicate that background audio is being played. In some embodiments, the additional audio is associated with another application on the portable multifunction device 100 (e.g., music application 422 in FIG. 4A), and the icon 550 representing the addition audio, displayed in example user interface 500, can be the same as the icon associated with that application (e.g., a music icon for music application 422).

The audio location map 514 in FIG. 5R also illustrates that the sound from simulated audio locations 516-522 of the participants P1-P4 will be aurally perceived as being significantly closer to the user of the device (e.g., at simulated audio location 524) than the additional audio, which is output by earbuds 502 so as to be perceived as coming from simulated background audio location 552. In this example, the sound associated with the simulated background audio location 552 is aurally perceived to be coming from the background of the simulated space for the communication session. To further illustrate this, an illustrative boundary line 553 indicates that the additional audio that is output (using spatial audio) so as to be perceived as coming from the simulated audio location 552, is in the background and not the foreground of the simulated space for the communication session. As shown in FIG. 5R, the audio location map 514 also indicates that a user of the device and the other participants on the ongoing video call all hear the same underlying sound (e.g., the additional audio) associated with the simulated background audio location 552 (e.g., they can all hear the same song). In some embodiments, the distance, simulated location, and other audio effects of the sound associated with the simulated audio background audio location 552 are different for each participant based on their simulated location.

Figure 5S:
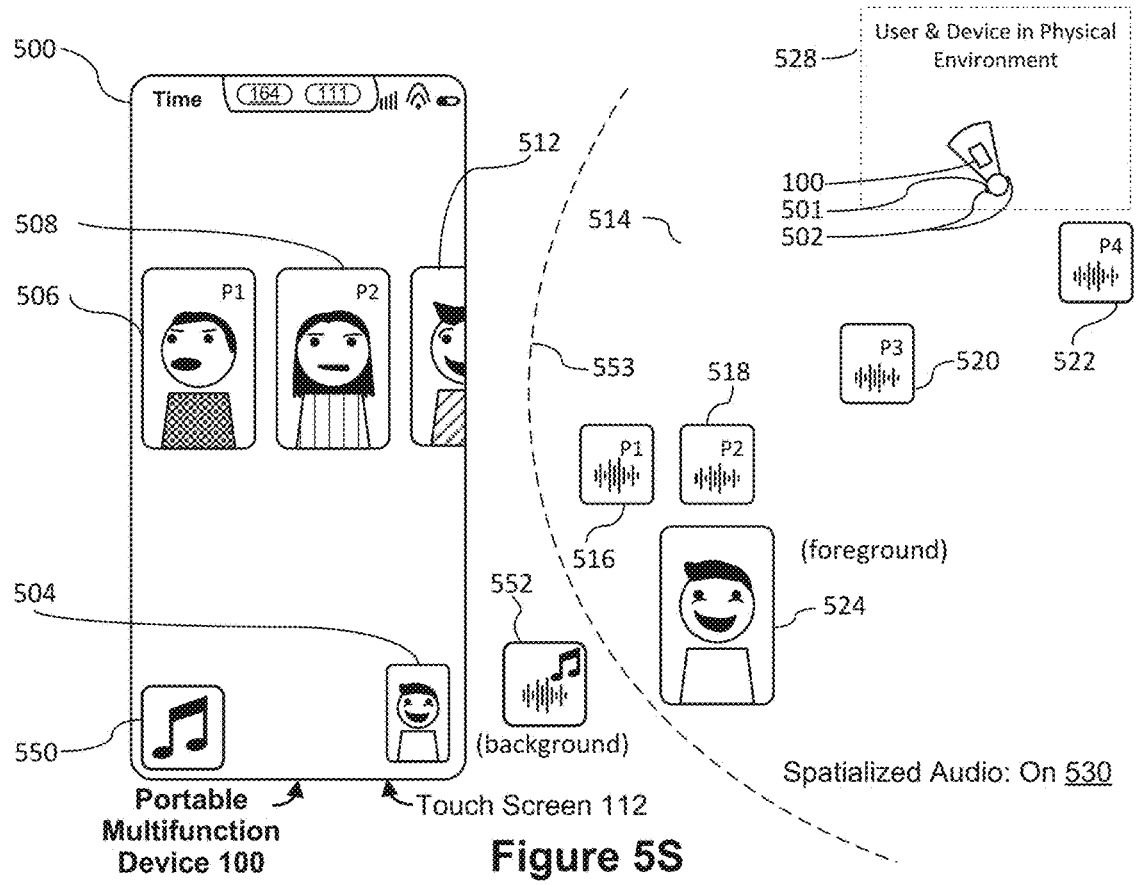
Figure 5T:
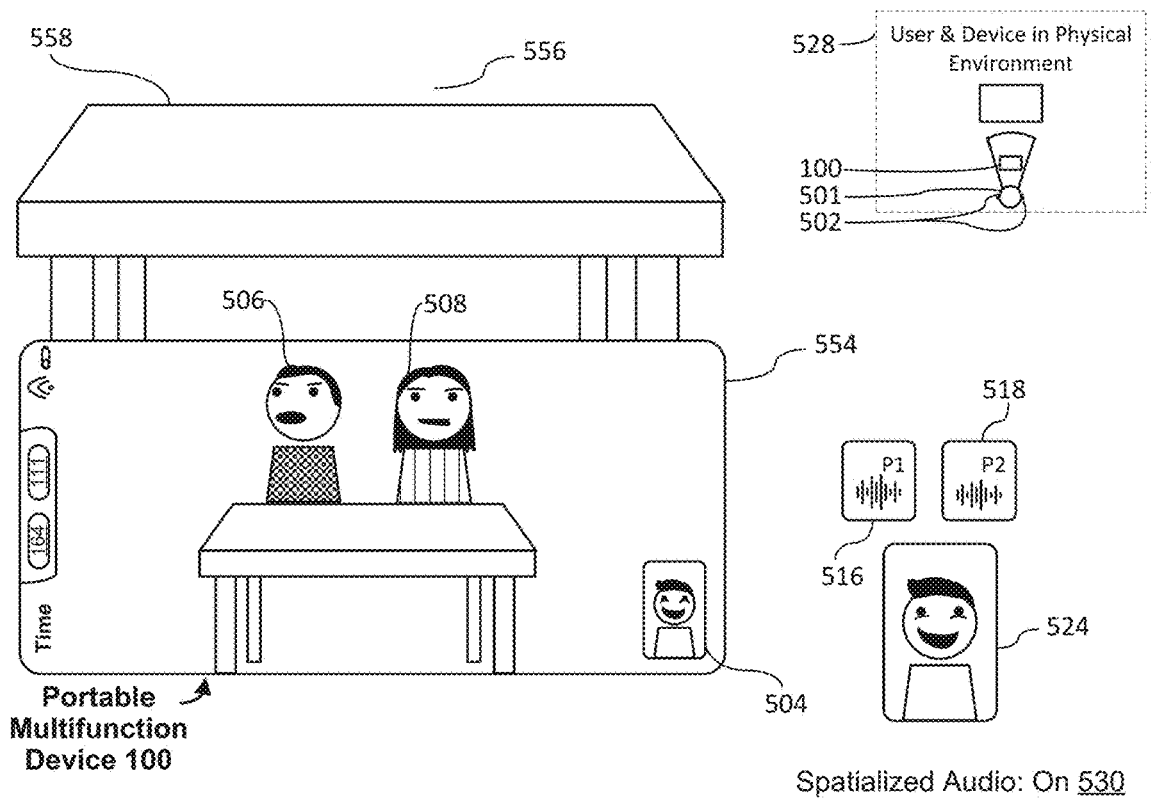

FIG. 5R also shows a slide gesture 554 starting at icon 550, to move the simulated background audio location 552 to a different perceived location in the simulated space for the communication session. FIG. 5S shows that in response to the slide gesture the icon 550 is moved, in example user interface 500, to a different location in the background. To illustrate this perceived change in audio location, the audio location map 514 has been updated to show that the icon 550 has been moved to a new location, which in this example is behind the representation of the user's location 524. Consequently, in this example, sound associated with the simulated background audio location 552 is aurally perceived to be coming from behind a user of the device rather than behind the participants as shown in FIG. 5R.

FIG. 5T shows an alternative example user interface 554, which is an augmented reality user interface in which visual depictions of participants in a communication session are added to the user interface 554, at locations within a physical environment also depicted in the user interface 554. This example user interface 554 is created based on a three-dimensional physical environment 556 that is in the field of view of the one or more optical sensors 164 of portable multifunction device 100 (e.g., that is in the field of view of a currently selected optical sensor of the one or more optical sensors 164, or any one of the one or more optical sensors 164; or, optionally, that is in a combined field of view of two or more of optical sensors 164). The example user interface 554 places video representation 506 of participant one and video representation 508 of participant two in a physical environment to emulate the experience of having a conversation with multiple people in the same room (e.g., they are placed on the other side of a table 558 in the three-dimensional physical environment 556 captured via the one or more optical sensors 164). The placement of these video representations may occur in a logical manner based on what is detected in the three-dimensional physical environment 556. For example, the portable multifunction device 100 can detect objects such as a table, a couch, or a chair, and place the video representations of participants in appropriate locations on the detected object(s) (e.g., a respective participant is placed on the other side of a table, or placed at the seating location on a chair or couch).

Additionally, simulated audio location 516 of participant one and simulated audio location 518 of participant two correspond to the locations of the video representation 506 of participant one and video representation 508 of participant two, respectively, in example user interface 554.

Figure 6A:
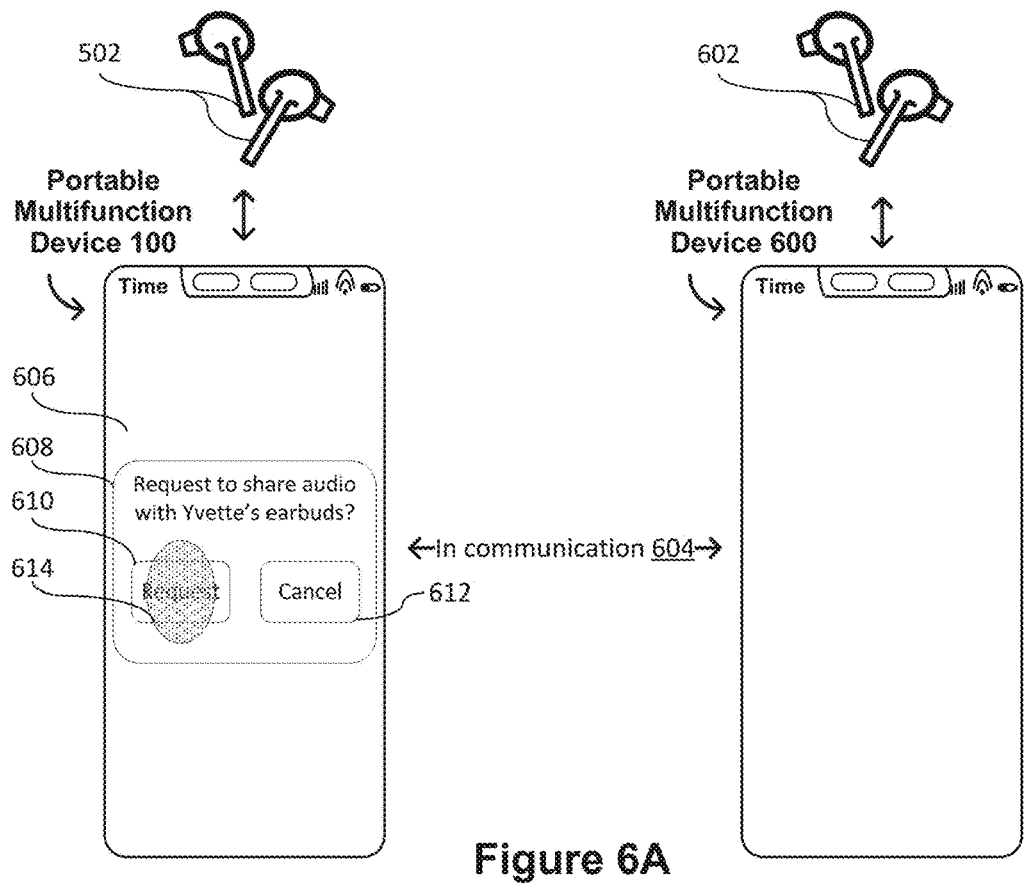
FIGS. 6A-6G illustrate at least two nearby users initiating and having a communication session via wearable audio output devices, and the at least two nearby users hear simulated spatial audio to indicate direction and distance of other users in the communication session in accordance with some embodiments.
Figure 6B:
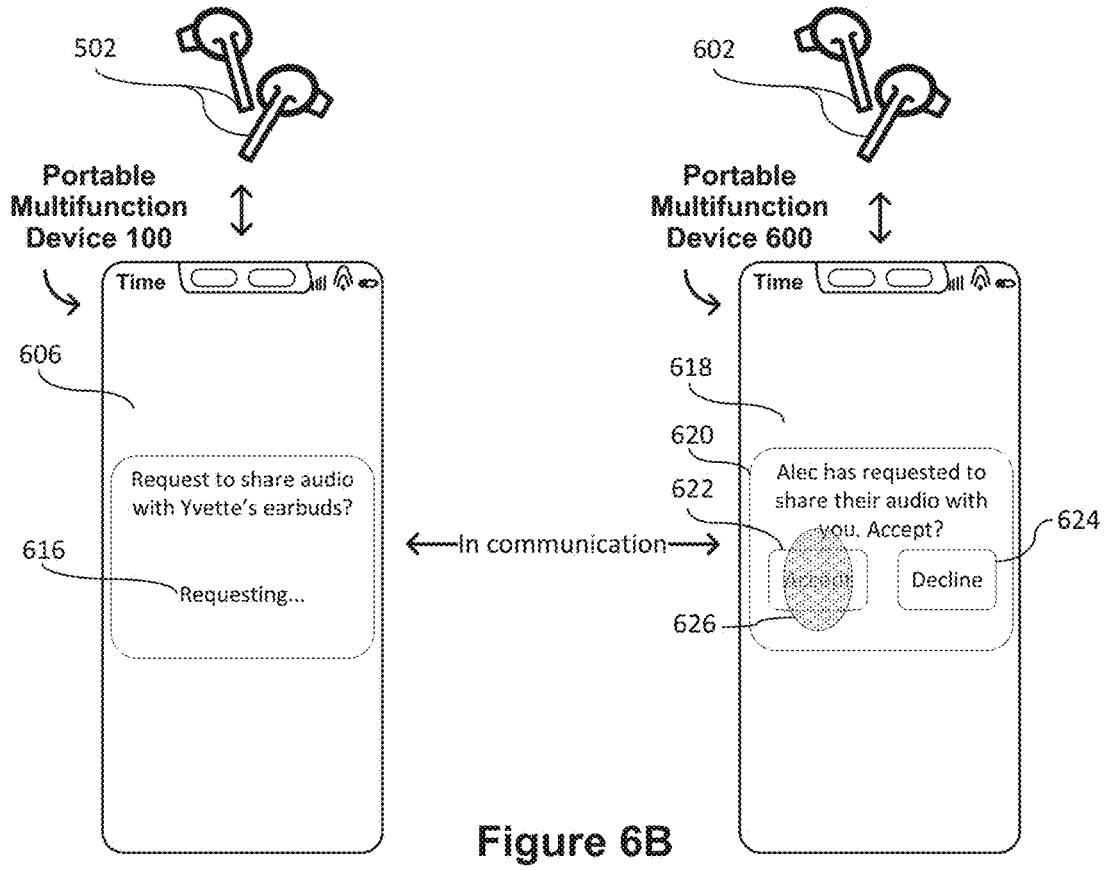
Figure 6C:
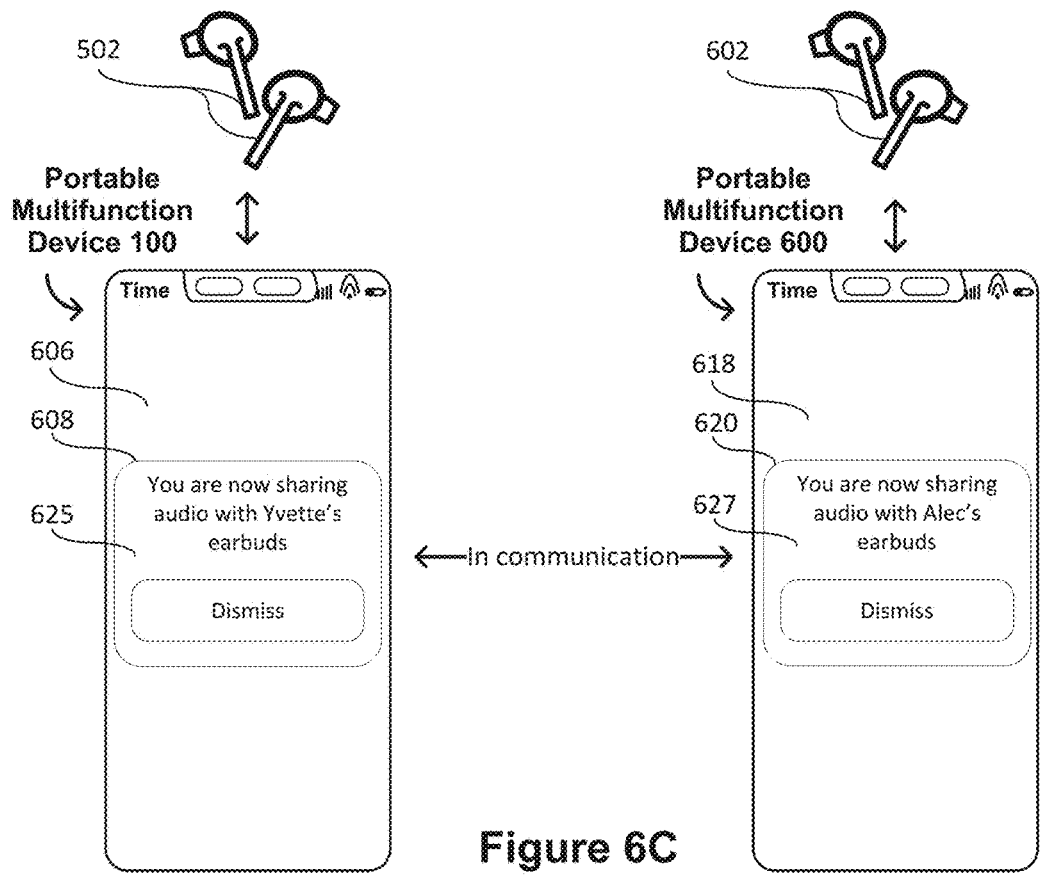
Figure 6D:
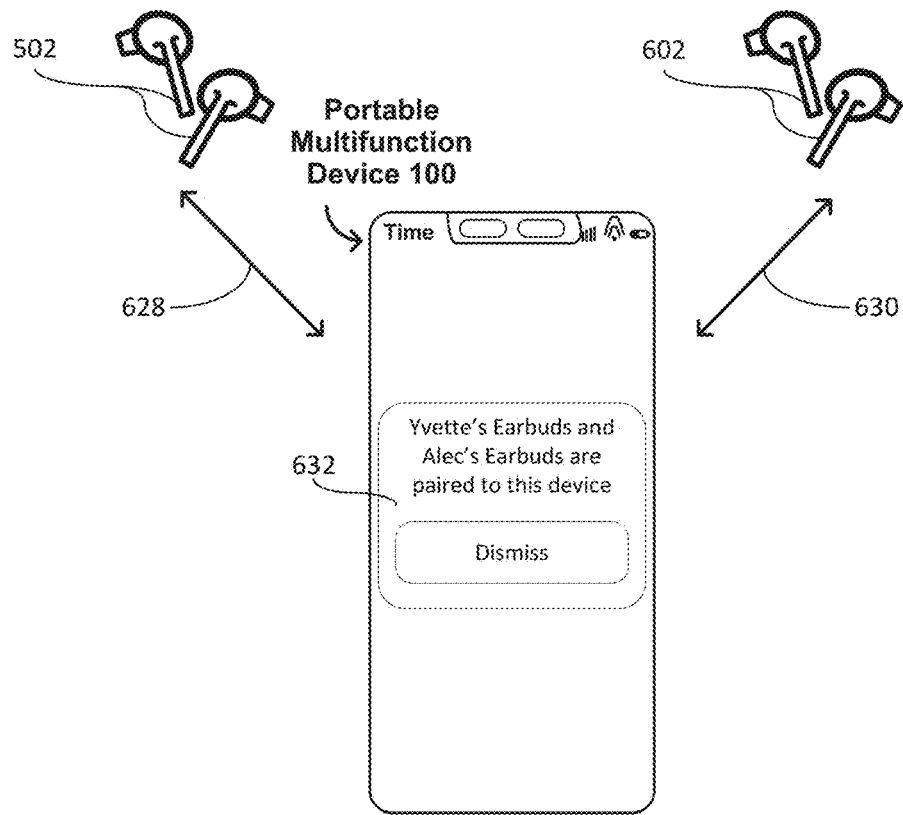
Figure 6E:
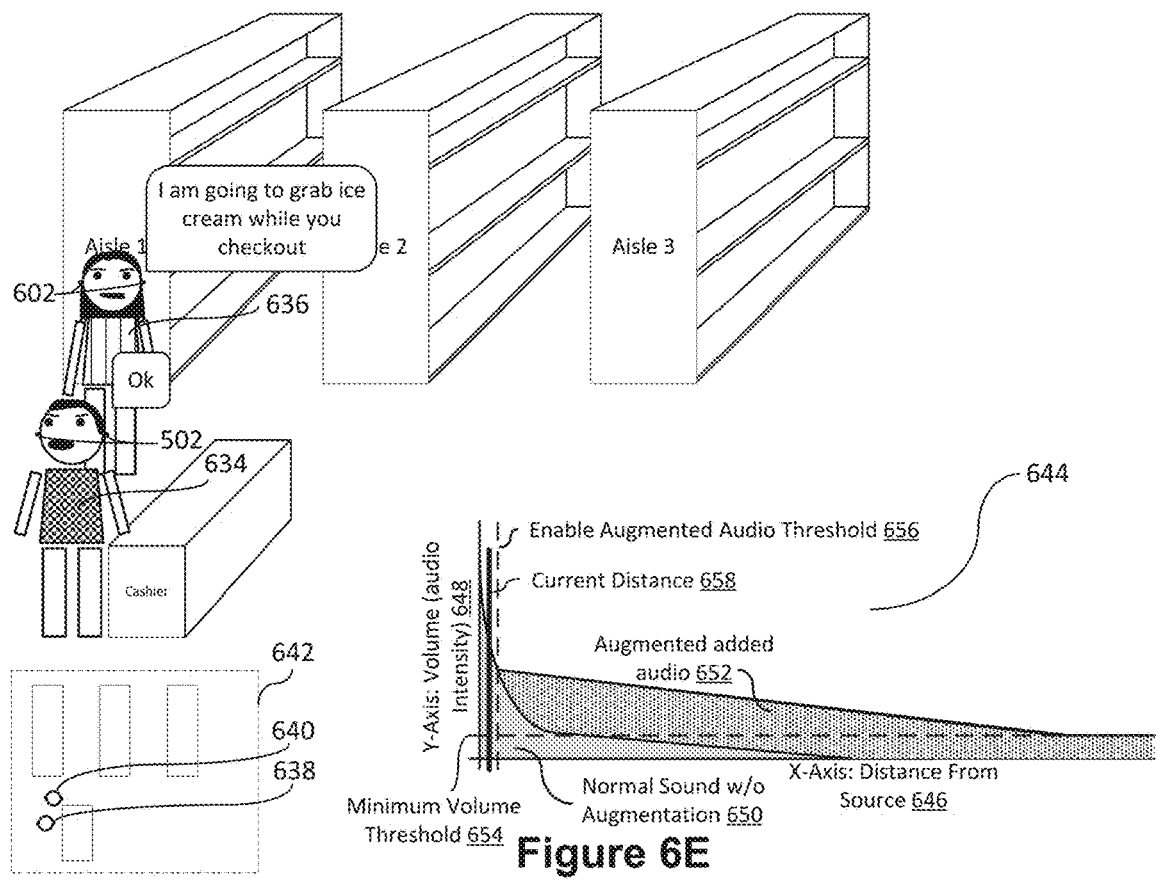
Figure 6F:
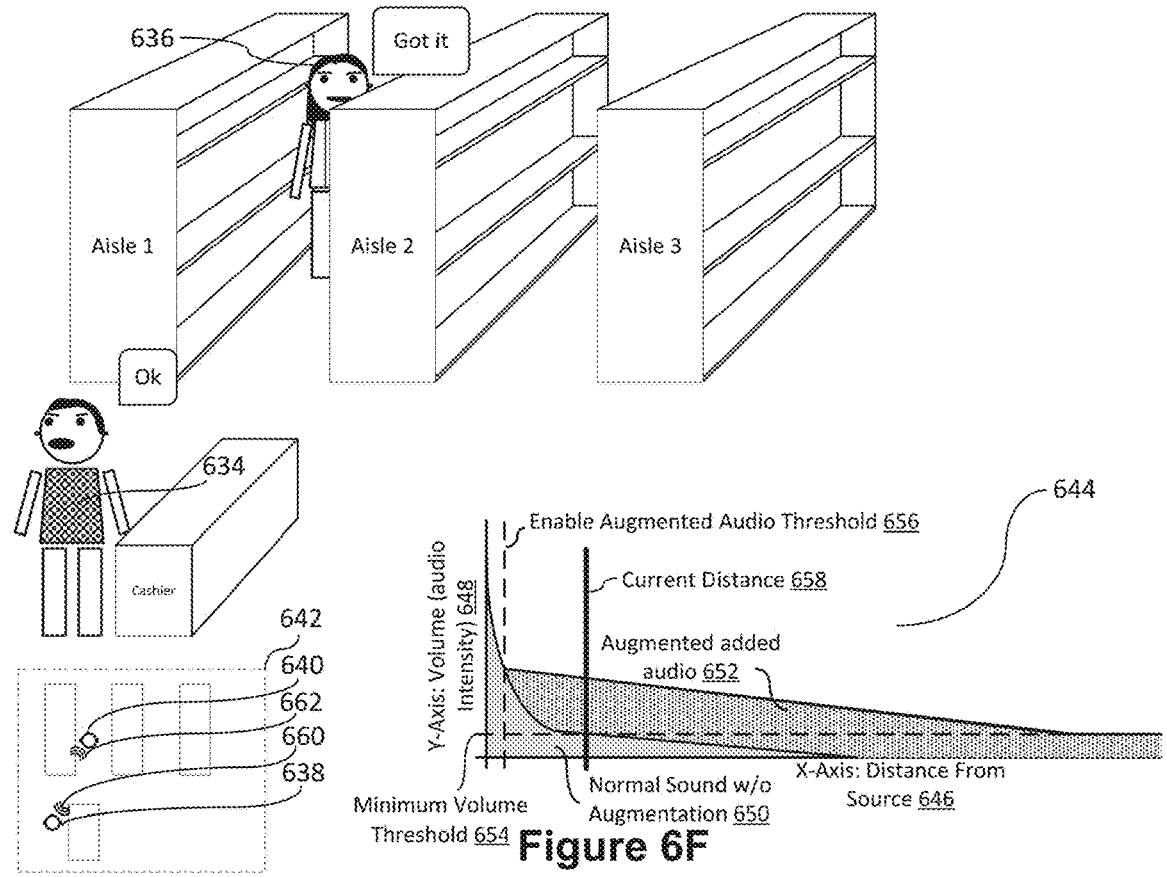

FIGS. 6A-6G illustrate at least two nearby users initiating and having an "augmented audio communication session" via wearable audio output devices, and the at least two nearby users hear simulated spatial audio to indicate direction and distance of other users in the communication session in accordance with some embodiments. Specifically, FIGS. 6A-6D show examples of an initial pairing process for establishing an audio communication session with at least one person, and FIGS. 6E-6G illustrate seamlessly transitioning from a face-to-face conversation to a conversation occurring over earbuds.

FIG. 6A shows an embodiment for establishing an audio communication session between at least two users. In this embodiment, each set of audio output devices (e.g., earbuds 502 and earbuds 602) are paired (e.g., wired or wirelessly connected) to their respective device (e.g., earbuds 502 are paired with portable multifunction device 100 and earbuds 602 are paired (e.g., wired or wirelessly connected) with portable multifunction device 600). FIG. 6A also shows that portable multifunction device 100 is in communication with portable multifunction device 600, as indicated by bidirectional arrow 604. While the portable multifunction devices are paired with their respective earbuds, an example user interface 606 for establishing an audio communication session can be displayed. For example, example user interface 606 may include a window 608 that includes a prompt that states "Request to share audio with Yvette's earbuds." Window 608 shows two buttons, a first button 610 for requesting to share audio with Yvette's earbuds, and a second button 612 for cancelling the pairing process for establishing an audio communication session. Lastly, FIG. 6A shows an input 614 (e.g., a tap input) at first button 610 for sending a request to Yvette's portable multifunction device to establish an audio communication session, shown in FIG. 6A as a request to share audio with Yvette's earbuds.

FIG. 6B shows that in response to detecting an input 614 at first button 610 for sending a request to establish an audio communication session with Yvette's portable earbuds 602, the process for establishing an audio communication session is initiated between the two devices. On portable multifunction device 100, the example user interface 606 no longer includes first button 610 and second button 612, and instead a prompt 616 is displayed that recites "[r]equesting . . . " Prompt 616 is displayed while waiting for information indicating that the user of portable multifunction device 600 has accepted or declined to enter an audio communication session with the user of the multifunction device 100. On portable multifunction device 600, a user interface 618 is displayed that includes a window 620 that includes a prompt that recites, "Alec has requested to share their audio with you. Accept?" Within this window 620 two buttons are displayed, a first button 622 for accepting the request and a second button 624 for declining the request. Lastly, FIG. 6B shows an input 626 (e.g., a tap input) at first button 622 for accepting the request to establish an audio communication session, or more colloquially, to share audio.

FIG. 6C, shows that in response to detecting the input 626 (e.g., a tap input) at first button 622 for accepting the request to share audio, an audio communication session is established. To indicate that both devices are in an active audio communication session, example user interface 606 and example user interface 618 are updated to alert the users that they are engaged in an active audio communication session (e.g., example user interface 606 includes a dialog box 625 that recites, "[y]ou are now sharing audio with Yvette's earbuds," and example user interface 618 includes a dialog box 627 that recites, "[y]ou are now sharing audio with Alec's earbuds.") of the portable multifunction devices.

FIG. 6D shows an alternative embodiment where two pairs of earbuds are connected to a single portable multifunction device (e.g., portable multifunction device 100). To illustrate this alternative embodiment, FIG. 6D shows portable multifunction device 100 concurrently in communication with earbuds 502 (indicated by bidirectional arrow 628) and earbuds 602 (indicated by bidirectional arrow 630). In some embodiments, when both earbuds 502 and earbuds 602 successfully establish communication with the portable multifunction device 100, a prompt 632 can be shown to notify the user of the device that the earbuds are paired (e.g., wirelessly connected). While FIGS. 6A-6D show examples of connection methods between earbuds, numerous other connections methods are possible, as explained in reference to operation 818 in FIG. 8B.

FIGS. 6E to 6G show how the users of the earbuds 502 and 602 aurally perceive audio in a communication session when they are near each other, but out of their normal speaking range. In a normal conversation without any earbuds present, a person's voice will decrease in volume according to the inverse square law, which holds that the intensity of sound is inversely proportional to the square of the distance from the signal source. This forces people to be within a certain distance, sometimes called "within earshot," from each other to maintain a conversation. There may be instances, however, where a user wishes to remain in the conversation with another user, but also move away from them to complete another task, even though they are no longer within earshot of each other. Therefore, there is a need for a user to be able to seamlessly switch between in-person communication (e.g., face-to-face), and a short distance communication (e.g., the person is near, but out of normal speaking range). FIGS. 6E-6G show an interaction that allows a user to seamlessly switch from in person-communication to a short distance communication session.

FIG. 6E shows a first user 634 wearing earbuds 502 and a second user 636 wearing earbuds 602, and the earbuds 502 and earbuds 602 are in communication with each other (e.g., directly in communication with each other or through one or more intermediary devices, such as portable multifunction device 100). In FIG. 6E, the first user 634 and the second user 636 are next to each other, for example in the checkout area of a store, and are able to communicate with each other using just their unaided voices. Therefore, despite the users wearing their respective earbuds and having an ongoing communication session, the earbuds can operate in a mode (e.g., a pass-through or transparency mode, or non-noise canceling mode) that allows the user to hear unaided audio (e.g., normal voices). First user's position 638 and second user's position 640 is indicated within mini-map 642 shown in FIG. 6E. This mini-map 642 can also indicate the perceived direction in which sound is emanating from, but is not shown in FIG. 6E because the earbuds are currently not providing additional audio to augment the users' voices.

FIG. 6E also shows a graph for aiding in explanation of how a user (e.g., first user 634 or second user 636) perceives audio while wearing their respective earbuds. The graph 644 has two axes, a horizontal axis 646 (labeled "X-Axis: Distance from source") and a vertical axis 648 (labeled "Y-Axis: Volume (audio intensity)"). Horizontal axis 646 represents the distance between users, which may be the same as or correspond to the distance from earbuds 602 to earbuds 502 (e.g., the distance from one user to another user who is providing the source of sound (e.g., talking)). Vertical axis 648 represents the volume, as heard by either user, of sound from the other the source (e.g., how loud the other user sounds), including both unaided.

Within graph 644 there are two filled in portions that represent the volume of the audio a user experiences during an augmented audio communication session, while wearing earbuds 502 (or earbuds 602). The first portion is shown below curve 650 (labeled as "Normal Sound without Augmentation"), which represents the unaided audio volume of a source of sound (e.g., a voice) decreasing in a normal environment according to the inverse square law. The second portion (labeled as "Augmented added audio") is shown below linear line 652 and above curve 650, which represents additional audio volume of the source of sound, output by earbuds to mitigate the drop off in sound that normally occurs with natural sound in an environment as the distance between the two users increases. The resulting combined audio volume may be called the augmented volume. As a result, use of earbuds 502 and 602 in an augmented audio communication session allow the users of earbuds 502 and 602 to still hear each other (e.g., hear each other talking) even if they are at a distance that would otherwise be out of earshot of each other. In this example, the augmented added audio volume still decreases based on distance, but at a slower rate over distance than would naturally occur, in accordance with the audio inverse square law, which helps the users to perceive changes in the distance between them. Additionally, in some embodiments, other properties of the added augmented audio (e.g., audio reverberation) are altered to allow the user to perceive that the distance between the user and the other person has changed. This allows the user to still perceive distance, or the change in distance, but without ending communication just because, they are out of a normal speaking range. While FIG. 6E shows the augmented added audio decreasing in a linear fashion, the total volume can also decrease linearly, nonlinearly, piecewise linearly, or a combination of those, until a minimum volume is reached. In some embodiments, once the total audio volume decreases to a certain minimum volume, the total audio volume may stop decreasing (e.g., remain constant) so that the user can continue to hear the other user. This minimum volume is indicated by horizontal line 654 (indicated by "Minimum Volume Threshold").

Graph 644 also shows a line 656 representing minimum threshold distance (labeled "Enable Augmented Audio Threshold"). In some embodiments, the distance between the users, or their respective devices, must meet or exceed the minimum threshold distance before the audio volume of the unaided audio is supplemented by augmented added audio. This allows the user to hear the unaided audio while still in range of the audio source (e.g., the person speaking). In some embodiments, the users wear noise cancelling earbuds, which may hinder communication despite the users being next to each other. In such embodiments, the earbuds may operate in a pass-through mode, which allows users to hear their surrounding audio without having to remove their noise cancelling earbuds. In the pass-through mode, the earbuds 502 or 602 replicate surrounding ambient sounds, sensed using an external microphone 303 (FIG. 3C) of the earbuds, thereby "passing" the surrounding ambient sounds through to the user.

Lastly, graph 644 in FIG. 6E, shows a current distance line 658 that indicates the distance between the users, or between their respective devices (e.g., earbuds 602 and earbuds 502). The position of the current distance line 658 along horizontal axis 646 indicates the distance between the users or their devices, and also indicates the combined volume of the audio from the user of earbuds 602, that the user 501 of earbuds 502 hears. Subsequent figures will show the current distance line 658 moving based on the distance between the users or their respective devices. Returning to the interaction occurring between first user 634 wearing earbuds 502 and a second user 636 wearing earbuds 602 in FIG. 6E, since (in the example shown in FIG. 6E) both user and their earbuds are still within the minimum threshold distance of each other, augmented added audio is not enabled, as indicated by the position of current distance line 658 to the left of line 656 representing the minimum threshold distance.

FIG. 6F, like FIG. 6E, still shows the first user 634 wearing earbuds 502 and a second user 636 wearing earbuds 602. However, the position of the second user 636 wearing earbuds 602 has changed (e.g., user 636 went to grab ice cream, while user 634 remained in the checkout area of the store), and this change in distance is great enough to meet or exceed the minimum threshold distance for enabling augmented audio. This change in position is indicated in mini-map 642, which shows first user's position 638 and second user's position 640. The mini-map 642, now illustrates audio waves (e.g., waves 660 and waves 662) emanating from a location around each of the user's positions (e.g., first user's position 638 and second user's position 640). The audio waves illustrate simulated spatial locations from which each user perceives audio to be emanating from (e.g., the location from which a user aurally perceives augmented audio to be originating). The simulated spatial locations are associated with the users' locations in physical space. In other words, as each user moves around their local physical environment, their transmitted audio will be aurally perceived by the other user as moving. This allows the users to have a sense of each other's physical locations in space even if they can no longer see each other or hear their unaided audio (e.g., their normal speaking voice).

FIG. 6F also shows that graph 644 has been updated to reflect the change of positions of the users. Graph 644 now shows current distance line 658 positioned to the right of line 656, representing the minimum threshold distance, thereby indicating that the users are more than the minimum threshold distance from each other. Once the minimum threshold has been met or exceeded, augmented audio is combined with the unaided audio to allow the users to hear each other over extended distances. Graph 644 shows that when the current distance line 658 is at its marked position in the graph 644, the user will hear a portion of the audio directly from the user (e.g., the sound waves emanating from a person normally speaking), and a portion supplemented by the earbuds (e.g., audio picked up by the speaking user's earbuds, and then transmitted to the listening user's earbuds for playback at a total volume level higher than the volume of the direct, unaided audio).

FIG. 6G illustrates audio properties that change when the users are at a large distance away from each other (e.g., and typically, out of visual contact with each other), in this example because user 636 has moved further away from user 634 than was the case in FIG. 6F. This change in position of user 636 is indicated by mini-map 642 in FIG. 6G, which shows second user's position 640 separated further from first user's position 638 than in FIG. 6F. The mini-map 642 in FIG. 6G also illustrates audio waves (e.g., waves 660 and waves 662) emanating from the simulated spatial location of each user's position (e.g., first user's position 638 and second user's position 640), and the audio waves locations have been updated (relative to the ones shown in FIG. 6F) to reflect the change in position of the earbuds in physical space.

FIG. 6G also shows that graph 644 has been updated to reflect the change in distance between the users. Graph 644 now shows current distance line 658 placed at or near the end of graph 644, which indicates that the second user's position 640 is far away from the first user's position 638. Current distance line 658 is also shown at a location where the volume has decreased to a minimum threshold level (e.g., the minimum volume indicated by horizontal line 654 (indicated by "Minimum Volume Threshold"). This leveling off of volume occurs so that the volume never gets so low that the users can no longer the other user. Lastly, in addition to adjusting volume based on distance, one or both earbuds may present to their respective users adjusted amounts of reverberation based on the distance between the users, and/or apply a high pass filter or a low pass filter to reduce high or low frequency sounds, where the frequency cutoff changes based on the distance between the users, to provide the user(s) with audio clues of the distance between the users. As a result, the users may still receive audio information indicating changes in distance between the users even when the volume of the provided audio has been reduced to the minimum volume level.

FIGS. 7A-7H are flow diagrams illustrating method 700 of providing an improved user interface for interacting with participants in a dynamic visual communication session (e.g., for displaying user interfaces of a video call application during a communication session) with multiple participants. Method 700 is performed at an electronic device (e.g., device 300, FIG. 3A, or portable multifunction device 100, FIG. 1A) that is in communication with one or more display devices (e.g., touch-sensitive display system 112, FIG. 1A, or display 340, FIG. 3A), one or more input devices (e.g., touch-sensitive display system 112, FIG. 1A, or touchpad 355, FIG. 3A), and a set of one or more wearable audio output devices (e.g., one or more wearable audio output devices 301, FIG. 3B). In some embodiments, the display device is a touch-screen display and the input device is on or integrated with the display device. In some embodiments, the display device is separate from the input device. Some operations in method 700 are, optionally, combined and/or the order of some operations is, optionally, changed.

As described below, method 700 provides an improved user interface for interacting with participants in a communication session such as a video conference. Audio, including speech, from different participants is output at different simulated spatial locations in a frame of reference of the communication session, which helps the user to identify and distinguish between different participants and makes the audio more intelligible. Dynamic visual representations (e.g., video representations or animated avatars) of the different participants are displayed at different locations corresponding to the different simulated spatial locations to further help the user visualize and distinguish between different participants. In addition, moving the audio from a given participant to a different simulated spatial location in accordance with and in response to a user input to move the dynamic visual representation of the participant maintains an intuitive association between the audio and the corresponding visual representation of the participant without requiring manual adjustment by the user to maintain the association. Providing improved feedback to the user and reducing the number of inputs needed to perform an operation enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

The electronic device displays (702), via the one or more display devices, a user interface including respective dynamic visual representations of a plurality of participants in a communication session (e.g., a live audiovisual communication session, such as a video conference), including displaying, at a first location in the user interface, a first dynamic visual representation of a first participant (e.g., a video representation or an animated representation such as an animated character or avatar representing the first participant, that optionally moves as the first participant moves, such as by one or more portions of the dynamic visual representation tracking one or more portions of the first participant's face, including facial features of the animated representation moving as the first participant's facial features move and/or facial expressions of the animated representation changing as the first participant's facial expressions change) and displaying, at a second location in the user interface, a second dynamic visual representation of a second participant different from the first participant (e.g., example user interface 500 in FIGS. 5A-5T displays representations of participants 506-512, which represent the participants who are part of the ongoing communication session).

Further, the electronic device outputs (704), via the set of one or more wearable audio output devices, audio from the plurality of participants in the communication session (e.g., FIGS. 5A-5T include simulated audio location map 514, which represents the sources of sound output by the earbuds 502 during an ongoing communication session).

Outputting (704) the audio from the plurality of participants includes outputting (706) first audio from the first participant (e.g., in FIGS. 5A-5T, the simulated audio location 516 of participant one represents the audio output from the first participant 506 in the communication session). The first audio is adjusted (e.g., as the set of one or more wearable audio output devices is moved relative to a frame of reference of the communication session) so as to maintain the first audio at a first simulated spatial location relative to a frame of reference of the communication session, independently of a position of the set of one or more wearable audio output devices relative to the frame of reference. Furthermore, the first simulated spatial location corresponds to the location (the "first location") of the first dynamic visual representation in the user interface (e.g., the top-down map in FIG. 5Q illustrates the device 100 remaining in the same location, while the user 501 rotates their head along with earbuds 502). As shown by the audio location map 415 in FIG. 5Q, the simulated audio locations of the participants remain fixed in space, at the same positions (e.g., as shown by the audio location map 514 of FIG. 5P) as before the user moved their head in the clockwise direction (e.g., the first audio is output using spatial audio so as to be perceived as coming from the first simulated spatial location while the first dynamic visual representation is displayed at the first location in the user interface).

The electronic device also outputs (708) second audio from the second participant (e.g., in FIGS. 5A-5T, simulated audio location 518 of participant two represents the audio output from the second participant in the communication session). The second audio is adjusted (e.g., as the set of one or more wearable audio output devices is moved relative to the frame of reference), so as to maintain the second audio at a second simulated spatial location relative to the frame of reference independently of a position of the set of one or more wearable audio output devices relative to the frame of reference (e.g., the second simulated spatial location is different from the first simulated spatial location). Furthermore, the second simulated spatial location corresponds to the second location of the second dynamic visual representation in the user interface (e.g., the second audio is output using spatial audio so as to be perceived as coming from the second simulated spatial location while the second dynamic visual representation is displayed at the second location in the user interface) (e.g., the top-down map in FIG. 5Q illustrates the device 100 remaining in the same location while the user 501 rotates their head along with earbuds 502). As shown by the audio location map 415 in FIG. 5Q, the simulated audio locations of the participants remain fixed in space, at the same positions (e.g., as shown by the audio location map 514 of FIG. 5P) as before the user rotated their head, causing movement of the wearable audio output devices.

In accordance with method 700, the electronic device receives (710), via the one or more input devices, an input selecting the first dynamic visual representation of the first participant (e.g., while FIG. 5C shows input 532 (e.g., a tap input) being received over (or at) video representation 508 of participant two, it is to be understood that the electronic device can receive a similar input over or at the video representation 506 of participant one).

In some embodiments, in response to receiving the input selecting the first dynamic visual representation of the first participant (712), the electronic device displays (714) the first dynamic visual representation of the first participant at a third location, different from the first location, in the user interface (e.g., FIG. 5D shows that in response to receiving the input shown in FIG. 5C, the video representation of participant one 506 is shifted rightward on the touch screen 112), and the electronic device outputs the first audio from the first participant (e.g., using spatial audio) so as to position the first audio at a third simulated spatial location, relative to the frame of reference, that corresponds to the third location of the first dynamic visual representation in the user interface (e.g., FIG. 5D illustrates that in the simulated audio location map 514, simulated audio location 516 of participant one is moved closer to the representation of the user's location 524 in comparison to the map FIG. 5C). The third simulated spatial location is different from the first simulated spatial location.

In some embodiments, in response to receiving the input selecting the first dynamic visual representation of the first participant (712), the electronic device displays (716) the second dynamic visual representation of the second participant at a fourth location in the user interface (e.g., FIG. 5D shows that in response to receiving the input in FIG. 5C, the video representation 510 of participant two is shifted to the center of the touch screen 112), and the electronic device outputs the second audio from the second participant (e.g., using spatial audio) so as to position the second audio at a fourth simulated spatial location, relative to the frame of reference, that corresponds to the fourth location of the second dynamic visual representation in the user interface (e.g., FIG. 5D illustrates that in the simulated audio location map 514, simulated audio location 518 of participant two is moved closer to the representation of the user's location 524 in comparison to the map FIG. 5C).

In some embodiments, the fourth location is different from the second location in the user interface, and the fourth simulated spatial location is different from the second simulated spatial location (718). For example, FIG. 5C shows input 532 (e.g., a tap input) being received over (or at) video representation 508 of participant two. The simulated audio location map 514 in FIG. 5D shows that in response to receiving the input 532, simulated audio locations 516-522 of the participants P1-P4 are all shifted with respect to the by representation of a user's location 524. Additionally, FIG. 5D shows that in response to receiving the input in FIG. 5C, the video representations 506-512 of the participants P1-P4 are all shifted to the right on the touch-sensitive display 112.

Moving both the respective simulated spatial locations and corresponding visual representations of multiple participants in the communication session in response to an input to reposition a selected participant reduces the number of user inputs required to effect multiple coordinated changes in the positioning of representations of participants in the user interface and the corresponding simulated spatial locations for the audio from those participants, and enables greater optimization of the overall arrangement of the communication session participants to help the user identify and distinguish between different participants and to improve intelligibility. Providing improved feedback to the user and performing an operation (e.g., automatically) when a set of conditions has been met without requiring further user input enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the third location in the user interface is in a respective direction relative to the first location in the user interface, and the fourth location in the user interface is in the (same) respective direction relative to the second location in the user interface (720). For example, FIG. 5C shows input 532 (e.g., a tap input) being received over (or at) video representation 508 of participant two. The simulated audio location map 514 in FIG. 5D shows that in response to receiving the input 532, simulated audio locations 516-522 of the participants P1-P4 are all shifted in the same rightward direction with respect to the by representation of a user's location 524. Additionally, FIG. 5D shows that in response to receiving the input in FIG. 5C, the video representations 506-512 of participants P1-P4 are all shifted to the right of the touch-sensitive display 112). In some embodiments, the first dynamic visual representation and the second dynamic visual representation are shifted in the user interface in a same direction. In some embodiments, the third simulated spatial location is substantially in the (same) respective direction relative to the first simulated spatial location, and the fourth simulated spatial location is in substantially the (same) respective direction relative to the second simulated spatial location. In some embodiments, the respective simulated spatial locations of the first audio and the second audio are spatially shifted in a same direction that corresponds to, and is substantially in the same direction as, the respective direction in which the first and second dynamic visual representations are shifted in the user interface.

Moving the respective simulated spatial locations and corresponding visual representations of multiple participants in the communication session in the same direction in response to an input to reposition a selected participant enables greater optimization of the overall arrangement of the communication session participants (e.g., by scrolling or panning the arrangement) to help the user identify and distinguish between different participants and to improve intelligibility. Providing improved feedback to the user and performing an operation (e.g., automatically) when a set of conditions has been met without requiring further user input enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the first location in the user interface is outside a respective region (e.g., a focal region or a center region) of the user interface, the second location in the user interface is within the respective region, the third location in the user interface is within the respective region, and the fourth location in the user interface is outside the respective region (722). For example, FIG. 5C shows input 532 (e.g., a tap input) being received over (or at) video representation 508 of participant two. The simulated audio location map 514 in FIG. 5D shows that in response to receiving the input 532, simulated audio location 518 of participants two is moved in front of the representation of a user's location 524 (e.g., in focus). As described above with reference to FIG. 5D, when a participant is no longer shown in the user interface (e.g., video representation 512 of participant four in not shown in the user interface 500 shown in FIG. 5D) their corresponding audio is perceived by a user of the device to be emanating from the periphery of the simulated space for the communication session (e.g., the background). Additionally, FIG. 5D shows that in response to receiving the input in FIG. 5C, the video representation 508 of participant two is brought to the center of the display, and the other representations of participants are shifted from their prior positions.

Moving the respective simulated spatial locations and corresponding visual representations of multiple participants in the communication session in response to a user input that moves a selected participant into a respective region, such as a focal or center region, of the user interface, including moving the visual representation of another participant out of the respective region in response to the user input, enables greater optimization of the overall arrangement of the communication session participants when the user expresses intent to bring the selected participant into focus, thus helping the user identify and distinguish between different participants and increasing intelligibility. Providing improved feedback to the user and performing an operation (e.g., automatically) when a set of conditions has been met without requiring further user input enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the third simulated spatial location is closer to a spatial location of the set of one or more wearable audio output devices than the first simulated spatial location and the second simulated spatial location (e.g., closer than respective locations of participants other than the first participant), and method 700 includes, in response to receiving the input selecting the first dynamic visual representation of the first participant, the electronic device emphasizes (724) the first audio from the first participant relative to the second audio from the second participant (e.g., by increasing a volume of the first audio from the first participant and/or decreasing a volume of the second audio from the second participant; blurring or fading the second audio from the second participant; moving the simulated spatial location of the second audio from the second participant further away; etc.). For example, FIGS. 5C-5D show a user input 532 on the touch screen 112 that results in the simulated spatial location 518 for participant two moving closer to the simulated spatial location 524 of the user 501 and the user's earbuds 502 than prior to the user input. In some embodiments, as result of the change in the simulated spatial location of the first participant, or in coordination with the change in the simulated spatial location of the first participant, the first electronic device emphasizes the first audio from the first participant relative to the second audio from the second participant. In some embodiments, the third simulated spatial location is a spatial location relative to the frame of reference, and, while the first audio is associated with the third simulated spatial location, the first audio is adjusted as the set of one or more wearable audio output devices is moved relative to the frame of reference so as to position (e.g., maintain the position of) the first audio at the third simulated spatial location independently of the position of the set of one or more wearable audio output devices. In some embodiments, the third simulated spatial location is a spatial location with a respective spatial relationship relative to the set of one or more wearable audio output devices, and, while the first audio is associated with the third simulated spatial location, the first audio is not adjusted as the set of one or more wearable audio output devices is moved relative to the frame of reference.

Adjusting the audio of a selected participant to simulate moving the audio of the selected participant spatially closer to the user (e.g., and spatially closer than the audio of other participants) and to emphasize the audio of the selected participant relative to the audio of other participants enables the user to bring a selected participant into focus, thereby helping the user identify and distinguish between different participants and increasing intelligibility. Providing improved feedback to the user and providing additional control options without cluttering the user interface with additional displayed controls enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, in response to receiving the input selecting the first dynamic visual representation of the first participant, the first audio is output so as to be positioned at the third simulated spatial location for a first predefined amount of time, and the electronic device, after the first audio is output so as to be positioned at the third simulated spatial location for the first predefined amount of time, outputs (726) the first audio at a simulated spatial location that is further from the spatial location of the set of one or more wearable audio output devices than the third simulated spatial location (e.g., a spatial location that is in a same or substantially the same direction relative to the spatial location of the set of one or more wearable audio output devices as the third simulated spatial location, and a same or substantially the same distance from the spatial location of the set of one or more wearable audio output devices as the first simulated spatial location). In some embodiments, after the first predetermined amount of time, the first audio is output so as to be returned to the first simulated spatial location and/or the first dynamic visual representation of the first participant is redisplayed at the first location in the user interface, and optionally, the second audio is output so as to be returned to the second simulated spatial location and/or the second dynamic visual representation of the second participant is redisplayed at the second location in the user interface. For example, FIGS. 5J-5L show an elapsed time chart 540 to indicate how long a lean-in interaction occurs, after which the simulated spatial location of the audio from a selected participant (e.g., third participant 510 in this example) is returned (e.g., from the simulated spatial location shown in FIG. 5J) to its prior location (e.g., the simulated spatial location shown in FIGS. 5I and 5L).

Adjusting the audio of a selected participant to simulate moving the audio of the selected participant spatially closer and to emphasize the audio of the selected participant relative to the audio of other participants for a predefined amount of time, and afterwards moving the audio of the selected participant further away and optionally reversing the emphasizing of the audio of the selected participant, enables the user to bring the selected participant into focus temporarily without requiring the user to manually move the selected participant out of focus later. Providing improved feedback to the user and performing an operation (e.g., automatically) when a set of conditions has been met without requiring further user input enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the input selecting the first dynamic visual representation of the first participant includes selection of a representation (e.g., a dynamic visual representation, such as a video representation or animated avatar) of a user of the electronic device, displayed in the user interface, and a drag gesture (e.g., movement of the input) to move the representation of the user in the user interface to within a predefined distance of the first dynamic visual representation of the first participant, and the electronic device, in response to receiving the input selecting the first dynamic visual representation of the first participant, displays (728) an indication that the first dynamic visual representation of the first participant is associated with the representation of the user (e.g., displaying the first dynamic visual representation and the representation of the user next to each other in the user interface and/or within an outline or with other visual association or emphasis). In some embodiments, the electronic device ceases to display the indication that the first dynamic visual representation of the first participant is associated with the representation of the user after the first predefined amount of time elapses (e.g., the association between the first dynamic visual representation and the representation of the user is temporarily displayed in conjunction with temporarily outputting the first audio at the third simulated spatial location). An example of such a drag gesture and the resulting display of an association between the representation of the user and the representation of the first participant is discussed above with reference to FIGS. 5G-L.

Displaying an association between a representation of the user and the visual representation of a selected participant in combination with adjusting the audio of the selected participant to simulate moving the audio of the selected participant spatially closer to the user and to emphasize the audio of the selected participant relative to the audio of other participants provides visual feedback to the user that the user and the selected participant are more closely associated, both visually and aurally, with each other than to other participants in the communication session. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, in response to receiving the input selecting the first dynamic visual representation of the first participant (e.g., a drag gesture to move the representation of the user to within the predefined distance of the first dynamic visual representation of the first participant), the electronic device transmits (730), to the first participant (e.g., to an electronic device in use by the first participant), a request to establish a partial communication session between the user and the first participant (e.g., a subconference or breakout session within the larger communication session). In some embodiments, in response to receiving an indication of the first participant accepting the request to establish the partial communication session, the electronic device displays (730) an indication that the first dynamic visual representation of the first participant is associated with the representation of the user (e.g., as described in relation to FIG. 5J, the device of the requested participant prompts the requested participant (e.g., participant three) to accept or decline the lean-in communication session) (e.g., as described herein with reference to operation 728). In some embodiments, one or more of the operations described herein as being performed in response to the electronic device receiving the input selecting the first dynamic visual representation of the first participant are performed in response to receiving the indication of the first participant accepting the request to establish the partial communication session, after receiving (at the electronic device) the input selecting the first dynamic visual representation of the first participant. Thus, the one or more operations are also, indirectly, performed in response to receiving the input selecting the first dynamic visual representation of the first participant.

Transmitting to a selected participant a request to establish a partial or sub-communication session in response to the user selecting the participant provides the option of requiring agreement between the user and the selected participant to establish the partial communication session and avoids establishing unwanted sub-communication sessions without requiring separate coordination between the user and the selected participant. Reducing the number of inputs needed to perform an operation and performing the operation (e.g., automatically) when a set of conditions has been met enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, receiving the input selecting the first dynamic visual representation of the first participant includes detecting (732), via the one or more input devices, the input at an initial location corresponding to the first dynamic visual representation and continuing to detect the input at the initial location for at least a second predefined amount of time (e.g., FIG. 5C shows input 532 (e.g., a press and hold input) being received over (or at) the video representation 508 of participant two) (e.g., a long press input maintained for at least the second predefined amount of time at a respective location on a touch-sensitive surface that corresponds to the first dynamic visual representation (e.g., while the first dynamic visual representation is displayed at the first location in the user interface)).

Moving the audio from a selected participant to a different simulated spatial location, and the dynamic visual representation of the selected participant accordingly, in response to an input maintained at a location corresponding to the dynamic visual representation of the selected participant for at least a threshold amount of time enables the user to provide input using an intuitive gesture (e.g., a touch-and-hold gesture). Requiring the user input to be maintained at a location corresponding to the dynamic visual representation of the selected participant for at least the threshold amount of time also enables the device to more accurately determine user intent without requiring additional user inputs. Providing additional control options without cluttering the user interface with additional displayed controls and reducing the number of inputs needed to perform an operation enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, receiving (734) the input selecting the first dynamic visual representation of the first participant includes concurrently detecting, via the one or more input devices, a first input point concurrently with a second input point, and movement of the first input point towards or away from the second input point (e.g., a pinch or a depinch gesture) (FIGS. 5M-5O show a de-pinch input over a representation of a respective participant (e.g., video representation 508 of participant two), which results the user's device 100 presenting audio from the respective participant from a simulated position that is closer to the user of the device than the simulated position of the respective participant immediately prior to the de-pinch gesture). In some embodiments, the first input point and second input points are concurrent contacts detected via a touch-sensitive surface, parts of a user such as the user's hands or fingers in the field of view of one or more cameras, or other forms of multiple simultaneous input.

Moving the audio from a selected participant to a different simulated spatial location, and the dynamic visual representation of the selected participant accordingly, in response to an input that includes movement of multiple input points of the input moving towards or away from each other enables the user to provide input using an intuitive gesture (e.g., a pinch or depinch gesture). Providing additional control options without cluttering the user interface with additional displayed controls enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the input selecting (736) the first dynamic visual representation of the first participant includes selection of the first dynamic visual representation while the first dynamic visual representation is displayed at the first location in the user interface and a drag gesture (e.g., movement of the input) to move the first dynamic visual representation to the third location in the user interface. For example, FIG. 5E shows an input 534 (e.g., a drag gesture) being received over (or at) video representation of a selected participant.

Moving the audio from a selected participant to a different simulated spatial location in response to an input that includes a drag gesture to move the corresponding dynamic visual representation of the selected participant enables the user to provide input using an intuitive gesture (e.g., a drag gesture). Providing additional control options without cluttering the user interface with additional displayed controls enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the electronic device scrolls (738) the user interface (e.g., vertically and/or laterally) in response to the electronic device detecting movement of the electronic device relative to a physical environment in which the electronic device is located. In some embodiments, while the first dynamic visual representation is displayed at the first location in the user interface, the first dynamic visual representation of the first participant is outside a focal region (e.g., a center region) of the user interface, and receiving the input selecting the first dynamic visual representation of the first participant includes detecting movement of the electronic device to scroll the user interface such that the first dynamic visual representation is within (e.g., is moved so as to be within) the focal region of the user interface. For example, FIG. 5P illustrates an example user interface 500 updating and audio location map 514 updating in response to the portable multifunction device 100 moving in space (e.g., as illustrated by top-down map 528 that shows the portable multifunction device 100 rotating counterclockwise around the user 501 of the device 100, relative to its prior position, as shown in FIG. 5O). In some embodiments, the user interface is scrolled in response to detecting movement of the electronic device as if the user interface were a simulated two- or three-dimensional environment and the electronic device were moved about the simulated environment (e.g., to view different portions of the simulated environment). For example, in response to detecting upward movement of the electronic device, the user interface is scrolled downward (e.g., as if the electronic device were being moved to view a portion of the user interface above what was previously displayed). In another example, in response to detecting leftward movement of the electronic device, the user interface is scrolled toward the right (e.g., as if the electronic device were being moved to view a portion of the user interface further to the left of what was previously displayed).

Moving the audio from a selected participant to a different simulated spatial location, and the dynamic visual representation of the selected participant, in accordance with scrolling the user interface in response to movement of the electronic device enables the user to provide input using an intuitive gesture (e.g., movement of the electronic device as if to point towards different participants in physical space). Providing additional control options without cluttering the user interface with additional displayed controls enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the audio from the plurality of participants in the communication session is output (740) at a plurality of simulated spatial locations relative to the frame of reference (e.g., the audio is output using spatial audio so as to be perceived by a user of the set of one or more wearable audio output devices as being output at the simulated spatial locations) (e.g., audio from each participant is output at a different simulated spatial location relative to the frame of reference from any other participant). In some embodiments, the electronic device receives a request to output, in the communication session, respective audio from the electronic device (e.g., different from voice audio from any respective participant in the communication), and in response to receiving the request to output the respective audio, the electronic device outputs, via the set of one or more wearable audio output devices, the respective audio. In some embodiments, the electronic device adjusts the respective audio so as to maintain the respective audio at a first respective simulated spatial location, relative to the frame of reference, that is different from (e.g., any of) the plurality of simulated spatial locations (e.g., the plurality of simulated spatial locations of the participants in the communication session) (e.g., FIG. 5R illustrates that background audio, distinct from the participants voices, may be played during a video call without interfering with the communication between the participants).

Outputting respective audio that is different from participant voice audio at a simulated spatial location that is different from the simulated spatial location of any participant voice audio helps the user identify and distinguish between different types of audio in the communication session and improves intelligibility. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the respective audio is output (742) via the communication session to (e.g., each of) the plurality of participants. An described above with reference to FIG. 5R, the other participants on the ongoing video call all hear the same underlying sound (e.g., the additional audio) associated with a simulated background audio location 552 (e.g., they can all hear the same song) and, from the perspective of each of the plurality of participants, the respective audio is output and adjusted in the communication session as perceived by the respective participant so as to maintain the respective audio at a respective simulated spatial location that is different from the simulated spatial location of any other participant.

Sharing respective audio other than participant voice audio with other (e.g., all) participants in the communication session provides additional options within the communication session without requiring separate coordination between the user and other participants. Reducing the number of inputs needed to perform an operation enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the electronic device receives (744) a request to reposition the respective audio (e.g., FIG. 5R shows a slide gesture 554 starting at icon 550, to move the simulated background audio location 552 to a different perceived location in the simulated space for the communication session). In some embodiments, in response to the electronic device receiving the request to reposition the respective audio, the electronic device outputs (744) the respective audio, and adjusts the respective audio so as to maintain the respective audio at a second respective simulated spatial location, relative to the frame of reference, that is different from (e.g., any of) the plurality of simulated spatial locations and different from the first respective simulated spatial location. For example, FIG. 5S shows that in response to the slide gesture in FIG. 5R, the icon 550 is moved, in example user interface 500, to a different location in the background. The perceived change in audio location is also illustrated by the audio location map 514 if FIG. 5R, which has been updated to show that the icon 550 has been moved to a new location, which in this example is behind the representation of the user's location 524.

Enabling respective audio that is different from participant voice audio to be repositioned to a different simulated spatial location that is also different from the simulated spatial location of any participant voice audio provides the user with control over the simulated spatial location of the respective audio while continuing to help the user identify and distinguish between different types of audio in the communication session with improved intelligibility. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, a distance between respective simulated spatial locations of any two participants of the plurality of participants in the communication session is less than a distance between a simulated spatial location of the respective audio and a simulated spatial location of any respective participant of the plurality of participants (746). For example, the audio location map 514 in FIG. 5R illustrates that the sound from simulated audio locations 516-522 the of participants will be aurally perceived as being significantly closer to a user of the device than the additional audio, which is output by earbuds 502 so as to be perceived as coming from simulated background audio location 552. In some embodiments, the maximum separation between simulated spatial locations of audio from different participants is less than a minimum separation between the simulated spatial location of the respective audio and the simulated spatial location of any participant.

Outputting respective audio that is different from participant voice audio at a simulated spatial location that appears further away from any participant in the communication session than any participant is from the simulated spatial location of any other participant in the communication session places the respective audio in the background of participant voice audio, which helps the user focus on participant voice audio over other types of audio such as the respective audio. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the electronic device detects (748) movement of the set of one or more wearable audio output devices relative to the frame of reference without detecting movement of the electronic device and without detecting input directed to the user interface (e.g., the top-down map in FIG. 5Q illustrates the device 100 remaining in the same location, and the user 501 rotating their head along with earbuds 502), and in response to the electronic device detecting the movement of the set of one or more wearable audio output devices relative to the frame of reference, the electronic device outputs respective audio from the plurality of participants in the communication session at respective simulated spatial locations (e.g., the first audio at the first simulated spatial location, the second audio at the second simulated spatial location, etc.), and adjusts the respective audio from the plurality of participants as the set of one or more wearable audio output devices moves relative to the frame of reference so as to maintain the respective audio at the respective simulated spatial locations relative to the frame of reference independently of a position of the set of one or more wearable audio output devices relative to the frame of reference. For example, as shown by the audio location map 415 in FIG. 5Q, the simulated audio locations of the participants remain fixed in space, at the same positions (e.g., as shown by the audio location map 514 of FIG. 5P) as before the user moved their head in the clockwise direction). This is accomplished by adjusting the first audio so as to maintain the first audio at the first simulated spatial location relative to the frame of reference even as the set of one or more wearable audio output devices moves relative to the frame of reference, and adjusting the second audio so as to maintain the second audio at the second simulated spatial location relative to the frame of reference even as the set of one or more wearable audio output devices moves relative to the frame of reference, etc.

Maintaining the respective simulated spatial locations of audio from participants in the communication session in response to movement of the set of one or more wearable audio output devices where no additional user input (e.g., via movement of the electronic device or other input directed to the user interface) is received provides the user with feedback that the different sources of audio in the communication session have fixed respective simulated spatial locations (e.g., in the absence of a manipulating user input) and that the communication session audio is being provided in a spatial audio output mode. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the electronic device is in communication with one or more cameras (e.g., that in some embodiments also serve as one or more input devices) in a physical environment (750). In some embodiments, the electronic device displays (750) in the user interface, via the one or more display devices, a representation of a portion of the physical environment that is in a field of view of the one or more cameras (e.g., the representation is updated as the one or more cameras move and the field of view of the one or more cameras changes to include different portions of the physical environment), and the respective dynamic visual representations of the plurality of participants in the communication session are displayed at respective locations in the representation of the field of view of the one or more cameras corresponding to respective physical locations in the physical environment. For example, FIG. 5T shows an alternative example user interface 554, which is an augmented reality user interface in which visual depictions of participants in a communication session are added to the user interface 554, at locations within a physical environment also depicted in the user interface 554). For example, the first location in the user interface, at which the first dynamic visual representation of the first participant is displayed, is a location in the representation of the field of view such that the first dynamic visual representation of the first participant appears to be positioned at a first physical location (e.g., at a first seating position at a table, as shown in FIG. 5T) in the physical environment within the field of view of the one or more cameras. In some embodiments, the first audio from the first participant is adjusted during output so as to be maintained at one or more spatial locations (e.g., such as the first simulated spatial location) such that the first audio sounds as though it is coming from the direction of the first dynamic visual representation of the first participant (e.g., from the direction of the first physical location). In another example, the second location in the user interface, at which the second dynamic visual representation of the second participant is displayed, is a location in the representation of the field of view such that the second dynamic visual representation of the second participant appears to be positioned at a different, second physical location (e.g., at a second seating position at the table, as shown in FIG. 5T) in the physical environment within the field of view of the one or more cameras. In some embodiments, the second audio from the second participant is adjusted during output so as to be maintained at one or more spatial locations (e.g., such as the second simulated spatial location) such that the second audio sounds as though it is coming from the direction of the second dynamic visual representation of the second participant (e.g., from the direction of the second physical location). In some embodiments, the input selecting the first dynamic visual representation of the first participant includes movement of the field of view of the one or more cameras (e.g., movement of the electronic device, in embodiments where the electronic device includes the one or more cameras) such that the field of view of the one or more cameras includes the first physical location in the physical environment corresponding to the first dynamic visual representation, and the representation of the first physical location, in the representation of the field of view of the one or more cameras as displayed in the user interface, is within the focal region of the user interface.

Displaying the dynamic visual representations of different participants at different locations in a representation of a physical environment in the field of view of one or more cameras that are in communication with the electronic device (e.g., an augmented reality environment that is based on the physical environment in the field of view of one or more cameras), where the respective displayed locations optionally correspond to the respective simulated spatial locations of the audio from the different participants, provides the user with visual feedback to help the user visualize the participants as being positioned in different locations in physical space, thus helping the user identify and distinguish between different participants and increasing intelligibility.

Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the electronic device displays (752) the first dynamic visual representation of the first participant with a first size, where the first size is determined in accordance with a distance between a current simulated spatial location of the first audio from the first participant and a spatial location of the set of one or more wearable audio output devices, and the electronic device displays the second dynamic visual representation of the second participant with a second size, wherein the second size is determined in accordance with a distance between a current simulated spatial location of the second audio from the second participant and the spatial location of the set of one or more wearable audio output devices. For example, FIG. 5O shows example user interface 500 in which the representation of a first user 506 is smaller than the representation of a second user 508, where the second user's simulated spatial location is closer to spatial location of the user and the user's set of one or more wearable audio output devices than the first user's simulated spatial location, as indicated by the audio location map 514 in FIG. 5O. In some embodiments, each dynamic visual representation of a respective participant is displayed with a respective size determined in accordance with (e.g., based on) the distance between the current simulated spatial location of the respective audio from the respective participant and the spatial location of the set of one or more wearable audio output devices. For example, a dynamic visual representation of a participant whose audio is output so as to sound closer to (e.g., the user wearing) the set of one or more wearable audio output devices is displayed with a larger size than a dynamic visual representation of a participant whose audio is output so as to sound further from the set of one or more wearable audio output devices.

Displaying the dynamic visual representations of different participants with respective sizes determined based on the respective perceived distances of the simulated spatial locations of the different participants from the user provides the user with visual feedback about the relative simulated spatial locations of the participants in the communication session, and correlates the visual feedback provided by the dynamic visual representation of a respective participant with the audio feedback provided by the simulated spatial location of the audio from the respective participant, thus helping the user identify and distinguish between different participants and increasing intelligibility. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, an electronic device that is in communication with one or more display devices, one or more input devices, and a set of one or more audio output devices, displays, via the one or more display devices, a user interface including respective dynamic visual representations of a plurality of participants in a communication session. This includes displaying, at a first location in the user interface, a first dynamic visual representation of a first participant and displaying, at a second location in the user interface, a second dynamic visual representation of a second participant different from the first participant. In some embodiments, the device outputs, via the set of one or more audio output devices, audio from the plurality of participants in the communication session, including: outputting first audio from the first participant, wherein the first audio is adjusted so as to maintain the first audio at a first simulated spatial location relative to a frame of reference of the communication session independently of a position of the set of one or more audio output devices relative to the frame of reference, wherein the first simulated spatial location corresponds to the first location of the first dynamic visual representation in the user interface The device also outputs second audio from the second participant, wherein the second audio is adjusted, so as to maintain the second audio at a second simulated spatial location relative to the frame of reference independently of a position of the set of one or more audio output devices relative to the frame of reference, wherein the second simulated spatial location corresponds to the second location of the second dynamic visual representation in the user interface.

Figure 9C:
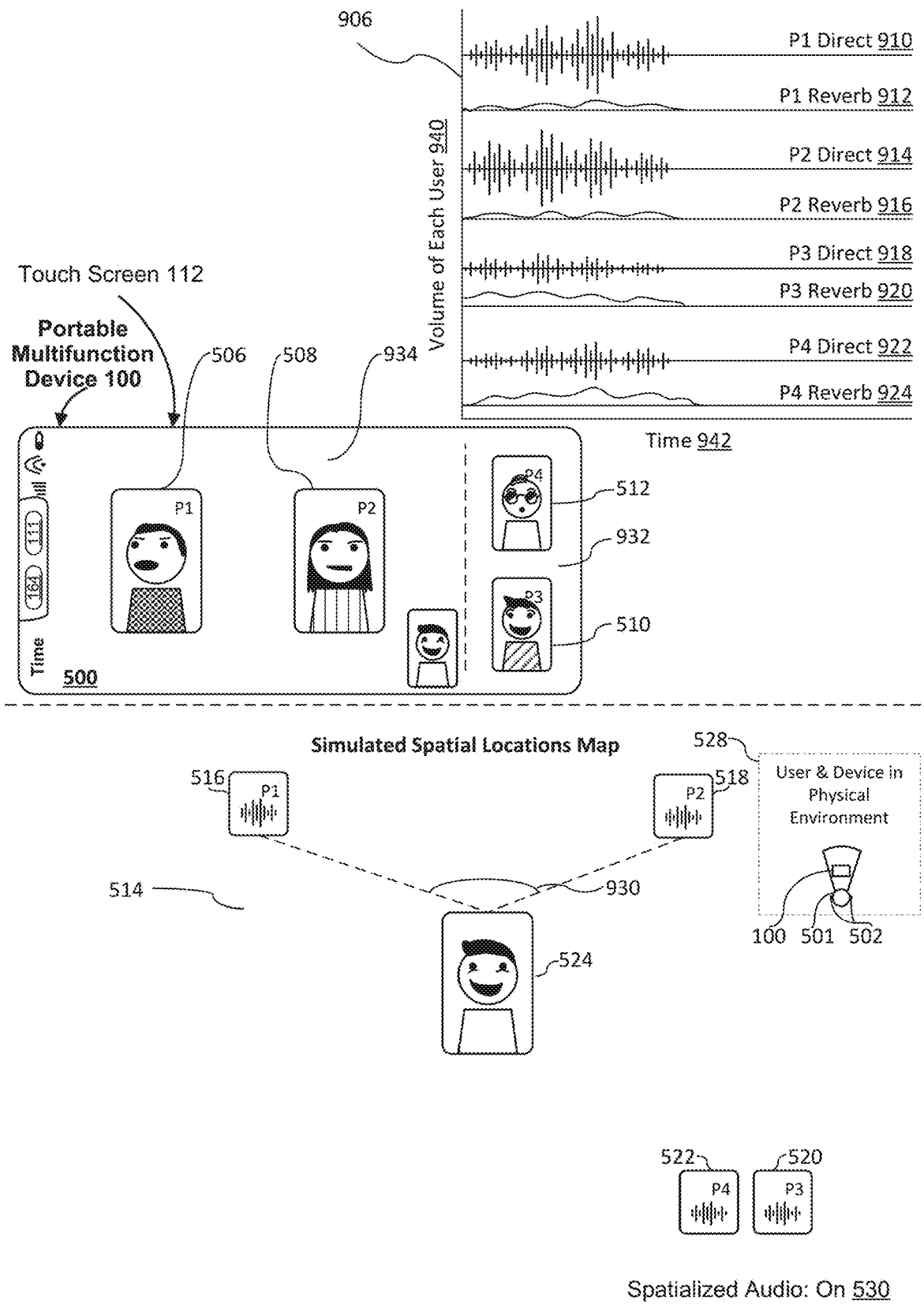

In some embodiments, the device displays (754) in the user interface (e.g., user interface 500 in FIG. 9A), in a roster region of the user interface (e.g., roster region 904 in FIG. 9A), separate from locations at which the first dynamic visual representation of the first participant and the second dynamic visual representation of the second participant are displayed (e.g., in-focus location 902 in FIG. 9A that includes video representation 506 of participant one and video representation 508 of participant two), dynamic visual representations of third and fourth participants in the communication session (e.g., video representation 510 of participant three, and video representation 512 of participant four), and the device outputs, via the set of one or more audio output devices (e.g., earbuds 502 in FIGS. 9A-9G), audio from the third and fourth participants. In some embodiments, the audio from participants (e.g., sometimes called roster participants for ease of explanation) whose video representations are displayed in a roster region is deemphasized (e.g., automatically deemphasized by the device 100) relative to audio output for participants (e.g., sometimes called in-focus participants for ease of explanation) whose video representations are displayed in an in-focus region of the user interface (e.g., audio from the third and fourth participants is deemphasized relative to audio output from the first and second participants (e.g., FIG. 9A illustrates multiple techniques employed to deemphasize audio)). For example, as shown by chart 906 of FIG. 9A, in some embodiments, audio from the roster participants is deemphasized relative to audio output from in-focus participants by generating (e.g., automatically generating by the device 100) the audio output from the roster participants with a higher ratio of reverberated audio (e.g., P3 Reverb 920 and P4 Reverb 924) to direct audio (e.g., P3 Direct 918 and P4 Direct 922) than the ratio of reverberated audio to direct audio for the in-focus participants, which aids in deemphasizing audio of participants whose representations are displayed in the roster region. The aforementioned ratio of reverberated audio to direct audio is sometimes called a ratio of reverberated to direct sound, and its inverse is sometimes called a ratio of direct audio to reverberated audio or a ratio of direct to reverberated sound.

In some embodiments, another method for deemphasizing audio from roster participants (whose representations are displayed in the roster region) includes producing (e.g., the device automatically producing) audio for those participants at more distant simulated spatial locations, relative to the location or simulated spatial location of the electronic device, than the simulated spatial locations of the in-focus participants (whose representations are displayed at an in-focus location in the user interface (e.g., simulated audio location 520 of participant three and simulated audio location 522 of participant four are at greater distances from the location or simulated audio location of the electronic device, compared to simulated audio location 516 of participant one and simulated audio location 518 of participant two).

In some embodiments, device 100 deemphasizes audio from roster participants relative to in-focus participants by reducing volume (e.g., the device automatically reducing volume) of roster participants (whose video representations are in a roster region, such as roster region 932) relative to audio output from the in-focus participants (e.g., the first participant and second participant, whose representations are displayed in one or more in-focus locations, such as in-focus location 902).

Deemphasizing audio (e.g., lowering volume, changing simulated audio physical positions, and/or changing reverberation characteristics) of participants whose visual representations are located in a roster region relative to participants outside of a roster region allows a user of the electronic device to more easily focus on participants who are speaking or producing audio above a minimum activity level without having to scan multiple video representations on the touch-screen to see who the user of the device should be directing their attention to. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the audio from roster participants (e.g., the third and fourth participants in FIG. 9A) whose video representations are shown in a roster region of the user interface 500 is deemphasized (e.g., automatically deemphasized by the device 100) relative to audio output from in-focus participants (e.g., the first and second participants in FIG. 9A) whose video representations are shown in an in-focus region of the user interface 500 by outputting (756) the audio from the participants whose video representations are shown in the roster region with a different (e.g., higher) ratio of reverberated to direct sound than a ratio of reverberated to direct sound for in-focus participants (e.g., first participant and second participant) whose video representations are shown in an in-focus region of the user interface 500. For example, Chart 906 in FIG. 9A illustrates that participant one and participant two (e.g., the participants that are in a non-deemphasized portrait in-focus location 902 (e.g., represented by video representation 506 of participant one and video representation 508 of participant two)) have a certain ratio of reverberated to direct sound, whereas participant three and participant four (e.g., the participants that are in a deemphasized vertical roster region 904 (e.g., represented by video representation 510 of participant three and video representation 512 of participant four)) have a different, higher ratio of reverberated to direct sound).

Changing the ratio of direct to reverberated sound for participants can either increase or decrease the aurally perceived distance the participant is from a user of the device. Increasing the ratio of reverberated to direct sound (or, equivalently, decreasing the ratio of direct to reverberated sound) for participants whose video representations are residing in a roster region helps draw attention away from their respective audio, and helps direct the focus of the user to audio from the participants (e.g., participants who are actively speaking or producing audio above a minimum activity level) not in a roster region. This change (e.g., increase) in the ratio of reverberated to direct sound for inactive participants helps the user of the electronic device to quickly focus on the video representations of active participants and the audio from those active participants. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the audio from the third and fourth participants (e.g., FIGS. 9A-9G illustrate participants (e.g., via their respective video representations) located within a roster region (e.g., horizontal roster region 904 in FIGS. 9A-9B and vertical roster region 932 in FIGS. 9C-9G)) is deemphasized relative to audio output from the first and second participants (e.g., FIGS. 9A-9G illustrate participants (e.g., via their respective video representations) located within an in-focus location (e.g., portrait in-focus location 902 in FIGS. 9A-9B and landscape in-focus location 934 in FIGS. 9C-9G) by outputting (758) the audio from the third and fourth participants at one or more simulated spatial locations that are further from a first spatial location, for the electronic device, than simulated spatial locations at which audio from the first participant and second participant are output. For example, FIGS. 9A-9G all illustrate a simulated spatial locations map 514 which shows one or more simulated spatial locations for participants whose video representations are located within a roster region. The participants whose video representations lie in the roster region are perceived by the user 501 of the device as being further away from the user than participants located at in-focus locations. In one example, FIG. 9A illustrates that audio emanating from simulated audio location 516 of participant one and simulated audio location 518 of participant two, which correspond to in-focus participants, is perceived by user 501 of the device 100 as aurally closer to the user 501 of the device 100 than the audio emanating from simulated audio location 520 of participant three and simulated audio location 522 of participant four, which correspond to roster region participants.

Changing simulated spatial locations for participants can either increase or decrease the aurally perceived distance of the participant from a user of the device. Simulating participants' audio at farther distances in a simulated physical environment helps draw attention away from their respective audio, and helps the user of the electronic device focus their attention on the participants (e.g., participants who are speaking or producing audio above a minimum activity level) not in a roster region. This allows the user of the electronic device to quickly focus on the audio from and video representations of active participants and avoids the undesirable effect of participants sounding as though they are all speaking over each other from a single position in simulated space. Providing improved feedback to the user of the electronic device enhances the operability of the electronic device and makes the user-device interface more efficient (e.g., by helping the user to achieve an intended outcome and reducing user mistakes when operating/interacting with the devices), which, additionally, reduces power usage and improves battery life of the electronic device by enabling the user to use the electronic device more quickly and efficiently.

In some embodiments, the audio (e.g., audio output by the electronic device) from the third and fourth participants is deemphasized relative to audio (e.g., audio output by the electronic device) from the first and second participants by changing (760) (e.g., decreasing or increasing) volume of the audio output from the third and fourth participants relative to volume of the audio output from the first participant and second participant. For example, FIG. 9A illustrates in chart 906 that volume of the audio from participants in the roster region 904 (e.g., participants three and four represented by video representation 510 of participant three and video representation 512 of participant four, respectively) is reduced in comparison to volume of the audio from participants in the in-focus location 902 (e.g., participants one and two represented by video representation 506 of participant one and video representation 508 of participant two, respectively).

Changing volume of the audio for some participants in a communication session can either increase or decrease the aurally perceived distance of those participants from a user of the device. Lowering the volume of participants' audio relative to other participants helps draw attention away from their respective audio, and helps direct the focus of the user of the device towards the participants (e.g., participants who are speaking or producing audio above a minimum activity level) not in a roster region. This allows for the user of the device to quickly focus on the audio from and video representations of active participants. Providing improved feedback to the user enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

Figure 9D:
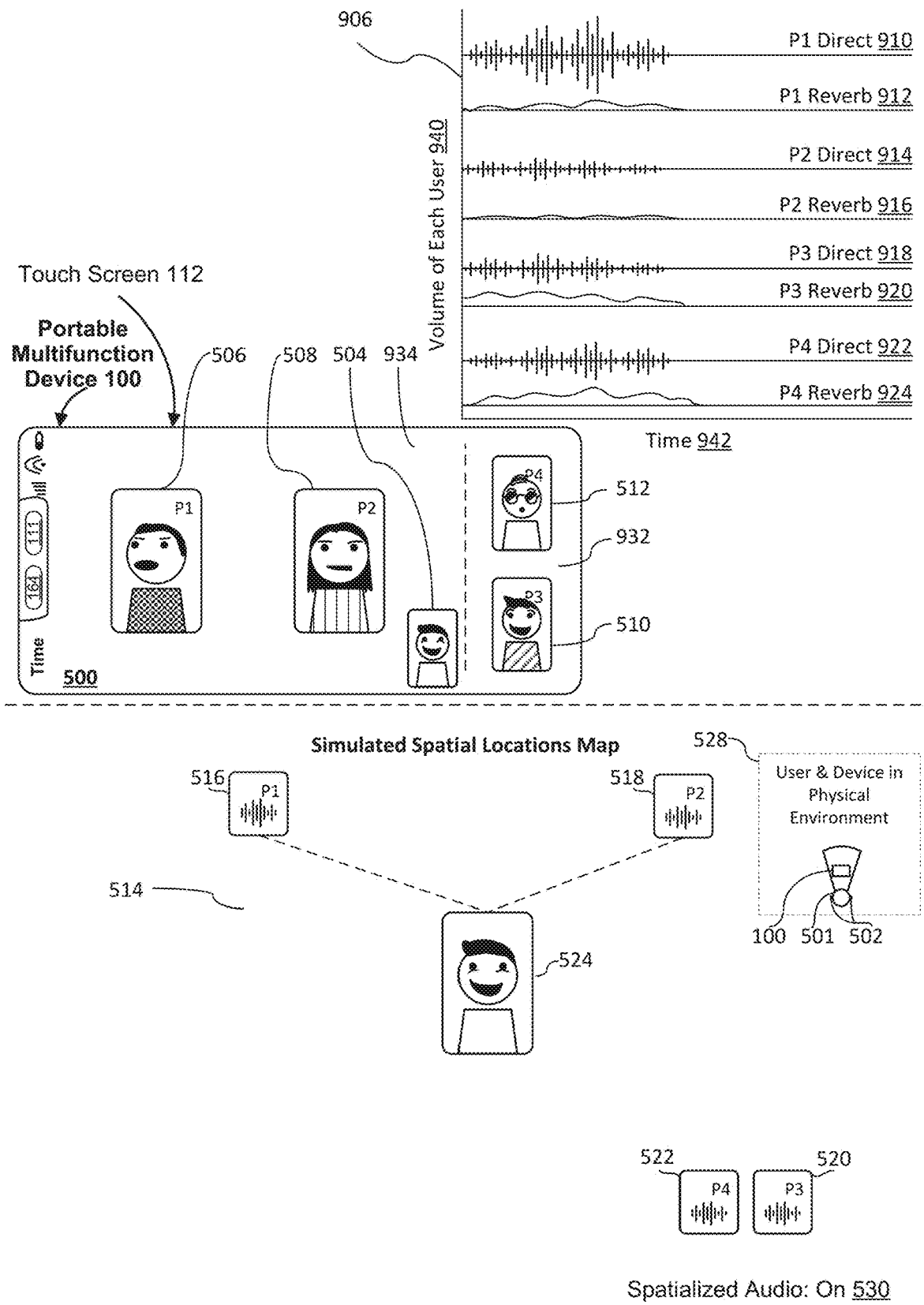
Figure 9E:
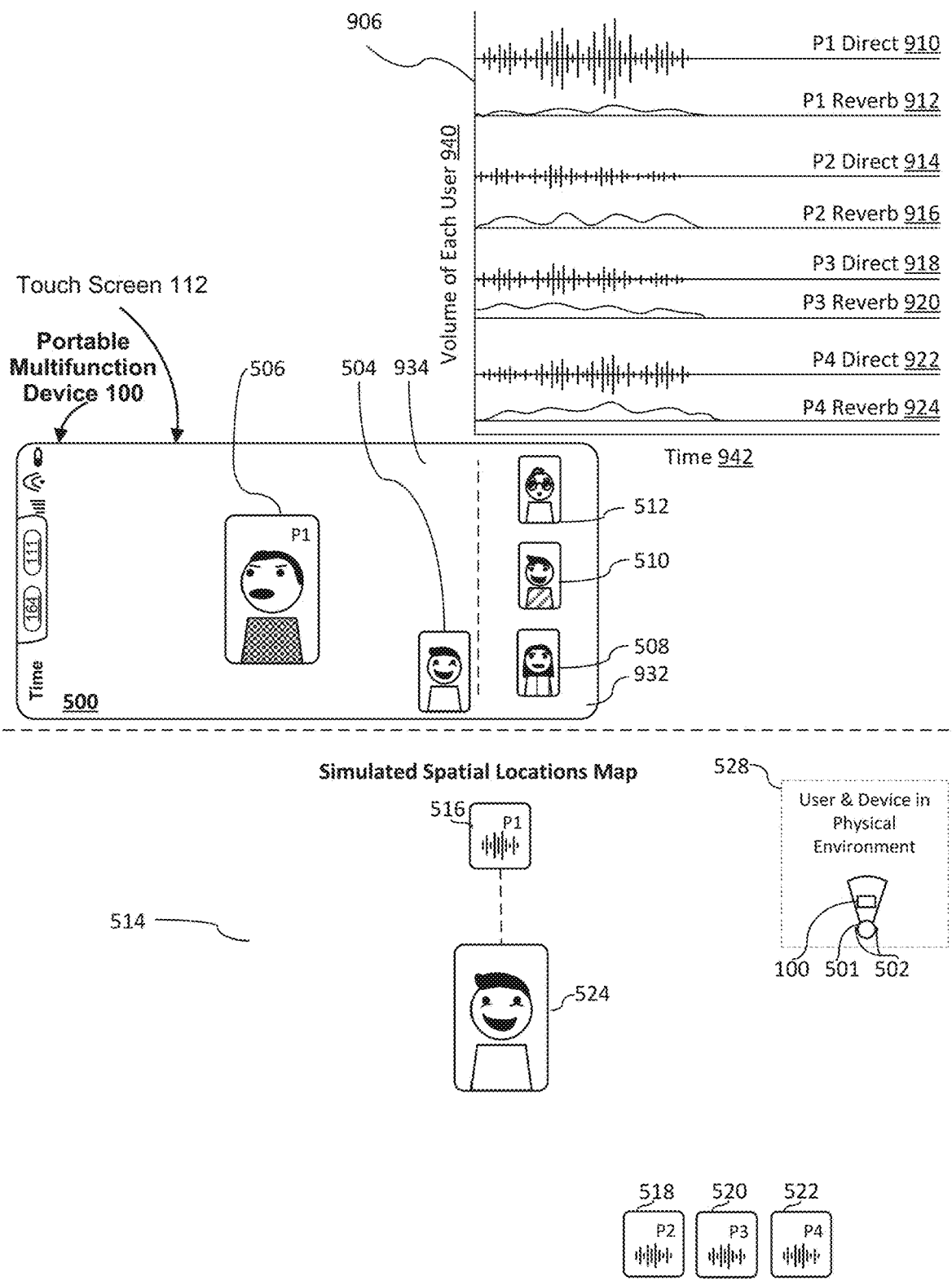
Figure 9F:
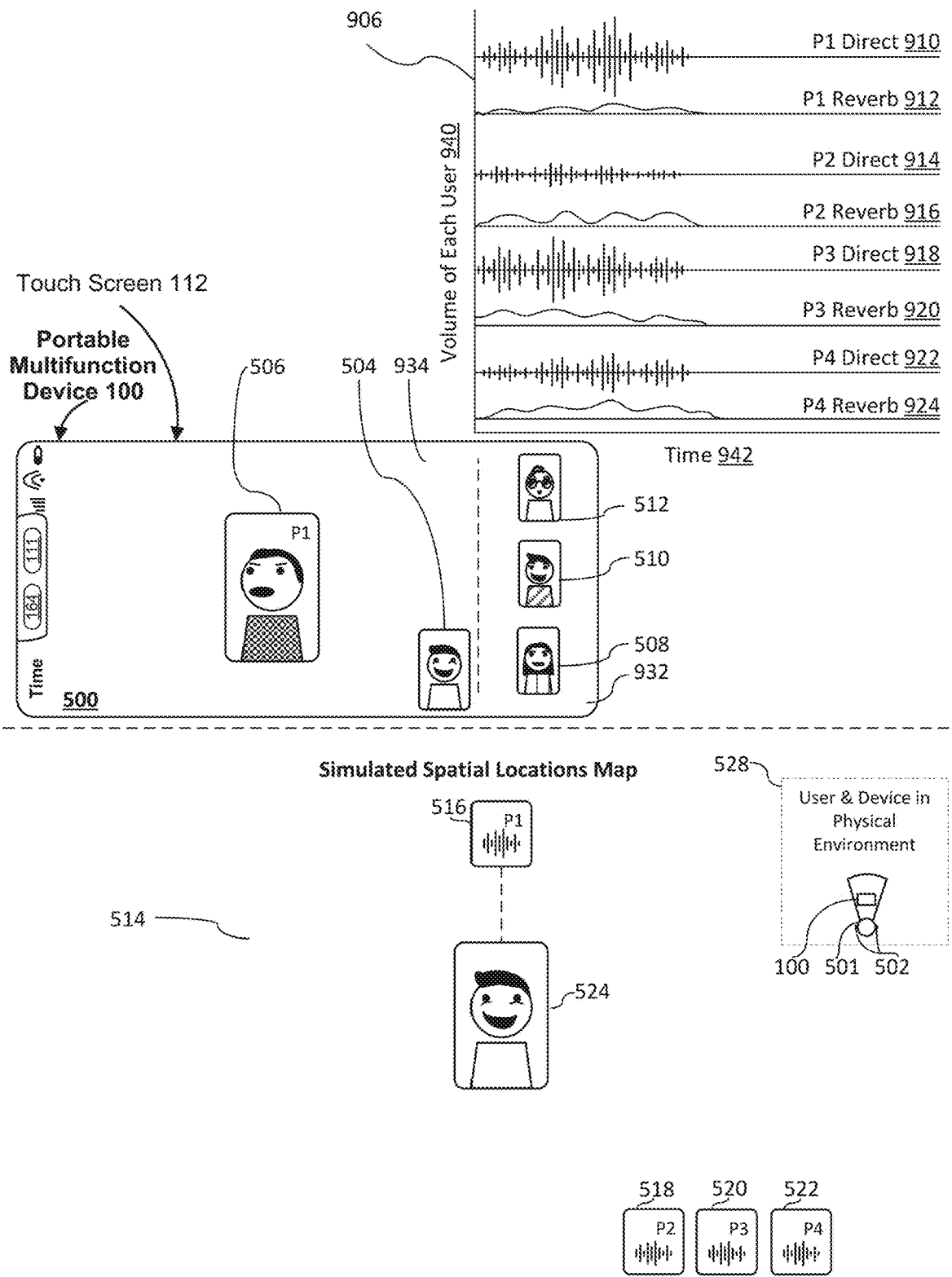
Figure 9G:
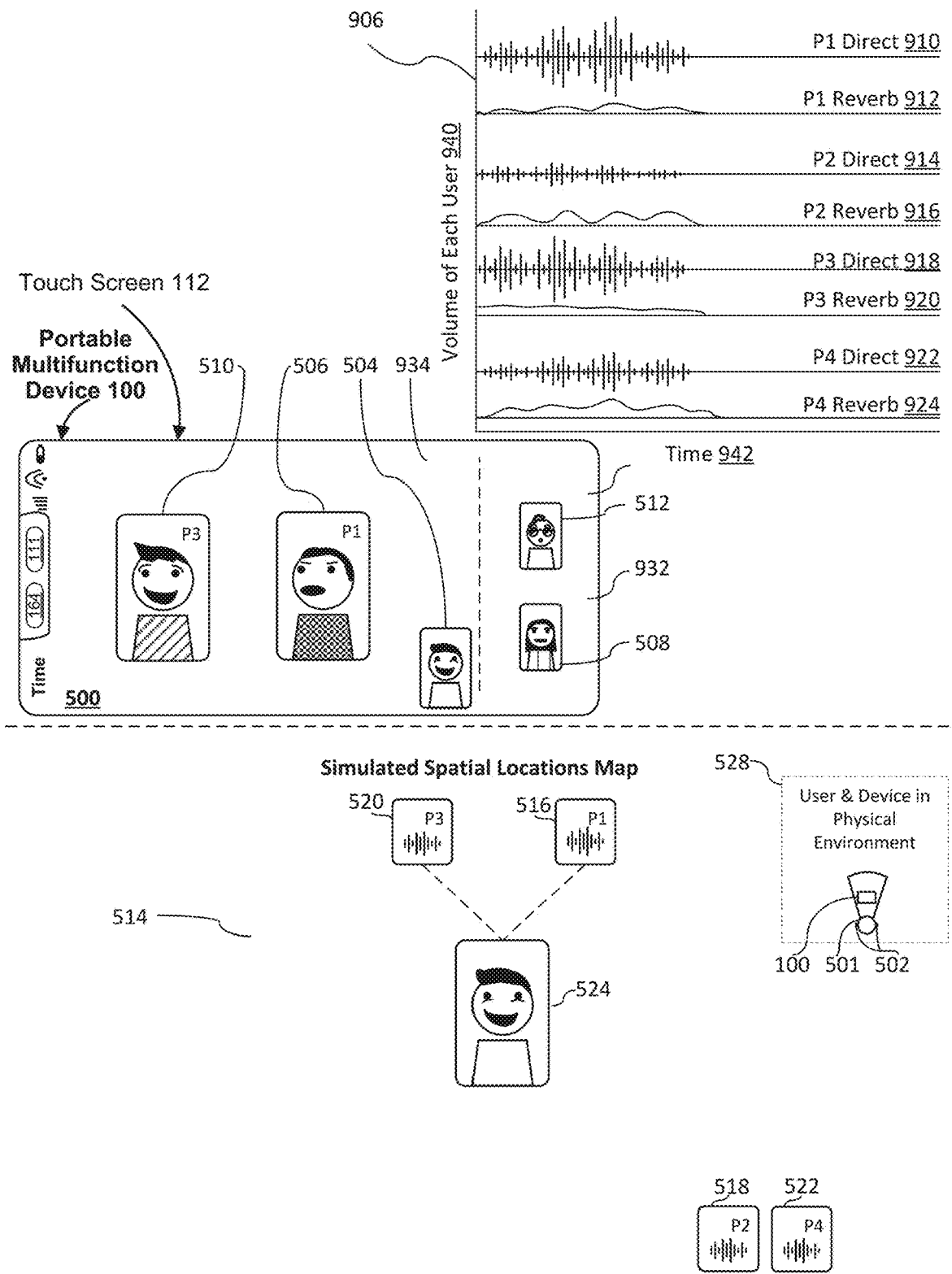

In some embodiments, the device identifies (762) certain participants (e.g., the third and fourth participants in the example shown in FIG. 9A) as roster participants, in accordance with predefined characteristics (e.g., voice activity level, as indicated by chart 906 of FIGS. 9A-9G) of the audio from those participants meeting predefined roster criteria, and in accordance with the identification of those participants (e.g., the third and fourth participants in FIG. 9A) as roster participants, displays the dynamic visual representations of the identified roster participants in the roster region of the user interface and deemphasizes the audio output, via the set of one or more audio output devices, from the identified roster participants, relative to audio output from other participants (e.g., the first and second participants, or more generally, participants whose audio has predefined characteristics that do not meet the predefined roster criteria). For example, FIGS. 9D-9E show that when characteristics of the audio from participant two meet the predefined roster criteria (e.g., and no longer meet predefined characteristics for active participants), the video representation 508 of participant two is moved to roster region 932. FIGS. 9F-9G show that when audio from participant three no longer meets the predefined roster criteria (e.g., meets or exceeds predefined audio characteristics for active participants), video representation 510 of participant three is moved to an in-focus region.

Automatically identifying roster participants based on audio characteristics of those participants helps a user of the device to quickly discern which video representation and corresponding audio their attention should be drawn to (e.g., participants who are speaking or producing audio above a minimum activity level). Performing an operation (e.g., automatically) when a set of conditions has been met without requiring further user input enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the device determines (764) one or more metrics of overlapping audio (e.g., people talking simultaneously) from two or more participants in the communication session (e.g., chart 906 in FIG. 9B illustrates that participant one and participant two are speaking simultaneously, as indicated by the volume of audio for "P1 Direct 910" and "P2 Direct 914"), and in accordance with a determination that the one or more metrics of overlapping audio meet predefined overlap criteria, positions (e.g., the device 100 automatically positions) simulated spatial locations of audio from the plurality of participants at wider angles, relative to each other, than default angles at which the simulated spatial locations of audio from the plurality of participants are positioned in accordance with a determination that the one or more metrics of overlapping audio do not meet the predefined overlap criteria. For example, FIG. 9B illustrates, in the simulated spatial locations map 514, a greater distance in an horizontal x-axis direction between simulated audio location 516 of participant one and simulated audio location 518 of participant two in comparison to the simulated locations of participants one and two shown in FIG. 9A. This change in positioning is also represented by the change in angle 926 in FIG. 9A to the larger angle 928 in FIG. 9B).

Changing simulated audio angles (e.g., locations) of participants when the participants are concurrently producing audio (e.g., speaking) removes the effect of having the participants audio overlap (e.g., removes the undesirable effect of participants sounding as they are speaking over each other from the same point in a space). This, in turn, improves the user's comprehension of the active participants and requires participants to not have to pause and repeat what they have said. Providing improved feedback to the user enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the first audio from the first participant is output at the first simulated spatial location and the second audio from the second participant is output at the second simulated spatial location while the one or more display devices of the electronic device has a first orientation relative to a physical environment in which the electronic device is located (e.g., FIG. 9B shows the portable electronic device 100 in a portrait orientation and has a portrait in-focus region 902 and a horizontal roster region 904). In some embodiments, the device detects (766) a change in the orientation of the electronic device from the first orientation to a second orientation relative to the physical environment in which the electronic device is located (e.g., FIG. 9C illustrates that portable multifunction device 100 has been placed in a landscape orientation). In some embodiments, in response to detecting the change in the orientation of the electronic device from the first orientation to the second orientation relative to the physical environment in which the electronic device is located, the device changes (e.g., automatically changes) at least one of a simulated spatial location at which the first audio from the first participant is output and a simulated spatial location at which the second audio from the second participant is output so as to change a distance between the simulated spatial locations at which the first audio from the first participant is output and the simulated spatial location at which the second audio from the second participant is output. For example, FIG. 9C illustrates, in the simulated spatial locations map 514, there is a greater distance in a horizontal x-axis direction between simulated audio location 516 of participant one and simulated audio location 518 of participant two in comparison to the simulated locations of participants one and two shown in FIG. 9B. This change in positioning is also represented by the change in angle 928 in FIG. 9B to the larger angle 930 in FIG. 9C.

Changing simulated spatial locations for participants in response to a change in orientation of the electronic device (e.g., rotating the device) aids in tying the displayed user interface to the simulated spatial locations, which allows for the user to better associate the video representation in the displayed user interface with the corresponding audio. In other words, as the displayed user interface changes in response to a change in orientation of the electronic device, the simulated spatial locations of each participant will change to better match the displayed user interface. Performing an operation (e.g., automatically) when a set of conditions has been met without requiring further user input enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, in response to detecting the change in the orientation of the electronic device from the first orientation to a second orientation relative to the physical environment in which the electronic device is located, the device changes (768) (e.g., automatically changes) at least one of a location of the first dynamic visual representation of the first participant in the user interface and a location of the second dynamic visual representation of the second participant in the user interface so as to change a distance between the locations of the first dynamic visual representation of the first participant and the second dynamic visual representation of the second participant in the user interface (e.g., FIG. 9C illustrates that video representation 506 of participant one and video representation 508 of participant two become visually more separated in the displayed user interface, in comparison to FIG. 9B, in response to the change in orientation of the device). In some embodiments, changes in the spatial audio and displayed user interface are coordinated: the change in distance between the simulated spatial locations at which the first audio from the first participant and the second audio from the second participant is output corresponds to the change in distance between the locations of the first dynamic visual representation of the first participant and the second dynamic visual representation of the second participant in the displayed user interface.

Changing (e.g., automatically changing), in a user interface, the distance between video representations of participants in response to a change in orientation of the electronic device aids in tying the displayed user interface to the simulated spatial locations of the participants, which allows for the user to better associate the video representations, in the user interface, of the participants with the corresponding audio from those participants. In other words, as the displayed user interface changes in response to a change in orientation of the electronic device, the locations of video representations of participants are updated to better match the changed simulated spatial locations for audio output from those participants. Performing an operation (e.g., automatically) when a set of conditions has been met without requiring further user input enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

It should be understood that the particular order in which the operations in FIGS. 7A-7H have been described is merely an example and is not intended to indicate that the described order is the only order in which the operations could be performed. One of ordinary skill in the art would recognize various ways to reorder the operations described herein. Additionally, it should be noted that details of other processes described herein with respect to the other methods described herein (e.g., methods 800, 1200, and 1300) are also applicable in an analogous manner to method 700 described above with respect to FIGS. 7A-7H. For example, the user interfaces, interactions, and animations described above with reference to method 700 optionally have one or more of the characteristics of the user interfaces, interactions, and animations described herein with reference to the other methods described herein (e.g., methods 800, 1200, and 1300).

FIGS. 8A-8B are flow diagrams illustrating method 800 of at least two nearby users initiating and having a communication session via wearable audio output devices, where the users hear simulated spatial audio to indicate direction and distance of other users in the communication session in accordance with some embodiments. Method 800 is performed at first set of one or more wearable audio output devices (e.g., a set of earbuds, earphones, or headphones (e.g., one or more wearable audio output devices 301, FIG. 3B (e.g., earbuds 502 in FIGS. 6A-6G))), associated with a first user, that is in communication with a second set of one or more wearable audio output devices, associated with a second user (e.g., one or more wearable audio output devices 301, FIG. 3B (e.g., earbuds 602 in FIGS. 6A-6G))) (optionally via one or more intermediary electronic devices, such as via an electronic device that is in communication with both the first and second sets of one or more wearable audio output devices, or via a first electronic device that is in communication with the first set of one or more wearable audio output devices and that is also in communication with a second electronic device that is in turn in communication with the second set of one or more wearable audio output devices). Some operations in method 700 are, optionally, combined and/or the order of some operations is, optionally, changed.

As described below, method 800 provides an improved user interface for users to engage in conversation using wearable audio output devices. Audio (e.g., speech) is captured by a set of wearable audio output devices worn by one user and transmitted to the set of wearable audio output devices worn by the other user, and vice versa. The audio received by a set of wearable audio output devices is output, using spatial audio, so as to be perceived as coming from a simulated spatial location based on a position of the transmitting set of wearable audio output devices relative to the position of the receiving set of wearable audio output devices. In addition, a different output property, other than simulated spatial location, of audio received by a set of wearable audio output devices is optionally adjusted based on the relative distance between the two sets of wearable audio output devices. This provides the user wearing a set of wearable audio output devices with feedback as to both the direction toward and the distance from the other user wearing the other set of wearable audio output devices, as well as in some cases feedback indicating that the conversation is being augmented or assisted by the use of the wearable audio output devices rather than including only unaided audio. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

While the first set of one or more wearable audio output devices and the second set of one or more wearable audio output devices are engaged in an audio communication session (e.g., FIGS. 6A-6D show a couple of connection methods for establishing a communication session between earbuds), the first set of one or more wearable audio output devices output (802), respective audio from the second set of one or more wearable audio output devices. For example, FIG. 6E shows a first user 634 wearing earbuds 502 that are outputting audio from a second user 636 wearing earbuds 602, including, as the first set of one or more wearable audio output devices is moved relative to the second set of one or more wearable audio output devices.

Further, as the first set of one or more wearable audio output devices is moved relative to the second set of one or more wearable audio output devices, the first set of one or more wearable audio output devices adjusts (804) the respective audio so as to position the respective audio at a simulated spatial location relative to the first set of one or more wearable audio output devices that is determined based on a respective position of the second set of one or more wearable audio output devices relative to the first set of one or more wearable audio output devices. For example, FIGS. 6E-6G shows the position of the second user 636 wearing earbuds 602 changing, and the changes in distance result in an adjustment of the respective audio. The graph 644 in FIGS. 6E-6G illustrate an example of how the volume of the respective audio is changed as a result of a change in the distance between the users (e.g., due to a change in position of either user). This change in position is also indicated in mini-map 642 in FIGS. 6E-6G, which illustrates audio waves (e.g., waves 660 and waves 662) emanating from a location around each of the user's positions (e.g., first user's position 638 and second user's position 640). For example, as the second set of one or more wearable audio output devices moves relative to the first set of one or more wearable audio output devices, the audio from the second set of one or more wearable audio output devices is output at different simulated spatial locations to follow the movement of the second set of one or more wearable audio output devices, to indicate the direction of the second set of one or more wearable audio output devices relative to the first set of one or more wearable audio output devices. In some embodiments, the simulated spatial location of the respective audio is continually adjusted as the second set of one or more wearable audio output devices moves relative to the first set of one or more wearable audio output devices.

The first set of one or more wearable audio output devices also adjusts (806) an output property other than a simulated spatial location of the respective audio based on a distance of the second set of one or more wearable audio output devices from the first set of one or more wearable audio output devices. For example, as discussed above with respect to FIG. 6G, in addition to adjusting volume based on distance, the first set of one or more wearable audio output devices may present to the first user adjusted amounts of reverberation based on the distance between the users, and/or apply a high pass filter or a low pass filter to reduce high or low frequency sounds, where the frequency cutoff changes based on the distance between the users, to provide the first user with audio clues of the distance between the users. In some embodiments, the output property of the respective audio is continually adjusted as the distance between the second set of one or more wearable audio output devices and the first set of one or more wearable audio output devices changes. In some embodiments, the output property is volume or amount of reverberation. In some embodiments, one or more output properties, other than simulated spatial location, of the respective audio are adjusted based on distance (e.g., any combination of output properties such as volume and/or amount of reverberation, frequency response (e.g., via application of a frequency filter), etc.). For example, a high pass filter may be applied to reduce lower frequency sound; in another example, a low pass filter is applied to reduce higher frequency sound. Optionally, the filter cutoff frequency may be varied based on the distance between the first set of wearable audio output devices and the second set of wearable audio output devices.

In some embodiments, adjusting the output property of the respective audio based on the distance includes adjusting (808) a volume (e.g., sound level or loudness) of the respective audio (optionally in addition to adjusting a non-volume audio output property). For example, the graph 644 shown in FIGS. 6E-6G include a vertical axis 648 (labeled "Y-Axis: Volume (audio intensity)," which represent how the volume of the respective audio (from the second user) is adjusted based on the distance between the users, or between their respective devices (e.g., earbuds 602 and earbuds 502).

Adjusting volume of received conversation audio based on a distance between the receiving set of wearable audio output devices and the other (e.g., transmitting) set of wearable audio output devices provides the user wearing the receiving set of wearable audio output devices with feedback as to the distance to the other user (e.g., by reducing volume in accordance with the distance to the other user increasing and/or by increasing volume in accordance with the distance to the other user decreasing). Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, as the first set of one or more wearable audio output devices is moved relative to the second set of one or more wearable audio output devices, the first set of one or more wearable audio output devices detects (810) a change in distance between the first set of one or more wearable audio output devices and the second set of one or more wearable audio output devices. For example, the graph 644 shown in FIGS. 6E-6G show the position of the current distance line 658 along horizontal axis 646, which indicates the distance between the users or their devices, and also indicates the combined volume of the audio from the user of earbuds 602, that the user 501 of earbuds 502 hears. In some embodiments, the change in distance is associated with a first amount of change in volume (e.g., in percentage, dB, or other measure of volume change) of unaided voice audio (e.g., speech) audible at a location of the first set of one or more wearable audio output devices from a location of the second set of one or more wearable audio output devices. For example, the graph 644 shown in FIGS. 6E-6G show a first volume of the audio portion shown below curve 650 (labeled as "Normal Sound without Augmentation"), which represents the unaided audio volume of a source of sound (e.g., a voice) decreasing in a normal environment according to the inverse square law. The change in volume of the unaided voice audio corresponds to a change in the amount of audio, from the location of the second set of one or more wearable audio output devices, that can be heard by someone at the location of the first set of one or more wearable audio output devices, such as the amount of speech that can be heard from a person at the location of the second set of one or more wearable audio output devices, for example with respect to speech that is not actively amplified using electronic, mechanical, or other means beyond a natural speaking volume and as perceived by a user with average hearing without assistance via electronic, mechanical, or other means.

In some embodiments, adjusting the output property of the respective audio based on the distance includes, in response to detecting the change in distance, changing the volume of the respective audio (e.g., which is output via the first set of one or more wearable audio output devices) by a second amount that is different from the first amount (e.g., in percentage, dB, or other measure of volume change). For example, the graph 644 in FIGS. 6E-6G includes a second portion (labeled as "Augmented added audio") located linear line 652 and above curve 650, which represents additional audio volume of the source of sound, output by earbuds to mitigate the drop off in sound that normally occurs with natural sound (e.g., unaided audio) as the distance between the two users increases. Thus, the augmented audio volume decreases at a slower rate than unaided audio volume.

For example, in accordance with an increase in distance between the first and second sets of wearable audio output devices, unaided audio from the location of the second set of one or more wearable audio output devices decreases in volume by a first amount as perceived by a user at the location of the first set of wearable audio output devices. More specifically, the decrease in volume by the first amount refers to the volume as perceived by (the ears of) the wearer of the first set of wearable audio output devices, taking into account that the first set of wearable audio output devices may be worn at a fixed, non-zero distance from the wearer's ears (e.g., in the case of on-ear or over-ear headphones). In this example, in accordance with the same increase in distance between the first and second sets of wearable audio output devices, audio output via the first set of wearable audio output devices decreases in volume by less than the first amount (e.g., with respect to the volume as perceived by (the ears of) the wearer of the first set of wearable audio output devices, such that the audio from the location of the second set of wearable audio output devices is heard louder via the first set of wearable audio output devices by the wearer of the first set of wearable audio output devices than without the first set of wearable audio output devices).

In another example, in accordance with a decrease in distance (e.g., from a longer distance to a shorter distance) between the first and second sets of wearable audio output devices, unaided audio from the location of the second set increases in volume by a first amount as perceived at the location of the first set. In this example, in accordance with the same decrease in distance between the first and second sets of wearable audio output devices, audio output via the first set of one or more wearable audio output devices is increased in volume by less than the first amount (e.g., while the first and second sets of wearable audio output devices are at the longer distance from each other, the audio from the location of the second set of wearable audio output devices is already heard louder via the first set of wearable audio output devices than without the first set of wearable audio output devices, and thus the audio output via the first set of wearable audio output devices need not be increased by the same amount as the first and second sets of wearable audio output devices move closer). In some embodiments, changes in output volume by a set of wearable audio output devices that is worn at a fixed distance (e.g., or with components worn at respective fixed distances) from a user's ears include adjustments that take into account the distance to the user's ears when adjusting audio output properties such as volume, so that audio output property changes in accordance with the methods described herein are performed with respect to the audio as heard by the user's ears.

Adjusting volume of received conversation audio by a different amount than the natural amount of volume change of unaided voice audio corresponding to a respective change in distance between the receiving set of wearable audio output devices and the other set of wearable audio output devices provides the user wearing the receiving set of wearable audio output devices with feedback as to the distance from the other user (e.g., by reducing volume in accordance with the distance from the other user increasing, and by increasing volume in accordance with the distance from the other user decreasing) while in some cases augmenting the conversation audio to improve audibility and intelligibility. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the first set of one or more wearable audio output devices adjusts (812) the volume of the respective audio without decreasing the volume of the respective audio below a respective (e.g., minimum) volume threshold (e.g., in FIGS. 6E-6G, minimum volume is indicated by horizontal line 654 (indicated by "Minimum Volume Threshold"), which indicates that the total audio volume may stop decreasing (e.g., remain constant) so that the user can continue to hear the other user). For example, in accordance with an increase in distance between the first and second sets of wearable audio output devices, unaided audio from the location of the second set decreases in volume by a first amount as perceived at the location of the first set of wearable audio output devices. In this example, in accordance with the same increase in distance between the first and second sets of wearable audio output devices, audio output via the first set is decreased in volume by a second amount, corresponding to the first amount (e.g., the second amount being less than the first amount in accordance with embodiments described with respect to operation 810), unless decreasing the audio output via the first set of wearable audio output devices by the second amount would decrease the audio volume to below the respective (e.g., minimum) audio threshold, in which case the audio output is decreased to the respective audio threshold (and, optionally, no further).

Adjusting volume of received conversation audio based on the distance between the receiving set of wearable audio output devices and the other set of wearable audio output devices without decreasing the volume below a threshold volume (e.g., even though a distance between the users may be above a threshold distance at which unaided voice audio from one user (e.g., using a natural speaking volume) would not be audible to the other user) enables the users to continue to hear each other and communicate without requiring separate coordination between the users to continue communicating, consistent with the conversation being augmented or assisted by the use of the wearable audio output devices. Performing an operation (e.g., automatically) when a set of conditions has been met without requiring further user input enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, adjusting (814) the output property of the respective audio based on the distance between the receiving set of wearable audio output devices and the other set of wearable audio output devices includes changing (e.g., increasing or decreasing) an amount of reverberation of the respective audio. For example, as discussed above with respect to FIG. 6G, in addition to adjusting volume based on distance, one or both earbuds in the receiving set of wearable audio output devices may present to the receiving user adjusted amounts of reverberation based on the distance between the users, and/or apply a high pass filter or a low pass filter to reduce high or low frequency sounds, where the frequency cutoff changes based on the distance between the users, to provide the receiving user with audio clues of the distance between the users. It is noted that if both sets of wearable audio output devices have similar capabilities, the users of both sets of wearable audio output devices, when receiving audio from the other user, will experience the above-described corresponding changes in volume and other output properties of the received audio as output by their respective set of wearable audio output devices.

Adjusting reverberation of received conversation audio based on a distance between the receiving set of wearable audio output devices and the other set of wearable audio output devices provides the user wearing the receiving set of wearable audio output devices with feedback as to the distance from the other user (e.g., by increasing reverberation to indicate a greater distance from the other user and/or by decreasing reverberation to indicate a lesser distance from the other user, or vice versa) as well as feedback indicating that the conversation is being augmented or assisted by the use of the wearable audio output devices rather than including only unaided audio. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the first set of one or more wearable audio output devices, in accordance with a determination that the second set of one or more wearable audio output devices is within a threshold distance from the first set of one or more wearable audio output devices, outputs (816) one or more pass-through audio components selected so as to increase audio pass-through of ambient sound from a physical environment surrounding the first set of one or more wearable audio output devices (e.g., captured via the first set of one or more wearable audio output devices, or more specifically via one or more microphones of the first set of one or more wearable audio output devices). For example, the Graph 644 in FIGS. 6E-6G includes a line 656 representing a minimum threshold distance (labeled "Enable Augmented Audio Threshold"). Additionally, as described above with reference to FIG. 6E, when the distance between the two users, or between their respective sets of wearable audio output devices is less than the minimum threshold distance, the first set of one or more wearable audio output devices may operate in a pass-through mode, which allows users to hear their surrounding audio without having to remove their noise cancelling wearable audio output devices.

In some embodiments, when the first and second sets of one or more wearable audio output devices are within the threshold distance of each other, the first set of one or more wearable audio output devices outputs, as part of the audio communication session, one or more pass-through audio components selected to as to increase audio pass-through of ambient sound captured via the first set of one or more wearable audio output devices from a physical environment surrounding the first set of one or more wearable audio output devices, rather than outputting audio based on audio information that is received from the second set of one or more wearable audio output devices and that corresponds to audio captured via the second set of one or more wearable audio output devices. In some embodiments, when the first and second sets of one or more wearable audio output devices are beyond the threshold distance from each other, the first set of one or more wearable audio output devices outputs audio that is based (e.g., primarily or entirely) on sound captured via the second set of one or more wearable audio output devices, optionally without (e.g., any) pass-through audio components based on ambient sound captured via the first set of one or more wearable audio output devices.

In some embodiments, the adjusting of the spatial location and/or output property (other than simulated spatial location) of the respective audio is performed in accordance with a determination that a distance between the first set of one or more wearable audio output devices and the second set of one or more wearable audio output devices is greater than the threshold distance. In some embodiments, the threshold distance is a distance beyond which unaided speech (e.g., speech that is not actively amplified using electronic, mechanical, or other means beyond a natural speaking volume) from the second user wearing the second set of one or more wearable audio output devices is not audible to the first user (e.g., an average user with average hearing) wearing the first set of one or more wearable audio output devices (e.g., the first and second users are out of earshot of each other). In some embodiments, while the second set of one or more wearable audio output devices is beyond the threshold distance from the first set of one or more wearable audio output devices, the adjusting of the spatial location and/or output property of the respective audio is performed without regard to whether unaided speech (e.g., speech that is not actively amplified using electronic, mechanical, or other means beyond a natural speaking volume) from the second user wearing the second set of one or more wearable audio output devices is audible to the first user (e.g., an average user with average hearing) wearing the first set of one or more wearable audio output devices.

Including (e.g., automatically including) pass-through audio components in conversation audio provided by a set of wearable audio output devices while the set of wearable audio output devices is within a threshold distance of the other set of wearable audio output devices provides the user with feedback indicating that the other participant in the conversation is nearby (e.g., within earshot) and provides a more natural audio experience for the conversation without requiring the user to manually change the audio output mode of the set of wearable audio output devices. Providing improved feedback to the user and performing an operation (e.g., automatically) when a set of conditions has been met without requiring further user input enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the first set of one or more wearable audio output devices, prior to the first set of one or more wearable audio output devices and the second set of one or more wearable audio output devices being engaged in an audio communication session: receives (818) a request to establish communication between the first set of one or more wearable audio output devices and the second set of one or more wearable audio output devices (e.g., to pair the first set of one or more wearable audio output devices and the second set of one or more wearable audio output devices). For example, FIGS. 6A-6D show examples of an initial pairing process for establishing an audio communication session between first and second sets of wearable audio output devices. In some embodiments, the pairing request is transmitted from one set of wearable audio output devices, or from a peripheral associated with the set of wearable audio output devices (e.g., a case for the set of wearable audio output devices, optionally while the set of wearable audio output devices is coupled to the case), to the other set, or to a peripheral associated with the other set of wearable audio output devices (e.g., a case for the other set of wearable audio output devices, optionally while the other set of wearable audio output devices is coupled to the case). Optionally, the pairing request is transmitted via one or more intermediary electronic devices, such as via an electronic device that is in communication with both the first and second sets of one or more wearable audio output devices, or via a first electronic device that is in communication with the first set of one or more wearable audio output devices and that is also in communication with a second electronic device that is in turn in communication with the second set of one or more wearable audio output devices. In some embodiments, while the first set of one or more wearable audio output devices is in communication with the second set of one or more wearable audio output devices, the first set of one or more wearable audio output devices initiates the audio communication session. For example, FIG. 6C, shows that in response to detecting the input 626 (e.g., a tap input) at first button 622 for accepting the request to share audio in FIG. 6B, an audio communication session is established. In some embodiments, the audio communication session is initiated in response to the request to establish the communication between the first set of one or more wearable audio output devices and the second set of one or more wearable audio output devices. In some embodiments, the audio communication session is initiated in response to a separate input subsequent to the request to establish the communication between the first set of one or more wearable audio output devices and the second set of one or more wearable audio output devices.

Initiating the audio communication session in response to receiving an explicit request to establish the audio communication session provides the option of requiring agreement between the user and a selected participant to establish the audio communication session and avoids establishing unwanted communication sessions without requiring separate coordination between the user and the selected participant. Reducing the number of inputs needed to perform an operation and performing the operation (e.g., automatically) when a set of conditions has been met enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the first set of one or more wearable audio output devices determines (820) that the second set of one or more wearable audio output devices is in a respective direction relative to the first set of one or more wearable audio output devices, and the simulated spatial location at which the respective audio is positioned is in the respective direction relative to the first set of one or more wearable audio output devices. Stated another way, the respective audio is output via the first set of wearable audio output devices so as to sound as though, from the perspective of the wearer of the first set of wearable audio output devices, the respective audio is coming from the direction of the second set of wearable audio output devices. For example, the mini-map 642 in FIGS. 6F-6G, illustrates audio waves (e.g., waves 660 and waves 662) emanating from a location around each of the user's positions (e.g., first user's position 638 and second user's position 640). The audio waves illustrate simulated spatial locations from which each user perceives audio to be emanating (e.g., the location from which a user aurally perceives augmented audio to be originating). For example, if the second set of wearable audio output devices is to the left of the first set of wearable audio output devices, the respective audio is output at a simulated spatial location to the left of the first set of wearable audio output devices.

In addition, the respective audio is output to sound as though the audio is coming from one or more simulated or perceived sources of sound at one or more simulated spatial locations in a frame of reference (e.g., the physical environment in which the wearer of the first set of wearable audio output devices is located), where the positioning of the one or more simulated or perceived sources of sound is independent of movement of the wearer (or more specifically, movement of the first set of wearable audio output devices) relative to the frame of reference. The respective audio that is output by the first set of wearable audio output devices is adjusted as the first set of wearable audio output devices is moved relative to the frame of reference, so as to position the one or more simulated sources of sound in the frame of reference independently of the position of the first set of wearable audio output devices relative to the frame of reference. For example, for a fixed source of sound, the audio output of the first set of wearable audio output devices is adjusted as the first set of wearable audio output devices moves, so as to maintain the simulated location of the fixed source of sound in a substantially fixed position relative to the frame of reference independently of a position of the first set of wearable audio output devices relative to the frame of reference. In another example, for a moving source of sound, the audio output of the first set of wearable audio output devices is adjusted as the first set of wearable audio output devices moves, so as to move the simulated location of the source of sound relative to the frame of reference in accordance with movement of the moving source of sound, but independently of a position of the first set of wearable audio output devices relative to the frame of reference.

Outputting received audio at a simulated spatial location that is in a same direction relative to the receiving set of wearable audio output devices as the other user wearing the transmitting set of wearable audio output devices provides the user wearing the receiving set of wearable audio output devices with feedback as to the direction of the other user. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the first set of one or more wearable audio output devices outputs (822) the respective audio, including adjusting the respective audio so as to position the respective audio at the simulated spatial location and adjusting the output property other than the simulated spatial location of the respective audio, is performed without regard to whether a direct path (e.g., a line of sight) between the first set of one or more wearable audio output devices and the second set of one or more wearable audio output devices is obstructed (e.g., in FIG. 6G, the users are out of visual contact with each other because a direct path between them is obstructed). Stated another way, method 800 is performed even when the direct path between the first set of one or more wearable audio output devices and the second set of one or more wearable audio output devices (e.g., a line of sight between a first user wearing the first set of one or more wearable audio output devices and a second user wearing the second set of one or more wearable audio output devices) is partially or fully obstructed (e.g., one or more physical objects are positioned between the first user and the second user so as to at least partially interfere with direct propagation of electromagnetic and/or acoustic waves between the first user and the second user).

Outputting received audio at a simulated spatial location that is in a same direction relative to the user wearing the receiving set of wearable audio output devices as the other user wearing the transmitting set of wearable audio output devices without regard to whether the users have a direct line of sight to each other provides the user with feedback as to the direction of the other user even when direct visual feedback is unavailable. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

It should be understood that the particular order in which the operations in FIGS. 8A-8B have been described is merely an example and is not intended to indicate that the described order is the only order in which the operations could be performed. One of ordinary skill in the art would recognize various ways to reorder the operations described herein. Additionally, it should be noted that details of other processes described herein with respect to the other methods described herein (e.g., methods 700, 1200, and 1300) are also applicable in an analogous manner to method 800 described above with respect to FIGS. 8A-8B. For example, the user interfaces and audible interactions described above with reference to method 800 optionally have one or more of the characteristics of the user interfaces, interactions, and animations described herein with reference to the other methods described herein (e.g., methods 700, 1200, and 1300).

FIGS. 9A-9G illustrate example user interfaces (e.g., user interfaces within a video call application) for a dynamic visual communication session with multiple participants, and representations of simulated spatial audio locations of participants relative to the user 501 of the device in accordance with some embodiments.

FIG. 9A, similar to the sequence of Figures shown in FIGS. 5A-5T, illustrates portable multifunction device 100 displaying an example user interface 500 on touch screen 112 of an ongoing video call between multiple participants and a user 501 of the device. The user interface distinguishes between the dynamic visual representations of the user 501 of the device (e.g., shown in the user interface 500 as video representation of a user 504), and the dynamic visual representations of the other participants in the video call (e.g., shown in the user interface 500 as video representation 506 of participant one, video representation 508 of participant two, video representation 510 of participant three, and video representation 512 of participant four (collectively also referred to as representations 506-512 of participants)). Throughout the following discussion of FIGS. 9A-9G, while the representations 504 of the user and representations 506-512 of participants are described as video representations for ease of exposition, it shall be understood that in some embodiments those representations are dynamic visual representations, which may include representations, such as animated avatars, other than video representations. Furthermore, throughout the following discussion of FIGS. 9A-9G, when a video representation or simulated audio location is said to be moved or changed, or an audio characteristic (e.g., volume or reverberation to direct sound ratio) is said to be changed, it is to be understood that, in some embodiments, such movements or changes are automatically made or implemented by the portable electronic device 100 in accordance with corresponding preconditions or criteria being satisfied.

In particular, the user interface 500 shown in FIG. 9A shows video representation 506 of participant one and video representation 508 of participant two being in an in-focus region 902 (also referred to as the portrait in-focus region 902) on touch screen 112, and illustrates video representation 510 of participant three and video representation 512 of participant four in a separate out-of-focus region, such as a roster region 904 (also referred to as a horizontal roster region 904). In some embodiments, roster region 904 visually aids the user 501 of the device 100 by illustrating who is currently speaking in the video conference call. In some embodiments, the video representations of the participants in the roster region 904 (e.g., video representation 510 of participant three and video representation 512 of participant four) are smaller in size than the video representations in the separate in-focus region 902 (e.g., video representation 506 of participant one and video representation 508 of participant two).

FIG. 9A, like FIGS. 5A-5T, also illustrates a simulated audio location map 514 (of a simulated space or environment for the communication session) that includes representations of simulated audio locations of the participants relative to a user 501 of the device. In FIG. 9A, the simulated audio location map is shown below the user interface 500. It is noted that, typically, the simulated audio location map 514 is not displayed by device 100, and instead simulated audio location map 514 is shown in FIGS. 9A-9G to facilitate understanding of spatial audio features being described. The simulated audio locations are placed in-part according to the location of corresponding video representations in user interface 500. For example, participants whose representations are displayed in an in-focus region 902 have simulated audio locations that are aurally perceived as being closer to the user 501 of the device than participants whose representations are displayed outside the in-focus region 902, e.g., in a roster region 904. This is illustrated in simulated audio location map 514, which shows simulated audio location 516 of participant one and simulated audio location 518 of participant two closer to the representation of the user's location 524 than the simulated audio location 520 of participant three and the simulated audio location 522 of participant four. Accordingly, participants one and two are aurally perceived by a user 501 of the device, via audio heard from earbuds 502, as being closer to the user 501 of device than participants three and four, consistent with participants one and two being shown in an in-focus region 902 while participants three and four and shown outside the in-focus region 902, in roster region 904. Stated another way, participants whose video representations are located within roster region 904 have simulated audio locations that are aurally perceived via audio heard from earbuds 502, as being farther from the user 501 of the device than the simulated audio locations of participants whose video representations are located within in-focus region 902. This is illustrated in simulated audio location map 514, specifically by simulated audio location 520 of participant three and simulated audio location 522 of participant four appearing farther away from the representation of the user's location 524. The perceived locations of the participants are achieved using spatial audio, sometimes called spatialized audio, which is indicated as being in an activated state by the "ON" state indicator 530 in FIG. 9A. A more detailed explanation of spatial audio is discussed in reference to FIG. 5B.

Additionally, FIG. 9A also shows a top-down map 528 (e.g., birds eye view map) that illustrates a user 501 of the device wearing audio output devices (e.g., earbuds 502) in physical space, and illustrates the position of the portable multifunction device 100 relative to a user 501 of the device.

To further simulate aurally perceived distances between a user 501 of the device 100 and other participants in the communication session, as perceived by the user 501, reverberation can also be modified for one or more participants in the video conference call. Decreasing the direct to reverberated sound ratio (e.g., the ratio of direct sound to reverberated sound) for a particular participant causes the user 501 of the device to aurally perceive, via audio heard from earbuds 502, the particular participant as being farther away from the user. This change in reverberation, or the ratio of direct to reverberated sound, is indicated by chart 906 in FIG. 9A, which has vertical y-axis defined as volume of each user 940 and a horizontal x-axis defined as time 942. Thus, chart 906 indicates the volume of the direct audio and the volume of the reverberated audio for each participant over a period of time.

In particular, chart 906 shows a metric, such as volume, for reverberated audio and direct audio for each participant in a video conference call. First, audio associated with video representation 506 of participant one includes direct audio (identified by "P1 Direct 910") and reverberated audio (identified by "P1 Reverb 912"), each of which has a respective volume shown in chart 906. Second, audio associated with video representation 508 of participant two includes direct audio (identified by "P2 Direct 914") and reverberated audio (identified by "P2 Reverb 916"), each of which has a respective volume shown in chart 906. Third, audio associated with video representation 510 of participant three comprises direct audio (identified by "P3 Direct 918") and reverberated audio (identified by "P3 Reverb 920"), each of which has a respective volume shown in chart 906. Fourth, audio associated with video representation 512 of participant four comprises direct audio (identified by "P4 Direct 922") and reverberated audio (identified by "P3 Reverb 924"), each of which has a respective volume shown in chart 906. As noted in the chart, the participants that are in an in-focus region 902 on the display (e.g., participant one and participant two) have a higher ratio of direct to reverberated sound compared to participants in the roster region 904 (e.g., participant three and participant four). In other words, the participants in the in-focus region will have more direct audio in comparison to their reverberated audio than the participants in the roster region 904. In practice, a user 501 of the device will aurally perceive, via audio heard from earbuds 502, the participants whose video representations are located within roster region 904 as being farther away from the user 501 of the device that the participants whose video representations are located within in-focus region 902.

To even further simulate aurally perceived distances by a user 501 of the device, volume of each participant's direct audio and/or reverberated audio (e.g., total audio volume) can also be adjusted to further simulate distances of participants as perceived by the user 501 of the device. As shown in FIG. 9A, the audio volumes of participants in an in-focus region 902 (e.g., participant one and participant two) are higher than the volumes of participants in a roster region 904 (e.g., participant three and participant four).

FIGS. 9A-9B illustrate how participants' spatialized locations (also herein called simulated spatial locations) can be actively changed during a video conference call in order to facilitate communication (e.g., reduce the participants from sounding as though they are talking over each other). FIG. 9B illustrates that the device can separate participants from each other in a simulated space (e.g., by increasing the distance between simulated audio positions of the participants) when it is determined that metrics of overlapping audio meet a predefined overlap criteria (e.g., multiple participants are simultaneously speaking for at least a set period of time). In an example of using spatial audio to separate the simulated audio locations of participants (e.g., increase the separation of simulated spatial locations between participants) who are talking simultaneously, FIGS. 9A and 9B show an increase in the angle, relative to the user 501 of the device, between simulated audio location 516 of participant one and simulated audio location 518 of participant two (e.g., the vertex of the angle is located at a representation of the user's location 524). After a determination is made that a metric of overlapping audio meets predefined overlap criteria, the angle 926 in FIG. 9A is widened to the angle 928 shown in FIG. 9B. In some embodiments, while the angle 928 increases, the distance in a horizontal x-direction increases (e.g., the distance from simulated audio location 516 of participant one to the user's simulated audio location 524 increases), but the distance in a vertical y-direction remains constant. Additionally, the user's simulated audio location 524 remains fixed while the angle changes. For example, this would be similar to a seated audience member (e.g., a user 501 of the device) listening to two individuals (e.g., participant one and participant two) standing on a stage while they start moving away from each other while still remaining on the stage.

In some embodiments, there is a default angle between the simulated spatial locations of the first and second participants in the communication session, and only after predefined overlap criteria is met does the angle change (e.g., increase or decrease). In some embodiments, the angle fluctuates depending on how much overlapping audio is taking place. For example after detecting that the predefined overlap criteria is no longer met, the angle may (and optionally gradually) return back to the default angle shown in FIG. 9A.

FIG. 9C illustrates a change in participants' simulated positions in response to changing the orientation of the portable multifunction device (e.g., the electronic device 100 from a portrait view to a landscape view). In response to changing the orientation of the portable multifunction device 100 from its orientation shown in FIG. 9B to the orientation shown in FIG. 9C, the angle 930 between the participants (e.g., the angle between simulated audio location 516 of participant one and simulated audio location 518 of participant two relative to a user's location or simulated audio location 524) increases in comparison to the angle 928. This increase in separation of the simulated audio locations occurs in response to (e.g., in conjunction with) the additional horizontal screen real-estate now shown in the landscape in-focus region 934.

In some embodiments, the simulated audio locations of participants whose video representations are located in the roster region (e.g., the vertical roster region 932) also move in response to the changing orientation of the device (e.g., since the roster region 932 is now located to the right of the touch screen 112 when viewed by a user 501, as opposed to the bottom of the touch screen as shown in FIGS. 9A-9B). In such an embodiment, the simulated audio location 520 of participant three and simulated audio location 522 of participant four relative to the user's location or simulated audio location 524 are now aurally perceived as originating from the right of the user 501 of the device, which corresponds to the location of the vertical roster region 932 relative to the location of the video representation of the user of the device in the user interface 500.

FIGS. 9D-9G relate to moving video representations of participants back-and-forth between the in-focus region (e.g., landscape in-focus region 934 or portrait in-focus region 902 in FIGS. 9A-9B) and the roster region (e.g., vertical roster region 932 or roster region 904) of the user interface 500 based on predefined criteria (e.g., whether the participant talking). In particular, chart 906 in FIG. 9D illustrates that participant two has stopped speaking, which is indicated by the volume of P2 Direct 914 and/or P2 Reverb 916 no longer indicating as much audio volume as was shown in FIGS. 9A-9C.

FIG. 9E illustrates that in response to participant two's audio characteristics (e.g., P2 Direct 914 and/or P2 Reverb 916) no longer meeting predefined characteristics (e.g., reduced voice activity level is indicated by P2 Direct 914 being lower in volume in comparison to P2 Direct shown in FIG. 9C), video representation 508 of participant two is moved from the landscape in-focus region 934 to the vertical roster region 932 (e.g., the video representation of the second participant, P2, is automatically moved to the roster region by the portable multifunction device 100, in accordance with the P2's audio characteristics not meeting the predefined characteristics). In some embodiments, the predefined characteristics need to be met for a set period of time (e.g., 1 second, 2 seconds, 5 seconds, 10 seconds, or 15 seconds) before the participant's video representation is moved (e.g., automatically moved by the device 100) to a roster region. In addition to video representation 508 of participant two moving to the vertical roster region 932, the simulated audio location 518 of participant two also changes (e.g., is automatically changed by the device 100, in accordance with the same criteria as for moving the participant's video representation to a roster region). Simulated audio location 518 of participant two now resides in a similar location as other participants who have their video representations displayed in the roster region 932. In effect, a user 501 of the device will now aurally perceive audio from participant two, P2, as being farther away than it was prior to video representation 508 of participant two moving to the vertical roster region 932. FIG. 9E also illustrates in chart 906 that the ratio of reverberated sound (e.g., P2 Reverb 916) to direct sound (e.g., P2 Direct 914) for participant two has increased in comparison to the ratio illustrated in FIG. 9D's chart 906. In some embodiments, in accordance with the video representation of participant two being moved to a roster region, video representation 508 of participant one shifts (e.g., is automatically shifted by the device 100) to the center of the landscape in-focus region 934, and simulated audio location 516 of participant one is moved (e.g., automatically moved by the device 100) to a simulated audio location that causes a user 501 of the device to aurally perceive participant one as speaking directly in front of the user 501. In some embodiments, when a participants video representation is moved from an in-focus region (e.g., portrait in-focus region 902 in FIGS. 9A-9B or landscape in-focus region 934 in FIGS. 9C-9G) to a roster region (e.g., horizontal roster region 904 in FIGS. 9A-9B or vertical roster region 932 in FIGS. 9C-9G) the respective video representation is changed in size (e.g., automatically changed in size by the device 100, for example decreased is size) on the touch-screen display.

FIG. 9F illustrates that participant three, P3, whose video representation (e.g., video representation 510 of participant three) is currently residing in the vertical roster region 932 begins speaking (e.g., as indicated by P3 Direct 918 in chart 906 in FIG. 9F increasing in voice activity in comparison to P3 Direct 918 in chart 906 in FIG. 9E).

FIG. 9G illustrates that in response to participant three's voice activity level increasing and meeting and/or exceeding a voice activity threshold, the device 100 moves (e.g., automatically moves) the video representation 510 of participant three from the vertical roster region 932 to the landscape in-focus region 934. In conjunction with moving video representation 510 of participant three from the vertical roster region 932 to landscape in-focus region 934, the ratio of reverberated audio (e.g., as indicated by P3 Reverb 920 in FIG. 9G) to direct audio (e.g., as indicated by P3 Direct 918 in FIG. 9G) decreases (e.g., is automatically decreased by device 100) in comparison to the ratio of reverberated audio (e.g., as indicated by P3 Reverb 920 in FIG. 9F) to direct audio (e.g., as indicated by P3 Direct 918 in FIG. 9F). In some embodiments, in conjunction with moving video representation 510 of participant three from the vertical roster region 932 to landscape in-focus region 934, the volume (e.g., direct audio and/or reverberated audio) of participant three's audio is increased (e.g., is automatically increased by device 100).

In some embodiments, audio from participants in the roster region needs to be greater than or equal to predefined activity level characteristics for a set period of time (e.g., 2 seconds, 5 seconds, 10 seconds, or 15 seconds) before the participant's video representation is moved (e.g., automatically moved by device 100) to an in-focus region. In some embodiments, when a participant's video representation is moved from a roster region (e.g., horizontal roster region 904 in FIGS. 9A-9B or vertical roster region 932 in FIGS. 9C-9G) to an in-focus region (e.g., portrait in-focus region 902 in FIGS. 9A-9B or landscape in-focus region 934 in FIGS. 9C-9G) the respective video representation is changed in size (e.g., increased) on the touch-screen display (e.g., automatically changed in size by the device 100).

FIG. 9G also illustrates changes (e.g., changes automatically made by the device 100) to the simulated spatial locations map 514 in response to (e.g., in conjunction with) moving video representation 510 of participant three from the vertical roster region 932 to the landscape in-focus region 934. In particular, simulated spatial locations map 514 shows that simulated audio location 520 of participant three is moved to a position in simulated space that will be aurally perceived, via audio heard from earbuds 502, by a user 501 of the device as being physically closer. FIG. 9G further illustrates that simulated audio location 516 of participant one is moved to a different location (e.g., to the right or the left) in comparison to FIG. 9F to accommodate the placement of simulated audio location 520 of participant three, which is now also in the in-focus region 934.

Some of the examples described herein are prophetic examples that are used for the purpose of illustrating the predicted or expected results in a particular scenario as a way to illustrate a more general concept (e.g., the examples described with respect to chart 906 in FIGS. 9A-9G, elapsed time chart 540 in FIGS. 5J-5L, and graph 644 in FIGS. 6E-6G).

FIGS. 10A-10O illustrate example user interfaces for a dynamic visual communication session (e.g., user interfaces of a video call application during a communication session) with multiple participants, charts illustrating activity levels of participants, and representations of simulated spatial audio locations of participants relative to a user of the device in accordance with some embodiments.

FIG. 10A, similar to FIGS. 5A-5T and 9A-G, illustrates portable multifunction device 100 displaying example user interface 500 on touch screen 112 of an ongoing video call between multiple participants and user 501 of device 100. The user interface distinguishes between the dynamic visual representations of the user 501 of device 100 (e.g., shown in the user interface 500 as video representation 504 of user 501), and the dynamic visual representations of the other participants in the video call (e.g., shown in the user interface 500 as video representation 1001 of participant one and video representation 1003 of participant two). Throughout the following discussion of FIGS. 10A-10O, while the representation 504 of user 501 and representations (e.g., 1001, 1003) of participants are described as video representations for ease of exposition, it shall be understood that in some embodiments those representations are dynamic visual representations, which may include representations, such as animated avatars, other than video representations. In addition, in some embodiments, one of more of the representations of respective participants may be static visual representations, such as a static avatar or text (e.g., one or more initials corresponding to a name or nickname of a respective participant); for example, one or more participants may disable the camera on the device they are using to participate in the video call, in which case a static or dynamic visual representation of the user is displayed instead of a video representation. Furthermore, throughout the following discussion of FIGS. 10A-10O, when a video representation or simulated audio location is said to be moved or changed, or an audio characteristic (e.g., volume or reverberation to direct sound ratio) is said to be changed, it is to be understood that, in some embodiments, such movements or changes are automatically made or implemented by portable electronic device 100 in accordance with corresponding preconditions or criteria being satisfied.

In particular, user interface 500 shown in FIG. 10A shows video representation 1001 of participant one and video representation 1003 of participant two being in an in-focus region 1002 on touch screen 112. The video representations of both participants are displayed in in-focus region 1002 because the number of participants in the video call does not exceed a threshold number (e.g., four, in the example in FIGS. 10A-10B; the threshold number may be any number such as is appropriate for device 100, as explained in further detail herein with reference to FIG. 10O).

In some embodiments, user interface 500 shown in FIGS. 10A-10O includes one or more of the following additional features: application icons, controls and/or affordances 1011 (e.g., labelled A, B, C, D, E and N in FIG. 10A) for invoking applications or mini-applications (e.g., for accessing photos or other images or documents to be shared in the video call); a control or affordance 1013 for leaving or dismissing the video call; a control or affordance 1015 for adding visual effects (e.g., augmented reality effects) to the video call; and/or a control or affordance 1017 for accessing additional features useable within the video call application.

FIG. 10A, like FIGS. 5A-5T and 9A-9G, also illustrates simulated audio location map 514 (of a simulated space or environment for the communication session) that includes representations of simulated audio locations of the participants relative to user 501 of device 100. In FIG. 10A, the simulated audio location map is shown below user interface 500. It is noted that, typically, simulated audio location map 514 is not displayed by device 100, and instead simulated audio location map 514 is shown in FIGS. 10A-10O to facilitate understanding of spatial audio features being described. The simulated audio locations are placed in-part according to the location of corresponding video representations in user interface 500. For example, simulated audio location 1005 of participant one is to the right of simulated audio location 1007 of participant two in accordance with video representation 1001 of participant one being to the right of video representation 1003 of participant two in user interface 500. Additionally, FIG. 10A also shows top-down map 528 (e.g., birds eye view map) that illustrates user 501 of device 100 wearing audio output devices (e.g., earbuds 502) in physical space, and illustrates the position of the portable multifunction device 100 relative to user 501 of the device.

FIG. 10B-10J illustrate how participants' spatialized locations (also herein called simulated spatial locations or simulated audio locations) can be actively changed during a video conference call based on participants' activity levels. In FIG. 10B, additional participants have joined the communication session. Video representations of four of the participants are displayed in a grid in in-focus region 1002:

video representation 1001 of participant one, video representation 1003 of participant two, video representation 1014 of participant three and video representation 1018 of participant four. The configuration of in-focus region 1002 in FIG. 10B is sometimes called a "grid view." Video representations of at least some of the remaining participants in the communication session (e.g., video representation 1038 of participant five, video representation 1040 of participant six, video representation 1042 of participant seven, and video representation 1044 of participant eight) are displayed in a separate out-of-focus region, referred to as roster region 1004 (e.g., based on a predefined size for video representations in the roster region, device 100 displays as many video representations of the remaining participants as will fit in the roster region on touchscreen 112).

The participants whose video representations are displayed in in-focus region 1002—participant one, participant two, participant three, and participant four—have activity levels above the activity levels of the remaining participants, as shown in activity chart 1006. In other words, the most active participants up to the threshold number (e.g., four in FIG. 10B) are represented in in-focus region 1002, whereas the remaining participants are represented in roster region 1004 (e.g., at least some of the remaining participants have video representations displayed in roster region 1004). Activity chart 1006 displays the activity level of each participant 1008 (on the vertical y-axis) with respect to time 1010 (on the horizontal x-axis). In particular, activity chart 1006 displays activity level 1022 of participant one, activity level 1024 of participant two, activity level 1026 of participant three, activity level 1028 of participant four, activity level 1030 of participant five, activity level 1032 of participant six, activity level 1034 of participant seven, and activity level 1036 of participant eight. In activity chart 1006, the activity level for a respective participant may be based on the participant's voice activity level (e.g., amount of talking), an overall audio volume level of the respective participant, a physical activity level (e.g., amount of body movement, including sign language or non-verbal gestures, such as raising or waving of the hand to get others' attention), recency of activity, and/or other metric for activity level.

In some embodiments, as in the example shown in FIG. 10B, the video representations of the participants in roster region 1004 are smaller in size than the video representations in the separate in-focus region 1002 (e.g., the video representations 1038, 1040, 1042, and 1044 of the participants in roster region 1004 are smaller than video representation 1001 of participant one, video representation 1003 of participant two, video representation 510 of participant three, and video representation 512 of participant four). In some embodiments, the video representations of the participants in roster region 1004 are the same size as each other (e.g., without regard to activity level of those participants). In some embodiments, in the "grid view," the video representations of the participants in in-focus region 1002 are the same size as each other (e.g., without regard to activity level of those participants). As described in more detail herein, for views other than the "grid view," such as the floating views in FIGS. 10C-10J, the video representations of the participants in in-focus region 1002 are optionally different sizes (e.g., based on activity level of the participants).

In addition, each of the participants whose video representation is displayed in in-focus region 1002—participant one, participant two, participant three, and participant four—has a distinct simulated audio location that is based on the location of the corresponding respective video representation, as indicated in simulated audio location map 514. Video representation 1001 of participant one is displayed in the lower left of in-focus region 1002, and accordingly simulated audio location 1005 of participant one is in the lower left relative to the simulated audio locations of the other participants in in-focus region 1002. Video representation 1003 of participant two is displayed in the upper left of in-focus region 1002, and accordingly simulated audio location 1007 of participant two is in the upper left relative to the simulated audio locations of the other participants in in-focus region 1002. Video representation 1014 of participant three is displayed in the upper right of in-focus region 1002, and accordingly simulated audio location 1016 of participant three is in the upper right relative to the simulated audio locations of the other participants in in-focus region 1002. Video representation 1018 of participant four is displayed in the lower right of in-focus region 1002, and accordingly simulated audio location 1020 of participant four is in the lower right relative to the simulated audio locations of the other participants in in-focus region 1002. In accordance with the "grid view" shown in FIG. 10B, simulated audio locations 1005, 1007, 1016, and 1020 are all the same distance (or substantially the same distance, e.g., with ten percent or twenty percent of a median distance of audio locations 1005, 1007, 1016 and 1020) from spatial location 524 of user 501. For views other than the "grid view," such as the floating views shown in FIGS. 10C-10J and described in more detail below, the video representations of the participants in in-focus region 1002 may be moved to different positions in user interface 500 (e.g., based on activity level of the participants), and the corresponding simulated audio locations may change accordingly.

In contrast to the participants represented in in-focus region 1002, the audio from other participants whose video representations are not displayed in in-focus region 1002 (e.g., are displayed in roster region 1004 (e.g., all remaining participants other than participants one through four and user 501)) is output at a same shared simulated audio location 1012 represented in simulated audio location map 514. It is noted that shared simulated audio location 1012 is used in situations where the number of participants in the video call, other than user 501, exceeds the threshold number of positions in in-focus region 1002 by two or more, such that at least two participants are represented in roster region 1004 and have their audio output at shared simulated audio location 1012 (e.g., if only one participant is represented in roster region 1004, that participant's simulated audio location, which is optionally the same location as shared simulated audio location 1012, is not shared with that of any other participant). As in the example shown in FIG. 10B, shared simulated audio location 1012 of the participants in roster region 1004 is below (e.g., in three-dimensional space) the simulated audio locations of the participants in in-focus region 1002, relative to spatial location 524 of user 501.

In FIG. 10C, the video representations of the participants in in-focus region 1002 are arranged based on the activity levels of those participants, rather than in a grid as shown in FIG. 10B, and the audio from those participants is output at distinct simulated audio locations based on the locations of the corresponding respective video representations and/or on the participants' activity levels. As shown in FIG. 10C, the video representations of the participants in in-focus region 1002 who are more active are more visually prominent (e.g., larger and/or in front of) the video representations of the participants in in-focus region 1002 who are less active. For example, because the activity level of participant two is the highest as indicated in activity chart 1006, video representation 1003 of participant two is visually the most prominent in user interface 500, by being displayed larger than the video representations of other participants (e.g., video representation 1003 of participant two is larger than video representation 1001 of participant one and video representation 1018 of participant four) as well as in front of the video representations of the other participants in user interface 500 (e.g., as indicated by video representation 1003 of participant two overlapping on top of video representation 1014 of participant three and on top of video representation 1018 of participant four).

Correspondingly, as shown in FIG. 10C, in some embodiments the simulated audio locations of the participants in in-focus region 1002 who are more active are closer to spatial location 524 of user 501 than the simulated audio locations of other participants who are less active. Optionally the audio of more active participants are aurally emphasized (e.g., by increasing audio volume) relative to the audio of other less active participants. For example, simulated audio location 1007 of participant two is closer to spatial location 524 of user 501 than the simulated audio locations of other participants, as indicated by the representation of simulated audio location 1007 for participant two being in front of the representation of simulated audio location 1016 for participant three in simulated audio location map 514.

FIG. 10D illustrates how prominence of a participant may alternatively or in addition be indicated by the proximity of a participant's video representation to a predefined position in user interface 500, such as a center position. In FIG. 10D, participant three is the most active participant as indicated in activity chart 1006. Accordingly, video representation 1014 of participant three is displayed closest to the center of in-focus region 1002 (e.g., as compared to video representations 1001, 1003, and 1018 of participants one, two, and four, respectively) and overlapping on top of video representations 1001, 1003, and 1018 of participants one, two, and four, respectively, in user interface 500.

FIG. 10E illustrates how prominence of a participant may alternatively or in addition be indicated by the size of a participant's video representation. In FIG. 10E, participant three is the most active participant as indicated in activity chart 1006. Accordingly, video representation 1014 of participant three is the largest video representation in user interface 500 (e.g., optionally as a result of increasing the size of video representation 1014 of participant three relative to the size of video representation 1014 as shown in FIG. 10D, to indicate that participant three is the most active participant).

FIGS. 10F-10I illustrate the video representation of a participant being moved out of in-focus region 1002 and into roster region 1004 in accordance with that participant's activity level decreasing such that that participant is no longer one of the threshold number of most active participants (e.g., no longer one of the four most active participants, in the example in FIGS. 10F-10I). Activity chart 1006 in FIGS. 10F-10I illustrates activity level 1028 of participant four progressively decreasing until, in FIG. 10I, participant four is no longer one of the four most active participants in the video call. For example, in FIG. 10F, activity level 1028 of participant four has decreased below activity level 1022 of participant one. Activity level 1028 of participant four has continued to decrease in FIG. 10G, while activity level 1030 of participant five has increased. In FIG. 10H, activity level 1030 of participant five has increased above activity level 1028 of participant four. Accordingly, in FIG. 10G, video representation 1018 of participant four is moved closer to roster region 1004, and simulated audio location 1020 of participant four is moved closer to shared simulated audio location 1012 for participants in roster region 1004, as indicated in simulated audio location map 514. In FIG. 10H, video representation 1018 of participant four is moved out of in-focus region 1002 and inserted into roster region 1004, and audio from participant four is output at shared simulated audio location 1012 for participants in roster region 1004 (e.g., simulated audio location 1020 is merged into shared simulated audio location 1012), as indicated by the absence of simulated audio location 1020 in simulated audio location map 514 in FIG. 10H. In FIG. 10I, video representation 1020 of participant four is displayed fully in roster region 1004.

FIGS. 10H-10J illustrate the video representation of a participant being moved into in-focus region 1002 from roster region 1004 in accordance with that participant's activity level increasing such that that participant has become one of the threshold number of most active participants (e.g., becoming one of the four most active participants, in the example in FIGS. 10H-10J). Activity chart 1006 in FIG. 10H indicates that activity level 1030 of participant five has increased above activity level 1028 of participant four, such that participant five is now one of the four most active participants in the video call, instead of participant four. Accordingly, in FIG. 10H, video representation 1038 of participant five is moved slightly out of roster region 1004, and audio from participant five is output at simulated audio location 1046 in simulated audio location map 514, which is distinct from shared simulated audio location 1012 and also distinct from simulated audio locations 1005, 1007, and 1016 for the other participants whose representations are displayed in in-focus region 1002. In FIG. 10I, video representation 1020 of participant four is displayed fully in roster region 1004 while video representation 1038 of participant five is moved further out of roster region 1004 and into in-focus region 1002. In addition, in FIG. 10I, simulated audio location 1046 of participant five is moved further from shared simulated audio location 1012 in simulated audio location map 514. In FIG. 10J, video representation 1038 of participant five is displayed fully in in-focus region 1002, and simulated audio location 1046 of participant five is moved further from shared simulated audio location 1012 so as to be more distinct from simulated audio location 1012 as well as from simulated audio locations 1005, 1007, and 1016 for the other participants whose representations are displayed in in-focus region 1002.

In some embodiments where the number of participants in the video call exceeds the threshold number (e.g., both in-focus region 1002 and roster region 1004 include video representations of participants), in-focus region 1002 always displays the threshold number of most active participants. In some such embodiments, transitioning a first, less active, participant out of in-focus region 1002 and into roster region 1004 occurs in conjunction with (e.g., simultaneously with) transitioning a second, more active, participant out of roster region 1004 and into in-focus region 1002 (e.g., where the activity levels of the first and second participants have crossed). Optionally, the corresponding simulated audio location of the first participant and the corresponding simulated audio location of the second participant are also shifted simultaneously. For example, in some embodiments the transitions illustrated in FIGS. 10F-10H for participant four occur in conjunction with, or overlap to a greater extent with, the transitions illustrated in FIGS. 10H-10J for participant five. In some embodiments, moving an in-focus participant (e.g., participant four) toward and/or into roster region 1004 is performed in accordance with (e.g., in response to, and after) the activity level of the in-focus participant decreasing below the activity level of a roster participant.

FIG. 10K illustrates portable multifunction device 100 displaying an example user interface 500 of an ongoing video call between exactly two participants: user 501 of device 100 and the other participant, participant one. User interface 500 includes video representation 504 of user 501 and video representation 1048 of participant one. Spatial audio is enabled for this video call, as indicated in legend 1050. Because spatial audio is enabled, and because video representations of the participants (e.g., video representation 504 and video representation 1048) in this two-participant video call are available to be displayed in user interface 500, audio from participant one is output at a simulated spatial location that is different from spatial location 524 of user 501—specifically, simulated audio location 1052, as shown in simulated audio location map 514.

In contrast to FIG. 10K, FIG. 10L illustrates the ongoing video call between user 501 and participant one with spatial audio disabled, as indicated in legend 1050 in FIG. 10L. Video representation 504 of user 501 and video representation 1048 of participant one are displayed in user interface 500. However, because spatial audio is disabled, audio from participant one is not output at a simulated spatial location that is different from spatial location 524 of user 501, as indicated by the absence of simulated audio location 1052 in simulated audio location map 514. Instead, audio from participant one is output as non-spatial audio (e.g., stereo audio or mono audio, which would typically be perceived by user 501 as if the audio were playing inside user 501's head).

Figure 10M:
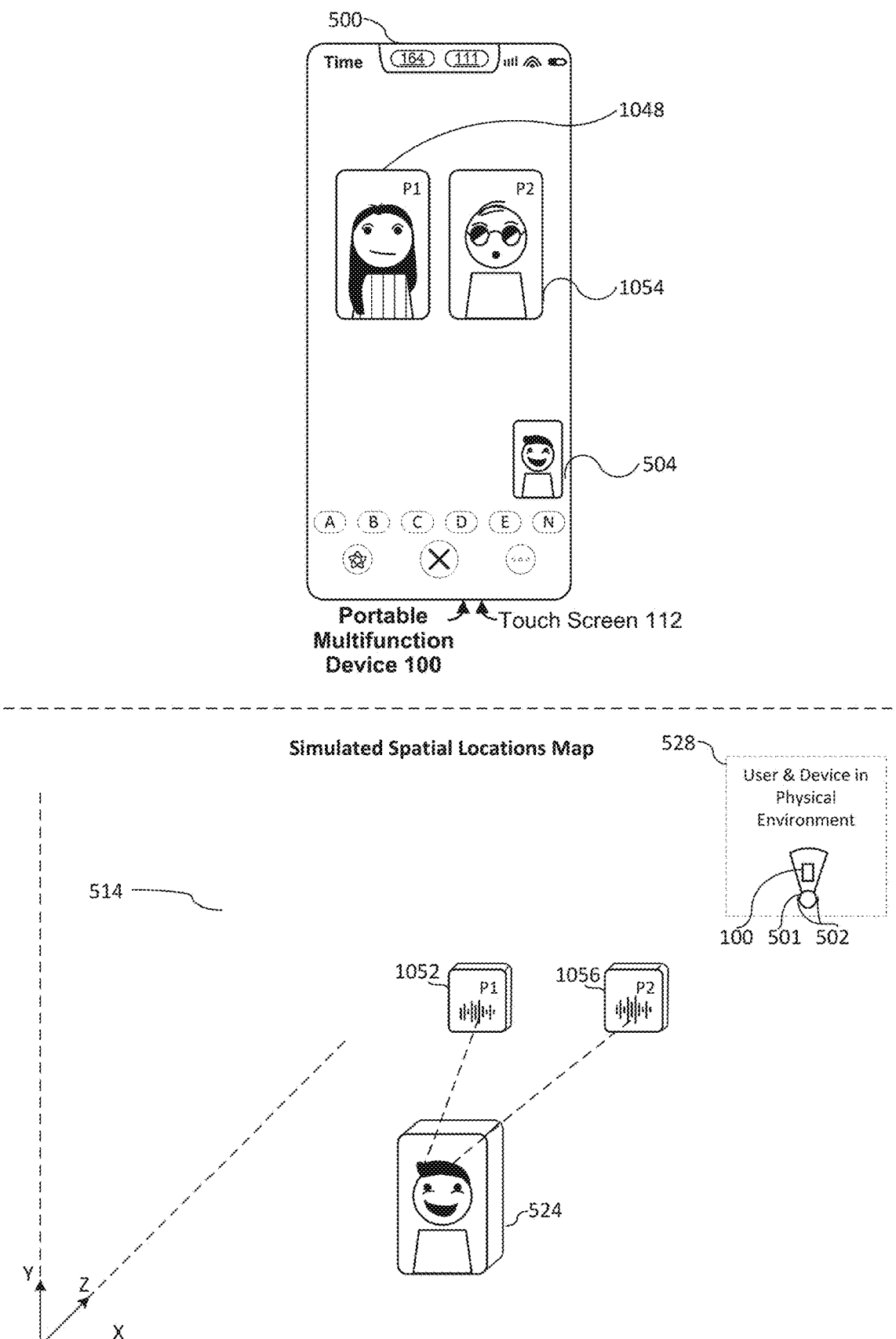
FIGS. 10A-10O illustrate example user interfaces for a dynamic visual communication session (e.g., user interfaces of a video call application during a communication session) with multiple participants, charts illustrating activity levels of participants, and representations of simulated spatial audio locations of participants relative to a user of the device in accordance with some embodiments.

FIG. 10M illustrates an example transition from FIG. 10L, in accordance with participant two—a third participant, other than user 501 and participant one—joining the video call. User interface 500 now also includes video representation 1054 of participant two (e.g., in the same region, such as an in-focus region, as video representation 1048 of participant one). Because the video call now includes two or more participants other than user 501 (e.g., totaling more than two participants), audio from the participants (e.g., other than user 501) is output at two or more distinct simulated spatial locations (e.g., despite spatial audio having been disabled, as indicated in legend 1050 in FIG. 10L, spatial audio is automatically enabled for this video call in response to a third participant joining). In particular, as shown in simulated audio location map 514, audio from participant one is output at simulated audio location 1052, and audio from participant two is output at simulated audio location 1056, which are different from each other and from spatial location 524 of user 501. Analogously, if the total number of participants in the video call were to decrease to two (e.g., the user and one other participant), audio from the participants would cease to be output at two or more distinct simulated spatial locations and would instead be output as non-spatial audio as described above with reference to FIG. 10L.

FIG. 10N illustrates two different two-participant calls: video call 1058 on the left and audio call 1060 on the right. Video call 1058 illustrated on the left is similar to the video call illustrated in FIG. 10K. In particular, for video call 1058, video representation 504 of user 501 and video representation 1048 of participant one are displayed in user interface 500. Spatial audio is enabled for this video call, as indicated in legend 1050. Because spatial audio is enabled, and because video representations of the participants (e.g., video representation 504 and video representation 1048) in this two-participant video call are available to be displayed in user interface 500, audio from participant one is output at a simulated spatial location that is different from spatial location 524 of user 501—specifically, simulated audio location 1052, as shown in simulated audio location map 514.

In contrast to video call 1058, a video representation of the other participant in audio call 1060 (e.g., an audio-only call) is not available to be displayed in user interface 500, as shown on the right of FIG. 10N. User interface 500 for audio call 1060 includes identifier 1062 of participant one (e.g., a static visual representation) instead of visual representation 1048. Because a video representation of participant one is not available, spatial audio is disabled for audio call 1060, as indicated in legend 1050. In addition, audio from participant one is not output at a simulated spatial location that is different from spatial location 524 of user 501, as indicated by the absence of simulated audio location 1052 in simulated audio location map 514. Instead, audio from participant one is output as non-spatial audio (e.g., stereo audio or mono audio, which would typically be perceived by user 501 as if the audio were playing inside user 501's head).

FIG. 10O illustrates different numbers of participants that can be displayed in an in-focus region of a video call user interface, by illustrating two different video calls: video call 1064 on the top and video call 1066 on the bottom. The top portion of FIG. 10O illustrates user 501 (represented by video representation 504 in user interface 500a) attending video call 1064 using device 100a. The bottom portion of FIG. 10O illustrates user 501 (represented by video representation 504 in user interface 500b) attending video call 1066 using device 100b. Device 100a is smaller than device 100b, and touchscreen 112a of device 100a has a smaller display area than touchscreen 112b of device 100b. Accordingly, more participants can be displayed in in-focus region 1002b of user interface 500b than in in-focus region 1002a of user interface 500a. In user interface 500a, video representations of four participants are displayed in in-focus region 1002a, with video representations of at least some of the remaining participants in video call 1064 being displayed in roster region 1004a. In user interface 500b, video representations of seven participants are displayed in in-focus region 1002b, with video representations of the remaining participants in video call 1066 being displayed in roster region 1004b.

By extension, FIG. 10O also illustrates different threshold numbers of participants that are required for a roster region to be displayed in the video call user interface. For example, five or more participants other than user 501 (e.g., six or more participants in all) must be attending video call 1064 for roster region 1004a to be displayed. If four or fewer participants other than user 501 were attending video call 1064 (e.g., five or fewer participants in all), the video representations of the other (four or fewer) participants will all be displayed in in-focus region 1002a of user interface 500a of video call 1064. For video call 1066, eight or more participants other than user 501 (e.g., nine or more participants in all) must be attending for roster region 1004b to be displayed. If seven or fewer participants other than user 501 were attending video call 1066 (e.g., eight or fewer participants in all), the video representations of the other (seven or fewer) participants will all be displayed in in-focus region 1002b of user interface 500b of video call 1066.

FIGS. 11A-11V illustrate the use of different virtual spaces to simulate production of audio content for different categories of content. Specifically, FIG. 11A illustrates, using energy diagrams, an example of audio characteristics of a virtual space (also herein called a virtual room or simulated audio environment), and FIGS. 11B-11V illustrate user interfaces displayed while outputting different categories of audio content, and user interfaces or viewing and changing audio settings that affect simulated production of audio content in a virtual space.

FIG. 11A shows three energy diagrams representing the audio response of a filter (sometimes called an audio filter, or audio frequency filter) corresponding to a respective virtual space. Each of these diagrams representing the smoothed energy level, sometimes called an energy envelope, produced over time in response to an audio input of short duration, such as 1 to 2 milliseconds, using a filter corresponding to a virtual space having a set of simulated audio characteristics. One of the simulated audio characteristics is reverberation. The top left diagram 1102 of FIG. 11A represents a direct energy component of the audio produced in response to the audio input. Alternatively, the direct energy component can be viewed as the energy of the audio input. As shown in the top left diagram, during an initial period of time (e.g., a period of time having a duration of less than 5 ms; a period of time having a duration of 1 to 2, or 1 to 3, or 1 to 4 ms), the direct energy component exceeds the scale of the diagram.

The bottom left diagram 1104 of FIG. 11A represents a reverberation energy component of the audio produced in response to the audio input, while using the audio filter corresponding to the respective virtual space. Since reverberation corresponds to the simulated reflection of an audio signal from surfaces of the respective virtual space, the energy envelop of the reverberation energy component reaches its peak after the direct energy component, and decays more slowly than the direct energy component. The shape and duration of the reverberation energy components varies from one virtual space to another, similarly to the variation in reverberation characteristics of different physical rooms.

The diagram 1106 on the right side of FIG. 11A represents a scaled combination of the direct energy component and reverberation energy component. In this example, two factors or parameters are used to produce the scaled combination: DRR, which is the ratio of direct energy to reverberant energy in the combined audio signal; and SF, a scaling factor, which scales the combined audio signal. In some embodiments, the scaling factor is determined so that the volume or total energy of the combined audio signal remains at the volume or energy level of the original audio signal. In this context, "remaining at the volume or energy level of the original audio signal" means remaining approximately the same as, or within a predefined range, such as a range no greater than plus or minus 5% or no greater than plus or minus 10%, of the volume or energy level of the original audio signal.

The DRR (e.g., the direct energy to reverberant energy ratio) is a characteristic of the virtual space, and its level corresponds to (or controls) the energy of the reverberation that occurs in response to the audio input. As shown in FIG. 11A, in some embodiments the scaling factor, SF, is equal to $1/(1+(1/DRR))$, where $1+1/DRR$ corresponds to the total energy of the direct and reverberant energy components, prior to scaling, in accordance with the DRR. However, other scaling factors may be used in some embodiments.

FIG. 11B shows a portable multifunction device 100 (e.g., device 100 of FIGS. 1A and 2) having a display 112 (e.g., a touch screen) that is in communication with one or more audio output devices 1108. In some embodiments, device 100 is in wireless communication with a pair of wearable audio output devices 1108-1 and 1108-2, such as in-ear earbuds, an example of which is described above with reference to FIG. 3B. However, in other implementations, device 100 is coupled to another type of audio output device, such as headphones or audio speakers (e.g., audio speakers included device 100 or audio speakers external to device 100), and the coupling maybe either wireless or wired. To reduce clutter, audio output devices 1108 are omitted from the remaining figures in this series, but it is to be understood that device 100 is in communication with one or more audio output devices in order to output audio corresponding to audio content.

In the example shown in FIG. 11B, a movie, "Surf The Movie" is being displayed on the touch-screen 112. In this example, the movie is being displayed by an application, such as a video application or movie application, and what is displayed on the touch-screen 112 is a user interface 1110 of the application, which includes the movie being played by the application. The movie in this example includes audio content that is spatial audio, and playback of the movie includes producing audio output using earbuds 1108, or more generally, one or more audio output devices in communication with the device 100. FIG. 11B shows that the spatial audio of the movie is output using a simulated audio environment, also herein called a virtual space 1112A. While FIG. 11B represents the virtual space 1112A as a simulated movie theatre, the movie theatre is merely an illustrative example. The virtual space 1112A used during playback of a movie may not "sound" like a movie theater, and may instead have a simulated shape and size suitable for producing audio characteristics suitable for playback of a movie, which may or may not be similar to that of a physical movie theatre. For example, FIG. 11V shows on the left side an example of audio characteristics for a virtual space 1112E, and on the right side an example of audio characteristics for a physical space corresponding to (e.g., that was used as a model or starting point for) the virtual space.

FIG. 11B also includes an energy diagram 1114 showing an energy envelope for an audio filter corresponding to the virtual space 1112A in which production of the movie's audio content is simulated by the electronic device 100 and/or by the one or more audio output devices 1108. It is noted that the reverberant energy component shown in FIG. 11B, and in all the remaining figures in this series of figures, is not drawn to the same scale as the combined energy envelope for the virtual space's audio filter. In some embodiments, the combined energy level is produced using a DRR parameter for the virtual space currently in use, and a scaling factor, e.g., a scaling factor based or determined based on the DRR parameter, as discussed above with respect to FIG. 11A.

FIG. 11C shows the portable multifunction device 100 while a music application is being executed by the device. A user interface 1116 for the music application is displayed on the display 112 of the device 110, and as shown in FIG. 11C, audio content (e.g., rock music from a specific album or track) from the music application is output by the device 100, via the aforementioned one or more audio output devices, using a second virtual space 1112B. In this example, the displayed user interface 1116 for the music application includes a representation of a media item being played, such as an album cover or other media identifying information, as well as a plurality of controls, such controls for starting/resuming and stopping playback, a shuffle playback control, and optionally a list of other media or a list of tracks that can be selected for playback.

While FIG. 11C represents the virtual space 1112B as a simulated concert stage, the simulated concert stage is merely an illustrative example. The virtual space 1112B used during playback of audio content from the music application may not "look" like a concert stage, and may instead have a simulated shape and size suitable for producing audio characteristics suitable for playback of music, or a specific type or genre of music, which may or may not be similar to that of a physical concert stage.

FIG. 11C also includes an energy diagram 1118 showing an energy envelope for an audio filter corresponding to the virtual space 1112B in which production of the music application's audio content is simulated by device 100 and/or by the one or more audio output devices in communication with device 100. The second virtual space 1112B has different audio characteristics from the first virtual space 1112A, as indicated by the different shape of the energy envelope for the second virtual space 1112B compared with the shape of the energy envelope for the first virtual space 1112A.

Figure 11D:
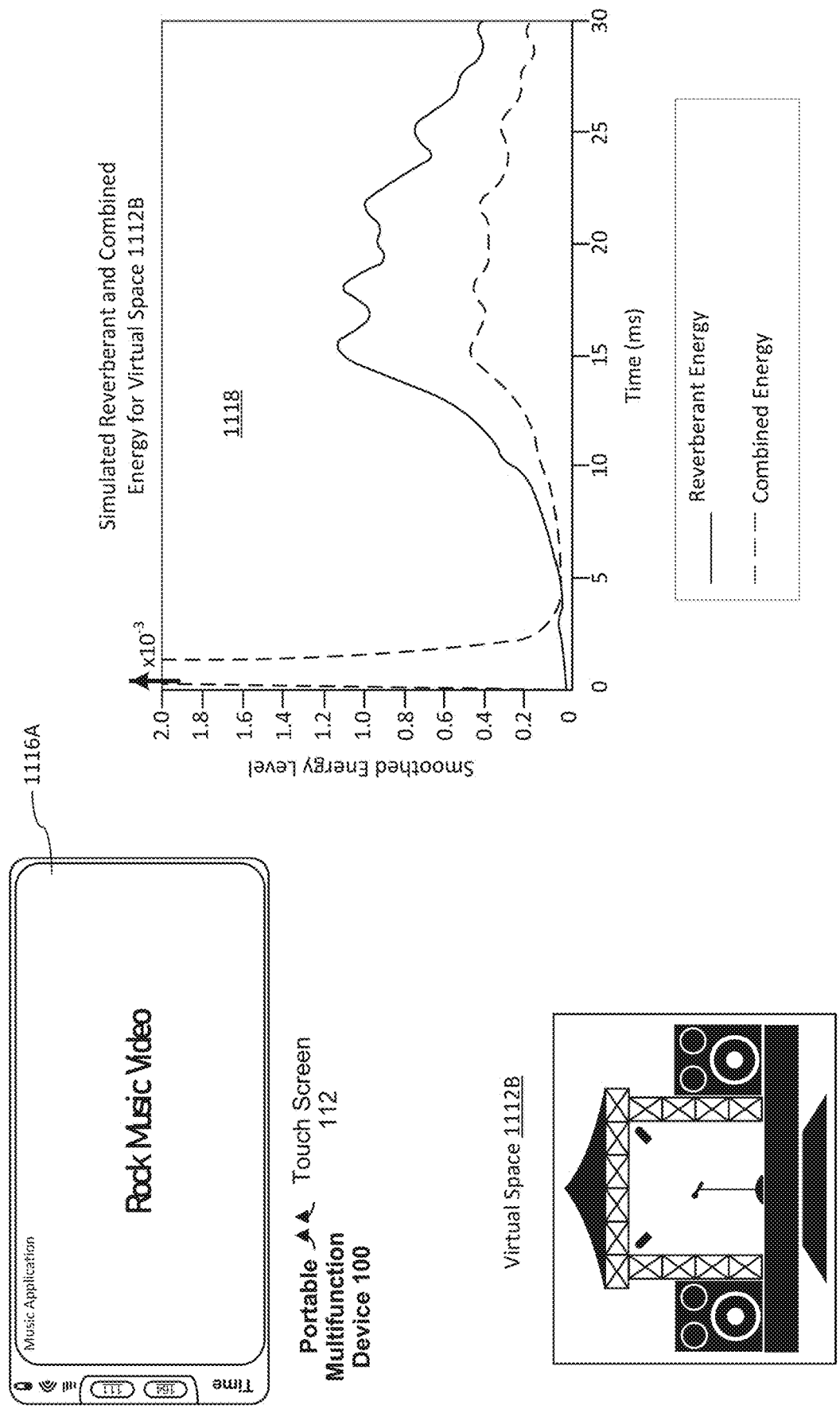

FIG. 11D shows the portable multifunction device 100 while a music video is being played by the music application. A user interface 1116A for the music application is displayed on the display 112 of the device 110, and audio content (e.g., rock music from the music video) from the music application is output by the device 100, via the aforementioned one or more audio output devices, using the same second virtual space 1112B that was used for outputting the audio content of a music album or track in the example shown in FIG. 11C. In this example, the displayed user interface 1116A for the music application includes a representation of music video being played. Furthermore, in the examples presented in FIGS. 11C and 11D, the same virtual space is used to output different types of audio content, where the different types of audio content are produced by the same application, such as a music application.

Figures 1, 11E:
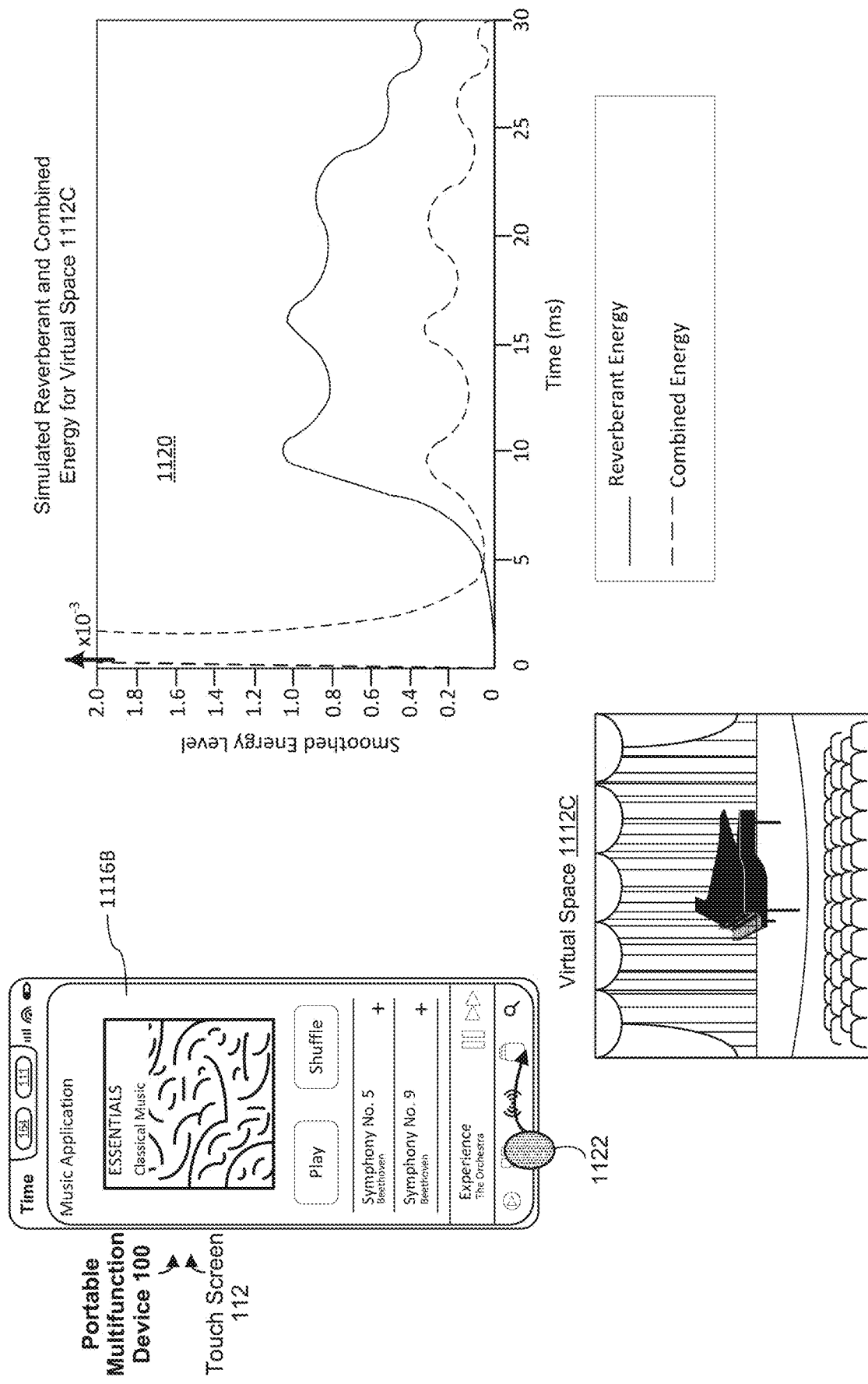
Figures 2, 3, 11E:
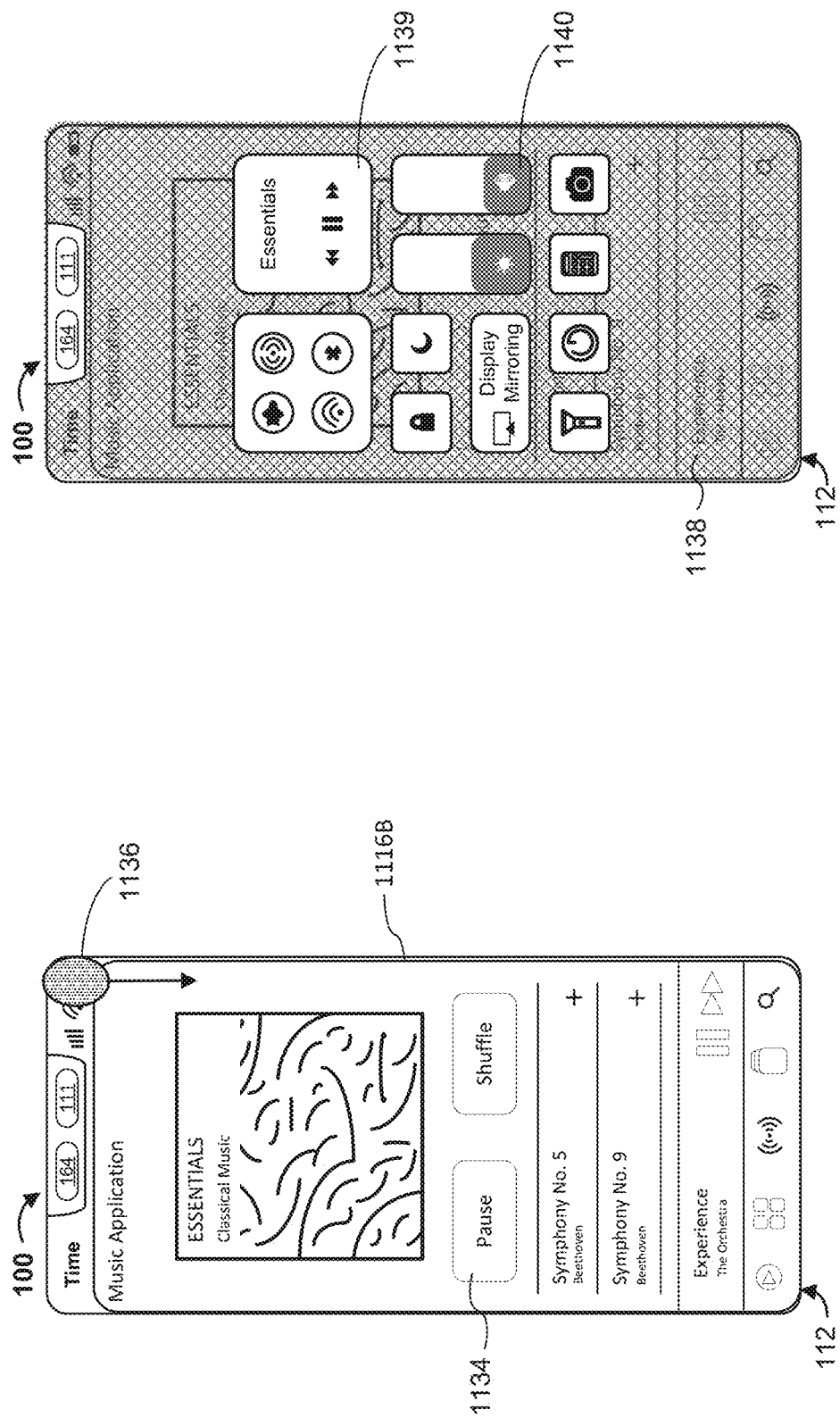

FIG. 11E-1 shows the portable multifunction device 100 while media that is classical music is being played by the music application. A user interface 1116B for the music application is displayed on the display 112 of the device 110, and audio content (e.g., rock music from the music video) from the music application is output by the device 100, via the aforementioned one or more audio output devices, using a third virtual space 1112C. In this example, the displayed user interface 1116B for the music application includes a representation of a media item being played, such as an album cover or other media identifying information, as well as a plurality of controls, such controls for starting/resuming and stopping playback, a shuffle playback control, and optionally a list of other media or a list of tracks that can be selected for playback.

While FIG. 11E-1 represents the virtual space 1112C as a simulated music hall, the simulated music hall is merely an illustrative example. The virtual space 1112C used during playback of a particular type or genre or music, such as classical music, from the music application may not "look" like a music hall, and may instead have a simulated shape and size suitable for producing audio characteristics suitable for playback of music, or a specific type or genre of music, which may or may not be similar to that of a physical music hall.

FIG. 11E-1 also includes an energy diagram 1120 showing an energy envelope for an audio filter corresponding to the third virtual space 1112C in which production of the music application's audio content is simulated by device 100 and/or by the one or more audio output devices in communication with device 100. The third virtual space 1112C has different audio characteristics from the first virtual space 1112A and from the second virtual space 1112B, as indicated by the different shape of the energy envelope for the third virtual space 1112C compared with the shapes of the energy envelopes for the first virtual space 1112A and for the second virtual space 1112B.

In the examples presented in FIGS. 11C and 11E-1, different virtual spaces are used to output different types of audio content (e.g., rock music and classical music), where the different types of audio content are produced by the same application, such as a music application.

Figures 5, 11E:
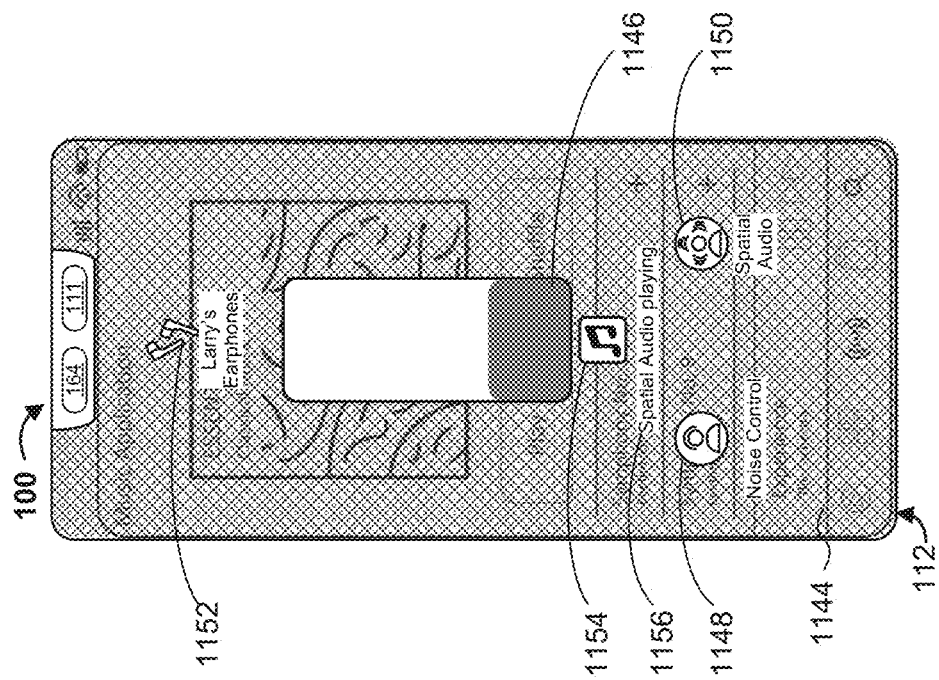
Figures 4, 11E:
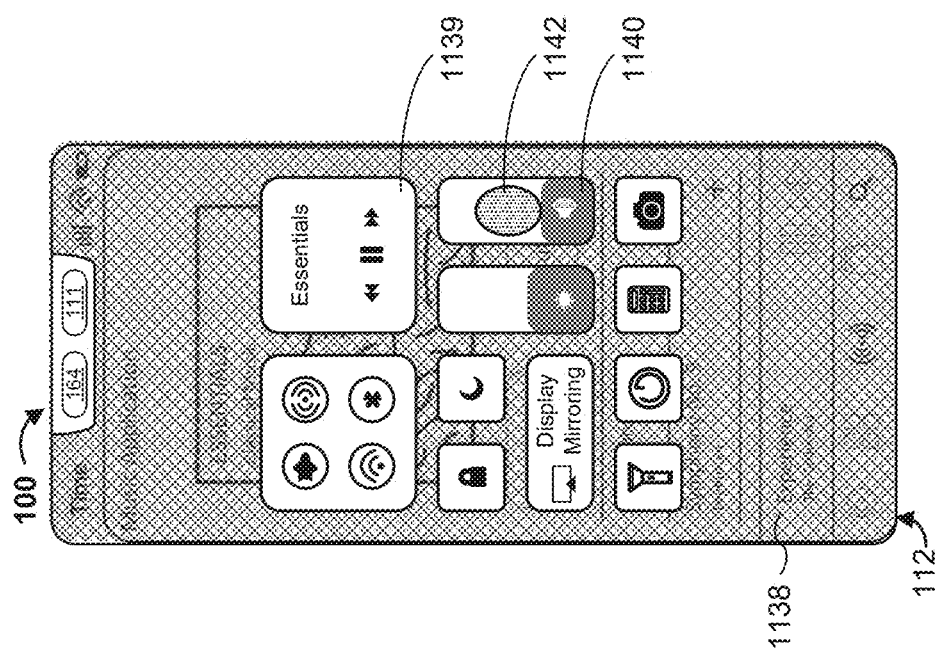
FIG. 4B illustrates an example user interface for a multifunction device with a touch-sensitive surface that is separate from the display in accordance with some embodiments.
Figures 7, 11E:
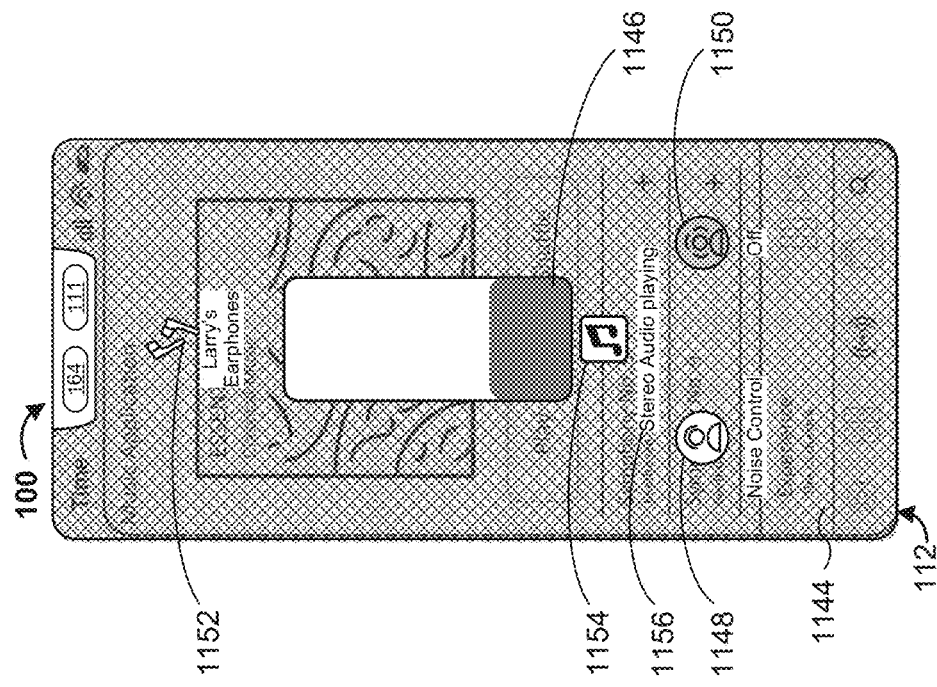
FIGS. 7A-7H are flow diagrams of a process for displaying a dynamic visual communication session (e.g., for displaying user interfaces of a video call application during a communication session) with multiple participants, and representations of simulated spatial audio locations of participants relative to a user of the device in accordance with some embodiments.

FIGS. 11E-2 to 11E-7 illustrate changing an audio output mode for a music application, and thereby changing a spatial audio characteristic of the audio content that is being output by the device 100, while executing the music application, via the one or more audio output devices. In particular, FIGS. 11E-2 to 11E-5 illustrate invoking an audio settings user interface over an application user interface in response to one or more inputs. FIG. 11E-2 illustrates user interface 1116B on touchscreen 112 of device 100. In the example shown in FIG. 11E-2, user interface 1116B is a user interface of a music application. The music application is being used to play music to an audio output device (e.g., earbuds 502, headphones, speakers, etc.), as indicated by play/pause button 1134 currently indicating "Pause," which indicates that the media item represented in the user interface is playing. FIG. 11E-2 also shows input 1136 detected on touchscreen 112 (e.g., a downwards swipe gesture from the top right corner of touchscreen 112). In FIG. 11E-3, in response to input 1136 (in FIG. 11E-2), settings user interface 1138 is displayed on touchscreen 112. In some embodiments, settings user interface 1138 is overlaid on and at least partially obscures the previously displayed user interface, in this case music application user interface 1116B (FIG. 11E-1). In some embodiments, settings user interface 1138 replaces the previously displayed user interface. Settings user interface 1138 includes a plurality of controls for controlling various features of device 100, such as media control 1139, which identifies the music that is playing from the music application and includes play/pause and back and forward controls, data connectivity controls, a screen orientation control, a brightness control, volume control 1140, and shortcuts to various applications.

FIG. 11E-4 shows input 1142 on volume control 1140 in settings user interface 1138 (e.g., a tap gesture or a long press gesture that is maintained on volume control 1140 for at least a predetermined amount of time). In FIG. 11E-5, audio settings user interface 1144 is displayed in response to input 1142 (in FIG. 11E-4). In some embodiments, audio settings user interface 1144 represents a submenu of settings user interface 1138. In the example shown in FIG. 11E-5, audio settings user interface 1144 includes expanded volume control slider 1146 for adjusting audio output volume (e.g., expanded volume control slider 1146 in audio settings user interface 1144 is a larger version of and has analogous behavior to volume control 1140 in settings user interface 1138), noise management control 1148 for selecting an available noise control audio output mode as the current noise control audio output mode and indicating that the active noise control mode is currently selected, and spatial audio toggle 1150 for enabling (e.g., activating) or disabling (e.g., deactivating) a spatial audio output mode. The example appearance of spatial audio toggle 1150 in FIG. 11E-5 indicates that spatial audio is currently enabled. In addition, in the example shown in FIG. 11E-59, audio settings user interface 1144 includes indication 1152 identifying the currently connected set of audio output devices (e.g., the label "Larry's Earphones" identifying earbuds 1162, icon 1154 identifying the application that is currently outputting audio (e.g., the music application icon), and indication 1156 identifying the type of audio that is currently being output (e.g., the text "Spatial Audio playing" indicating that spatial audio is currently being played).

Figures 6, 11E:
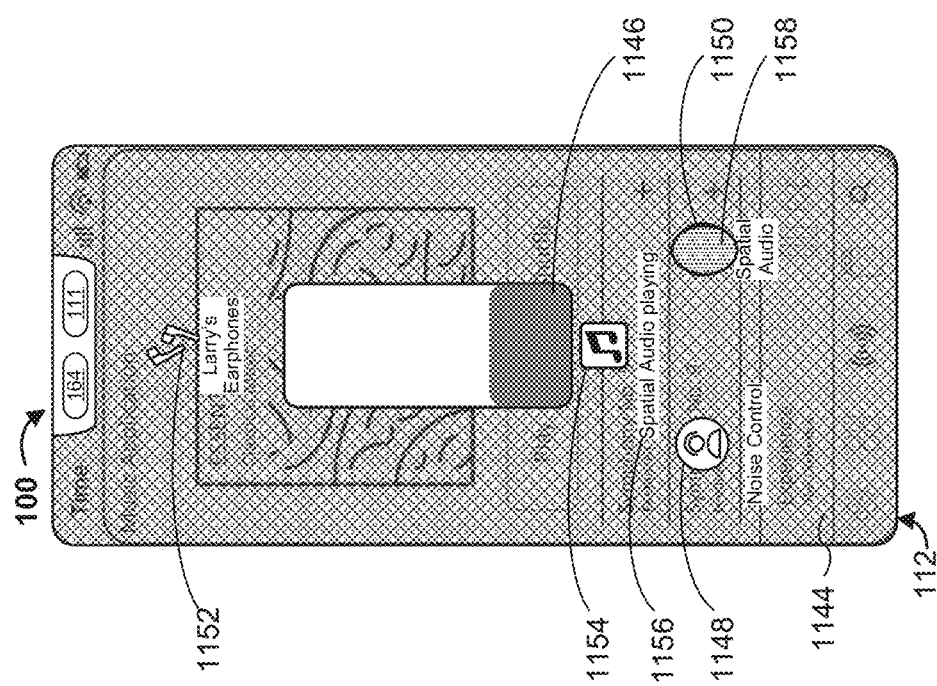

FIGS. 11E-6 and 11E-7 illustrate changing a spatial audio output mode setting. In particular, FIG. 11E-6 shows input 1158 (e.g., a tap gesture) on spatial audio toggle 1150. In FIG. 11E-7, in response to input 1168 on spatial audio toggle 1160 (in FIG. 11E-6), spatial audio is disabled, as indicated by the appearance of spatial audio toggle 1150 and by indication 1156 (e.g., the text "Stereo Audio playing" indicating that stereo audio is currently being played and that spatial audio is no longer being played). In this example, disabling spatial audio changes the spatial audio output mode from spatial audio to spatialized stereo.

A spatial audio output mode is a mode that allows audio that is output from the one or more audio output devices, such as earbuds 1108, to sound as though the audio is coming from one or more locations (e.g., one or more sources of sound) in a frame of reference, such as a physical environment (e.g., a surround sound effect), where the positioning of the one or more simulated or perceived sources of sound is independent of movement of earbuds 1108 relative to the frame of reference. Typically, the one or more perceived sound sources, when fixed, are fixed relative to the frame of reference, and, when moving, move relative to the frame of reference. For example, where the frame of reference is a physical environment, the one or more perceived sound sources have respective spatial locations in the physical environment. As earbuds 1108 move about the physical environment, the audio output from earbuds 1108 is adjusted so that the audio continues to sound as though it is coming from the one or more perceived sound sources at the respective spatial locations in the physical environment. Where the one or more perceived sound sources are moving sources that move through a sequence of spatial locations about the physical environment, the audio output from earbuds 1108 is adjusted so that the audio continues to sound as though it is coming from the one or more perceived sound sources at the sequence of spatial locations in the physical environment. Such adjustment for moving sound sources also takes into account any movement of earbuds 1108 relative to the physical environment (e.g., if earbuds 1108 move relative to the physical environment along an analogous path as the moving source of sound so as to maintain a constant spatial relationship with the source of sound, the audio would be output so that the sound does not appear to move relative to earbuds 1108).

In some embodiments, the frame of reference for the spatial audio effect is fixed to an electronic device, such as device 100, that is outputting audio via earbuds 1108 or other audio output devices (e.g., the sound follows the device), and is referred to herein as the "follow device" feature. For example, locations of the simulated sources of the audio in a physical environment move corresponding to movement of device 100 in the physical environment. This feature may be useful when the user is traveling in a vehicle or other mode of transportation, or walking, or the like and the device is moving along with the user, so the audio moves along with the device and the user in the vehicle, or in situations where the device is moving relative to the audio output device(s) and is associated with visual content playing on the device, so that the simulated sources of sound are located at virtual locations that correspond to the location of the device as it moves around the physical environment. When the follow device feature is not enabled, the audio output does not follow the movement of device 100. For example, spatial audio is positioned relative to a frame of reference that is not fixed to device 100 (e.g., such that the spatial audio is not moved based on movement of device 100 even as device 100 moves relative to the frame of reference), and non-spatial stereo or mono audio is positioned relative to the position of the earbuds, and is not moved based on device 100 being moved.

As used herein, "spatial audio" refers to audio content that includes three or more audio channels (e.g., more than merely left and right channels as in stereo audio) rendered to simulate virtual speakers placed around a user's head. As used herein, "spatialized stereo audio" refers to two-channel stereo audio content that is put through an upscaling algorithm and output spatially even though the underlying stereo audio content does not have more than two channels.

In some embodiments, a non-spatial audio output mode is an audio output mode where audio of the set of one or more audio output devices is not adjusted as the set of one or more audio output devices is moved relative to the frame of reference (e.g., resulting in not maintaining the one or more sources of sound in a substantially fixed position relative to the frame of reference (e.g., relative to a three-dimensional environment or relative to a displayed user interface corresponding to the one or more sources of sound, such as the display of a device or a projected user interface)).

Returning to FIG. 11E-1, FIG. 11E-1 also shows input 1122 for switching from the music application to a different application (e.g., a previously launched application executing in the background on device 100. In FIG. 11L, in response to input 1122 (FIG. 11E), user interface 1124A is displayed on touchscreen 112 instead of music application user interface 1116B. In the example shown in FIG. 11G, user interface 1124A is a user interface of a video call application. Video call application user interface 1124A includes representations of a plurality of participants in a video communication session, which optionally include dynamic representations (e.g., video representations) of one or more or a plurality of the participants in the video communication session, and also optionally includes a number of controls, such as controls A, B, C, D, E and N shown in FIG. 11G.

FIG. 11F shows the portable multifunction device 100 while a video call application is being executed by device 100, with user interface 1124A for the video call application being displayed on the display 112 of the device 110, and audio content (e.g., voices of the participants in the video communication session) from the video call application is output by the device 100, via the aforementioned one or more audio output devices, using a fourth virtual space 1112D.

While FIG. 11F represents the virtual space 1112D as a simulated meeting space, such as a meeting room, the simulated meeting space hall is merely an illustrative example. The virtual space 1112D used to present audio content during a video communication session may not "look" like a meeting space or meeting room, and may instead have a simulated shape and size suitable for producing audio characteristics suitable for a video communication session, or suitable for a meeting having a number of participants corresponding to the number of participants in the video communication session.

FIG. 11F also includes an energy diagram 1126 showing an energy envelope for an audio filter corresponding to the fourth virtual space 1112D in which production of the video communication session's audio content is simulated by device 100 and/or by the one or more audio output devices in communication with device 100. The fourth virtual space 1112D has different audio characteristics from the first, second and third virtual spaces, 1112A, 1112B and 1112C, respectively, as indicated by the different shape of the energy envelope for the fourth virtual space 1112D compared with the shapes of the energy envelopes for the first, second and third virtual spaces, 1112A, 1112B and 1112C. See also FIG. 11U for examples of different energy envelopes for a plurality of distinct virtual spaces.

Figure 11H:
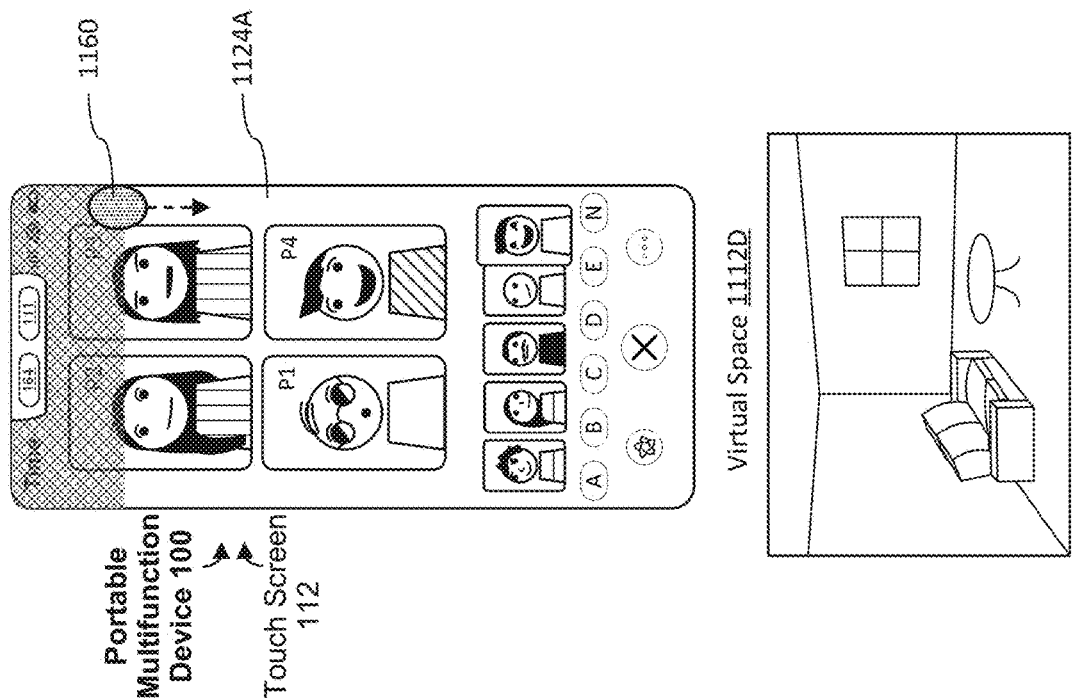
Figure 11G:
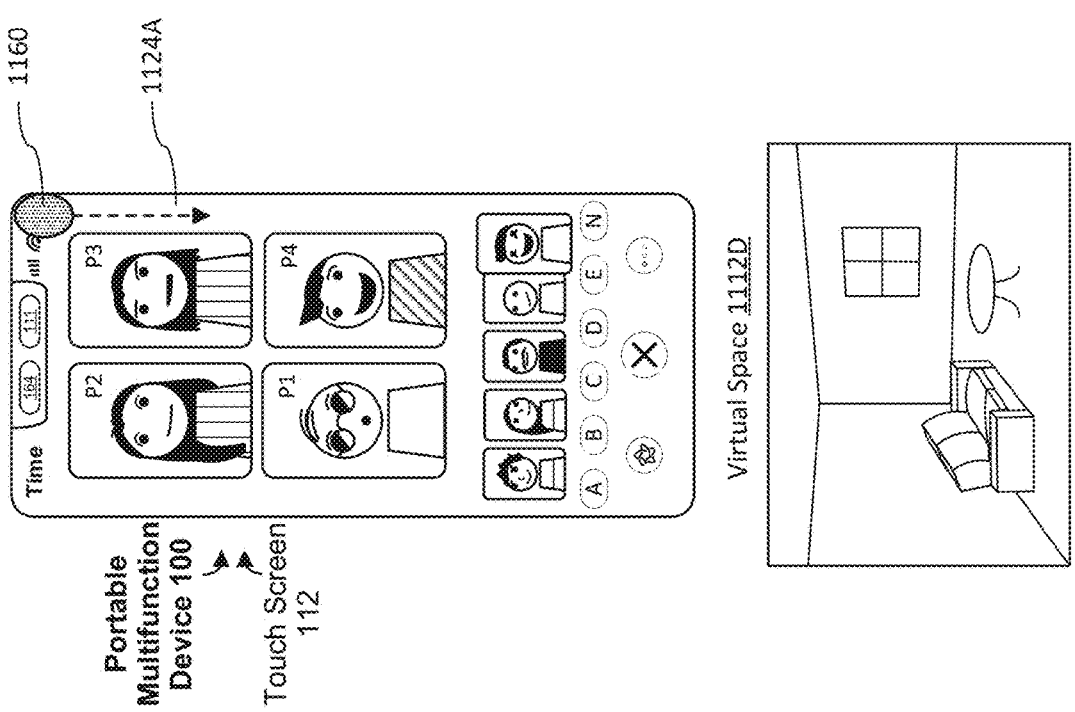
Figure 11J:
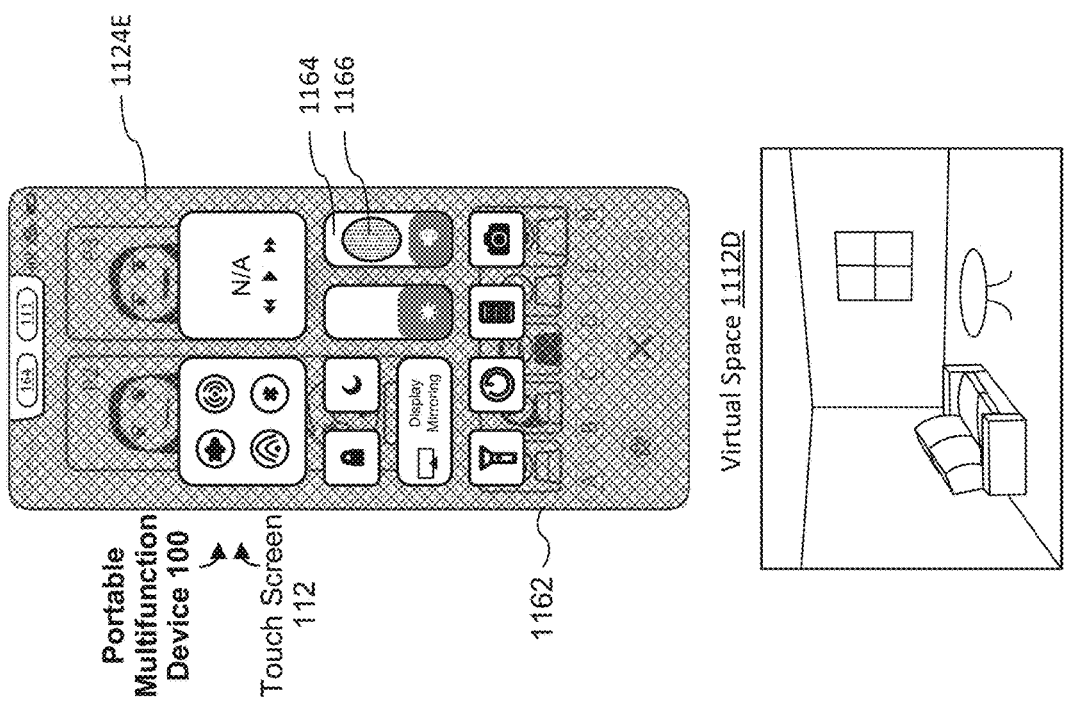
Figure 11I:
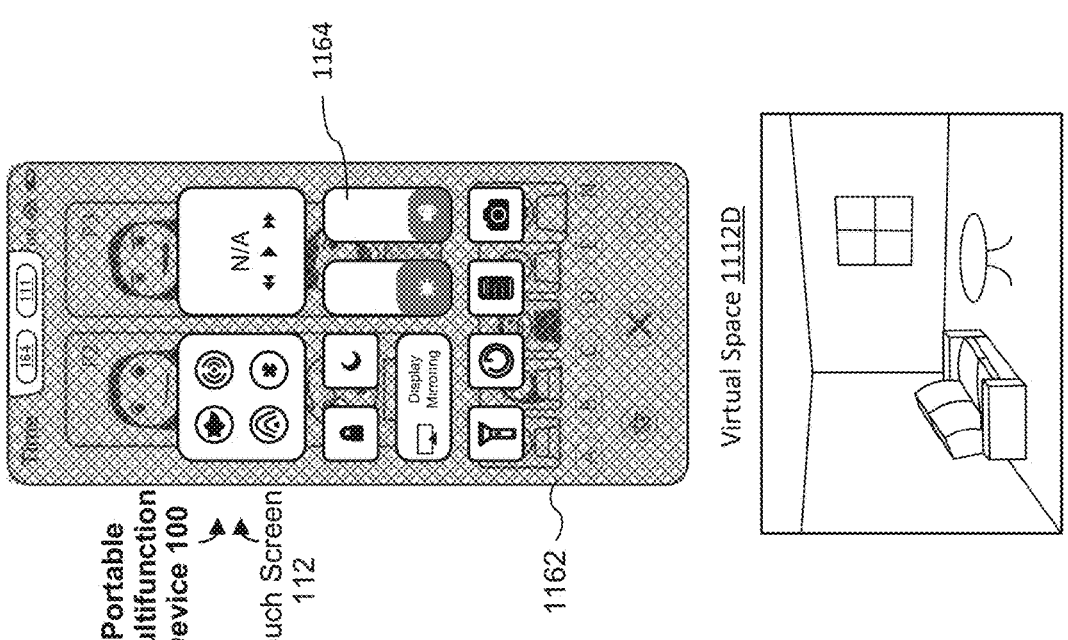
Figure 11L:
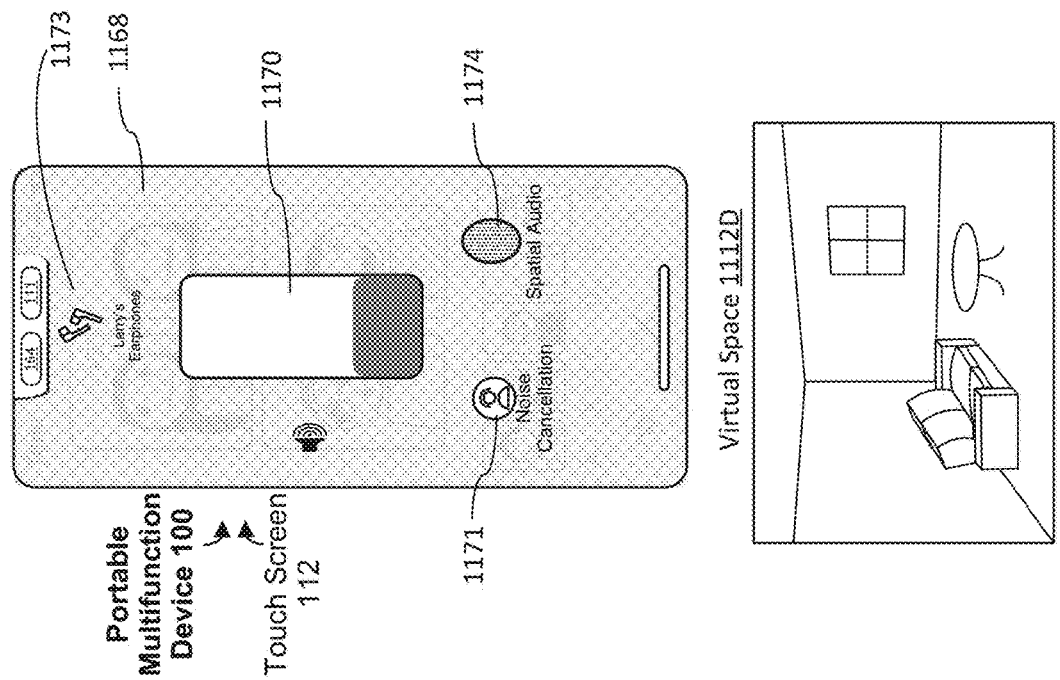

FIGS. 11G to 11M illustrate that, in some embodiments, a spatial audio output mode for the device 100, while executing a video call application and outputting audio from an ongoing video communication session, cannot be changed by a user of the device 100. FIG. 11G also shows input 1160 detected on touchscreen 112 (e.g., a downward swipe gesture from the top right corner of touchscreen 112). In FIGS. 11H and 11I, in response to input 1160 (in FIG. 11G), settings user interface 1162 is displayed on touchscreen 112. Optionally, the transition to displaying settings user interface 1162 is an animated transition, for example an animated transition that progresses in accordance with movement of the downward swipe gesture, and shown in FIGS. 11H and 11I. In some embodiments, settings user interface 1162 is overlaid on and at least partially obscures the previously displayed user interface, in this case video call application user interface 1124A (FIG. 11G). In some embodiments, settings user interface 1162 replaces the previously displayed user interface. Settings user interface 1162 includes a plurality of controls for controlling various features of device 100, such as media controls, data connectivity controls, a screen orientation control, a brightness control, volume control 1164, and shortcuts to various applications.

Figure 11K:
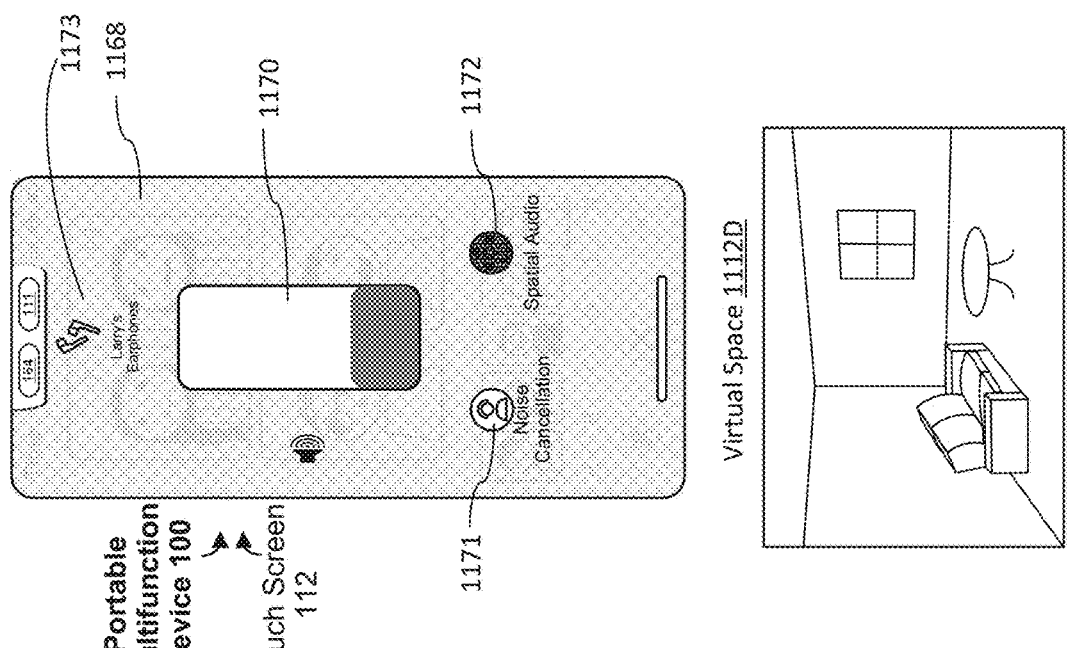

FIG. 11J shows input 1166 on volume control 1164 in settings user interface 1162 (e.g., a tap gesture or a long press gesture that is maintained on volume control 1164 for at least a predetermined amount of time). In FIG. 11K, audio settings user interface 1168 is displayed in response to input 1166 (in FIG. 11J). In some embodiments, audio settings user interface 1168 represents a submenu of settings user interface 1162. In the example shown in FIG. 11K, audio settings user interface 1168 includes expanded volume control slider 1170 for adjusting audio output volume (e.g., expanded volume control slider 1170 in audio settings user interface 1168 is a larger version of and has analogous behavior to volume control 1164 in settings user interface 1162), noise management control 1171 for selecting an available noise control audio output mode as the current noise control audio output mode and indicating that the active noise control mode is currently selected, and spatial audio toggle 1172 for enabling (e.g., activating) or disabling (e.g., deactivating) a spatial audio output mode. The example appearance of spatial audio toggle 1172 in FIG. 11K indicates that spatial audio is currently enabled and cannot be disabled by the user. In addition, as shown in FIG. 11K, in some embodiments, audio settings user interface 1168 includes an indication identifying the currently connected set of audio output devices (e.g., the label "Larry's Earphones" identifying earbuds 1173. In some embodiments, as shown in FIG. 11E-5 but not in FIG. 11K, audio settings user interface 1168 includes an icon identifying the application that is currently outputting audio (e.g., in user interface 1168, a video call application icon), and an indication identifying the type of audio that is currently being output (e.g., the text "Spatial Audio playing" indicating that spatial audio is currently being played).

Figure 11N:
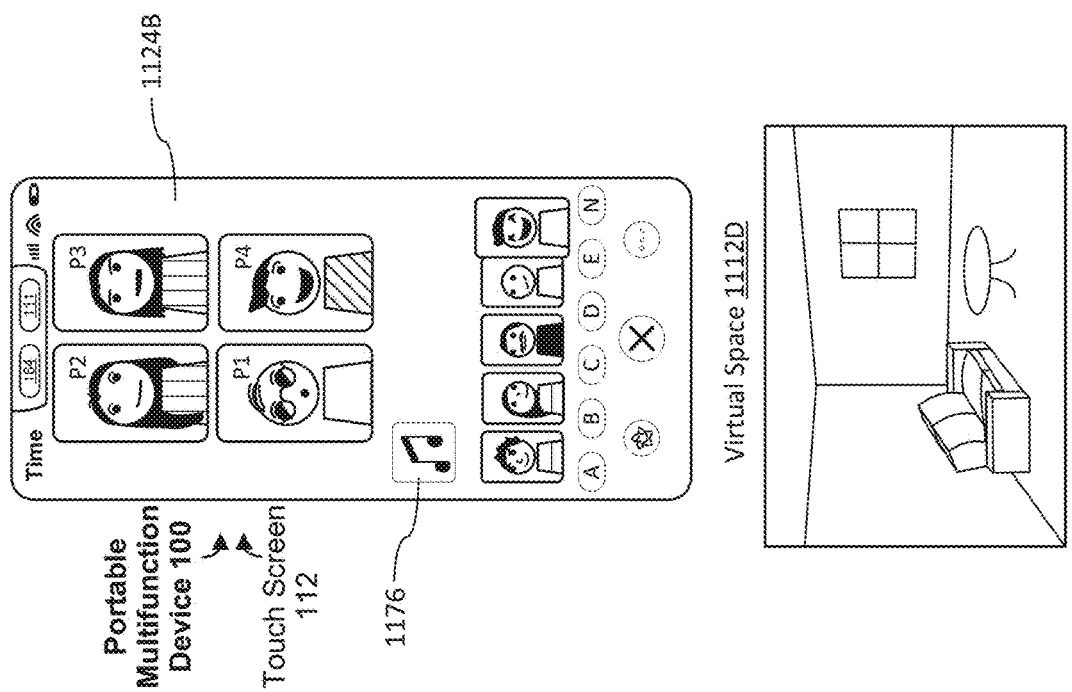
Figure 11M:
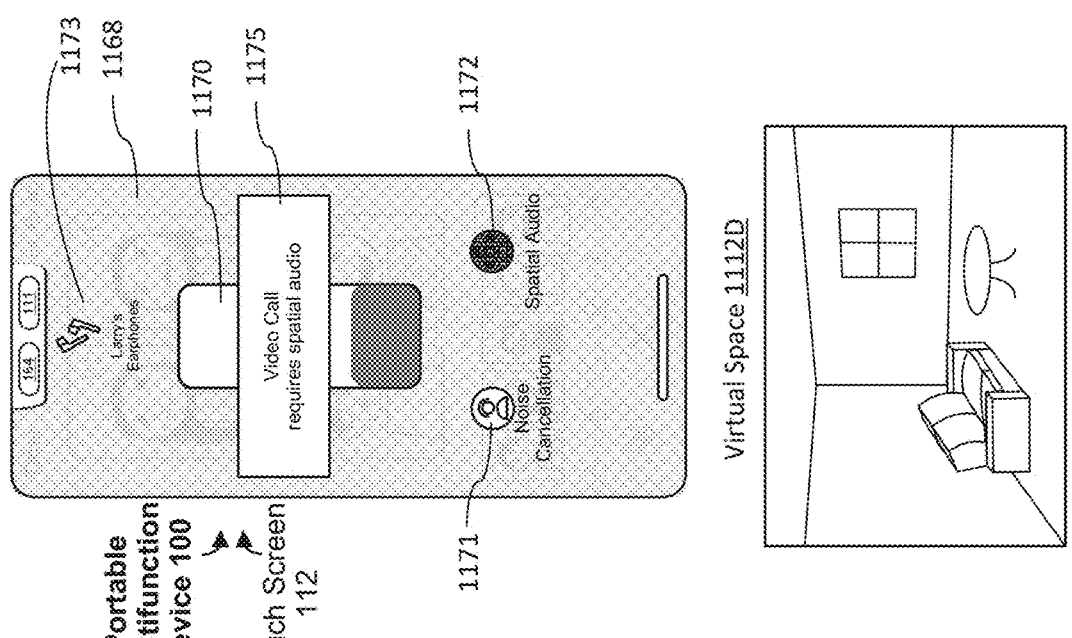

FIGS. 11L and 11M illustrate a user attempting, unsuccessfully, to change the spatial audio output mode setting. In particular, FIG. 11M shows input 1174 (e.g., a tap gesture) on spatial audio toggle 1172. In FIG. 11M, in response to input 1174 on spatial audio toggle 1172 (in FIG. 11L), spatial audio remains enabled (e.g., the spatial audio output mode is not changed in response to input 1174), as indicated by the appearance of spatial audio toggle 1172 and by indication 1175 (e.g., the text "Video Call requires spatial audio" indicating that spatial audio cannot be disabled while audio content from a video call is being output by the one or more audio output devices).

FIG. 11N is similar to FIG. 11F, described above, except that the audio content produced by the video call application includes shared media content, represented by media item 1176. FIGS. 11O to 11S, similar to FIGS. 11G to 11M, illustrate a user accessing a settings user interface 1162 while executing a video call application, in response to a user input 1160A. Optionally, the transition to displaying settings user interface 1162 is an animated transition, for example an animated transition that progresses in accordance with movement of the downward swipe gesture, and shown in FIGS. 11O and 11P. In some embodiments, settings user interface 1162 is overlaid on and at least partially obscures the previously displayed user interface, in this case video call application user interface 1124B (FIG. 11N). In some embodiments, settings user interface 1162 replaces the previously displayed user interface. As described above, settings user interface 1162 includes a plurality of controls for controlling various features of device 100, such as media controls, data connectivity controls, a screen orientation control, a brightness control, volume control 1164, and shortcuts to various applications.

Figure 11P:
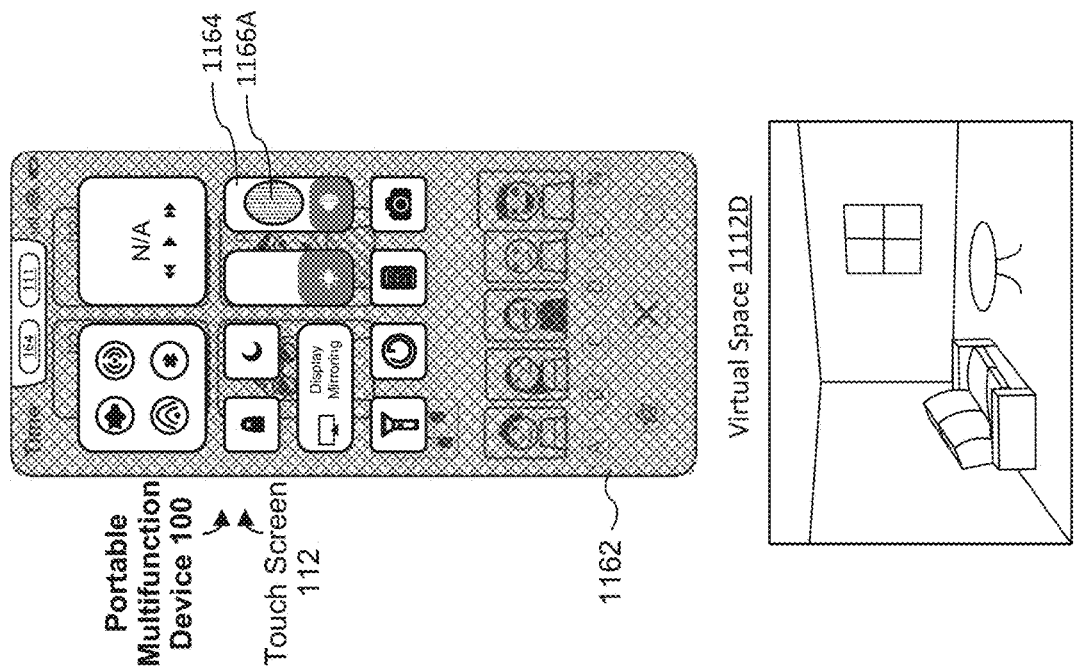
Figure 11O:
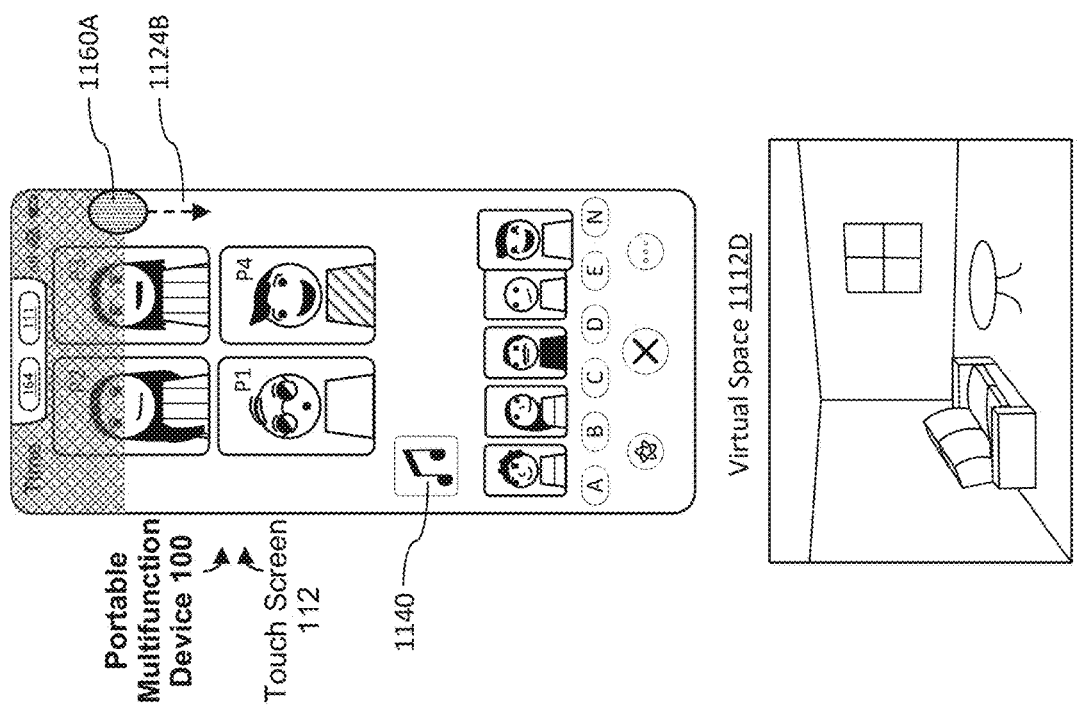

FIG. 11P shows input 1166A on volume control 1164 in settings user interface 1162 (e.g., a tap gesture or a long press gesture that is maintained on volume control 1164 for at least a predetermined amount of time). In FIG. 11Q, audio settings user interface 1168 is displayed in response to input 1166A (in FIG. 11P). As described above in some embodiments, audio settings user interface 1168 represents a submenu of settings user interface 1162. In the example shown in FIG. 11Q, audio settings user interface 1168 includes expanded volume control slider 1170 for adjusting audio output volume (e.g., expanded volume control slider 1170 in audio settings user interface 1168 is a larger version of and has analogous behavior to volume control 1164 in settings user interface 1162), noise management control 1171 for selecting an available noise control audio output mode as the current noise control audio output mode and indicating that the active noise control mode is currently selected, and spatial audio toggle 1172 for enabling (e.g., activating) or disabling (e.g., deactivating) a spatial audio output mode. The example appearance of spatial audio toggle 1172 in FIG. 11Q indicates that spatial audio is currently enabled and cannot be disabled by the user. In addition, as shown in FIG. 11Q, in some embodiments, audio settings user interface 1168 includes an indication identifying the currently connected set of audio output devices (e.g., the label "Larry's Earphones" identifying earbuds 1173. In some embodiments, as shown in FIG. 11E-5 but not in FIG. 11Q, audio settings user interface 1168 includes an icon identifying the application that is currently outputting audio (e.g., in user interface 1168, a video call application icon), and an indication identifying the type of audio that is currently being output (e.g., the text "Spatial Audio playing" indicating that spatial audio is currently being played).

Figure 11R:
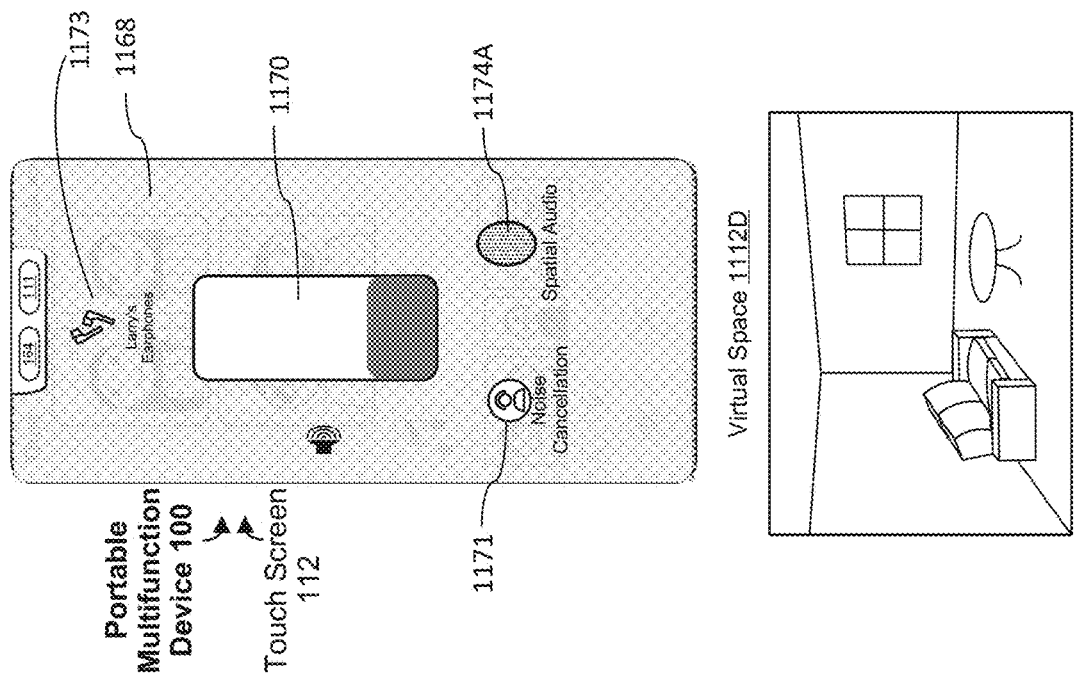
Figure 11Q:
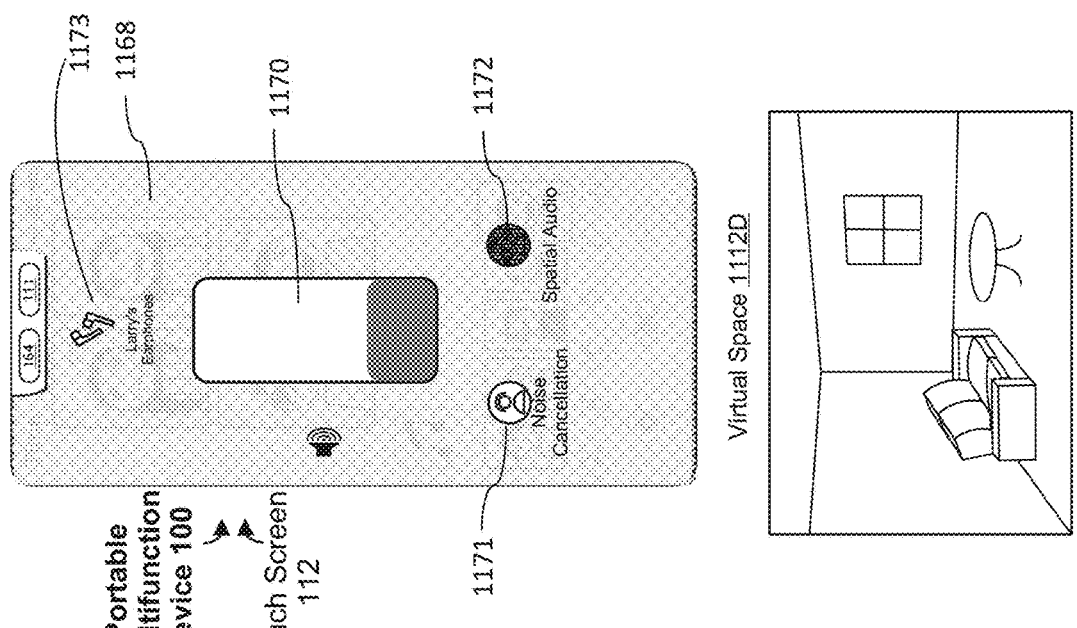
Figure 11S:
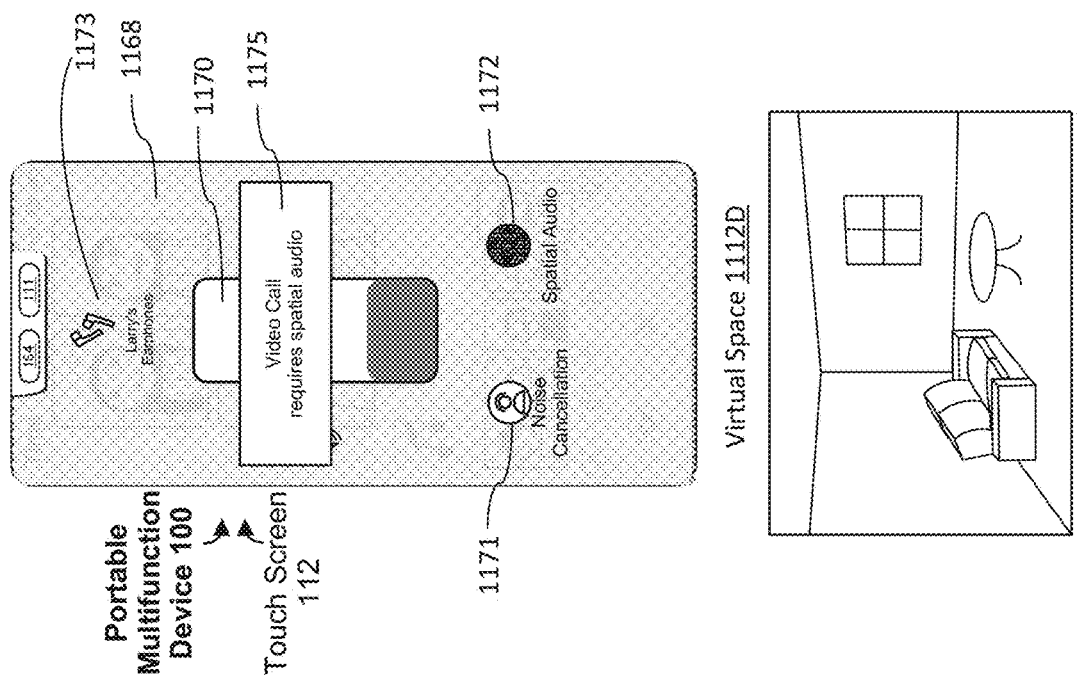

FIGS. 11R and 11S illustrate a user attempting, unsuccessfully, to change the spatial audio output mode setting. In particular, FIG. 11R shows input 1174A (e.g., a tap gesture) on spatial audio toggle 1172. In FIG. 11S, in response to input 1174A on spatial audio toggle 1172 (in FIG. 11R), spatial audio remains enabled (e.g., the spatial audio output mode is not changed in response to input 1174A), as indicated by the appearance of spatial audio toggle 1172 and by indication 1175 (e.g., the text "Video Call requires spatial audio" indicating that spatial audio cannot be disabled while audio content from a video call is being output by the one or more audio output devices).

FIG. 11T illustrates that, in some embodiments, for the same media item or audio source, such as a respective movie, different virtual spaces (e.g., virtual spaces 1112E and 1112F) are used to simulate production of spatial audio content when the media item or audio source are output by different electronic devices 100 and 1190. For example, the content category of the respective movie may be assigned to different categories of audio content, each associate with different virtual spaces, based on the type of the electronic device (e.g., device 100 or 1190) that is outputting, via the set of one or more audio output devices, audio content in a simulated three-dimensional environment. As shown, virtual spaces 1112E and 1112F, corresponding to two different categories of audio content, have different energy envelopes.

Figure 11U:
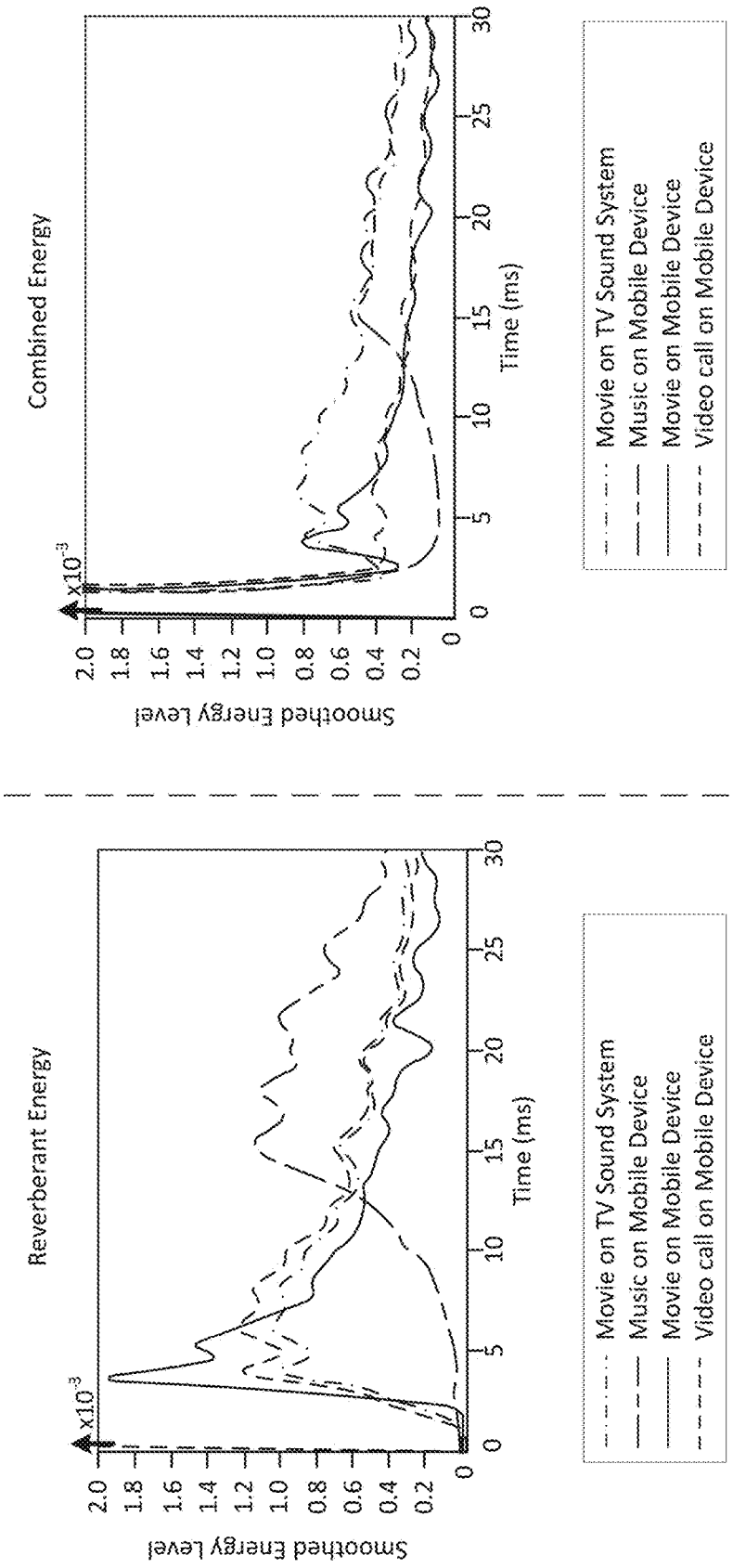
Figure 12A:
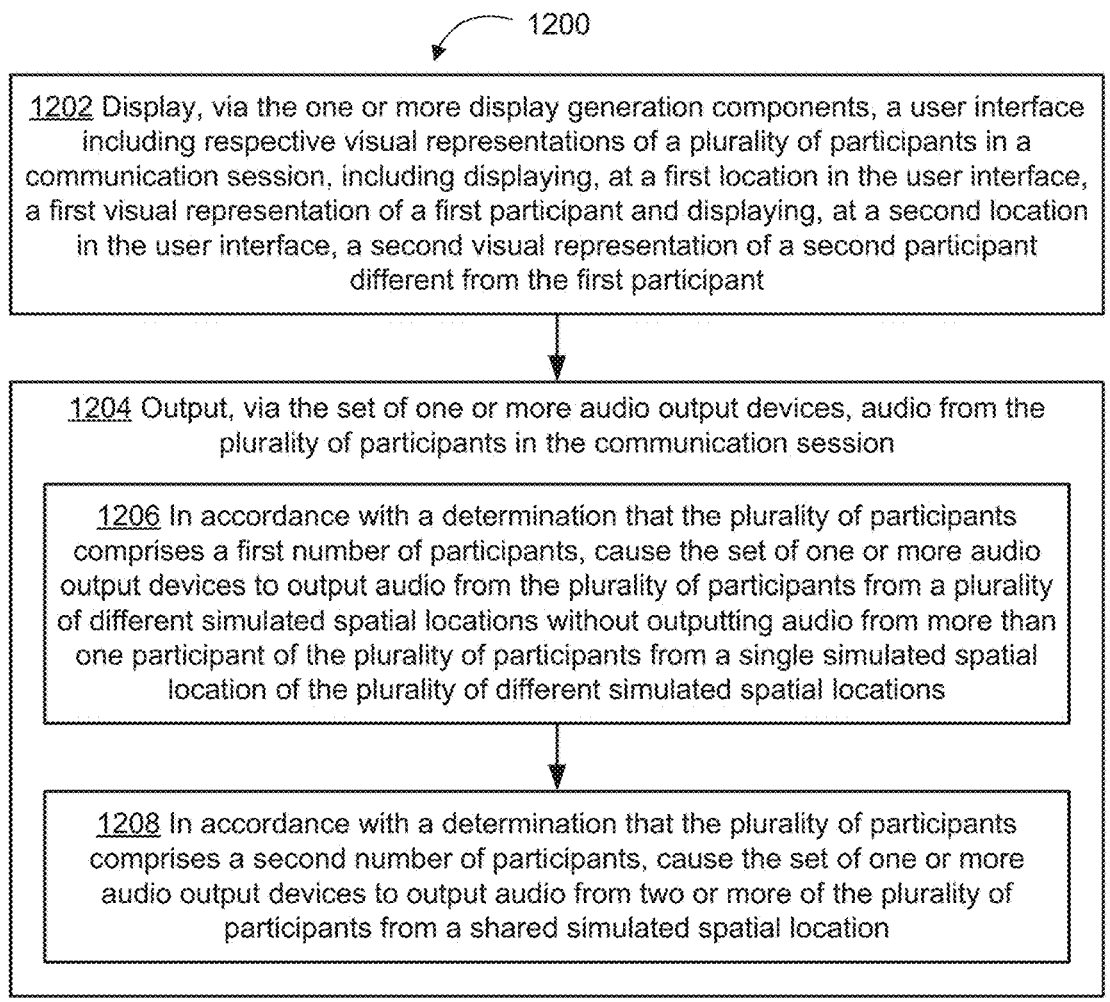

FIG. 11U illustrates a few examples of reverberant energy envelopes and combined energy envelopes for a plurality of different virtual spaces, each corresponding to a category of audio content determined based on both the type of the electronic device that is outputting the audio content and the application providing the audio content or a content type of the audio content being output by the electronic device. As shown, there can be significant variation in the energy envelopes of the different virtual spaces.

FIGS. 12A-12E are flow diagrams illustrating method 1200 for displaying a dynamic visual communication session (e.g., user interfaces of a video call application during a communication session) with multiple participants and for outputting audio of participants at simulated spatial audio locations relative to a user of the device, based on activity levels of participants. Method 1200 is performed at an electronic device (e.g., device 300, FIG. 3A, or portable multifunction device 100, FIG. 1A) that is in communication with one or more display generation components (e.g., touch-sensitive display system 112, FIG. 1A, or display 340, FIG. 3A), one or more input devices (e.g., touch-sensitive display system 112, FIG. 1A, or touchpad 355, FIG. 3A), and a set of one or more audio output devices (e.g., one or more wearable audio output devices 301, FIG. 3B). Some operations in method 1200 are, optionally, combined and/or the order of some operations is, optionally, changed.

As described below, method 1200 outputs audio from different participants in a communication session at different simulated spatial locations, which helps a user to identify and distinguish between different participants and makes the audio more intelligible. When the communication session has more than a threshold number of participants, the audio of some (e.g., two or more) of the participants is output at a same (e.g., shared) simulated spatial location, which aurally deemphasizes those participants relative to other participants, provides audio feedback to the user indicating that the participants with the shared simulated spatial audio location are speaking or producing audio below a threshold activity level and/or less than that of the other participants, and reduces the cognitive burden that would otherwise be placed on the user by outputting audio at too many simulated spatial locations. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

The device displays (1202), via the one or more display generation components, a user interface including respective visual representations of a plurality of participants in a communication session, including displaying, at a first location in the user interface, a first visual representation of a first participant (e.g., representation 1001 of participant one, FIGS. 10A-10J) and displaying, at a second location in the user interface, a second visual representation of a second participant different from the first participant (e.g., representation 1003 of participant two, FIG. 10A-10J).

The device outputs (1204), via the set of one or more audio output devices, audio from the plurality of participants in the communication session, including: in accordance with a determination that the plurality of participants comprises a first number of participants (e.g., N (e.g., 3, 4 or 5) or fewer participants), causing (1206) the set of one or more audio output devices to output audio from the plurality of participants from a plurality of different simulated spatial locations (e.g., from N different simulated spatial locations) without outputting audio from more than one participant of the plurality of participants from a single simulated spatial location of the plurality of different simulated spatial locations (e.g., without outputting audio from more than one participant of the plurality of participants from any single simulated spatial location of the plurality of different simulated spatial locations); and, in accordance with a determination that the plurality of participants comprises a second number of participants (e.g., more than N participants), causing (1208) the set of one or more audio output devices to output audio from two or more of the plurality of participants (e.g., from each roster participant, or, from each of two or more of the plurality of participants) from a shared simulated spatial location (e.g., a shared simulated location in a three dimensional environment in which the electronic device is located) (e.g., separate audio streams from each of the roster participants are output from the shared simulated spatial location) (e.g., wherein the two or more of the plurality of participants comprise a first subset of the plurality of participants; and the electronic device outputs audio from each other participant of the plurality of participants, not included in the first subset of the plurality of participants, from a simulated spatial location that is different than the simulated spatial location from which audio is output for each other participant of the plurality of participants). In some embodiments, even if the visual representations of the first and second participants partially overlap, a centroid of the first visual representation of a first participant is different from a centroid of the second visual representation of a second participant. For example, in FIG. 10A, audio from participants one and two is output from two different respective simulated spatial locations 1005 and 1007, respectively, without outputting audio from a shared simulated spatial location; in FIG. 10B, audio from participants other than user 501 and other than participants one, two, three, and four is output from shared simulated spatial location 1012.

In some embodiments, two or more of the plurality of participants comprise (1210) a first subset of the participants (e.g., the roster participants), and the plurality of participants other than the first subset comprise a second subset of the plurality of participants (e.g., non-roster participants), and, in accordance with the determination that the plurality of participants comprises the second number of participants, the electronic device displays in the user interface visual representations of the participants in the second subset and visual representations of the participants in the first subset. In some such embodiments, the visual representations of the participants in the first subset are smaller than the visual representations of the participants in the second subset (e.g., visual representations of each participant of the plurality of participants for whom audio is output from the shared simulated spatial location are displayed in the user interface at a smaller size than visual representations of each of participant for whom audio is output from a simulated spatial location other than the shared simulated spatial location). For example, in FIGS. 10B and 10C, the visual representations of participants in roster region 1004 are smaller than the visual representations of participants in in-focus region 1002. Displaying visual representations of the participants with the shared simulated spatial audio location (e.g., roster participants) as smaller than the visual representations of the other participants (e.g., non-roster participants) visually deemphasizes the roster participants and allows the user to focus visually on the non-roster participants, provides visual feedback to the user that the roster participants are speaking or producing audio below a threshold activity level and/or less than those not in the roster, and helps the user to better associate the visual representations in the user interface with their corresponding audio, which provides improved feedback to the user.

In some embodiments, the set of one or more audio output devices is (1212) a set of one or more wearable audio output devices (e.g., one or more earbuds such as earbuds 502, an over ear headset, or any other wearable hearing device). With respect to outputting the audio of some (e.g., two or more) participants at a same (e.g., shared) simulated spatial location when the communication session has more than a threshold number of participants, doing so for wearable audio output devices helps the user visualize the different participants in the communication session and their respective activity levels even as the user moves relative to the frame of reference of the audio communication session while wearing the audio output devices, which provides improved feedback to the user.

In some embodiments, the first visual representation of the first participant is (1214) a dynamic visual representation (e.g., video or animated image) of the first participant, and the second visual representation of the second participant is a dynamic visual representation (e.g., video or animated image) of the second participant (e.g., as described herein with reference to FIG. 10A). Displaying dynamic visual representations of the participants helps the user visualize and distinguish between different participants, which provides improved feedback to the user.

In some embodiments, in accordance with a change in an activity state of a respective participant of the plurality of participants (e.g., a respective participant for whom audio is output at an individual (e.g., non-shared) simulated spatial location), the electronic device changes (1216) visual prominence of the respective participant's visual representation in the user interface or changes audio prominence of audio from the respective participant output by the set of one or more audio output devices (e.g., as described herein with reference to participant three in FIGS. 10D-10E, participant four in FIGS. 10F-10I, and participant five in FIGS. 10H-10J). For example, visual prominence of a participant's visual representation is associated with the displayed size of the participant's visual representation and/or how closely the participant's visual representation is displayed to a predefined (e.g., center) position in the user interface; alternatively, an outline around the visual representation or a drop shadow can be used to indicate which participants are most active, or meet activity state criteria. In some embodiments, an activity state may be a voice activity level, an overall audio volume level of the respective participant, or a physical (body movement, e.g., raising or waving hand to get attention) activity level, etc. Changing the visual prominence of the displayed visual representation of a participant (e.g., a non-roster participant) and/or the audio prominence of the audio from that participant as the activity level of that participant changes visually emphasizes or deemphasizes that participant, provides visual feedback to the user of the change in activity level of that participant, and helps the user to better associate the visual representation in the user interface with its corresponding audio, which provides improved feedback to the user.

In some embodiments, changing visual prominence of the respective participant's visual representation comprises (1218) one or more of: changing a size of the respective participant's visual representation, and changing a layer in a sequence of display layers at which the respective participant's visual representation is displayed (e.g., a visual representation of a participant who is currently speaking is enlarged and may partially overlap other visual representations of participants who are currently not speaking; and, where a first visual representation is associated with a higher layer than a second visual representation, the first visual representation would overlap on top of the second visual representation to the extent that the first and second visual representations overlap) (e.g., as described herein with reference to the visual prominence of visual representation 1014 of participant three in FIGS. 10D-10E). Changing the size and/or layer of the displayed visual representation of a participant as the activity level of that participant changes visually emphasizes or deemphasizes that participant, provides visual feedback to the user of the change in activity level of that participant, and helps the user to better associate the visual representation in the user interface with its corresponding audio, which provides improved feedback to the user.

In some embodiments, in accordance with an activity state of a respective participant of the plurality of participants changing from an activity state (e.g., an audio activity state) that does not satisfy activity criteria to an activity state that satisfies the activity criteria, the electronic device performs (1220) a transition operation, the transition operation including causing the set of one or more audio output devices to change a simulated spatial location of audio from the respective participant from the shared simulated spatial location to a respective simulated spatial location different from the shared simulated spatial location (e.g., by outputting, via the set of one or more audio output devices, audio from the participant at a non-shared simulated spatial location) (e.g., the other simulated location is also located in the three dimensional environment in which the electronic device is located) (e.g., as described herein with reference to participant five in FIGS. 10H-10J). In some embodiments, whether a participant's activity satisfies the activity criteria may be determined based on a combination of factors including: an overall audio volume level, a visual activity level, a voice detection, etc. As the activity level of a participant changes to meet activity criteria, moving the simulated spatial location of audio from that participant to a separate simulated spatial location away from the shared simulated spatial location aurally emphasizes that participant and provides audio feedback to the user of the change (e.g., increase) in activity level of that participant, which provides improved feedback to the user.

In some embodiments, in accordance with the activity state of the respective participant of the plurality of participants changing from an activity state (e.g., an audio activity state) that does not satisfy activity criteria to an activity state that satisfies the activity criteria, the electronic device gradually moves (1222) (e.g., by displaying an animated transition of moving) a visual representation of the respective participant from a first region of the user interface, at which visual representations of participants whose activity state does not satisfy the activity criteria are displayed, to a second region of the user interface (e.g., anyplace other than the first region), at which visual representations of participants whose activity state satisfies the activity criteria are displayed (e.g., as described herein with reference to participant five in FIGS. 10H-10J) (e.g., the visual representation gradually moves across the user interface from a secondary (e.g., roster) location to a primary location over a period of time that is at least x (e.g., 0.05, 0.1, 0.2, 0.5, 1, or 2 seconds) and no greater than y (e.g., 3, 5, 10, or 15 seconds)) (e.g., optionally as part of the transition operation). In some embodiments, the rate of the gradual moving is a predefined, fixed rate; in some embodiments the rate of the gradual moving is based, at least in part, on the level of activity of the respective participant. In some embodiments, the size of the visual representation of the respective participant changes (e.g., enlarges) while gradually moving. As the activity level of a participant changes to meet activity criteria, moving the visual representation of that participant out of a region of the user interface for visual representations of participants who are not sufficiently active and into a region of the user interface for visual representations of participants who are sufficiently active visually emphasizes that participant, provides visual feedback to the user of the change (e.g., increase) in activity level of that participant, and helps the user to better associate the visual representation in the user interface with its corresponding audio (e.g., which has been moved to a separate simulated spatial location away from the shared simulated spatial location), which provides improved feedback to the user.

In some embodiments, the transition operation includes (1224) gradually (e.g., over the same time period as the visual transition) changing the simulated spatial location of audio of the respective participant from the shared simulated spatial location to the respective simulated spatial location (e.g., as described herein with reference to participant five in FIGS. 10H-10J). Gradually moving the simulated spatial location of audio from (and optionally the visual representation) of the participant whose activity level has changed to meet the activity criteria provides a smoother transition that helps the user keep track of the participant and the participant's associated simulated spatial audio location, which provides improved feedback to the user.

In some embodiments, in accordance with (e.g., in response to detecting) an activity state of a respective participant of the plurality of participants changing from an activity state that satisfies activity criteria to an activity state that does not satisfy the activity criteria, the electronic device performs (1226) a second transition operation, the second transition operation including causing the set of one or more audio output devices to change a simulated spatial location of audio from the respective participant from a non-shared simulated spatial location that is different than the shared simulated spatial location to the shared simulated spatial location (e.g., change the simulated spatial location of the respective participant to the shared simulated spatial location for the roster) (e.g., as described herein with reference to participant four in FIGS. 10F-10H). As discussed above, an activity state may be a voice activity level, an overall audio volume level of the respective participant, or a physical (e.g., body movement) activity level, etc. As the activity level of a participant ceases to meet activity criteria, moving the simulated spatial location of audio from that participant from a separate non-shared simulated spatial location to the shared simulated spatial location aurally deemphasizes that participant and provides audio feedback to the user of the change (e.g., decrease) in activity level of that participant, which provides improved feedback to the user.

In some embodiments, the second transition operation includes (1228) gradually (e.g., concurrently with at least a portion of (or all of) the visual transition for the first transition operation) moving a visual representation of the respective participant from a region of the user interface at which visual representations of participants whose activity state satisfies the activity criteria are displayed (e.g., the second region, as described herein with reference to operation 1222) to a region of the user interface at which visual representations of participants whose activity state does not satisfy the activity criteria are displayed (e.g., the first region, as described herein with reference to operation 1222) (e.g., as described herein with reference to participant four in FIGS. 10F-10I) (e.g., the visual representation gradually moves across the user interface from a first position to a second position). In some embodiments, the gradual moving of the visual representation of the respective participant to the region of the user interface at which visual representations of participants whose activity state does not satisfy the activity criteria are displayed is performed in conjunction with the second transition operation of operation 1226 (e.g., also in accordance with the activity state of the respective participant of the plurality of participants changing from an activity state that satisfies activity criteria to an activity state that does not satisfy the activity criteria). In some embodiments, the size of the visual representation of the respective participant changes (e.g., decreases) while gradually moving. As the activity level of a participant ceases to meet activity criteria, moving the visual representation of that participant out of a region of the user interface for visual representations of participants who are sufficiently active and into a region of the user interface for visual representations of participants who are not sufficiently active visually deemphasizes that participant, provides visual feedback to the user of the change (e.g., decrease) in activity level of that participant, and helps the user to better associate the visual representation in the user interface with its corresponding audio (e.g., which has been moved to the shared simulated spatial location), which provides improved feedback to the user.

In some embodiments, the second transition operation includes (1230) gradually (e.g., over the same time period as the visual transition) changing the simulated spatial location of audio from the respective participant from the non-shared simulated spatial location to the shared simulated spatial location (e.g., as described herein with reference to participant four in FIGS. 10F-10H). Gradually moving the simulated spatial location of audio from (and optionally the visual representation) of the participant whose activity level has ceased to meet the activity criteria provides a smoother transition that helps the user keep track of the participant and the participant's associated simulated spatial audio location, which provides improved feedback to the user.

In some embodiments, while the electronic device is in a first virtual display mode, the electronic device causes (1232) the set of one or more audio output devices to output audio from up to, but no more than, a third number of participants of the plurality of participants at individual (non-shared) simulated spatial locations (e.g., individually spatialized locations, each of which is distinct from the shared simulated spatial location and all other individual simulated spatial locations). In some such embodiments, while the electronic device is in a second virtual display mode, the electronic device causes the set of one or more audio output devices to output audio from up to, but no more than, a fourth number of participants of the plurality of participants at individual simulated spatial locations, wherein the fourth number is different from the third number (e.g., the number of participants of the plurality of participants for whom audio is output at individual (non-shared) simulated spatial locations is determined in accordance with a visual display mode (e.g., tile vs organic) of the electronic device) (e.g., when changing from a first virtual display mode that displays the visual representations of a plurality of participants in a first (tile) layout (e.g., grid), to a second virtual display mode that displays the visual representations in a second (e.g., floating) layout, where tiles are positioned based on activity levels, or vice versa, the electronic device changes the number of respective participants whose audio is output from the shared simulated spatial location (e.g., the roster simulated spatial location), with the audio from all other participants being output from individually spatialized locations) (e.g., if a different number of simulated spatial locations were used for the grid view shown in FIG. 10B than for the floating view shown in FIG. 10C). Using different numbers of simulated spatial audio locations for different device display modes helps the user visualize and distinguish between different participants in a manner that is consistent with how the communication session is visually represented and with how visual representations of the different participants are displayed, which provides improved feedback to the user.

In some embodiments, a number of participants (e.g., the number of participants, or how many participants) of the plurality of participants for whom audio is output at individual (non-shared) simulated spatial locations is (1234) determined in accordance with a size (and, optionally, orientation) of a user interface window in which the user interface is displayed using the one or more display generation components (e.g., as described herein with reference to FIG. 10O). Using different numbers of simulated spatial audio locations for different sizes of user interface window helps the user visualize and distinguish between different participants in a manner that is consistent with how the communication session is visually represented and with how visual representations of the different participants are displayed, which provides improved feedback to the user.

In some embodiments, in accordance with a determination that a number of participants in the communication session changes from more than two participants to exactly two participants, the two participants including the first participant (e.g., a participant other than a user of the electronic device), the electronic device changes (1236) from outputting audio from the first participant from a simulated spatial location to outputting audio from the first participant without spatialization (e.g., output as stereo or monophonic audio) (e.g., changing a spatialization characteristic of the audio from the first participant from spatialized to non-spatialized) (e.g., as described herein with reference to FIGS. 10L-10M). When a communication session has exactly two participants (e.g., the user and exactly one other participant), at least some benefits of spatialization (e.g., helping the user to identify and distinguish between other participants) are lost. In such situations, outputting audio without spatialization for a communication session with exactly two participants reduces the computational burden on the devices that would otherwise be required to spatialize the audio and enables one or more operations to be performed automatically.

In some embodiments, two or more of the plurality of participants, for whom audio is output at individual (e.g., non-shared) simulated spatial locations, comprise (1238) a third subset of the plurality of participants, and two or more other participants of the plurality of participants, for whom audio is output at the shared simulated spatial location, comprise a fourth subset of the plurality of participants. In some such embodiments, the visual representations of the third subset of participants are displayed at a plurality of different sizes (e.g., representations of the participants in the third subset are displayed in the user interface at different sizes from each other), and the visual representations of the fourth subset of participants are each displayed in the user interface at the same size (e.g., as described herein with reference to FIGS. 10B and 10E). In some embodiments, the third subset of participants' respective visual representations each change in size in response to changes in activity level of each participant. Displaying visual representations of the participants with the shared simulated spatial audio location (e.g., roster participants) at the same size as each other, and the visual representations of the other participants (e.g., non-roster participants) at different sizes from each other, provides visual feedback that is consistent with the roster participants having a shared simulated spatial location in contrast to the non-roster participants having separate simulated spatial locations, and reinforces the distinction between the roster participants and the non-roster participants, which provides improved feedback to the user.

In some embodiments, while in a second communication session (1240): in accordance with a determination that the plurality of participants includes a single external participant (and a user of the electronic device) and there is no visual representation associated with the single external participant, the electronic device outputs, via the set of one or more audio output devices, non-spatialized audio (e.g., non-spatialized audio comprises stereo or mono audio that is generated at a fixed location relative to one or more audio output devices generating the non-spatialized audio without regard to movement of the electronic device and/or the set of one or more audio output devices) corresponding to the single external participant; and, in accordance with a determination that the plurality of participants includes the single external participant (and the user of the electronic device) and a visual representation associated with the single external participant is available for display at the electronic device (e.g., even if the electronic device screen is off, or if the user interface of the second communication is not currently being displayed), the electronic device outputs, via the set of one or more audio output devices, audio at a simulated spatial location corresponding to the single external participant (e.g., as described herein with reference to FIG. 10N). When a communication session has exactly two participants (e.g., the user and exactly one other participant), at least some benefits of spatialization (e.g., helping the user to identify and distinguish between other participants) are lost. Audio-only communication sessions between the user and the other participant, where no visual representation of the other participant is available, lose even more of the benefits of spatialization than do communication sessions where a visual representation of the other participant is available. Thus, outputting audio without spatialization for a two-participant, audio-only communication session reduces the computational burden on the devices that would otherwise be required to spatialize the audio, whereas outputting audio with spatialization for a communication session having a visual representation of the other participant displayed or at least available makes the communication session feel more intuitive and helps the user to better associate the visual representation in the user interface with its corresponding audio, which enables one or more operations to be performed automatically and provides improved feedback to the user.

In some embodiments, while in a second communication session, the electronic device (1242): determines that an additional participant is joining the second communication session; and, in response to determining that the additional participant is joining the second communication session: in accordance with a determination that visual representations of participants in the second communication session are displayed, continues to output audio from the participants in the second communication session at simulated spatial locations; and, in accordance with a determination that visual representations of participants in the second communication session are not displayed, transitions from outputting audio from the participants in the second communication session without spatialization to outputting audio from the participants in the second communication session at simulated spatial locations (e.g., as described herein with reference to FIGS. 10L-10M). In accordance with an additional participant joining a communication session (e.g., resulting in three or more participants including the user), switching to outputting spatialized audio for audio-only communication sessions, and continuing to output spatialized audio for communication sessions with visual representations of the participants available, helps the user to identify and distinguish between the different participants and makes the audio more intelligible, which enables one or more operations to be performed automatically and provides improved feedback to the user.

In some embodiments, the shared simulated spatial location is (1244) lower (e.g., lower on a y or z axis; below) in a three dimensional environment than individual simulated spatial locations at which audio is output for two or more of (e.g., each of) the plurality of participants for whom audio is output at the individual simulated spatial locations (e.g., as described herein with reference to FIG. 10B). Positioning the shared simulated spatial audio location (e.g., for audio from the roster participants) spatially lower in a three dimensional environment than the individual simulated spatial locations (e.g., for audio from the non-roster participants) aurally deemphasizes the roster participants and allows the user to focus aurally on the non-roster participants and provides audio feedback to the user that the roster participants are speaking or producing audio below a threshold activity level and/or less than those not in the roster, which provides improved feedback to the user.

In some embodiments, the electronic device displays (1246) visual representations in the user interface for two or more of the plurality of participants, for whom audio is output at individual (e.g., non-shared) simulated spatial locations, at locations in the user interface corresponding to the individual simulated spatial locations (e.g., if the visual representation of a first user is to the right of the visual representation of a second user, the audio of the first user is spatialized to a simulated spatial location that is to the right of the simulated spatial location of audio of the second user; if the visual representation of a first user is to the left of the visual representation of a second user, the audio of the first user is spatialized to a simulated spatial location that is to the left of the simulated spatial location of audio of the second user; if the visual representation of a first user is above the visual representation of a second user, the audio of the first user is spatialized to a simulated spatial location that is above the simulated spatial location of audio of the second user; and/or if the visual representation of a first user is below the visual representation of a second user, the audio of the first user is spatialized to a simulated spatial location that is below the simulated spatial location of audio of the second user). Positioning the visual representations of the participants whose audio is output at individual simulated spatial locations (e.g., the non-roster participants) at locations in the user interface that correspond to the individual simulated spatial locations (e.g., as described herein with reference to FIGS. 10A-10C) helps the user visualize and distinguish between different participants and better associate the visual representations in the user interface with their corresponding audio, which provides improved feedback to the user.

In some embodiments, in accordance with (e.g., in response to detecting) a change in position within the user interface of a respective visual representation associated with a participant of the plurality of participants, the electronic device changes (1248) a respective simulated spatial location of the participant (e.g., to a simulated spatial location corresponding to the changed position of the respective visual representation in the user interface) (e.g., as described herein with reference to FIGS. 10B-10C). Changing the simulated spatial location of a participant as the visual representation of that participant moves in the user interface helps the user better associate the visual representations in the user interface with their corresponding audio, which provides improved feedback to the user.

It should be understood that the particular order in which the operations in FIGS. 12A-12E have been described is merely an example and is not intended to indicate that the described order is the only order in which the operations could be performed. One of ordinary skill in the art would recognize various ways to reorder the operations described herein. Additionally, it should be noted that details of other processes described herein with respect to the other methods described herein (e.g., methods 700, 800, and 1300) are also applicable in an analogous manner to method 1200 described above with respect to FIGS. 12A-12E. For example, the user interfaces, interactions, and animations described above with reference to method 1200 optionally have one or more of the characteristics of the user interfaces, interactions, and animations described herein with reference to the other methods described herein (e.g., methods 700, 800, and 1300).

FIGS. 13A-13E illustrate flow diagrams of processes for causing audio output devices to simulate production of spatial audio content in one of a number of virtual spaces, in accordance with some embodiments. Method 1300 is performed at a computer system (e.g., device 300, FIG. 3A, or portable multifunction device 100, FIG. 1A) that is in communication with a display generation component (e.g., touch-sensitive display system 112, FIG. 1A, or display 340, FIG. 3A), one or more input devices (e.g., touch-sensitive display system 112, FIG. 1A, or touchpad 355, FIG. 3A), and a set of one or more audio output devices (e.g., one or more wearable audio output devices 301, FIG. 3B). Some operations in method 1300 are, optionally, combined and/or the order of some operations is, optionally, changed.

As described below, method 1300 outputs different categories of audio content by simulating production of the audio content using different virtual spaces. Providing improved spatial audio improves the audio functionality of devices using method 1300 and better simulates or approximates the audio experience of hearing different categories of audio content in a variety of different physical environments. From the viewpoint of a user of a computer system (e.g., an electronic device such as a smart phone, tablet, smart watch, laptop computer, etc.), method 1300 enables the user, while an application executed by the computer system plays content (e.g., a media item) that includes audio content, to hear spatial audio content produced in any of a number of simulated audio environments (also herein called virtual spaces), each simulated audio environment having different audio characteristics, where audio output devices of the computer system automatically simulate production of the audio content in a virtual simulated audio environment selected in accordance with a category of the content being played. Automatically selecting the virtual space to be used to simulate production of the audio content based on a category of the content being played, while outputting the audio content, reduces user inputs required to produce spatial audio with audio characteristics appropriate for the audio content being played, and reduces user mistakes by eliminating the need for the user to select an appropriate virtual space to use when playing back audio content.

Performing operations automatically, based on predefined criteria, without the need of additional user inputs reduces the number of inputs needed to perform an operation, such as switching the virtual space used to simulate production of audio content, and also reduces the cognitive burden of a user, who does not need to determine which virtual space to use. Reducing the number of inputs needed to produce spatial audio using an appropriate virtual space enhances the operability of the device and makes the user-device interface more efficient (e.g., by reducing the number of user inputs and reducing user mistakes when operating/interacting with the device) which, additionally, reduces power usage and improves battery life of the device by enabling the user to use the device more quickly and efficiently.

The electronic device receives (1302) a request to output audio content via the one or more audio output devices. For example, the request may be a request to play a song, play a movie, start a phone call, start a video call, play a game, etc. and may be received while the device is displaying, via one of more display generation components or display devices, a user interface for a respective application. In response to receiving the request to output the audio content via the one or more audio output devices, and in accordance with a determination that the audio content includes information (e.g., spatial audio information) that enables spatialization of the audio content, the electronic device outputs (1304), via the set of one or more audio output devices, the audio content in a simulated three-dimensional environment. Outputting (1304) the audio content includes, in accordance with a determination (e.g., a first determination) that the audio content corresponds to (e.g., is, or belongs to) a first category of content, causing (1306) the one or more audio output devices to simulate production of the audio content in a first virtual space. For example, the spatial audio content is spatialized using a first set of audio spatialization parameters that represent the first virtual space. It is noted that there can be many different types of audio content, such as, without limitation, music, including different types of music/songs/genres, radio and other audio programs, podcasts, videos (different types of videos) that include audio content, video/audio chat streams, etc.

Outputting (1304) the audio content also includes, in accordance with a determination (e.g., a second determination) that the audio content corresponds to (e.g., is, or belongs to) a second category of content, causing (1308) the one or more audio output devices to simulate production of the audio content in a second virtual space that has different simulated acoustic properties. For example, the simulated acoustic properties of the second virtual space that are different from the simulated acoustic properties of the first virtual space optionally include different degrees of reverberation, different degrees or amounts of audio reflection, different ratios of direct to reverberant energy, and/or changes in these parameters over time. In some embodiment, when using the second virtual space, the spatial audio is spatialized using a second set of audio spatialization parameters that represent the second virtual space, different from a first set of audio spatialization parameters that represent the first virtual space. Examples of first and second virtual spaces (e.g., virtual spaces 1112A and 1112B) are described above with reference to FIGS. 11B and 11C, for use with different categories of content.

From the perspective of the audio output devices, the audio output devices, in response to the request, are configured to output the audio content so as to simulate production of the audio content in a first virtual space or a second virtual space, as determined (e.g., by the electronic device) based on a category of the audio content that is being output.

In some embodiments, in response to receiving the request to output the audio content via the one or more audio output devices, and in accordance with a determination that the audio content does not include information that enables spatialization of the audio content, the electronic device outputs (1310) the audio content without spatializing the audio content. For example, stereo or mono audio content does not include information that enables spatialization of the audio content, and such audio content is output without spatializing the audio content. Automatically outputting audio content without spatializing the audio content, when the audio content does not include information that enabled spatialization of the audio content, improves operation of the electronic device by avoiding unneeded spatialization of audio content, and potentially reduces power usage and improves battery life of the electronic device.

In some embodiments, outputting (1304) the audio content also includes, in accordance with a determination (e.g., a third determination) that the audio content corresponds to (e.g., is, or belongs to) a third category of content different from the first category and second category, causing (1321) the one or more audio output devices to simulate production of the audio content in a third virtual space that has different simulated acoustic properties than simulated acoustic properties of the first virtual space and simulated acoustic properties of the second virtual space. As noted above, automatically outputting audio content using a third virtual space, by simulating production of the audio content using a third virtual space when the audio content corresponds to a third category of content, improves operation of the electronic device by changing the virtual space used to simulate production of the audio content without the user having to determine which virtual space to use. An example of a third virtual space (e.g., virtual space 1112C) that has different simulated acoustic properties than simulated acoustic properties of the first virtual space (e.g., virtual space 1112A) and simulated acoustic properties of the second virtual space (e.g., virtual space 1112B) is described above with reference to FIG. 11E.

In some embodiments, the respective audio source is a respective application, and method 1300 includes (e.g., automatically) determining (1314) a category of the audio content in accordance with the respective application. For example, the respective application may be a music application, video chat application, move application, television application, telephone application, etc. Examples of such applications and corresponding virtual spaces used to simulate production of audio content from those applications are discussed above with respect to FIGS. 11B (movie application, virtual space 1112A), 11C (music application, virtual space 1112B) and 11F (video call application, virtual space 1112D). Automatically determining a category of audio content based on the respective application that is the source of the audio content improves operation of the electronic device by automatically selecting the virtual space used to simulate production of the audio content without the user having to determine which virtual space to use, thereby reducing the number of user inputs required and reducing mistakes by the user, which enhances the operability of the device and makes the user-device interface more efficient.

In some embodiments, the respective audio source is a respective application, and a category corresponding to the audio content is determined (1316) in accordance with the respective application and without regard to a content type of media being played by the respective application while the set of one or more audio output devices output the audio content. For example, in some embodiments, while the respective application (e.g., a music application) is playing audio content of a first type (e.g., music, FIG. 11C), the electronic device causes (1317) the one or more audio output devices to simulate production of the audio content of the first type in the first virtual space (e.g., virtual space 1112B, FIG. 11C), and while the respective application is playing audio content of a second type (e.g., a music video, FIG. 11D), the electronic device causes the one or more audio output devices to simulate production of the audio content of the second type in the first virtual space (e.g., virtual space 1112B, FIG. 11D).

Similarly, in some embodiments, the respective audio source is an application that includes first audio content and second audio content, and while the application is executing, in accordance with a determination that the first audio content corresponds to (e.g., is, or belongs to) the first category of content, the electronic device causes (1318) the one or more audio output devices to simulate production of the audio content in the first virtual space; but, in accordance with a determination that the second audio content corresponds to the second category of content, the electronic device causes (1318) the one or more audio output devices to simulate production of the audio content in the first virtual space.

In contrast to the embodiments just described, in some embodiments method 1300 includes determining (1320) a category of the audio content in accordance with a content type of respective media being played, and without regard to the respective application providing the audio content. For example, for music, the electronic device simulates production of the audio content in the first virtual space/room (e.g., as described above with respect to FIG. 11C); for video or audio chat, the electronic device simulates production of the audio content in the second virtual space/room (e.g., as described above with respect to FIG. 11F); for television content, the electronic device simulates production of the audio content in a third virtual space/room; and for movies, the electronic device simulates production of the audio content in a fourth virtual space/room (e.g., as described above with respect to FIG. 11B).

Automatically determining a category of audio content based on the content type of the media being played, without regard to the respective application providing the audio content, improves operation of the electronic device by automatically selecting the virtual space used to simulate production of the audio content without the user having to determine which virtual space to use, thereby reducing the number of user inputs required and reducing mistakes by the user, which enhances the operability of the device and makes the user-device interface more efficient.

In some such embodiments, in which a category of the audio content is determined (1320) in accordance with a content type of respective media being played, without regard to the respective application providing the audio content, and the electronic device outputs, via the set of one or more audio output devices, audio content from a second respective audio source comprising a second application different from the respective application, method 1300 includes (1322), in accordance with a determination that the audio content from the second respective audio source corresponds to (e.g., is, or belongs to) the first category of content, causing the one or more audio output devices to simulate production of the audio content from the second respective audio source in the first virtual space. In some embodiments, after determining that the audio content provided by the respective application corresponds to the first category of content, the electronic device detects whether new audio content from the second application is of the same content type as the audio content provided by the respective application. If so, the electronic device causes the one or more audio output devices to simulate production of the new audio content from the second application in the first virtual space. For example, the new audio content is output using the same virtual space as the virtual space used to output audio content immediately prior to receiving a request to output the new audio content, even though the new audio content is from a different application than the audio content from the respective audio source.

In some embodiments, audio content is categorized (1330) based on both a type of content (e.g., music, video, video chat, etc.), and which application is providing the audio content (e.g., video chat application, a music application, a television/movie application; and optionally based on the type of application providing the audio content, as opposed to which specific application is providing the audio content, or alternatively based on the specific application providing the audio content). For example, a device or system that implements the content categorizations and virtual space selections shown in all three of FIGS. 11B, 11C and 11D, is an example of a device or system in which audio content is categorized, and the virtual space to be used is determined, based on both the type of content and application providing the content. Automatically determining a category of audio content based on the content type of the media being played, and also based on the respective application providing the audio content, improves operation of the electronic device by automatically selecting the virtual space used to simulate production of the audio content without the user having to determine which virtual space to use, thereby reducing the number of user inputs required and reducing mistakes by the user, which enhances the operability of the device and makes the user-device interface more efficient.

In some embodiments, for example any of the previously discussed embodiments, the simulated acoustic properties of the first virtual space correspond to detected acoustic properties of a first physical space and the simulated acoustic properties of the second virtual space correspond to detected acoustic properties of a second physical space that is different from the first physical space (1332). Thus, for each virtual space, a respective (e.g., at least one) acoustic response characteristic (e.g., reverb, frequency damping, etc.) of a plurality of acoustic response characteristics is based on the same respective acoustic response characteristic of a corresponding physical space. For example, FIG. 11V shows on the left side an example of audio characteristics for a virtual space 1112E, and on the right side an example of audio characteristics for a physical space corresponding to (e.g., that was used as a model or starting point for) the virtual space 1112E. Automatically providing virtual spaces with simulated acoustic properties that correspond to (but are not necessarily identical to) detected acoustic properties of various physical spaces, improves operation of the electronic device by simulating production of the audio content in virtual spaces that have similar acoustic properties to a variety of "real" physical spaces. In addition, this avoids the user having to determine the acoustic properties to assign to the virtual spaces used to simulate production of audio content, thereby reducing the number of user inputs required and reducing mistakes by the user, which enhances the operability of the device and makes the user-device interface more efficient.

In some embodiments, the acoustic response characteristics of the first virtual space have a modified (e.g., increased or decreased) acoustic response (e.g., reverberation) to audio content in one or more frequency ranges in comparison with acoustic response characteristics of the corresponding first physical space (1333). As noted above, automatically providing virtual spaces with simulated acoustic properties that correspond to, but are not identical to, detected acoustic properties of various physical spaces, improves operation of the electronic device by simulating production of the audio content in virtual spaces that have similar, albeit not identical, acoustic properties to a variety of "real" physical spaces.

In some embodiments, simulating production of audio content in the first virtual space includes (e.g., automatically) simulating (1334) a different amount of reverberation than simulating production of audio content in the second virtual space (e.g., the first virtual space and second virtual space have different reverberation characteristics). For example, virtual space 1112A of FIG. 11B and virtual space 1112B of FIG. 11C simulate different amounts of reverberation, as shown by the energy envelope diagrams in FIGS. 11B and 11C. Automatically providing virtual spaces with different amounts of reverberation improves operation of the electronic device by simulating production of the audio content in virtual spaces that have acoustic properties similar to the acoustic properties of a variety of "real" physical spaces that have different amounts of reverberation. In addition, this avoids the user having to determine the acoustic properties to assign to the virtual spaces used to simulate production of audio content, thereby reducing the number of user inputs required and reducing mistakes by the user, which enhances the operability of the device and makes the user-device interface more efficient.

In some embodiments, simulating production of audio content in the first virtual space includes (e.g., automatically) simulating (1336) a different direction of reverberation than simulating production of audio content in the second virtual space (e.g., the first virtual space and second virtual space have different acoustic response characteristics, including different directional reverberation characteristics). As noted above, automatically providing virtual spaces with different directional reverberation characteristics improves operation of the electronic device by simulating production of the audio content in virtual spaces that have acoustic properties similar to the acoustic properties of a variety of "real" physical spaces that have different amounts of reverberation. In addition, this avoids the user having to determine the acoustic properties to assign to the virtual spaces used to simulate production of audio content, thereby reducing the number of user inputs required and reducing mistakes by the user, which enhances the operability of the device and makes the user-device interface more efficient.

In some embodiments, simulating production of audio content in the first virtual space includes simulating (1338) a different frequency range of reverberation than simulating production of audio content in the second virtual space (e.g., the first virtual space and second virtual space have different acoustic response characteristics, including different frequency ranges of reverberation).

In some embodiments, the first virtual space has a first simulated size and the second virtual space has a second simulated size different from the first simulated size (1340). In some embodiments, the first and second virtual spaces differ both in simulated size and simulated geometric shape, e.g., to provide acoustic characteristics tailored to, or configured for, a corresponding category of content. For example, virtual space 1112A of FIG. 11B and virtual space 1112B of FIG. 11C may have different simulated sizes. Automatically providing virtual spaces having different virtual sizes, and correspondingly different audio characteristics, improves operation of the electronic device by simulating production of the audio content in virtual spaces that have acoustic properties similar to the acoustic properties of a variety of "real" physical spaces that have different sizes. In addition, this avoids the user having to determine the acoustic properties to assign to the virtual spaces used to simulate production of audio content, thereby reducing the number of user inputs required and reducing mistakes by the user, which enhances the operability of the device and makes the user-device interface more efficient.

In some embodiments, method 1300 includes displaying (1342), via one or more display devices or display generation components coupled to the electronic device, a user interface that includes a control for changing a spatial audio characteristic of audio output via the set of one or more audio output devices (e.g., for changing whether an application is configured to output audio content using spatial audio, spatialized stereo, or stereo), and detecting (1344) an input at (e.g., on) the control (e.g., button) for changing the spatial audio characteristic. In response to detecting the input, in accordance with a determination that the control for changing the spatial audio characteristic is selected while audio content that corresponds to (e.g., is, or belongs to) the first category of content is being output by the set of one or more audio output devices, the electronic device changes (1346) the spatial audio characteristic (e.g., toggling or rotating between two or three modes, such as spatialized, stereo (non-spatialized) and spatialized stereo modes) of the audio content that is being output by the set of one or more audio output devices. For example, the first category may correspond to audio from media being provided (e.g., played) by a respective application, or the first category may be for specific type of audio content, such as music, or such as a specific type or genre of music, in which case the user is allowed to change the spatial audio characteristic of audio output via the set of one or more audio output devices. For example, FIG. 11E-5 shows an audio setting user interface 1144, which is an example of a user interface that includes a control for changing a spatial audio characteristic of audio output via a set of one or more audio output devices, and FIGS. 11E-6 and 11E-7 show an input for changing the spatial audio characteristic of audio output via the set of one or more audio output devices and the resulting change in the spatial audio characteristic of audio output via the set of one or more audio output devices.

Further, in response to detecting the input, in accordance with a determination that the control for changing a spatial audio characteristic is selected while audio content that corresponds to (e.g., is, or belongs to) the second category of content (e.g., audio from an ongoing communication session) is being output by the set of one or more audio output devices, the electronic device forgoes (1347) changing the spatial audio characteristic. For example, in some embodiments, in accordance with a determination that the control for changing a spatial characteristic of media is selected while an ongoing spatialized communication session that includes media is occurring, the device forgoes changing prevents the user from changing) the spatial characteristic of the ongoing spatialized communication session that includes media. For example, FIGS. 11K through 11M show an example in which, in response to detecting an input (e.g., input 1174) on the control (e.g., spatial audio toggle 1172) for changing the spatial audio characteristic, the electronic device forgoes changing the spatial audio characteristic in accordance with a determination that the audio content currently being output by the one or more audio output devices is audio from an ongoing video communication session.

Enabling a user to change a spatial audio setting for some applications, or for some categories of content, but not others, provides the user with control over a spatial audio characteristic in contexts in which such control is compatible with the category of content being output, while preventing user adjustment of those same spatial audio characteristic in contexts in which such control is not compatible with the category of content being output.

In some embodiments, outputting the audio content further includes, in accordance with a determination that the audio content corresponds to a video communication session between a plurality of participants, causing (1348) the one or more audio output devices to simulate production of the audio content in a third virtual space (e.g., a video communication virtual space, such as the virtual space 1112D, discussed above with respect to FIG. 11F) that has different simulated acoustic properties than the simulated acoustic properties of the first virtual space and the second virtual space. Furthermore, in such embodiments, the method includes, while the plurality of participants share media content and the audio content includes audio from the shared media content, continuing to cause (1350) the one or more audio output devices to simulate production of the audio content in the third virtual space. For example, if music is played during an ongoing video communication session, the third virtual space will continue to be used for outputting the audio content in a simulated three-dimensional environment, as discussed above with respect to FIGS. 11O-11P. Furthermore, in some embodiments, the user is prevented from changing the virtual space used to simulate production of the audio content, as discussed above with reference to FIGS. 11P-11S.

In some embodiments, a particular predefined virtual space is used to simulate production of audio during video communication sessions to facilitate the ability of participants to associate specific spatial locations with specific participants, and continuing to use that same predefined virtual space even when music or other media content is shared by the participants of a communication session, ensures that the spatial audio characteristics of the particular predefined virtual space continue to be used even when audio content of the communication session includes audio other than the voices of the participants.

In some embodiments, the audio content that corresponds to the first category is communication audio content, the audio content that corresponds to the second category is media audio content, and the first virtual space simulates (1352) a smaller space than the second virtual space (e.g., by causing the one or more audio output devices to simulate production of the audio content in a smaller virtual space if the audio content corresponds to the first category than if the audio content corresponds to the second category). An example of a virtual space used to simulate production of communication audio content is the virtual space 1112D of FIGS. 11F-11S. Based on the observation that most conference rooms or meeting rooms are smaller than the spaces in which musical performances take place, automatically using a smaller virtual space for video conferences than the virtual space used for playing a particular category of media content, improves operation of the electronic device by automatically selecting an appropriate virtual space, having a simulated size consistent with physical spaces in which audio content of the same category is typically experienced, to simulate production of the audio content without the user having to determine which virtual space to use, thereby reducing the number of user inputs required and reducing mistakes by the user, which enhances the operability of the device and makes the user-device interface more efficient.

In some embodiments, the audio content that corresponds to the first category is communication audio content, the audio content that corresponds to the second category is media audio content, and the first virtual space simulates (1354) a more acoustically damped space than the second virtual space (e.g., by causing the one or more audio output devices to simulate production of the audio content with more acoustic damping if the audio content corresponds to the first category than if the audio content corresponds to the second category). Automatically providing virtual spaces having different audio dampening characteristics improves operation of the electronic device by simulating production of the audio content in virtual spaces that have acoustic properties similar to the acoustic properties of a variety of "real" physical spaces that have different sizes. In addition, this avoids the user having to determine the acoustic properties to assign to the virtual spaces used to simulate production of audio content, thereby reducing the number of user inputs required and reducing mistakes by the user, which enhances the operability of the device and makes the user-device interface more efficient.

In some embodiments, the audio content that corresponds to the first category is music audio content, the audio content that corresponds to the second category is audio content associated with video (e.g., movies, tv shows, etc.), and the first virtual space simulates (1356) a smaller space than the second virtual space (e.g., by causing the one or more audio output devices to simulate production of the audio content in a smaller virtual space if the audio content corresponds to the first category than if the audio content corresponds to the second category). Automatically providing virtual spaces having different audio characteristics, for example audio characteristics based on spaces having different simulated sizes, simulated improves operation of the electronic device by simulating production of the audio content in virtual spaces that have acoustic properties similar to the acoustic properties of a variety of "real" physical spaces that have different sizes. In addition, this avoids the user having to determine the acoustic properties to assign to the virtual spaces used to simulate production of audio content, thereby reducing the number of user inputs required and reducing mistakes by the user, which enhances the operability of the device and makes the user-device interface more efficient In some embodiments, the audio content that corresponds to the first category is music audio content, the audio content that corresponds to the second category is audio content associated with video (e.g., movies, tv shows, etc.), and the first virtual space is more acoustically damped than the second virtual space (1358) (e.g., by causing the one or more audio output devices to simulate production of the audio content with more acoustic damping if the audio content corresponds to the first category than if the audio content corresponds to the second category). Automatically providing virtual spaces having different audio dampening characteristics improves operation of the electronic device by simulating production of the audio content in virtual spaces that have acoustic properties similar to the acoustic properties of a variety of "real" physical spaces that have different sizes. In addition, this avoids the user having to determine the acoustic properties to assign to the virtual spaces used to simulate production of audio content, thereby reducing the number of user inputs required and reducing mistakes by the user, which enhances the operability of the device and makes the user-device interface more efficient.

In some embodiments, the audio content that corresponds to the first category is music audio content of a first type (e.g., a first genre of music), and the audio content that corresponds to the second category is music audio content of a second type (e.g., a second genre of music) (1360). For example, in such embodiments, when (or in accordance with a determination that) the audio content being played changes from music of the first type to music of the second type, the virtual space used to simulated production of the audio content in a simulated three-dimensional environment changes from the first virtual room to the second virtual space. Automatically changing the virtual space being used to simulate production of audio content when the category of music content being played changes from a first type to a second type improves operation of the electronic device by automatically simulating production of the audio content in virtual spaces that have acoustic properties similar to the acoustic properties of a variety of "real" physical spaces in which different types of music are typically produced. In addition, this avoids the user having to determine the acoustic properties to assign to the virtual spaces used to simulate production of audio content when the audio content changes from music of the first type to music of the second type, thereby reducing the number of user inputs required and reducing mistakes by the user, which enhances the operability of the device and makes the user-device interface more efficient.

In some embodiments, method 1300 includes determining (1362) a category of the audio content based at least in part on a type of the electronic device (e.g., where the types of electronic devices upon which a category of the audio content is based includes two or more of: an electronic device for providing content to a television, a television, a video player, a phone, a tablet, a desktop computer, a laptop computer, AR/VR devices, etc.). In some such embodiments, for a given type of audio content, such as music or a specific type of music, different categories of content are determined when the electronic device is a device for providing content to a television and when the electronic device is a phone or tablet. For example, when the input source for the one or more audio output devices (e.g., headphones or other wearable audio output devices) changes from the electronic device to a second electronic device (e.g., when the user, while watching a media item (e.g., a video) or listening to a media item (e.g., music), switches playback of the media item from a smart phone to a TV, or vice versa, the virtual space used to simulated production of the audio content changes from a currently used virtual space to a different virtual space. Examples of content categorization, and selection of a virtual space, based on the type of the electronic device that is outputting the audio content are discussed above with reference to FIGS. 11U and 11V.

Automatically changing the virtual space being used to simulate production of audio content based at least in part on the type of the electronic device improves operation of the electronic device by automatically simulating production of the audio content in virtual spaces corresponding to the type of the electronic device. In addition, this avoids the user having to determine the acoustic properties to assign to the virtual spaces used to simulate production of audio content when production of the audio content changes from an electronic device of one type to an electronic device of another type, thereby reducing the number of user inputs required and reducing mistakes by the user, which enhances the operability of the device and makes the user-device interface more efficient.

It should be understood that the particular order in which the operations in FIGS. 13A-13E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800 and 1200) are also applicable in an analogous manner to method 1300 described above with respect to FIGS. 13A-13E. For example, the user interfaces, user interface elements, audio output devices, audio output modes, inputs, interactions, and animations described above with reference to method 1300 optionally have one or more of the characteristics of the user interfaces, user interface elements, audio output devices, audio output modes, inputs, interactions, and animations described herein with reference to other methods described herein (e.g., methods 700, 800 and 1200). For brevity, these details are not repeated here.

It should be understood that the particular order in which the operations in FIGS. 13A-13E have been described is merely an example and is not intended to indicate that the described order is the only order in which the operations could be performed. One of ordinary skill in the art would recognize various ways to reorder the operations described herein. Additionally, it should be noted that details of other processes described herein with respect to the other methods described herein (e.g., methods 700, 800, and 1200) are also applicable in an analogous manner to method 1300 described above with respect to FIGS. 13A-13E. For example, the user interfaces, interactions, and animations described above with reference to method 1300 optionally have one or more of the characteristics of the user interfaces, interactions, and animations described herein with reference to the other methods described herein (e.g., methods 700, 800, and 1200).

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten or described as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at an electronic device that is in communication with one or more display devices, one or more input devices, and a set of one or more wearable audio output devices:
displaying, via the one or more display devices, a user interface including respective dynamic visual representations of a plurality of participants in a communication session, including displaying, at a first location in the user interface, a first dynamic visual representation of a first participant and displaying, at a second location in the user interface, a second dynamic visual representation of a second participant different from the first participant;
outputting, via the set of one or more wearable audio output devices, audio from the plurality of participants in the communication session, including:
outputting first audio from the first participant, wherein the first audio is adjusted so as to maintain the first audio at a first simulated spatial location relative to a frame of reference of the communication session independently of a position of the set of one or more wearable audio output devices relative to the frame of reference, wherein the first simulated spatial location corresponds to the first location of the first dynamic visual representation in the user interface; and
outputting second audio from the second participant, wherein the second audio is adjusted, so as to maintain the second audio at a second simulated spatial location relative to the frame of reference independently of a position of the set of one or more wearable audio output devices relative to the frame of reference, wherein the second simulated spatial location corresponds to the second location of the second dynamic visual representation in the user interface;
receiving, via the one or more input devices, an input selecting the first dynamic visual representation of the first participant;
in response to receiving the input selecting the first dynamic visual representation of the first participant:
displaying the first dynamic visual representation of the first participant at a third location, different from the first location, in the user interface, and outputting the first audio from the first participant so as to position the first audio at a third simulated spatial location, relative to the frame of reference, that corresponds to the third location of the first dynamic visual representation in the user interface, wherein the third simulated spatial location is different from the first simulated spatial location; and
displaying the second dynamic visual representation of the second participant at a fourth location in the user interface, and outputting the second audio from the second participant so as to position the second audio at a fourth simulated spatial location, relative to the frame of reference, that corresponds to the fourth location of the second dynamic visual representation in the user interface.

2. The method of claim 1, wherein the fourth location is different from the second location in the user interface, and the fourth simulated spatial location is different from the second simulated spatial location.

3. The method of claim 2, wherein:
the third location in the user interface is in a respective direction relative to the first location in the user interface, and the fourth location in the user interface is in the respective direction relative to the second location in the user interface; and
the third simulated spatial location is substantially in the respective direction relative to the first simulated spatial location, and the fourth simulated spatial location is in substantially the respective direction relative to the second simulated spatial location.

4. The method of claim 1, wherein:
the first location in the user interface is outside a respective region of the user interface;
the second location in the user interface is within the respective region;
the third location in the user interface is within the respective region; and
the fourth location in the user interface is outside the respective region.

5. The method of claim 1, wherein the third simulated spatial location is closer to a spatial location of the set of one or more wearable audio output devices than the first simulated spatial location and the second simulated spatial location, and the method includes, in response to receiving the input selecting the first dynamic visual representation of the first participant, emphasizing the first audio from the first participant relative to the second audio from the second participant.

6. The method of claim 5, wherein, in response to receiving the input selecting the first dynamic visual representation of the first participant, the first audio is output so as to be positioned at the third simulated spatial location for a first predefined amount of time, and the method includes, after the first audio is output so as to be positioned at the third simulated spatial location for the first predefined amount of time, outputting the first audio at a simulated spatial location that is further from the spatial location of the set of one or more wearable audio output devices than the third simulated spatial location.

7. The method of claim 5, wherein the input selecting the first dynamic visual representation of the first participant includes selection of a representation of a user of the electronic device, displayed in the user interface, and a drag gesture to move the representation of the user in the user interface to within a predefined distance of the first dynamic visual representation of the first participant, and the method includes, in response to receiving the input selecting the first dynamic visual representation of the first participant, displaying an indication that the first dynamic visual representation of the first participant is associated with the representation of the user.

8. The method of claim 5, including:
in response to receiving the input selecting the first dynamic visual representation of the first participant, transmitting, to the first participant, a request to establish a partial communication session between the user and the first participant; and
in response to receiving an indication of the first participant accepting the request to establish the partial communication session, displaying an indication that the first dynamic visual representation of the first participant is associated with the representation of the user.

9. The method of claim 1, wherein receiving the input selecting the first dynamic visual representation of the first participant includes detecting, via the one or more input devices, the input at an initial location corresponding to the first dynamic visual representation and continuing to detect the input at the initial location for at least a second predefined amount of time.

10. The method of claim 1, wherein receiving the input selecting the first dynamic visual representation of the first participant includes concurrently detecting, via the one or more input devices, a first input point concurrently with a second input point, and movement of the first input point towards or away from the second input point.

11. The method of claim 1, wherein the input selecting the first dynamic visual representation of the first participant includes selection of the first dynamic visual representation while the first dynamic visual representation is displayed at the first location in the user interface and a drag gesture to move the first dynamic visual representation to the third location in the user interface.

12. The method of claim 1, including scrolling the user interface in response to detecting movement of the electronic device relative to a physical environment in which the electronic device is located, wherein, while the first dynamic visual representation is displayed at the first location in the user interface, the first dynamic visual representation of the first participant is outside a focal region of the user interface, and receiving the input selecting the first dynamic visual representation of the first participant includes detecting movement of the electronic device to scroll the user interface such that the first dynamic visual representation is within the focal region of the user interface.

13. The method of claim 1, wherein the audio from the plurality of participants in the communication session is output at a plurality of simulated spatial locations relative to the frame of reference, and the method includes:
receiving a request to output, in the communication session, respective audio from the electronic device; and
in response to receiving the request to output the respective audio, outputting, via the set of one or more wearable audio output devices, the respective audio, including adjusting the respective audio so as to maintain the respective audio at a first respective simulated spatial location, relative to the frame of reference, that is different from the plurality of simulated spatial locations.

14. The method of claim 13, wherein the respective audio is output via the communication session to the plurality of participants.

15. The method of claim 13, including:
receiving a request to reposition the respective audio; and
in response to receiving the request to reposition the respective audio, outputting the respective audio, including adjusting the respective audio so as to maintain the respective audio at a second respective simulated spatial location, relative to the frame of reference, that is different from the plurality of simulated spatial locations and different from the first respective simulated spatial location.

16. The method of claim 13, wherein a distance between respective simulated spatial locations of any two participants of the plurality of participants in the communication session is less than a distance between a simulated spatial location of the respective audio and a simulated spatial location of any respective participant of the plurality of participants.

17. The method of claim 1, including:
detecting movement of the set of one or more wearable audio output devices relative to the frame of reference without detecting movement of the electronic device and without detecting input directed to the user interface; and
in response to detecting the movement of the set of one or more wearable audio output devices relative to the frame of reference, outputting respective audio from the plurality of participants in the communication session at respective simulated spatial locations, including adjusting the respective audio from the plurality of participants as the set of one or more wearable audio output devices moves relative to the frame of reference so as to maintain the respective audio at the respective simulated spatial locations relative to the frame of reference independently of a position of the set of one or more wearable audio output devices relative to the frame of reference.

18. The method of claim 1, wherein the electronic device is in communication with one or more cameras in a physical environment, and the method includes displaying in the user interface, via the one or more display devices, a representation of a portion of the physical environment that is in a field of view of the one or more cameras, wherein the respective dynamic visual representations of the plurality of participants in the communication session are displayed at respective locations in the representation of the field of view of the one or more cameras corresponding to respective physical locations in the physical environment.

19. The method of claim 1, including:

displaying the first dynamic visual representation of the first participant with a first size, wherein the first size is determined in accordance with a distance between a current simulated spatial location of the first audio from the first participant and a spatial location of the set of one or more wearable audio output devices; and displaying the second dynamic visual representation of the second participant with a second size, wherein the second size is determined in accordance with a distance between a current simulated spatial location of the second audio from the second participant and the spatial location of the set of one or more wearable audio output devices.

20. The method of claim 1, including displaying in the user interface, in a roster region of the user interface, separate from locations at which the first dynamic visual representation of the first participant and the second dynamic visual representation of the second participant are displayed, dynamic visual representations of third and fourth participants in the communication session, and outputting, via the set of one or more audio output devices, audio from the third and fourth participants, wherein the audio from the third and fourth participants is deemphasized relative to audio output from the first and second participants.

21. The method of claim 20, wherein the audio from the third and fourth participants is deemphasized relative to audio output from the first and second participants by outputting the audio from the third and fourth participants with a different ratio of direct to reverberated sound than a ratio of direct to reverberated sound for the first participant and second participant.

22. The method of claim 20, wherein the audio from the third and fourth participants is deemphasized relative to audio output from the first and second participants by outputting the audio from the third and fourth participants at one or more simulated spatial locations that are further from a first spatial location, for the electronic device, than simulated spatial locations at which audio from the first participant and second participant are output.

23. The method of claim 20, wherein the audio from the third and fourth participants is deemphasized relative to audio output from the first and second participants by changing volume of the audio output from the third and fourth participants relative to volume of the audio output from the first participant and second participant.

24. The method of claim 20, further including identifying the third and fourth participants as roster participants, in accordance with predefined characteristics of the audio from the third and fourth participants meeting predefined roster criteria, and in accordance with the identification of the third and fourth participants as roster participants, displaying the dynamic visual representations of third and fourth participants in the roster region of the user interface and deemphasizing the audio output, via the set of one or more audio output devices, from the third and fourth participants, relative to audio output from the first and second participants.

25. The method of claim 1, further comprising determining one or more metrics of overlapping audio from two or more participants in the communication session, and in accordance with a determination that the one or more metrics of overlapping audio meet predefined overlap criteria, positioning simulated spatial locations of audio from the plurality of participants at wider angles, relative to each other, than default angles at which the simulated spatial locations of audio from the plurality of participants are positioned in accordance with a determination that the one or more metrics of overlapping audio do not meet the predefined overlap criteria.

26. The method of claim 1, wherein
the first audio from the first participant is output at the first simulated spatial location and the second audio from the second participant is output at the second simulated spatial location while the one or more display devices of the electronic device has a first orientation relative to a physical environment in which the electronic device is located; and
the method further includes:
detecting a change in the orientation of the electronic device from the first orientation to a second orientation relative to the physical environment in which the electronic device is located, and
in response to detecting the change in the orientation of the electronic device from the first orientation to a second orientation relative to the physical environment in which the electronic device is located, changing at least one of a simulated spatial location at which the first audio from the first participant is output and a simulated spatial location at which the second audio from the second participant is output so as to change a distance between the simulated spatial locations at which the first audio from the first participant is output and the simulated spatial location at which the second audio from the second participant is output.

27. The method of claim 26, further including, in response to detecting the change in the orientation of the electronic device from the first orientation to a second orientation relative to the physical environment in which the electronic device is located, changing at least one of a location of the first dynamic visual representation of the first participant in the user interface and a location of the second dynamic visual representation of the second participant in the user interface so as to change a distance between the locations of the first dynamic visual representation of the first participant and the second dynamic visual representation of the second participant in the user interface.

28. An electronic device that is in communication with one or more display devices, one or more input devices, and a set of one or more wearable audio output devices, the electronic device comprising:
one or more processors; and
memory storing one or more programs, wherein the one or more programs are configured to be executed by the one or more processors, the one or more programs including instructions for:
displaying, via the one or more display devices, a user interface including respective dynamic visual representations of a plurality of participants in a communication session, including displaying, at a first location in the user interface, a first dynamic visual representation of a first participant and displaying, at a second location in the user interface, a second dynamic visual representation of a second participant different from the first participant;
outputting, via the set of one or more wearable audio output devices, audio from the plurality of participants in the communication session, including:
outputting first audio from the first participant, wherein the first audio is adjusted so as to maintain the first audio at a first simulated spatial location relative to a frame of reference of the communication session independently of a position of the set of one or more wearable audio output devices relative to the frame of reference, wherein the first simulated spatial location corresponds to the first location of the first dynamic visual representation in the user interface; and outputting second audio from the second participant, wherein the second audio is adjusted, so as to maintain the second audio at a second simulated spatial location relative to the frame of reference independently of a position of the set of one or more wearable audio output devices relative to the frame of reference, wherein the second simulated spatial location corresponds to the second location of the second dynamic visual representation in the user interface;

receiving, via the one or more input devices, an input selecting the first dynamic visual representation of the first participant;

in response to receiving the input selecting the first dynamic visual representation of the first participant:

displaying the first dynamic visual representation of the first participant at a third location, different from the first location, in the user interface, and outputting the first audio from the first participant so as to position the first audio at a third simulated spatial location, relative to the frame of reference, that corresponds to the third location of the first dynamic visual representation in the user interface, wherein the third simulated spatial location is different from the first simulated spatial location; and displaying the second dynamic visual representation of the second participant at a fourth location in the user interface, and outputting the second audio from the second participant so as to position the second audio at a fourth simulated spatial location, relative to the frame of reference, that corresponds to the fourth location of the second dynamic visual representation in the user interface.

29. A non-transitory computer readable storage medium storing one or more programs, the one or more programs comprising instructions that, when executed by an electronic device that is in communication with one or more display devices, one or more input devices, and a set of one or more wearable audio output devices, cause the electronic device to:

display, via the one or more display devices, a user interface including respective dynamic visual representations of a plurality of participants in a communication session, including displaying, at a first location in the user interface, a first dynamic visual representation of a first participant and displaying, at a second location in the user interface, a second dynamic visual representation of a second participant different from the first participant;

output, via the set of one or more wearable audio output devices, audio from the plurality of participants in the communication session, wherein outputting audio from the plurality of participants in the communication session includes:

outputting first audio from the first participant, wherein the first audio is adjusted so as to maintain the first audio at a first simulated spatial location relative to a frame of reference of the communication session independently of a position of the set of one or more wearable audio output devices relative to the frame of reference, wherein the first simulated spatial location corresponds to the first location of the first dynamic visual representation in the user interface; and outputting second audio from the second participant, wherein the second audio is adjusted, so as to maintain the second audio at a second simulated spatial location relative to the frame of reference independently of a position of the set of one or more wearable audio output devices relative to the frame of reference, wherein the second simulated spatial location corresponds to the second location of the second dynamic visual representation in the user interface;

receive, via the one or more input devices, an input selecting the first dynamic visual representation of the first participant; and in response to receiving the input selecting the first dynamic visual representation of the first participant:

display the first dynamic visual representation of the first participant at a third location, different from the first location, in the user interface, and outputting the first audio from the first participant so as to position the first audio at a third simulated spatial location, relative to the frame of reference, that corresponds to the third location of the first dynamic visual representation in the user interface, wherein the third simulated spatial location is different from the first simulated spatial location; and display the second dynamic visual representation of the second participant at a fourth location in the user interface, and outputting the second audio from the second participant so as to position the second audio at a fourth simulated spatial location, relative to the frame of reference, that corresponds to the fourth location of the second dynamic visual representation in the user interface.

30. The electronic device of claim 28, wherein the fourth location is different from the second location in the user interface, and the fourth simulated spatial location is different from the second simulated spatial location.

31. The electronic device of claim 30, wherein:

the third location in the user interface is in a respective direction relative to the first location in the user interface, and the fourth location in the user interface is in the respective direction relative to the second location in the user interface; and the third simulated spatial location is substantially in the respective direction relative to the first simulated spatial location, and the fourth simulated spatial location is in substantially the respective direction relative to the second simulated spatial location.

32. The electronic device of claim 28, wherein:

the first location in the user interface is outside a respective region of the user interface;

the second location in the user interface is within the respective region;

the third location in the user interface is within the respective region; and the fourth location in the user interface is outside the respective region.

33. The electronic device of claim 28, wherein the third simulated spatial location is closer to a spatial location of the set of one or more wearable audio output devices than the first simulated spatial location and the second simulated spatial location, and the one or more programs include instructions for, in response to receiving the input selecting the first dynamic visual representation of the first participant, emphasizing the first audio from the first participant relative to the second audio from the second participant.

34. The electronic device of claim 33, wherein, in response to receiving the input selecting the first dynamic visual representation of the first participant, the first audio is output so as to be positioned at the third simulated spatial location for a first predefined amount of time, and the one or more programs include instructions for, after the first audio is output so as to be positioned at the third simulated spatial location for the first predefined amount of time, outputting the first audio at a simulated spatial location that is further from the spatial location of the set of one or more wearable audio output devices than the third simulated spatial location.

35. The electronic device of claim 33, wherein the input selecting the first dynamic visual representation of the first participant includes selection of a representation of a user of the electronic device, displayed in the user interface, and a drag gesture to move the representation of the user in the user interface to within a predefined distance of the first dynamic visual representation of the first participant, and the one or more programs include instructions for, in response to receiving the input selecting the first dynamic visual representation of the first participant, displaying an indication that the first dynamic visual representation of the first participant is associated with the representation of the user.

36. The electronic device of claim 33, wherein the one or more programs include instructions for:
    in response to receiving the input selecting the first dynamic visual representation of the first participant, transmitting, to the first participant, a request to establish a partial communication session between the user and the first participant; and
    in response to receiving an indication of the first participant accepting the request to establish the partial communication session, displaying an indication that the first dynamic visual representation of the first participant is associated with the representation of the user.

37. The electronic device of claim 28, wherein receiving the input selecting the first dynamic visual representation of the first participant includes detecting, via the one or more input devices, the input at an initial location corresponding to the first dynamic visual representation and continuing to detect the input at the initial location for at least a second predefined amount of time.

38. The electronic device of claim 28, wherein receiving the input selecting the first dynamic visual representation of the first participant includes concurrently detecting, via the one or more input devices, a first input point concurrently with a second input point, and movement of the first input point towards or away from the second input point.

39. The electronic device of claim 28, wherein the input selecting the first dynamic visual representation of the first participant includes selection of the first dynamic visual representation while the first dynamic visual representation is displayed at the first location in the user interface and a drag gesture to move the first dynamic visual representation to the third location in the user interface.

40. The electronic device of claim 28, wherein the one or more programs include instructions for scrolling the user interface in response to detecting movement of the electronic device relative to a physical environment in which the electronic device is located, wherein, while the first dynamic visual representation is displayed at the first location in the user interface, the first dynamic visual representation of the first participant is outside a focal region of the user interface, and receiving the input selecting the first dynamic visual representation of the first participant includes detecting movement of the electronic device to scroll the user interface such that the first dynamic visual representation is within the focal region of the user interface.

41. The electronic device of claim 28, wherein the audio from the plurality of participants in the communication session is output at a plurality of simulated spatial locations relative to the frame of reference, and the one or more programs include instructions for:
    receiving a request to output, in the communication session, respective audio from the electronic device; and
    in response to receiving the request to output the respective audio, outputting, via the set of one or more wearable audio output devices, the respective audio, including adjusting the respective audio so as to maintain the respective audio at a first respective simulated spatial location, relative to the frame of reference, that is different from the plurality of simulated spatial locations.

42. The electronic device of claim 41, wherein the respective audio is output via the communication session to the plurality of participants.

43. The electronic device of claim 41, wherein the one or more programs include instructions for:
    receiving a request to reposition the respective audio; and
    in response to receiving the request to reposition the respective audio, outputting the respective audio, including adjusting the respective audio so as to maintain the respective audio at a second respective simulated spatial location, relative to the frame of reference, that is different from the plurality of simulated spatial locations and different from the first respective simulated spatial location.

44. The electronic device of claim 41, wherein a distance between respective simulated spatial locations of any two participants of the plurality of participants in the communication session is less than a distance between a simulated spatial location of the respective audio and a simulated spatial location of any respective participant of the plurality of participants.

45. The electronic device of claim 28, wherein the one or more programs include instructions for:
    detecting movement of the set of one or more wearable audio output devices relative to the frame of reference without detecting movement of the electronic device and without detecting input directed to the user interface; and
    in response to detecting the movement of the set of one or more wearable audio output devices relative to the frame of reference, outputting respective audio from the plurality of participants in the communication session at respective simulated spatial locations, including adjusting the respective audio from the plurality of participants as the set of one or more wearable audio output devices moves relative to the frame of reference so as to maintain the respective audio at the respective simulated spatial locations relative to the frame of reference independently of a position of the set of one or more wearable audio output devices relative to the frame of reference.

46. The electronic device of claim 28, wherein the electronic device is in communication with one or more cameras in a physical environment, and the one or more programs include instructions for displaying in the user interface, via the one or more display devices, a representation of a portion of the physical environment that is in a field of view of the one or more cameras, wherein the respective dynamic visual representations of the plurality of participants in the communication session are displayed at respective locations in the representation of the field of view of the one or more cameras corresponding to respective physical locations in the physical environment.

47. The electronic device of claim 28, wherein the one or more programs include instructions for:
displaying the first dynamic visual representation of the first participant with a first size, wherein the first size is determined in accordance with a distance between a current simulated spatial location of the first audio from the first participant and a spatial location of the set of one or more wearable audio output devices; and
displaying the second dynamic visual representation of the second participant with a second size, wherein the second size is determined in accordance with a distance between a current simulated spatial location of the second audio from the second participant and the spatial location of the set of one or more wearable audio output devices.

48. The electronic device of claim 28, wherein the one or more programs include instructions for displaying in the user interface, in a roster region of the user interface, separate from locations at which the first dynamic visual representation of the first participant and the second dynamic visual representation of the second participant are displayed, dynamic visual representations of third and fourth participants in the communication session, and outputting, via the set of one or more audio output devices, audio from the third and fourth participants, wherein the audio from the third and fourth participants is deemphasized relative to audio output from the first and second participants.

49. The electronic device of claim 48, wherein the audio from the third and fourth participants is deemphasized relative to audio output from the first and second participants by outputting the audio from the third and fourth participants with a different ratio of direct to reverberated sound than a ratio of direct to reverberated sound for the first participant and second participant.

50. The electronic device of claim 48, wherein the audio from the third and fourth participants is deemphasized relative to audio output from the first and second participants by outputting the audio from the third and fourth participants at one or more simulated spatial locations that are further from a first spatial location, for the electronic device, than simulated spatial locations at which audio from the first participant and second participant are output.

51. The electronic device of claim 48, wherein the audio from the third and fourth participants is deemphasized relative to audio output from the first and second participants by changing volume of the audio output from the third and fourth participants relative to volume of the audio output from the first participant and second participant.

52. The electronic device of claim 48, wherein the one or more programs include instructions for identifying the third and fourth participants as roster participants, in accordance with predefined characteristics of the audio from the third and fourth participants meeting predefined roster criteria, and in accordance with the identification of the third and fourth participants as roster participants, displaying the dynamic visual representations of third and fourth participants in the roster region of the user interface and deemphasizing the audio output, via the set of one or more audio output devices, from the third and fourth participants, relative to audio output from the first and second participants.

53. The electronic device of claim 28, wherein the one or more programs include instructions for determining one or more metrics of overlapping audio from two or more participants in the communication session, and in accordance with a determination that the one or more metrics of overlapping audio meet predefined overlap criteria, positioning simulated spatial locations of audio from the plurality of participants at wider angles, relative to each other, than default angles at which the simulated spatial locations of audio from the plurality of participants are positioned in accordance with a determination that the one or more metrics of overlapping audio do not meet the predefined overlap criteria.

54. The electronic device of claim 28, wherein
the first audio from the first participant is output at the first simulated spatial location and the second audio from the second participant is output at the second simulated spatial location while the one or more display devices of the electronic device has a first orientation relative to a physical environment in which the electronic device is located; and
the one or more programs include instructions for:
detecting a change in the orientation of the electronic device from the first orientation to a second orientation relative to the physical environment in which the electronic device is located, and
in response to detecting the change in the orientation of the electronic device from the first orientation to a second orientation relative to the physical environment in which the electronic device is located, changing at least one of a simulated spatial location at which the first audio from the first participant is output and a simulated spatial location at which the second audio from the second participant is output so as to change a distance between the simulated spatial locations at which the first audio from the first participant is output and the simulated spatial location at which the second audio from the second participant is output.

55. The electronic device of claim 54, wherein the one or more programs include instructions for, in response to detecting the change in the orientation of the electronic device from the first orientation to a second orientation relative to the physical environment in which the electronic device is located, changing at least one of a location of the first dynamic visual representation of the first participant in the user interface and a location of the second dynamic visual representation of the second participant in the user interface so as to change a distance between the locations of the first dynamic visual representation of the first participant and the second dynamic visual representation of the second participant in the user interface.

56. The non-transitory computer readable storage medium of claim 29, wherein the fourth location is different from the second location in the user interface, and the fourth simulated spatial location is different from the second simulated spatial location.

57. The non-transitory computer readable storage medium of claim 56, wherein:
the third location in the user interface is in a respective direction relative to the first location in the user interface, and the fourth location in the user interface is in the respective direction relative to the second location in the user interface; and
the third simulated spatial location is substantially in the respective direction relative to the first simulated spatial location, and the fourth simulated spatial location is in substantially the respective direction relative to the second simulated spatial location.

58. The non-transitory computer readable storage medium of claim 29, wherein:
the first location in the user interface is outside a respective region of the user interface;
the second location in the user interface is within the respective region;
the third location in the user interface is within the respective region; and
the fourth location in the user interface is outside the respective region.

59. The non-transitory computer readable storage medium of claim 29, wherein the third simulated spatial location is closer to a spatial location of the set of one or more wearable audio output devices than the first simulated spatial location and the second simulated spatial location, and the one or more programs comprising instructions that, when executed by the electronic device, cause the electronic device to, in response to receiving the input selecting the first dynamic visual representation of the first participant, emphasize the first audio from the first participant relative to the second audio from the second participant.

60. The non-transitory computer readable storage medium of claim 59, wherein, in response to receiving the input selecting the first dynamic visual representation of the first participant, the first audio is output so as to be positioned at the third simulated spatial location for a first predefined amount of time, and the one or more programs comprising instructions that, when executed by the electronic device, cause the electronic device to, after the first audio is output so as to be positioned at the third simulated spatial location for the first predefined amount of time, output the first audio at a simulated spatial location that is further from the spatial location of the set of one or more wearable audio output devices than the third simulated spatial location.

61. The non-transitory computer readable storage medium of claim 59, wherein the input selecting the first dynamic visual representation of the first participant includes selection of a representation of a user of the electronic device, displayed in the user interface, and a drag gesture to move the representation of the user in the user interface to within a predefined distance of the first dynamic visual representation of the first participant, and the one or more programs comprising instructions that, when executed by the electronic device, cause the electronic device to, in response to receiving the input selecting the first dynamic visual representation of the first participant, display an indication that the first dynamic visual representation of the first participant is associated with the representation of the user.

62. The non-transitory computer readable storage medium of claim 59, wherein the one or more programs comprising instructions that, when executed by the electronic device, cause the electronic device to:
in response to receiving the input selecting the first dynamic visual representation of the first participant, transmit, to the first participant, a request to establish a partial communication session between the user and the first participant; and
in response to receiving an indication of the first participant accepting the request to establish the partial communication session, display an indication that the first dynamic visual representation of the first participant is associated with the representation of the user.

63. The non-transitory computer readable storage medium of claim 29, wherein receiving the input selecting the first dynamic visual representation of the first participant includes detecting, via the one or more input devices, the input at an initial location corresponding to the first dynamic visual representation and continuing to detect the input at the initial location for at least a second predefined amount of time.

64. The non-transitory computer readable storage medium of claim 29, wherein receiving the input selecting the first dynamic visual representation of the first participant includes concurrently detecting, via the one or more input devices, a first input point concurrently with a second input point, and movement of the first input point towards or away from the second input point.

65. The non-transitory computer readable storage medium of claim 29, wherein the input selecting the first dynamic visual representation of the first participant includes selection of the first dynamic visual representation while the first dynamic visual representation is displayed at the first location in the user interface and a drag gesture to move the first dynamic visual representation to the third location in the user interface.

66. The non-transitory computer readable storage medium of claim 29, wherein the one or more programs comprise instructions that, when executed by the electronic device, cause the electronic device to scroll the user interface in response to detecting movement of the electronic device relative to a physical environment in which the electronic device is located, wherein, while the first dynamic visual representation is displayed at the first location in the user interface, the first dynamic visual representation of the first participant is outside a focal region of the user interface, and receiving the input selecting the first dynamic visual representation of the first participant includes detecting movement of the electronic device to scroll the user interface such that the first dynamic visual representation is within the focal region of the user interface.

67. The non-transitory computer readable storage medium of claim 29, wherein the audio from the plurality of participants in the communication session is output at a plurality of simulated spatial locations relative to the frame of reference, and the one or more programs comprise instructions that, when executed by the electronic device, cause the electronic device to:
receive a request to output, in the communication session, respective audio from the electronic device; and
in response to receiving the request to output the respective audio, output, via the set of one or more wearable audio output devices, the respective audio, including adjusting the respective audio so as to maintain the respective audio at a first respective simulated spatial location, relative to the frame of reference, that is different from the plurality of simulated spatial locations.

68. The non-transitory computer readable storage medium of claim 67, wherein the respective audio is output via the communication session to the plurality of participants.

69. The non-transitory computer readable storage medium of claim 67, wherein the one or more programs comprise instructions that, when executed by the electronic device, cause the electronic device to:
receive a request to reposition the respective audio; and
in response to receiving the request to reposition the respective audio, output the respective audio, including adjusting the respective audio so as to maintain the respective audio at a second respective simulated spatial location, relative to the frame of reference, that is different from the plurality of simulated spatial locations and different from the first respective simulated spatial location.

70. The non-transitory computer readable storage medium of claim 67, wherein a distance between respective simulated spatial locations of any two participants of the plurality of participants in the communication session is less than a distance between a simulated spatial location of the respective audio and a simulated spatial location of any respective participant of the plurality of participants.

71. The non-transitory computer readable storage medium of claim 29, wherein the one or more programs comprising instructions that, when executed by the electronic device, cause the electronic device to:
   detect movement of the set of one or more wearable audio output devices relative to the frame of reference without detecting movement of the electronic device and without detecting input directed to the user interface; and
   in response to detecting the movement of the set of one or more wearable audio output devices relative to the frame of reference, output respective audio from the plurality of participants in the communication session at respective simulated spatial locations, including adjusting the respective audio from the plurality of participants as the set of one or more wearable audio output devices moves relative to the frame of reference so as to maintain the respective audio at the respective simulated spatial locations relative to the frame of reference independently of a position of the set of one or more wearable audio output devices relative to the frame of reference.

72. The non-transitory computer readable storage medium of claim 29, wherein the electronic device is in communication with one or more cameras in a physical environment, and the one or more programs comprising instructions that, when executed by the electronic device, cause the electronic device to display in the user interface, via the one or more display devices, a representation of a portion of the physical environment that is in a field of view of the one or more cameras, wherein the respective dynamic visual representations of the plurality of participants in the communication session are displayed at respective locations in the representation of the field of view of the one or more cameras corresponding to respective physical locations in the physical environment.

73. The non-transitory computer readable storage medium of claim 29, wherein the one or more programs comprising instructions that, when executed by the electronic device, cause the electronic device to:
   display the first dynamic visual representation of the first participant with a first size, wherein the first size is determined in accordance with a distance between a current simulated spatial location of the first audio from the first participant and a spatial location of the set of one or more wearable audio output devices; and
   display the second dynamic visual representation of the second participant with a second size, wherein the second size is determined in accordance with a distance between a current simulated spatial location of the second audio from the second participant and the spatial location of the set of one or more wearable audio output devices.

74. The non-transitory computer readable storage medium of claim 29, wherein the one or more programs comprising instructions that, when executed by the electronic device, cause the electronic device to display in the user interface, in a roster region of the user interface, separate from locations at which the first dynamic visual representation of the first participant and the second dynamic visual representation of the second participant are displayed, dynamic visual representations of third and fourth participants in the communication session, and outputting, via the set of one or more audio output devices, audio from the third and fourth participants, wherein the audio from the third and fourth participants is deemphasized relative to audio output from the first and second participants.

75. The non-transitory computer readable storage medium of claim 74, wherein the audio from the third and fourth participants is deemphasized relative to audio output from the first and second participants by outputting the audio from the third and fourth participants with a different ratio of direct to reverberated sound than a ratio of direct to reverberated sound for the first participant and second participant.

76. The non-transitory computer readable storage medium of claim 74, wherein the audio from the third and fourth participants is deemphasized relative to audio output from the first and second participants by outputting the audio from the third and fourth participants at one or more simulated spatial locations that are further from a first spatial location, for the electronic device, than simulated spatial locations at which audio from the first participant and second participant are output.

77. The non-transitory computer readable storage medium of claim 74, wherein the audio from the third and fourth participants is deemphasized relative to audio output from the first and second participants by changing volume of the audio output from the third and fourth participants relative to volume of the audio output from the first participant and second participant.

78. The non-transitory computer readable storage medium of claim 74, wherein the one or more programs comprising instructions that, when executed by the electronic device, cause the electronic device to identify the third and fourth participants as roster participants, in accordance with predefined characteristics of the audio from the third and fourth participants meeting predefined roster criteria, and in accordance with the identification of the third and fourth participants as roster participants, display the dynamic visual representations of third and fourth participants in the roster region of the user interface and deemphasizing the audio output, via the set of one or more audio output devices, from the third and fourth participants, relative to audio output from the first and second participants.

79. The non-transitory computer readable storage medium of claim 29, wherein the one or more programs comprising instructions that, when executed by the electronic device, cause the electronic device to determine one or more metrics of overlapping audio from two or more participants in the communication session, and in accordance with a determination that the one or more metrics of overlapping audio meet predefined overlap criteria, position simulated spatial locations of audio from the plurality of participants at wider angles, relative to each other, than default angles at which the simulated spatial locations of audio from the plurality of participants are positioned in accordance with a determination that the one or more metrics of overlapping audio do not meet the predefined overlap criteria.

80. The non-transitory computer readable storage medium of claim 29, wherein
   the first audio from the first participant is output at the first simulated spatial location and the second audio from the second participant is output at the second simulated spatial location while the one or more display devices of the electronic device has a first orientation relative to a physical environment in which the electronic device is located; and the one or more programs comprising instructions that, when executed by the electronic device, cause the electronic device to:

detect a change in the orientation of the electronic device from the first orientation to a second orientation relative to the physical environment in which the electronic device is located, and in response to detecting the change in the orientation of the electronic device from the first orientation to a second orientation relative to the physical environment in which the electronic device is located, change at least one of a simulated spatial location at which the first audio from the first participant is output and a simulated spatial location at which the second audio from the second participant is output so as to change a distance between the simulated spatial locations at which the first audio from the first participant is output and the simulated spatial location at which the second audio from the second participant is output.

81. The non-transitory computer readable storage medium of claim 80, wherein the one or more programs comprising instructions that, when executed by the electronic device, cause the electronic device to, in response to detecting the change in the orientation of the electronic device from the first orientation to a second orientation relative to the physical environment in which the electronic device is located, change at least one of a location of the first dynamic visual representation of the first participant in the user interface and a location of the second dynamic visual representation of the second participant in the user interface so as to change a distance between the locations of the first dynamic visual representation of the first participant and the second dynamic visual representation of the second participant in the user interface.

* * * * *